(12) United States Patent
Raleigh

(10) Patent No.: US 8,675,507 B2
(45) Date of Patent: Mar. 18, 2014

(54) SERVICE PROFILE MANAGEMENT WITH USER PREFERENCE, ADAPTIVE POLICY, NETWORK NEUTRALITY AND USER PRIVACY FOR INTERMEDIATE NETWORKING DEVICES

(75) Inventor: Gregory G. Raleigh, Woodside, CA (US)

(73) Assignee: Headwater Partners I LLC, Redwood Shores, CA (US)

( * ) Notice: Subject to any disclaimer, the term of this patent is extended or adjusted under 35 U.S.C. 154(b) by 656 days.

(21) Appl. No.: 12/380,769

(22) Filed: Mar. 2, 2009

(65) Prior Publication Data
US 2010/0188992 A1 Jul. 29, 2010

Related U.S. Application Data

(60) Provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(51) Int. Cl.
*H04L 12/26* (2006.01)

(52) U.S. Cl.
USPC .......................................... 370/252; 455/405

(58) Field of Classification Search
USPC .......... 370/252–253, 465, 468; 709/223–226; 455/405–408, 432.1
See application file for complete search history.

(56) References Cited

U.S. PATENT DOCUMENTS

| | | | |
|---|---|---|---|
| 5,283,904 | A | 2/1994 | Carson et al. |
| 5,577,100 | A | 11/1996 | McGregor et al. |
| 5,594,777 | A | 1/1997 | Makkonen et al. |
| 5,630,159 | A | 5/1997 | Zancho |
| 5,633,484 | A | 5/1997 | Zancho et al. |
| 5,774,532 | A | 6/1998 | Gottlieb et al. |
| 5,794,142 | A | 8/1998 | Vanttila et al. |
| 5,814,798 | A | 9/1998 | Zancho |

(Continued)

FOREIGN PATENT DOCUMENTS

| | | |
|---|---|---|
| CN | 1538730 A | 10/2004 |
| CN | 101035308 A | 3/2006 |

(Continued)

OTHER PUBLICATIONS

Knight et al., Layer 2 and 3 Virtual Private Networks: Taxonomy, Technology, and Standardization Efforts, IEEE Communications Magazine, Jun. 2004.

(Continued)

*Primary Examiner* — Pao Sinkantarakorn
(74) *Attorney, Agent, or Firm* — Marc A. Sockol

(57) ABSTRACT

Various embodiments are disclosed for a services policy communication system and method. In some embodiments, an intermediate networking device provides a service intermediary or intermediate connection between a network and one or more communications devices; implements a service profile set for assisting control of the intermediate networking device use of a service set on the network, wherein the service profile set includes one or more service profiles, each profile being associated with either the intermediate networking device or a communications device, each profile further including a plurality of service policy settings; and monitors use of the service set based on the service profile set, in which the implementation of the first service profile set is verified.

137 Claims, 106 Drawing Sheets

(56) References Cited

U.S. PATENT DOCUMENTS

| | | | |
|---|---|---|---|
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,933,778 A | 8/1999 | Buhrmann et al. |
| 5,940,472 A | 8/1999 | Newman et al. |
| 5,983,270 A | 11/1999 | Abraham et al. |
| 6,035,281 A | 3/2000 | Crosskey et al. |
| 6,038,452 A | 3/2000 | Strawczynski et al. |
| 6,047,268 A | 4/2000 | Bartoli et al. |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,141,686 A | 10/2000 | Jackowski et al. |
| 6,148,336 A | 11/2000 | Thomas et al. |
| 6,154,738 A | 11/2000 | Call |
| 6,198,915 B1 | 3/2001 | McGregor et al. |
| 6,226,277 B1 | 5/2001 | Chuah |
| 6,263,055 B1 | 7/2001 | Garland et al. |
| 6,292,828 B1 | 9/2001 | Williams |
| 6,317,584 B1 | 11/2001 | Abu-Amara et al. |
| 6,381,316 B2 | 4/2002 | Joyce et al. |
| 6,418,147 B1 | 7/2002 | Wiedeman |
| 6,449,479 B1 | 9/2002 | Sanchez |
| 6,477,670 B1 | 11/2002 | Ahmadvand |
| 6,502,131 B1 | 12/2002 | Vaid et al. |
| 6,505,114 B2 | 1/2003 | Luciani |
| 6,532,235 B1 | 3/2003 | Benson et al. |
| 6,532,579 B2 | 3/2003 | Sato et al. |
| 6,539,082 B1 | 3/2003 | Lowe et al. |
| 6,542,992 B1 | 4/2003 | Peirce et al. |
| 6,563,806 B1 | 5/2003 | Yano et al. |
| 6,574,321 B1 | 6/2003 | Cox et al. |
| 6,574,465 B2 | 6/2003 | Marsh et al. |
| 6,581,092 B1 | 6/2003 | Motoyama et al. |
| 6,598,034 B1 | 7/2003 | Kloth |
| 6,603,969 B1 | 8/2003 | Vuoristo et al. |
| 6,606,744 B1 | 8/2003 | Mikurak |
| 6,631,122 B1 | 10/2003 | Arunachalam et al. |
| 6,639,975 B1 | 10/2003 | O'Neal et al. |
| 6,640,097 B2 | 10/2003 | Corrigan et al. |
| 6,650,887 B2 | 11/2003 | McGregor et al. |
| 6,651,101 B1 | 11/2003 | Gai et al. |
| 6,654,814 B1 | 11/2003 | Britton et al. |
| 6,658,254 B1 | 12/2003 | Purdy et al. |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,725,031 B2 | 4/2004 | Watler et al. |
| 6,748,195 B1 | 6/2004 | Phillips |
| 6,754,470 B2 | 6/2004 | Hendrickson et al. |
| 6,763,000 B1 | 7/2004 | Walsh |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,829,596 B1 | 12/2004 | Frazee |
| 6,829,696 B1 | 12/2004 | Balmer et al. |
| 6,839,340 B1 | 1/2005 | Voit et al. |
| 6,873,988 B2 | 3/2005 | Herrmann et al. |
| 6,876,653 B2 | 4/2005 | Ambe et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,947,723 B1 | 9/2005 | Gurnani et al. |
| 6,952,428 B1 | 10/2005 | Necka et al. |
| 6,957,067 B1 | 10/2005 | Iyer et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,002,920 B1 | 2/2006 | Ayyagari et al. |
| 7,013,469 B2 | 3/2006 | Smith et al. |
| 7,024,200 B2 | 4/2006 | McKenna et al. |
| 7,027,408 B2 | 4/2006 | Nabkel et al. |
| 7,032,072 B1 | 4/2006 | Quinn et al. |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,226 B2 | 5/2006 | Yamauchi |
| 7,043,268 B2 | 5/2006 | Yukie et al. |
| 7,058,968 B2 | 6/2006 | Rowland et al. |
| 7,068,600 B2 | 6/2006 | Cain |
| 7,069,248 B2 | 6/2006 | Huber |
| 7,092,696 B1 * | 8/2006 | Hosain et al. ................ 455/405 |
| 7,102,620 B2 | 9/2006 | Harries et al. |
| 7,113,780 B2 | 9/2006 | McKenna et al. |
| 7,113,997 B2 | 9/2006 | Jayapalan et al. |
| 7,139,569 B2 | 11/2006 | Kato |
| 7,142,876 B2 | 11/2006 | Trossen et al. |
| 7,158,792 B1 | 1/2007 | Cook et al. |
| 7,167,078 B2 | 1/2007 | Pourchot |
| 7,174,174 B2 | 2/2007 | Boris et al. |
| 7,180,855 B1 | 2/2007 | Lin |
| 7,181,017 B1 | 2/2007 | Nagel et al. |
| 7,197,321 B2 | 3/2007 | Erskine et al. |
| 7,203,169 B1 | 4/2007 | Okholm et al. |
| 7,212,491 B2 | 5/2007 | Koga |
| 7,228,354 B2 | 6/2007 | Chambliss et al. |
| 7,236,780 B2 | 6/2007 | Benco et al. |
| 7,242,920 B2 | 7/2007 | Morris |
| 7,245,901 B2 | 7/2007 | McGregor et al. |
| 7,251,218 B2 | 7/2007 | Jorgensen |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,317,699 B2 | 1/2008 | Godfrey et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,346,410 B2 | 3/2008 | Uchiyama |
| 7,349,695 B2 | 3/2008 | Oommen et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,373,136 B2 | 5/2008 | Watler et al. |
| 7,373,179 B2 | 5/2008 | Stine et al. |
| 7,388,950 B2 | 6/2008 | Elsey et al. |
| 7,401,338 B1 | 7/2008 | Bowen et al. |
| 7,403,763 B2 | 7/2008 | Maes |
| 7,418,253 B2 | 8/2008 | Kavanah |
| 7,418,257 B2 | 8/2008 | Kim |
| 7,421,004 B2 | 9/2008 | Feher |
| 7,444,669 B1 | 10/2008 | Bahl et al. |
| 7,450,591 B2 | 11/2008 | Korling et al. |
| 7,450,927 B1 | 11/2008 | Creswell et al. |
| 7,457,265 B2 | 11/2008 | Julka et al. |
| 7,460,837 B2 | 12/2008 | Diener |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,493,659 B2 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,515,608 B2 | 4/2009 | Yuan et al. |
| 7,516,219 B2 | 4/2009 | Moghaddam et al. |
| 7,529,204 B2 | 5/2009 | Bourlas et al. |

(56) References Cited

U.S. PATENT DOCUMENTS

| | | |
|---|---|---|
| 7,535,880 B1 | 5/2009 | Hinman et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,976 B2 | 6/2009 | Bahl et al. |
| 7,551,922 B2 | 6/2009 | Roskowski et al. |
| 7,555,757 B2 | 6/2009 | Smith et al. |
| 7,565,141 B2 | 7/2009 | Macaluso |
| 7,574,509 B2 | 8/2009 | Nixon et al. |
| 7,574,731 B2 | 8/2009 | Fascenda |
| 7,580,356 B1 | 8/2009 | Mishra et al. |
| 7,580,857 B2 | 8/2009 | VanFleet et al. |
| 7,583,964 B2 | 9/2009 | Wong |
| 7,593,417 B2 | 9/2009 | Wang et al. |
| 7,593,730 B2 | 9/2009 | Khandelwal et al. |
| 7,596,373 B2 | 9/2009 | McGregor et al. |
| 7,599,288 B2 | 10/2009 | Cole et al. |
| 7,609,650 B2 | 10/2009 | Roskowski et al. |
| 7,609,700 B1 | 10/2009 | Ying et al. |
| 7,610,328 B2 | 10/2009 | Haase et al. |
| 7,610,396 B2 | 10/2009 | Taglienti et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,627,314 B2 | 12/2009 | Carlson et al. |
| 7,633,438 B2 | 12/2009 | Tysowski |
| 7,634,388 B2 | 12/2009 | Archer et al. |
| 7,636,574 B2 | 12/2009 | Poosala |
| 7,644,151 B2 | 1/2010 | Jerrim et al. |
| 7,644,267 B2 | 1/2010 | Ylikoski et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,668,176 B2 | 2/2010 | Chuah |
| 7,668,903 B2 | 2/2010 | Edwards et al. |
| 7,685,131 B2 | 3/2010 | Batra et al. |
| 7,685,254 B2 | 3/2010 | Pandya |
| 7,693,720 B2 | 4/2010 | Kennewick et al. |
| 7,697,540 B2 | 4/2010 | Haddad et al. |
| 7,710,932 B2 | 5/2010 | Muthuswamy et al. |
| 7,711,848 B2 | 5/2010 | Maes |
| 7,720,505 B2 | 5/2010 | Gopi et al. |
| 7,720,960 B2 | 5/2010 | Pruss et al. |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,756,534 B2 | 7/2010 | Anupam et al. |
| 7,756,757 B1 | 7/2010 | Oakes, III |
| 7,760,711 B1 | 7/2010 | Kung et al. |
| 7,760,861 B1 | 7/2010 | Croak et al. |
| 7,774,323 B2 | 8/2010 | Helfman |
| 7,774,456 B1 | 8/2010 | Lownsbrough et al. |
| 7,778,176 B2 | 8/2010 | Morford |
| 7,778,643 B2 | 8/2010 | Laroia et al. |
| 7,792,538 B2 | 9/2010 | Kozisek |
| 7,792,708 B2 | 9/2010 | Alva |
| 7,797,204 B2 | 9/2010 | Balent |
| 7,797,401 B2 | 9/2010 | Stewart et al. |
| 7,801,523 B1 | 9/2010 | Kenderov |
| 7,801,985 B1 | 9/2010 | Pitkow et al. |
| 7,802,724 B1 | 9/2010 | Nohr |
| 7,822,837 B1 | 10/2010 | Urban et al. |
| 7,826,427 B2 | 11/2010 | Sood et al. |
| 7,826,607 B1 | 11/2010 | De Carvalho Resende et al. |
| 7,844,728 B2 | 11/2010 | Anderson et al. |
| 7,848,768 B2 | 12/2010 | Omori et al. |
| 7,856,226 B2 | 12/2010 | Wong et al. |
| 7,865,182 B2 | 1/2011 | Macaluso |
| 7,868,778 B2 | 1/2011 | Kenwright |
| 7,873,344 B2 | 1/2011 | Bowser et al. |
| 7,873,705 B2 | 1/2011 | Kalish |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,886,047 B1 | 2/2011 | Potluri |
| 7,890,084 B1 | 2/2011 | Dudziak et al. |
| 7,890,111 B2 | 2/2011 | Bugenhagen |
| 7,899,438 B2 | 3/2011 | Baker et al. |
| 7,903,553 B2 | 3/2011 | Liu |
| 7,907,970 B2 | 3/2011 | Park et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,920,529 B1 | 4/2011 | Mahler et al. |
| 7,921,463 B2 | 4/2011 | Sood et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,446 B2 | 4/2011 | Kesselman et al. |
| 7,937,069 B2 | 5/2011 | Rassam |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,969,950 B2 | 6/2011 | Iyer et al. |
| 7,970,350 B2 | 6/2011 | Sheynman et al. |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,510 B2 | 7/2011 | Kocher et al. |
| 8,000,276 B2 | 8/2011 | Scherzer et al. |
| 8,000,318 B2 | 8/2011 | Wiley et al. |
| 8,005,009 B2 | 8/2011 | McKee et al. |
| 8,005,459 B2 | 8/2011 | Balsillie |
| 8,005,988 B2 | 8/2011 | Maes |
| 8,010,080 B1 | 8/2011 | Thenthiruperai et al. |
| 8,010,081 B1 | 8/2011 | Roskowski |
| 8,015,133 B1 | 9/2011 | Wu et al. |
| 8,015,234 B2 | 9/2011 | Lum et al. |
| 8,019,687 B2 | 9/2011 | Wang et al. |
| 8,019,820 B2 | 9/2011 | Son et al. |
| 8,019,868 B2 | 9/2011 | Rao et al. |
| 8,023,425 B2 | 9/2011 | Raleigh |
| 8,024,397 B1 | 9/2011 | Erickson et al. |
| 8,027,339 B2 | 9/2011 | Short et al. |
| 8,031,601 B2 | 10/2011 | Feroz et al. |
| 8,032,409 B1 | 10/2011 | Mikurak |
| 8,032,899 B2 | 10/2011 | Archer et al. |
| 8,045,973 B2 | 10/2011 | Chambers |
| 8,050,275 B1 | 11/2011 | Iyer |
| 8,059,530 B1 | 11/2011 | Cole |
| 8,060,463 B1 | 11/2011 | Spiegel |
| 8,068,824 B2 | 11/2011 | Shan et al. |
| 8,068,829 B2 | 11/2011 | Lemond et al. |
| 8,073,721 B1 | 12/2011 | Lewis |

(56) References Cited

U.S. PATENT DOCUMENTS

| | | |
|---|---|---|
| 8,078,140 B2 | 12/2011 | Baker et al. |
| 8,078,163 B2 | 12/2011 | Lemond et al. |
| 8,086,497 B1 | 12/2011 | Oakes, III |
| 8,090,359 B2 | 1/2012 | Proctor, Jr. et al. |
| 8,090,616 B2 | 1/2012 | Proctor, Jr. et al. |
| 8,094,551 B2 | 1/2012 | Huber et al. |
| 8,095,112 B2 | 1/2012 | Chow et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,108,520 B2 | 1/2012 | Ruutu et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,122,128 B2 | 2/2012 | Burke, II et al. |
| 8,122,249 B2 | 2/2012 | Falk et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,144,591 B2 | 3/2012 | Ghai et al. |
| 8,149,823 B2 | 4/2012 | Turcan et al. |
| 8,150,431 B2 | 4/2012 | Wolovitz et al. |
| 8,155,155 B1 | 4/2012 | Chow et al. |
| 8,155,620 B2 | 4/2012 | Wang et al. |
| 8,155,670 B2 | 4/2012 | Fullam et al. |
| 8,156,206 B2 | 4/2012 | Kiley et al. |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,970 B2 | 5/2012 | Adamczyk et al. |
| 8,184,530 B1 | 5/2012 | Swan et al. |
| 8,184,590 B2 | 5/2012 | Rosenblatt |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,675 B2 | 5/2012 | Tribbett |
| 8,191,116 B1 | 5/2012 | Gazzard |
| 8,194,549 B2 | 6/2012 | Huber et al. |
| 8,194,553 B2 | 6/2012 | Liang et al. |
| 8,195,163 B2 | 6/2012 | Gisby et al. |
| 8,196,199 B2 | 6/2012 | Hrastar et al. |
| 8,200,509 B2 | 6/2012 | Kenedy et al. |
| 8,200,775 B2 | 6/2012 | Moore |
| 8,204,190 B2 | 6/2012 | Bang et al. |
| 8,204,505 B2 | 6/2012 | Jin et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,224,382 B2 | 7/2012 | Bultman |
| 8,224,773 B2 | 7/2012 | Spiegel |
| 8,228,818 B2 | 7/2012 | Chase et al. |
| 8,233,883 B2 | 7/2012 | De Froment |
| 8,233,895 B2 | 7/2012 | Tysowski |
| 8,238,287 B1 | 8/2012 | Gopi et al. |
| 8,239,520 B2 | 8/2012 | Grah et al. |
| 8,242,959 B2 | 8/2012 | Mia et al. |
| 8,244,241 B2 | 8/2012 | Montemurro |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,265,004 B2 | 9/2012 | Toutonghi |
| 8,266,681 B2 | 9/2012 | Deshpande et al. |
| 8,270,972 B2 | 9/2012 | Otting et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,279,067 B2 | 10/2012 | Berger et al. |
| 8,279,864 B2 | 10/2012 | Wood |
| 8,280,354 B2 | 10/2012 | Smith et al. |
| 8,284,740 B2 | 10/2012 | O'Connor |
| 8,285,249 B2 | 10/2012 | Baker et al. |
| 8,291,238 B2 | 10/2012 | Ginter et al. |
| 8,296,404 B2 | 10/2012 | McDysan et al. |
| 8,307,067 B2 | 11/2012 | Ryan |
| 8,315,999 B2 | 11/2012 | Chatley et al. |
| 8,320,244 B2 | 11/2012 | Muqattash et al. |
| 8,320,949 B2 | 11/2012 | Matta |
| 8,325,638 B2 | 12/2012 | Jin et al. |
| 8,326,319 B2 | 12/2012 | Davis |
| 8,331,293 B2 | 12/2012 | Sood |
| 8,332,375 B2 | 12/2012 | Chatley et al. |
| 8,340,718 B2 | 12/2012 | Colonna et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,980 B2 | 1/2013 | Howcroft |
| 8,356,336 B2 | 1/2013 | Johnston et al. |
| 8,358,638 B2 | 1/2013 | Scherzer et al. |
| 8,363,658 B1 | 1/2013 | Delker et al. |
| 8,364,806 B2 | 1/2013 | Short et al. |
| 8,370,477 B2 | 2/2013 | Short et al. |
| 8,374,090 B2 | 2/2013 | Morrill et al. |
| 8,374,592 B2 | 2/2013 | Proctor, Jr. et al. |
| 8,385,896 B2 | 2/2013 | Proctor, Jr. et al. |
| 8,386,386 B1 | 2/2013 | Zhu |
| 8,396,929 B2 | 3/2013 | Helfman et al. |
| 8,402,540 B2 | 3/2013 | Kapoor et al. |
| 8,411,587 B2 | 4/2013 | Curtis et al. |
| 8,411,691 B2 | 4/2013 | Aggarwal |
| 8,423,016 B2 | 4/2013 | Buckley et al. |
| 8,429,403 B2 | 4/2013 | Moret et al. |
| 8,437,734 B2 | 5/2013 | Ray et al. |
| 8,447,607 B2 | 5/2013 | Weider et al. |
| 8,447,980 B2 | 5/2013 | Godfrey et al. |
| 8,461,958 B2 | 6/2013 | Saenz et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,483,135 B2 | 7/2013 | Cai et al. |
| 8,483,694 B2 | 7/2013 | Lewis et al. |
| 8,484,327 B2 | 7/2013 | Werner et al. |
| 8,489,720 B1 | 7/2013 | Morford et al. |
| 8,495,227 B2 | 7/2013 | Kaminsky et al. |
| 8,495,360 B2 | 7/2013 | Falk et al. |
| 8,504,729 B2 | 8/2013 | Pezzutti |
| 8,509,082 B2 | 8/2013 | Heinz et al. |
| 8,520,589 B2 | 8/2013 | Bhatt et al. |
| 8,521,110 B2 | 8/2013 | Rofougaran |
| 8,522,039 B2 | 8/2013 | Hyndman et al. |
| 8,526,329 B2 | 9/2013 | Mahany et al. |
| 8,526,350 B2 | 9/2013 | Xue et al. |
| 8,543,265 B2 | 9/2013 | Ekhaguere et al. |
| 8,544,105 B2 | 9/2013 | Mclean et al. |
| 8,561,138 B2 | 10/2013 | Rothman et al. |
| 8,571,474 B2 | 10/2013 | Chavez et al. |
| 8,571,993 B2 | 10/2013 | Kocher et al. |
| 8,583,499 B2 | 11/2013 | De Judicibus et al. |
| 2001/0048738 A1 | 12/2001 | Baniak et al. |
| 2001/0053694 A1 | 12/2001 | Igarashi et al. |
| 2002/0022472 A1 | 2/2002 | Watler et al. |
| 2002/0049074 A1 | 4/2002 | Eisinger et al. |
| 2002/0116338 A1 | 8/2002 | Gonthier et al. |
| 2002/0120540 A1 | 8/2002 | Kende et al. |
| 2002/0131404 A1 | 9/2002 | Mehta et al. |
| 2002/0138601 A1 | 9/2002 | Piponius et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0199001 A1 | 12/2002 | Wenocur et al. |

(56) References Cited

U.S. PATENT DOCUMENTS

| | | |
|---|---|---|
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0088671 A1* | 5/2003 | Klinker et al. ............... 709/225 |
| 2003/0133408 A1 | 7/2003 | Cheng et al. |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0021697 A1 | 2/2004 | Beaton et al. |
| 2004/0030705 A1 | 2/2004 | Bowman-Amuah et al. |
| 2004/0044623 A1 | 3/2004 | Wake et al. |
| 2004/0047358 A1 | 3/2004 | Chen et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0127200 A1 | 7/2004 | Shaw et al. |
| 2004/0132427 A1 | 7/2004 | Lee et al. |
| 2004/0168052 A1 | 8/2004 | Clisham et al. |
| 2004/0198331 A1 | 10/2004 | Coward et al. |
| 2004/0203755 A1 | 10/2004 | Brunet et al. |
| 2004/0236547 A1 | 11/2004 | Rappaport et al. |
| 2004/0249918 A1 | 12/2004 | Sunshine |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0048950 A1 | 3/2005 | Morper |
| 2005/0055291 A1 | 3/2005 | Bevente et al. |
| 2005/0055309 A1 | 3/2005 | Williams et al. |
| 2005/0060266 A1 | 3/2005 | DeMello et al. |
| 2005/0097516 A1 | 5/2005 | Donnelly et al. |
| 2005/0107091 A1 | 5/2005 | Vannithamby et al. |
| 2005/0128967 A1 | 6/2005 | Scobbie |
| 2005/0166043 A1 | 7/2005 | Zhang et al. |
| 2005/0183143 A1 | 8/2005 | Anderholm et al. |
| 2005/0198377 A1 | 9/2005 | Ferguson et al. |
| 2005/0216421 A1 | 9/2005 | Barry et al. |
| 2005/0228985 A1 | 10/2005 | Ylikoski et al. |
| 2005/0238046 A1* | 10/2005 | Hassan et al. ............... 370/465 |
| 2005/0246282 A1 | 11/2005 | Naslund et al. |
| 2005/0250508 A1 | 11/2005 | Guo et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0026679 A1 | 2/2006 | Zakas |
| 2006/0034256 A1 | 2/2006 | Addagatla et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072646 A1 | 4/2006 | Feher et al. |
| 2006/0085543 A1 | 4/2006 | Hrastar et al. |
| 2006/0112016 A1 | 5/2006 | Ishibashi |
| 2006/0135144 A1 | 6/2006 | Jothipragasam |
| 2006/0143098 A1 | 6/2006 | Lazaridis |
| 2006/0156398 A1 | 7/2006 | Ross et al. |
| 2006/0165060 A1 | 7/2006 | Dua |
| 2006/0173959 A1 | 8/2006 | Mckelvie et al. |
| 2006/0174035 A1 | 8/2006 | Tufail |
| 2006/0178918 A1 | 8/2006 | Mikurak |
| 2006/0183462 A1 | 8/2006 | Kolehmainen |
| 2006/0190314 A1 | 8/2006 | Hernandez |
| 2006/0199608 A1 | 9/2006 | Dunn et al. |
| 2006/0206904 A1 | 9/2006 | Watkins et al. |
| 2006/0218395 A1 | 9/2006 | Maes |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0291477 A1 | 12/2006 | Croak et al. |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0036312 A1 | 2/2007 | Cai et al. |
| 2007/0055694 A1 | 3/2007 | Ruge et al. |
| 2007/0061243 A1 | 3/2007 | Ramer et al. |
| 2007/0061878 A1 | 3/2007 | Hagiu et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0109983 A1 | 5/2007 | Shankar et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0147324 A1 | 6/2007 | McGary |
| 2007/0155365 A1 | 7/2007 | Kim et al. |
| 2007/0168499 A1 | 7/2007 | Chu |
| 2007/0198656 A1 | 8/2007 | Mazzaferri et al. |
| 2007/0220251 A1 | 9/2007 | Rosenberg et al. |
| 2007/0226225 A1 | 9/2007 | Yiu et al. |
| 2007/0243862 A1 | 10/2007 | Coskun et al. |
| 2007/0248100 A1 | 10/2007 | Zuberi et al. |
| 2007/0254675 A1 | 11/2007 | Zorlu Ozer et al. |
| 2007/0255848 A1 | 11/2007 | Sewall et al. |
| 2007/0259673 A1 | 11/2007 | Willars et al. |
| 2007/0263558 A1 | 11/2007 | Salomone |
| 2007/0274327 A1 | 11/2007 | Kaarela et al. |
| 2007/0280453 A1 | 12/2007 | Kelley et al. |
| 2007/0282896 A1 | 12/2007 | Wydroug et al. |
| 2007/0294395 A1 | 12/2007 | Strub et al. |
| 2007/0298764 A1 | 12/2007 | Clayton |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010452 A1 | 1/2008 | Holtzman et al. |
| 2008/0022354 A1 | 1/2008 | Grewal et al. |
| 2008/0039102 A1 | 2/2008 | Sewall et al. |
| 2008/0049630 A1 | 2/2008 | Kozisek et al. |
| 2008/0051076 A1 | 2/2008 | O'Shaughnessy et al. |
| 2008/0052387 A1 | 2/2008 | Heinz et al. |
| 2008/0059174 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0095339 A1 | 4/2008 | Elliott et al. |
| 2008/0098062 A1 | 4/2008 | Balia |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |

(56) References Cited

U.S. PATENT DOCUMENTS

| | | |
|---|---|---|
| 2008/0134330 A1 | 6/2008 | Kapoor et al. |
| 2008/0147454 A1 | 6/2008 | Walker et al. |
| 2008/0160958 A1 | 7/2008 | Abichandani et al. |
| 2008/0162637 A1 | 7/2008 | Adamczyk et al. |
| 2008/0162704 A1 | 7/2008 | Poplett et al. |
| 2008/0164304 A1 | 7/2008 | Narasimhan |
| 2008/0167027 A1 | 7/2008 | Gautier et al. |
| 2008/0167033 A1 | 7/2008 | Beckers |
| 2008/0168523 A1 | 7/2008 | Ansari et al. |
| 2008/0177998 A1 | 7/2008 | Apsangi et al. |
| 2008/0183794 A1 | 7/2008 | Georgis et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0250053 A1 | 10/2008 | Aaltonen et al. |
| 2008/0256593 A1 | 10/2008 | Vinberg |
| 2008/0262798 A1 | 10/2008 | Kim et al. |
| 2008/0268813 A1 | 10/2008 | Maes |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313730 A1 | 12/2008 | Iftimie et al. |
| 2008/0316923 A1 | 12/2008 | Fedders et al. |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0013157 A1 | 1/2009 | Beaule |
| 2009/0046723 A1 | 2/2009 | Rahman et al. |
| 2009/0054030 A1* | 2/2009 | Golds .................... 455/406 |
| 2009/0067372 A1 | 3/2009 | Shah et al. |
| 2009/0068984 A1 | 3/2009 | Burnett |
| 2009/0077622 A1 | 3/2009 | Baum et al. |
| 2009/0079699 A1 | 3/2009 | Sun |
| 2009/0113514 A1 | 4/2009 | Hu |
| 2009/0125619 A1 | 5/2009 | Antani |
| 2009/0157792 A1 | 6/2009 | Fiatal |
| 2009/0172077 A1 | 7/2009 | Roxburgh et al. |
| 2009/0180391 A1 | 7/2009 | Petersen et al. |
| 2009/0197585 A1 | 8/2009 | Aaron |
| 2009/0219170 A1 | 9/2009 | Clark et al. |
| 2009/0248883 A1 | 10/2009 | Suryanarayana et al. |
| 2009/0257379 A1 | 10/2009 | Robinson et al. |
| 2009/0271514 A1 | 10/2009 | Thomas et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0299857 A1 | 12/2009 | Brubaker |
| 2009/0307746 A1 | 12/2009 | Di et al. |
| 2009/0315735 A1 | 12/2009 | Bhavani et al. |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027559 A1 | 2/2010 | Lin et al. |
| 2010/0041364 A1 | 2/2010 | Lott et al. |
| 2010/0042675 A1 | 2/2010 | Fujii |
| 2010/0043068 A1 | 2/2010 | Varadhan et al. |
| 2010/0071053 A1 | 3/2010 | Ansari et al. |
| 2010/0080202 A1 | 4/2010 | Hanson |
| 2010/0082431 A1 | 4/2010 | Ramer et al. |
| 2010/0103820 A1 | 4/2010 | Fuller et al. |
| 2010/0131584 A1 | 5/2010 | Johnson |
| 2010/0144310 A1 | 6/2010 | Bedingfield |
| 2010/0153781 A1 | 6/2010 | Hanna |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh et al. |
| 2010/0198698 A1 | 8/2010 | Raleigh et al. |
| 2010/0198939 A1 | 8/2010 | Raleigh et al. |
| 2010/0241544 A1 | 9/2010 | Benson et al. |
| 2010/0284327 A1 | 11/2010 | Miklos |
| 2010/0325420 A1 | 12/2010 | Kanekar |
| 2011/0013569 A1 | 1/2011 | Scherzer et al. |
| 2011/0081881 A1 | 4/2011 | Baker et al. |
| 2011/0082790 A1 | 4/2011 | Baker et al. |
| 2011/0126141 A1 | 5/2011 | King et al. |
| 2011/0159818 A1 | 6/2011 | Scherzer et al. |
| 2011/0173678 A1 | 7/2011 | Kaippallimalil et al. |
| 2011/0264923 A1 | 10/2011 | Kocher et al. |
| 2012/0020296 A1 | 1/2012 | Scherzer et al. |
| 2012/0196644 A1 | 8/2012 | Scherzer et al. |
| 2012/0238287 A1 | 9/2012 | Scherzer |
| 2013/0029653 A1 | 1/2013 | Baker et al. |
| 2013/0058274 A1 | 3/2013 | Scherzer et al. |
| 2013/0065555 A1 | 3/2013 | Baker et al. |
| 2013/0084835 A1 | 4/2013 | Scherzer et al. |
| 2013/0144789 A1 | 6/2013 | Aaltonen et al. |

FOREIGN PATENT DOCUMENTS

| | | |
|---|---|---|
| CN | 1802839 A | 7/2006 |
| CN | 1889777 A | 7/2006 |
| CN | 101155343 A | 9/2006 |
| CN | 101115248 A | 1/2008 |
| CN | 101341764 A | 1/2009 |
| EP | 1463238 | 9/2004 |
| EP | 1739518 | 6/2005 |
| EP | 1772988 A1 | 4/2007 |
| EP | 1978772 A1 | 10/2008 |
| WO | 9858505 | 12/1998 |
| WO | WO 99/65185 | 12/1999 |
| WO | WO 03/014891 | 2/2003 |
| WO | WO 03/058880 | 4/2003 |
| WO | WO 2004/028070 | 4/2004 |
| WO | 2004064306 | 7/2004 |
| WO | WO 2004/077797 | 9/2004 |
| WO | WO 2004/095753 | 11/2004 |
| WO | 2005008995 | 1/2005 |
| WO | WO 2006/004467 | 1/2006 |
| WO | WO 2006/050758 | 5/2006 |
| WO | WO 2006/073837 | 7/2006 |
| WO | WO 2006/077481 | 7/2006 |
| WO | WO 2007/018363 | 8/2006 |
| WO | 2006120558 A1 | 11/2006 |
| WO | WO 2006/130960 | 12/2006 |
| WO | WO 2007/001833 | 1/2007 |
| WO | WO 2007/014630 | 2/2007 |
| WO | WO 2007/053848 | 5/2007 |
| WO | 2007068288 | 6/2007 |
| WO | WO 2007/069245 | 6/2007 |
| WO | 2007097786 A | 8/2007 |
| WO | WO 2007/107701 | 9/2007 |
| WO | 2007124279 | 11/2007 |
| WO | WO 2008/017837 | 2/2008 |
| WO | WO 2008/051379 | 5/2008 |
| WO | WO 2008/066419 | 6/2008 |
| WO | WO 2008/080139 | 7/2008 |
| WO | WO 2008/080430 | 7/2008 |
| WO | WO 2008/099802 | 8/2008 |
| WO | 2010088413 | 8/2010 |

(56) References Cited

FOREIGN PATENT DOCUMENTS

OTHER PUBLICATIONS

Koutsopoulou et al., Middleware Platform for the Support of Charging Reconfiguration Actions, 2005.
Nilsson et al., A Novel MAC Scheme for Solving the QoS Parameter Adjustment Problem in IEEE802.11e EDCA, Feb. 2006.
Author Unknown, Overview of GSM, GPRS, and UMTS, Chapter 2, Nov. 4, 2008.
Chaouchi et al., Policy Based Networking in the Integration Effort of 4G Networks and Services, 2004 IEEE.
Zhu et al., A Survey of Quality of Service in IEEE 802.11 Networks, IEEE Wireless Communications, Aug. 2004.
Kyriakakos et al., Ubiquitous Service Provision in Next Generation Mobile Networks, Proceedings of the 13th IST Mobile and Wireless Communications Summit, Lyon, France, Jun. 2004.
Farooq et al., An IEEE 802.16 WiMax Module for the NS-3 Simulator, Mar. 2-6, 2009.
Author Unknown, HP, IP Multimedia Services Charging, A White Paper from HP, Jan. 2006.
Author Unknown, Kindle™ User's Guide $3^{rd}$ Edition, Copyright 2004-2009.
Hartmann et al., Agent-Based Banking Transactions & Information Retrieval—What about Performance Issues? 1999.
Van Eijk, et al., GigaMobile, Agent Technology for Designing Personalized Mobile Service Brokerage, Jul. 1, 2002.
Yu Li, Dedicated E-Reading Devices: The State of the Art and Challenges, Scroll, vol. 1, No. 1, 2008.
Dikaiakos et al., A Distributed Middleware Infrastructure for Personalized Services, Nov. 24, 2003.
Rao et al., Evolution of Mobile Location-Based Services, Communication of the ACM, Dec. 2003.
Chandrasekhar et al., Femtocell Networks: A Survey, Jun. 28, 2008.
Hossain et al., Gain-Based Selection of Ambient Media Services in Pervasive Environments, 2008.
Author Unknown, 3GPP TS 23.203, V8.4.0, $3^{rd}$ Generation Partnership Project; Technical Specification Group Services and System Aspects; Policy and Charging Control Architecture (Release 8), Dec. 2008.
Author Unknown, 3GPP TS 23.401, V8.4.0, $3^{rd}$ Generation Partnership Project; Technical Specification Group Services and System Aspects; General Packer Radio Service (GPRS) Enhancements for Evolved Universal Terrestrial Radio Access Network (E-UTRAN) Access (Release 8), Dec. 2008.
Stephan Steglich, I-Centric User Interaction, Nov. 21, 2003.
Han et al., Information Collection Services for Qos-Aware Mobile Applications, 2005.
Alonistioti et al., Intelligent Architectures Enabling Flexible Service Provision and Adaptability, 2002.
Rolf Oppliger, Internet Security: Firewalls and Bey, Communications of the ACM, May 1997, vol. 40. No. 5.
Author Unknown, "Data Roaming Tariffs—Transparency Measures." EUROPA—Europe's Information Society Thematic Portal website; date unknown, 2011.
"The Construction of Intelligent Residential District in Use of Cable Television Network," Shandong Science, vol. 13, No. 2, Jun. 2000.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
International Search Report and Written Opinion mailed Apr. 20, 2010 from International Serial No. PCT/US2010/021398 filed Jan. 19, 2010.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
"Communication Concepts for Mobile Agent Systems," by Joachim Baumann et al.; Inst. Of Parallel and Distributed High-Performance Systems, Univ. Of Stuttgart, Germany, pp. 123-135, 1997.

* cited by examiner

| Service Processor 115 Embodiment | Partial Summary of Embodiment Functions |
|---|---|
| Service Control Device Link 1691 | Device side control plane link for connecting Service Processor 415 to Service Controller. In some embodiments also serves as the link for the agent heartbeat function. |
| Access Control Integrity Agent 1694 | Collects device information on service policy, service usage, agent configuration and agent behavior. Cross checks this information to identify integrity breaches in the service policy implementation and control system. Initiates action when a service policy violation or a system integrity breach is suspected. In some embodiments, verifies configuration of other agents or performs challenge-response sequence testing. In some embodiments, monitors software loading activity, protected memory access or communication with Service Processor agents to detect unauthorized changes to Service Processor software or configuration. |
| Policy Control Agent 1692 | Takes policy instructions from the network and sets instantaneous device service policy. In some embodiments, performs a policy control function to adapt instantaneous service policies to achieve a service usage objective. |
| Policy Implementation Agent 1690 | Implements traffic control and QOS policy rules for device. In some embodiments provides the functions of access control and/or firewall function or perform traffic inspection and characterization. In some embodiments packet inspection is aided by literal or virtual application layer tagging while in other embodiments packet inspection is performed completely in the Policy Implementation Agent 490. |
| Service Monitor Agent 1696 | Records and reports device service usage. In some embodiments, assists in communicating application tagging of traffic flows through the networking stack policy implementation. In some embodiments, maintains a history and provides reports or summary reports of which networks in addition to the networks controlled by the Service Controller that the device has connected to. In some embodiments, this network activity summary may include a summary of the networks accessed, activity vs. time per connection, traffic vs. time per connection. |
| Application Interface Agent 1693 | Rich feature interface for device application programs. In some embodiments, identifies application level traffic, reports service usage or tags traffic for service QOS control. In some embodiments, interacts with applications or programs applications to arrange application settings such as email file transfer options or browser headers. In some embodiments, intercepts certain application traffic to modify traffic application layer parameters such as email file transfer options or browser headers. In some embodiments implements certain aspects of traffic control or other service policies. In some embodiments, provides the functions of traffic control, access control and/or firewall. |
| Modem Firewall 1655 | Blocks or passes traffic based on service policies and traffic attributes. In some embodiments, assists in traffic flow tagging. In some embodiments provides the functions of traffic control and/or access control. |
| Billing Agent 1695 | Detects and reports billing events. In some embodiments interacts with the User Interface Agent 497 to provide the user with service plan options, accept service plan selections, provide notification on service usage levels, provide options on service usage control policy, accept choices on service usage policy, provide transaction options or accept transaction choices. In some embodiments, interacts with Transaction Servers 134 to conduct ecommerce transactions with central billing. |

FIG. 22A

| | |
|---|---|
| User Interface Agent 1697 | Provide service interface to users. |
| Service Downloader 1663 | Provides a download function to install or update service software elements on the device. |
| Connection Manager 1804 | Provides a control and supervision function for one or more modem drivers or modems that connect to an access network. |
| Modem Selection and Control 1811 | Selects the access network connection. |
| Modem Drivers 1831, 1815, 1814, 1813, 1812 | Converts data traffic into modem bus traffic for one or more modems. |
| Modems 2141, 2125, 2124, 2123, 2122 | Connects the device to one or more networks. |

FIG. 22B

| Service Controller 122 Element | Partial Summary of Embodiment Functions |
|---|---|
| Service Control Server Link 1638 | Network side control plane link for connecting Service Controller 422 Service Processor 415 device agents. In some embodiments, also serves as the link for the agent heartbeat function. |
| Access Control Integrity Server 1654 | Collects device information on service policy, service usage, agent configuration and agent behavior. Cross checks this information to identify integrity breaches in the service policy implementation and control system. Initiates action when a service policy violation or a system integrity breach is suspected. |
| Policy Management Server 1652 | Transmits policies to the Service Processor 415. |
| Access Network AAA Server 1621 | Provides access control and authorization functions for the device access layer. Records and reports device network service usage. |
| Service History Server 1650 | Collects and records service usage reports from the Access Network AAA Server 421 and the Service Monitor Agent 496. In some embodiments, maintains a history of which networks in addition to the networks controlled by the Service Controller that the device has connected to. In some embodiments, this network activity summary may include a summary of the networks accessed, activity vs. time per connection, traffic vs. time per connection. In some embodiments, this activity summary is further analyzed or reported to estimate the type of service plan associated with the traffic activity for the purpose of bill sharing reconciliation. |
| Central Provider Billing System 1619 | Provides mediation function for central provider billing events. Accepts service plan changes. In some embodiments, provides updates on device service usage, service plan limits or service policies. |
| Billing Event Server 1662 | In some embodiments, collects billing events, provides service plan information to the Service Processor 415, provides service usage updates to the Service Processor 415, serves as interface between device and central Provider Billing System 123, or provides trusted third party function for certain ecommerce billing transactions. |
| Network Traffic Analysis Server 1656 | Collects service usage history for devices or groups of devices and analyses the service usage. In some embodiments, presents service usage statistics in various formats to identify improvements in network service quality or service profitability. In other embodiments, estimates the service quality or service usage for the network under variable settings on potential service policy. In other embodiments, identifies actual or potential service behaviors by one or more devices that are causing problems for overall network service quality or service cost. |
| Beta Test Server 1658 | Publishes candidate service plan policy setting to one or more devices. In some embodiments, provides summary reports of network service usage or user feedback information for one or more candidate service plan policy setting. In some embodiments, provides a means to compare the beta test results for different candidate service plan policy settings or select the optimum candidates for further setting optimization. |
| Service Download Control Server 1660 | Provides a download function to install or update service software elements on the device. |
| Transaction Server 134 | Provides an electronic commerce offering and transaction platform to the device. |

FIG. 23

| Example Service Processor Heartbeat Parameter Embodiments | Description | Frequency |
|---|---|---|
| Access control integrity report | Contains the latest results of the Access Control Integrity agents Service Processor system checks and reports any error events. | Not necessary to report in every heartbeat if there are no errors. Can report only on error, set a minimum frequency or respond to Service Controller polling. |
| Service monitor report | Reports filtered summary of Service Monitor Agent measurements. Summary reduces control traffic and filters out unauthorized private information. | Every heartbeat. Some embodiments link this to amount of data usage in the data path to keep overhead low. Report immediately upon polling from Service Controller. |
| Billing event report | Reports any billing activity since the last heartbeat. Billing events may include service usage events, transaction events, bill by account records, bill by account offset reports or any other event that results in a billing event report. | Send upon billing event. Report immediately upon polling from Service Controller. |
| Service Processor settings report | Reports service policy settings for all Service Processor agents. | Not necessary to send every heartbeat. Some embodiments link this to amount of data usage to reduce overhead. Can report every N heartbeats. Report immediately upon polling from Service Controller. |
| Customer resource management report | Reports filtered summary of Service Monitor Agent measurements or filtered summary of other device or user activity such as service preferences, advertisement behavior and location. Summary reduces control traffic and filters out unauthorized private information. | Not necessary to send every heartbeat. Some embodiments link this to amount of data usage to reduce overhead. Can report every N heartbeats. Report immediately upon polling from Service Controller. |
| Responses to Service Processor agent queries | Sends agent responses to challenge-response queries from the Service Controller. | Report immediately upon polling from Service Controller. |

FIG. 26A

| | | |
|---|---|---|
| Location tracking service update | Reports filtered summary of location tracking information. Summary reduces control traffic and filters out unauthorized private information. | Not necessary to send every heartbeat. Some embodiments call for a minimum time based transmission frequency. |
| Service usage based transmission frequency | Lowers overhead by buffering and reserving heartbeat communications from agents and servers until a certain amount of data has been transmitted or received in the network, or a certain amount of service has been consumed. When the parameters are chosen properly, this can result in the network control plane traffic overhead being a small percentage of data path traffic or result in the control plane traffic cost being a small percentage of the service usage cost. | Ranges depending on settings. For example, if there are 5 agents messages that typically need to be communicated, and each message is less than 100 bytes, and Service Processor heartbeat framing plus network overhead would result in a packet size of less than 1,000 bytes; and the heartbeat packet is transmitted when 10,000,000 bytes have been communicated over the data path, then the overhead loss due to one heartbeat packet in each direction is less than 0.02%. |
| Constant frequency transmissions | Since the device may be off line for long periods of time where the Service Control Processor needs to verify service control integrity, in some embodiments it can be advantageous to transmit heartbeat packets at a minimum rate regardless of data traffic activity. This is accomplished by setting a timer that sends queued heartbeat packets on a regular schedule. | Ranges depending on settings and applications. |
| Service Controller polled transmissions | In some embodiments, the Service Controller may poll the Service Processor for a heartbeat transmission at which time the Service Processor will frame and transmit all queued heartbeat messages. | Ranges depending on applications. In some embodiments this is used as an on demand function while in others it is used as a way to set heartbeat transmission timing functions in the Service Controller. |
| Service Processor polled transmissions | In some embodiments, the Service Processor polls the Service Controller for a heartbeat transmission at which time the Service Controller will frame and transmit all queued heartbeat messages. | Ranges depending on applications. In some embodiments this is used as an on demand function while in others it is used as a way to set heartbeat transmission timing functions in the Service Processor. |

FIG. 26B

| | | |
|---|---|---|
| Agent self-check reports | Agent reports results of various agent self-diagnosis procedures to ensure that the agent is properly configured, operating properly, properly implementing service control policy or has not been tampered with. [provide examples which are extensions of typical software security self diagnosis reporting] | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |
| Environment reports | One or more agents scan the storage or execution environment for one or more of the agents to identify potential threats to the integrity of the service implementation or agent integrity and makes a report. In one example embodiment, a scan is done to determine if unauthorized software or hardware is executing in a secure agent environment. In another embodiment, a scan is done to determine the software that has been loaded into a portion of the device operating environment, memory or storage, and the software list is referenced against a known threat list. In another example embodiment, the list of entities that accessed one or more agents is scanned to determine if an unauthorized access to an agent has occurred. In another embodiment a scan is performed to determine if unauthorized access to secure execution environment, memory or storage has occurred. In another example embodiment, the network access pattern for the device is logged and analyzed to determine if there is an access pattern that is known to be associated with a threat to service or agent control integrity. In another example embodiment, the internal device software, memory or peripheral access pattern is logged and analyzed to determine if there is an access pattern that is known to be associated with a threat to service or agent control integrity. | In some embodiments an report is made during every heartbeat transmission. In other embodiments the report is generated by a request from the Service Controller. In other embodiments the report is generated by timing determined by the device. In some embodiments the report is generated when there is a verification error of some kind that is identified. |

FIG. 26C

| | | |
|---|---|---|
| User notification response reports | Billing agent, UI agent or another agent logs user notification events and the response of the user to the notification event. In some embodiments these events may be cross-referenced to the notification policy that should be in force on the device and the device service usage to ensure that the proper notification sequences are being adhered to. In other embodiments, the user notification responses are logged and used to document user choices to notification events, billing event decisions, service control decisions or service cost control decisions. In some embodiments, the user may be asked to provide a password, biometric signature, hardware key or other mechanism to positively identify that the user is in possession of the device or to verify that the service is operating properly or is implemented properly. In some embodiments, the user may be asked to acknowledge a service overage notification and/or to also provide a password, biometric signature, hardware key or other mechanism to verify the service overage acknowledgement. | In some embodiments a report is made during every heartbeat transmission. In other embodiments the report is generated by a request from the Service Controller. In other embodiments the report is generated by timing determined by the device, for example when there has been a user notification sequence action with the user. In some embodiments, the report is generated when there is a verification error of some kind that is identified. |
| User warning response reports | Billing agent, UI agent or another agent logs user warning events and the response of the user to warning event. In some embodiments the user response is used to determine if the user is in positive control of the device. In some embodiments the response is used to confirm that the user acknowledges a billing overage or other service cost event. In some embodiments, the user may be asked to provide a password, biometric signature, hardware key or other mechanism to positively identify that the user is in possession of the device or to verify that the service is operating properly or is implemented properly. | In some embodiments a report is made during every heartbeat transmission. In other embodiments the report is generated by a request from the Service Controller. In other embodiments the report is generated by timing determined by the device, for example when there has been a warning sequence action with the user. In some embodiments the report is generated when there is a verification error of some kind that is identified. |

FIG. 26D

| | | |
|---|---|---|
| Agent communication log reports | Reports entities that established or attempted to establish communication with the agents. In one embodiment, reports a list of entities and the number of times the entity communicated or attempted to communicate with the agent. In another embodiments, reports an error flag when unauthorized entities attempt to establish communication with an agent. | In some embodiments a report is made during every heartbeat transmission. In other embodiments the report is generated by a request from the Service Controller. In other embodiments the report is generated by timing determined by the device. In some embodiments the report is generated when there is a verification error of some kind that is identified. |
| Service usage synchronization data | IPDR or other data that is used to synchronize the device service usage counters. In some embodiments the data is time stamped so that the service usage at a point in time may be reconciled between the local device usage count and the network based usage count, and then the local device usage count since the point in time may be used to estimate the present real-time usage count. In some embodiments, the service usage data from the device is used by the network as the actual service usage or billing data base for the device. In other embodiments, a bill by account function is included in the service usage synchronization data so that the service usage may be billed to different accounts other than a single or main user account. | Service usage synchronization is continuous with each heartbeat in some embodiments. In other embodiments service usage synchronization is based on a push from the Service Controller or other network function that sends the IPDR information to the device. In other embodiments, the device requests a synchronization data transmission. |
| Service cost synchronization data | Information to reconcile a service cost estimate on the local device with a service cost count from a network based function. Similar to the service usage count, in some embodiments the service cost information is time stamped so that service cost at a point in time may be reconciled between the device and the network based function, and then a local measure of service cost may be used to estimate the present real-time service cost. In some embodiments the local service cost is determined by taking recorded billing events and looking up the cumulative cost of one or more billing | Service cost synchronization is continuous with each heartbeat in some embodiments. In other embodiments service cost synchronization is based on a push from the Service Controller or other network function that sends the IPDR information to the device. In other embodiments, the device requests a synchronization data transmission. |

FIG. 26E

| | | |
|---|---|---|
| | events using a service usage to cost look up data base stored locally on the device or available from a network function. In some embodiments, service cost estimation is done entirely in the network and the result is pushed out to the device UI. In other embodiments service cost estimation is done in the device based on local usage estimates and a local usage to cost lookup table. | |
| Available network information and roaming information | Device receives available network or available roaming service provider information from a network function. The available network or roaming service information may include the potential network service or roaming service a device or user may choose to select, or the network service or roaming service the user has already selected. In some embodiments this information includes service cost information to aid the device or the user in determining the potential or actual costs of service usage while using the available network or roaming network. In some embodiments the service cost information is used to help the user in selecting the available network provider or roaming service provider. In some embodiments the available network cost information or roaming cost information is combined with a measure of expected or possible service usage to estimate how much a typical usage scenario may cost. In some embodiments, the available network information or roaming information is used to help the user estimate the present available network or roaming service charges for services used to date. In some embodiments service usage is recorded and sent to a network function that estimates the current service cost. In other embodiments the service cost is estimated locally on the device based on a service usage estimate and a service usage to cost look up function. In other | In some embodiments available network information or roaming information is requested by the device. In other embodiments, the information is periodically updated by the Service Controller or other network function that contains the information. |

FIG. 26F

| | | |
|---|---|---|
| | embodiments, the service cost is derived by querying the available network or roaming network billing system. | |
| System messages and responses | In some embodiments the heartbeat function may be used as a secure control channel to display a system messages or screen that is generated by a network function or server to the end user and possibly report user inputs to the UI message or screen. Examples include, ...... etc. | System messages are generated by the Service Controller and transmitted as needed in some embodiments. In other embodiments, some system messages are generated in response to user input or requests. In other embodiments, system messages are generated on a regular time table or in accordance with a certain amount of service usage. |
| UI screen messages and responses | In some embodiments the heartbeat function may be used as a secure control channel to display user interface message or screen that is generated by a network function or serve to the end user and possibly report user inputs to the UI message or screen. Examples include service usage UI, service choice UI, upgrade UI, transaction UI, marketing UI, billing UI, user identify confirmation UI, user service warning UI, user potential service tamper response request UI, etc. | UI screen messages are generated by the Service Controller and transmitted as needed in some embodiments. In other embodiments some user UI messages are generated in response to user input or requests. In other embodiments, UI messages are generated on a regular time table or in accordance with a certain amount of service usage. |
| Local agent check-in history | Logs and reports agent check-ins or self-reports that are made to a local agent integrity verification function. | In some embodiments a report is made during every heartbeat transmission. In other embodiments the report is generated by a request from the Service Controller. In other embodiments the report is generated by timing determined by the device. In some embodiments the report is generated when there is a verification error of some kind that is identified. |
| Software install report | Logs and reports one or more aspects of software installs that have occurred on the device. | In some embodiments a report is made during every heartbeat transmission. In other embodiments the report is generated by a request from the Service Controller. In other embodiments the report is generated by timing determined by the device. In some embodiments the report is generated when there is a verification error of some kind that is identified. In some |

FIG. 26G

| | | |
|---|---|---|
| Test billing event | In some embodiments the Service Controller or other network function may send or cause a test billing event wherein the device triggers a local billing sequence for the purpose of verifying that the billing sequence is properly logged, conducted and reported. The billing sequence can be related to a service usage event or sequence, a transaction event or sequence, or any other event or sequence that should result in a billing event. | embodiments, the report is generated when new SW is installed. In some embodiments, the test billing event timing is determined by the Service Controller or other network function. In others it is generated by the device or on a regular schedule. |
| Test service event | In some embodiments the service Controller or other network function may send or cause a service usage event wherein the device triggers a local service usage event or sequence for the purpose of verifying that the service usage event or sequence is properly logged and reported. | In some embodiments, the test service usage event timing is determined by the Service Controller or other network function. In others it is generated by the device or on a regular schedule. |

FIG. 26H

| Service Policy Implementation Verification Technique Embodiments | Example Error Trigger Criteria Embodiments | Example Error Response Embodiments |
|---|---|---|
| Verify service usage measure in network is consistent with expected service behavior | Network service usage measure is in conflict with expected service usage. Examples: traffic usage outside limits, address access outside limits, data rate outside limits, traffic shaping rules not being followed. | In some embodiments the severity of the error and/or the persistence of the error and/or the existence of the other errors are used to determine the appropriate response or action. In some embodiments, reset service policies and see if errors persists. In some embodiments, perform agent settings check to verify that agent service usage control policy settings are correct. In some embodiments, perform agent query/ response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service inspection process, or usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 27A

| | | |
|---|---|---|
| Verify service usage measure at device is consistent with expected service behavior | Device service usage measure is in conflict with expected service usage. Examples: traffic usage too high, address access outside limits, email accessed against policy. | Same as above. |
| Verify service usage measure in network is consistent with service usage measure at device | Device service usage measure varies significantly from network service usage measure | Same as above. |
| Verify service usage measure at one point in device is consistent with service usage measure at a second point in device | Service usage measure at one point in device stack that is inconsistent with another point indicates error or potential parasitic usage | Same as above. In some embodiments, the differences in service measures on the device may be used to evaluate the nature of the service usage policy implementation problem. |
| Verify that service policies in effect are as intended | Service policy setting queries result in settings that are different than intended | In some embodiments, reset service policies and see if error persist. If this does not clear the error, or if this is not the error correction method employed, then perform one or more of the following actions:<br>In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition |

FIG. 27B

| | | |
|---|---|---|
| Verify presence of Service Processor agents | Agent does not respond to agent communication or query-response | to a message sent to the device. In some embodiments, an error message is sent to a human interface in the network for further error analysis.<br><br>In some embodiments, run dynamic agent load, in some cases with different encryption, sequencing or obfuscation for the new agent code to refresh one or more agents. If this does not clear the error, or if this is not the error correction method employed, then perform one or more of the following actions:<br>In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify configuration of Service Processor agents | Agent configuration audit or configuration self check fails. | In some embodiments, run dynamic agent load, in some cases with different encryption, sequencing or obfuscation for the new agent code to refresh one or more agents. If this does not clear the error, or if this is not the error correction method employed, then perform one or more of the following actions:<br>In some embodiments the severity of the error and/or the persistence of the |

FIG. 27C

| | |
|---|---|
| | error and/or the existence of other errors are used to determine the appropriate response or action. In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify billing events are reported or are reported properly | Billing Agent query reveals logged billing events that have not been reported. | In some embodiments, perform a billing event test to determine if the billing event reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>In some embodiments the severity of the error and/or the persistence of the error and/or the existence of other errors are used to determine the appropriate response or action. In some embodiments, reset service |

FIG. 27D

| | |
|---|---|
| | policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify network reported service usage measure are consistent with reported device billing data. | Billing agent is not properly reporting billing events for service usage, transactions, bill by account, or other billing event functions. | In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>In some embodiments the severity of the error and/or the persistence of the error and/or the existence of other errors are used to determine the appropriate response or action. In some embodiments, reset service |

FIG. 27E

| | | |
|---|---|---|
| | | policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended; possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify device reported service usage measure are consistent with reported device billing data. | Billing agent reports are inconsistent with service usage reports. | In some embodiments, perform a billing event test to determine if the billing event reporting sequence is operating properly. In some embodiments, run dynamic agent load, in some cases with different encryption, sequencing or obfuscation for the new agent code to refresh one or more agents. In some embodiments, perform a service usage test to determine if the service usage reporting sequence is operating properly. In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>In some embodiments the severity of the error and/or the persistence of the error and/or the existence of other errors are used to determine the |

FIG. 27F

| | | appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
|---|---|---|
| Send test billing event through device and verify it is reported. | Test billing event is not properly reported by the device. | In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine |

| | | |
|---|---|---|
| | | agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a service usage test to determine if the device is properly reporting service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis |
| Verify device reports billing events reported from transaction servers. | Transaction server receipts do not correspond with billing events from device. | In some embodiments, perform checks to determine if transaction server receipts are valid. In some embodiments, run dynamic agent load, in some cases with different encryption, sequencing or obfuscation for the new agent code to refresh one or more agents. If this does not clear the error, or if these are not the error correction methods employed, then perform one or more of the following actions:<br>In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to |

| | | |
|---|---|---|
| | | the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify activation tracking system presence, configuration or operation | Activation tracking service is not present, is not providing scheduled network activity reporting, or is exhibiting erroneous reports. | In some embodiments the response is to place the device ID: on a list of devices suspected of having activation tracking functions that have been tampered with for the purpose of central provider billing reconciliation. In some embodiments, install a new copy of the activation tracking service agent software either from a locally stored device copy or a network download. In some embodiments where authorization exists to manage device software and some aspects of service tracking, run further checks on device service integrity such as agent query-response. In some embodiments where authorization exists to manage a device access service connection, send error message to device UI, suspend device or place device on quarantine route. In some embodiments send error message to human interface for troubleshooting. |
| Verify device standing or service plan standing | No service plan on record or device not authorized | In some embodiments, if device is not yet activated with a service plan, provide UI with activation sequence. In some embodiments, if device is not authorized for service on one of the networks controlled by the Service |

FIG. 27I

| | | |
|---|---|---|
| | | Controller, send the UI an error message instructing the user how to proceed. In some embodiments, configure the Service Processor for the ambient service intended for that device. In some embodiments, download the appropriate Service Processor agent software that is appropriate for that device. |
| Verify proper operation of Service Processor agents | Check input to output relationship on Policy Implementation agent, Firewall agent. Check billing event reports to verify events are being recorded. Check application and traffic inspection tagging system correctly tagging traffic. Verify Service Processor heartbeat reports proper agent integrity self-checks, cross-checks and query/response sequences with Service Controller. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |

FIG. 27J

| | | |
|---|---|---|
| Service Processor heartbeat response reports | One or more of the heartbeat reports indicate an error in operation, configuration, or tamper and error prevention system. Heartbeat function not functioning properly but device is still indicating service usage on the network. | In some embodiments the severity of the error and/or the persistence of the error and/or the existence of other errors are used to determine the appropriate response or action. In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Test service event | Service usage reporting system does not properly report test service usage event | In some embodiments, run dynamic agent load, in some cases with different encryption, sequencing or obfuscation for the new agent code to refresh one or more agents. If this does not clear the error, or if this is not the error correction method employed, then perform one or more of the |

FIG. 27K

| | | |
|---|---|---|
| | | following actions:<br>In some embodiments, reset service policies and see if error persists. In some embodiments, perform agent settings check to verify that agent service usage control policy settings are correct. In some embodiments, perform agent query/response to determine agent integrity. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing test event to determine if the device is properly reporting billing events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Load a fresh version of Service Processor software and perform integrity reports | After fresh load of Access Control Integrity Agent, agent discovers one or more of the other agents are corrupted. | Run dynamic agent load, in some cases with different encryption, sequencing or obfuscation for the new agent code to refresh other agents and see if problem persists. If this does not clear the error, or if this is not the error correction method employed, then perform one or more of the following actions:<br>In some embodiments, reset service policies and see if error persists. In some embodiments, perform agent settings check to verify that agent service usage control policy settings are correct. In some embodiments, a |

FIG. 27L

| | |
|---|---|
| | user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify Service Processor code configuration with agent self diagnosis checks | One or more of the agents indicates an error after running a self-check. | Run dynamic agent load, in some cases with different encryption, sequencing or obfuscation for the new agent code to refresh other agents and see if problem persists. If this does not clear the error, or if this is not the error correction method employed, then perform one or more of the following actions:<br>In some embodiments, reset service policies and see if error persists. In some embodiments, perform agent settings check to verify that agent service usage control policy settings are correct. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the |

FIG. 27M

| | | |
|---|---|---|
| | | device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify that device uses service only after being authorized | Device gains access to the network and does not check in with the Access Control Integrity Server and service measures indicate device is on the network. | In some embodiments, reset service policies and see if error persists. In some embodiments, perform agent settings check to verify that agent service usage control policy settings are correct. In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, perform a billing event test or a service usage test to determine if the device is properly reporting billing events or service usage events. In some embodiments, the device is placed on |

FIG. 27N

| | | |
|---|---|---|
| | | quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. |
| Verify user standing | User does not respond with proper response to UI query such as request for ID., password or biometric input. This process may be part of handling a suspected error. | In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis. In some embodiments, the user may be asked to acknowledge a service overage notification and/or to also provide a password, biometric signature, hardware key or other mechanism to verify the service overage acknowledgment. |
| Agent communications log | Unauthorized communications with one or more agents is detected | In some embodiments, perform agent query/response to determine agent integrity. In some embodiments, run dynamic agent load, in some cases with different encryption, sequencing or obfuscation for the new agent code to refresh one or more agents. In some embodiments, a user query or warning is sent to the UI to notify the user, confirm that the device is in the user's possession, or involve the user in the process of determining the source or error or to assist in verifying the device based service control. |

FIG. 27O

In some embodiments, the device identification number is placed on an error list for further error handling. In some embodiments, the device is placed on a SPAN process, or a similar traffic or service inspection process, or another service usage watch status, to closely monitor service behavior and determine if it is consistent with the service usage policy that is intended to be in place. In some embodiments, the device is placed on quarantine network routing status, possibly with a user message being sent to inform the user. In some embodiments, the device service is suspended, possibly after sending the user a message that may include instructions on the process for correcting the error and resuming service. In some embodiments, the user messages are sent through an alternative messaging system, such as email or text messaging, as an alternative to or in addition to a message sent to the device. In some embodiments, an error message is sent to a human interface in the network for further error analysis.

FIG. 27P

| Service Policy Implementation Tamper or Error Protection Techniques | Example Error Trigger Criteria | Example Error Responses |
|---|---|---|
| Detect or block device networking activity that is potentially harmful for the operation of Service Processor. | Network activity is observed in service monitor reports that fit known patterns that indicated harmful software may be present on device. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Detect or block unauthorized Service Processor software from being loaded. | Access Control Integrity Agent discovers software that is on a known malicious list. | Same as above. |
| Detect or block unauthorized access of protected Service Processor software or hardware memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code . In some embodiments send message to UI and either suspend device, place on SPAN, place on watch list, place on further action list or place on quarantine network. In some embodiments send error message to human interface for troubleshooting. |
| Detect or block unauthorized communication with Service Processor software or hardware. | Unauthorized communication is detected. | Identify the entity that has gained access to the Service Processor if possible and eradicate. In some embodiments repair any compromised agents with dynamic agent load, in some cases with different encryption, sequencing or obfuscation for the new agent code . In some embodiments send message to UI and either suspend device, place on SPAN, place on watch list, place on further action list or place on quarantine network. In some embodiments send error message to human interface for troubleshooting. |

FIG. 28A

| | | |
|---|---|---|
| Secure loader with signed SW installed into protected memory | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Secure encrypted communication between Service Processor agents. | Secure communication link is in error or unauthorized access is detected. | Identify the entity that has gained access to the Service Processor if possible and eradicate. In some embodiments repair any compromised agents with dynamic agent load, in some cases with different encryption, sequencing or obfuscation for the new agent code. In some embodiments, run dynamic agent load, in some cases with different encryption, sequencing or obfuscation for the new agent code to refresh agents with communication links that are in error or entire Service Processor. In some embodiments send message to UI and either suspend device, place on SPAN, place on watch list, place on further action list or place on quarantine network. In some embodiments send error message to human interface for troubleshooting. |
| Secure encrypted communication between Service Processor and Service Controller. | Service Processor communication is lost. | Send error message to device UI (if possible), suspend device, place on SPAN, place on watch list, place on further action list or place device on quarantine route. In some embodiments send error message to human interface for troubleshooting. |
| Execution of Service Processor software within secure memory. | Unauthorized access is detected, memory contents are corrupted or unresponsive. | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |

FIG. 28B

| | | |
|---|---|---|
| Storage of service processor software in secure memory | Secure memory violation or Service Processor stored in non-secure memory | Identify the entity that has gained access to the Service Processor if possible and eradicate. In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. |
| Detection or removal of software thought to be harmful to Service Processor operation. | Unauthorized software is detected. | Initiate or install and initiate eradication software. Block traffic from the suspect entity. In some embodiments if software can not be eradicated or blocked, then send message to UI and either suspend device, place on SPAN, place on watch list, place on further action list or place on quarantine network. In some embodiments send error message to human interface for troubleshooting. |
| Recording and reporting of software loading signatures, software activity signatures or network activity signatures for later identification of threat sequences. | Unauthorized software or malicious network activity is detected | Same as above. |
| Implement critical Service Processor software as a self-refreshing program that resists corruption by running self-audit and reinstall processes such as placing audit function in inaccessible memory or OS functions or bios. | Re-installation function alerts that Re-installation has been required. Continued re-installations or failure to re-install alert increases severity of warnings. | Identify the entity that has gained access to the Service Processor if possible and eradicate. In some embodiments send message to UI and either suspend device, place on SPAN, place on watch list, place on further action list or place on quarantine network. In some embodiments send error message to human interface for troubleshooting. |
| Encrypted agent code | Code check, agent query-response, agent self check or other agent configuration check discovers error in code encryption | In some embodiments repair any compromised agents with dynamic agent load, in some cases with different encryption, sequencing or obfuscation for the new agent code . In some embodiments send message to UI and either suspend device, place on SPAN, place on watch list, place on further action list or place on quarantine network. In some embodiments send |

FIG. 28C

| | | |
|---|---|---|
| Obfuscated agent code | Code check, agent query-response, agent self check or other agent configuration check discovers error in code obfuscation | error message to human interface for troubleshooting. Identify the entity that may have gained access to the Service Processor if possible and eradicate.<br>Same as above. |
| Unique agent identification numbers and signatures | Agent is discovered to have an incorrect ID. or fails signature | Same as above. |
| Secure agent communication bus | Agent communication bus monitoring discovers unauthorized communication or other unauthorized access to one or more agents is discovered | Same as above. |
| Agent level message encryption | Agent is found to be communicating without the required level of agent communication encryption | Same as above. |
| Service control link message level encryption | Unauthorized communication traffic is discovered on service control link | In some embodiments repair any compromised agents with dynamic agent load, in some cases with different encryption, sequencing or obfuscation for the new agent code. In some embodiments send message to UI and either suspend device, place on SPAN, place on watch list, place on further action list or place on quarantine network. In some embodiments send error message to human interface for troubleshooting. Identify the entity that may have gained access to the Service Processor if possible and eradicate. |
| Service control link transport layer encryption | Unauthorized communication traffic is discovered on service control link | Same as above. |
| Agent communication access permissions | Unauthorized communication is discovered with one or more agents | Same as above. |

FIG. 28D

| | | |
|---|---|---|
| Agent communication log | Unauthorized communication is discovered with one or more agents | Same as above. |
| Encrypted agent code for downloads | Agent download is found to have incorrect or absent encryption or signature | Same as above. |
| Secure downloader memory | Unauthorized access to or storage in secure downloader memory is discovered | Same as above. |

FIG. 28E

| Example Device CRM Data Collection and Reporting Classification | Partial Description | Example Sensitivity Level Classification | Example Authorization Level to Include in Report |
|---|---|---|---|
| Basic non-specific service usage parameters | User sensitive information is filtered from this report which is used for purposes such as service control, service control integrity monitoring or network traffic analysis. | Low | None |
| Service billing events or service plan selection events | Documents user selection process from service plan selection or billing options. | Low | Customer authorization with basic service agreement or enterprise agreement |
| Transaction billing events | Documents user selection process from service plan selection or billing options. | Low | Customer authorization with central billing agreement or enterprise agreement |
| Device location – customer location based service assist | Reports customer location for the purpose of assisting with location based services such as directions, yellow pages, shopping and social networking. | High | Customer authorization with basic service agreement or enterprise agreement |
| Device location – device or people tracking | Reports customer location for the purpose of providing tracking services for the device or the user. | High | Customer authorization with separate device tracking service agreement or enterprise agreement |
| Transaction associated information | Reports customer information such as networking activity, location, advertising usage, shopping behavior that is associated with a commerce transaction or happens around the same time as the transaction. | High | Customer authorization – potential service discount or upgrade or enterprise agreement |
| URL history | Reports customer web surfing history. | High | Customer authorization – potential service discount or upgrade or enterprise agreement |
| Served and visited advertisement history | Reports the advertisements served to the user or which advertisements the user responded to. This information may be used to determine customer preferences or for a revenue sharing relationship with the advertisers. | Medium | Customer authorization – potential service discount, perk or upgrade or enterprise agreement |
| 911 Service usage and location trace log | This log contains all information pertinent to emergency service personnel responding to a 911 call or other emergency situation. In some embodiments this information is password protected and generally not available to the service provider unless it happens to also be contained in reports authorized by the consumer as in the examples above. | Very High | Available only for 911 support or enterprise agreement |

FIG. 41

| Partial List of Example Service Policy Functionality Embodiments | Partial Description of Functionality Example | Example Authorization Level Required to Implement Embodiment |
|---|---|---|
| Block Downstream or upstream traffic | Various embodiments block traffic associated with one or more of user, network address identifier, application, content or data type, type of network, central provider, transaction provider, or transaction type. Typical but non-exhaustive examples of command usage are access control prior to authorization, access control policy limits as defined by service plan or special device type, access control for ambient activation services, access control for error handling or access control for tamper prevention. This command may be implemented in instantaneous policy implementation mode or adaptive policy control mode. | Basic authority to pass or block traffic for access control, authorization, ambient services, or plan specific services typically may be provided by the user when they acknowledge the service plan agreement. Authorization to block traffic access as part of controlling user service costs typically may be provided by the service plan agreement options the user chooses to manage cost or may be provided when the user acknowledges the limitations in the UI notifications. |
| Pass downstream or upstream traffic | Various embodiments allow traffic associated with one or more of user, network address identifier, application, content or data type, type of network, central provider, transaction provider, or transaction type. Typical but non-exhaustive examples of command usage are access control prior to authorization, access control policy limits as defined by service plan or special device type, access control for ambient activation services, access control for error handling or access control for tamper prevention. This command may be implemented in instantaneous policy implementation mode or adaptive policy control mode. | Same as above. |
| Limit maximum data rate | Various embodiments limit maximum data rate for traffic associated with one or more of user, network address identifier, application, content or data type, type of network, central provider, transaction provider, or transaction type. Typical but non-exhaustive examples of how this command can be implemented include limiting data rate to the device according to service plan; limiting data rate by network address identifier, application or content type by implementing a tiered garden; limiting data rate in to different levels according to the type of access technology used by the present network connection; limiting data rate to different levels according to the service provider for the present network; or limiting data rate according to an agreement or lack of agreement with a transaction provider. This command may be implemented in instantaneous policy implementation mode or adaptive policy control mode. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |

FIG. 42A

| | | |
|---|---|---|
| Analyze traffic | Provides capability resident on the device to analyze device or user traffic statistics to determine how to implement adaptive policy control or how best to assist the user with notification messages. In some embodiments it is important to perform traffic analysis locally on the device to reduce network chatter with the Control Processor or to maintain user CRM privacy levels by not sharing sensitive raw traffic usage history needed to determine implementation of less sensitive service control policies. Typical but non-exhaustive examples of command usage are analyzing traffic usage statistics or patterns to determine compliance with service plan limits; analyzing traffic usage statistics or patterns to determine likely future compliance with service plan limits; analyzing traffic statistics or patterns to categorize usage according to network address identifiers, applications, content types, network types or central providers; analyzing traffic demand vs. usage statistics or patterns to determine if user may be better served with another service plan; analyzing traffic statistics or patterns to identify potential tamper threats. This command may be implemented in instantaneous policy implementation mode or adaptive policy control mode, but adaptive application of the analysis results is typically associated with adaptive policy control mode. | Authorization to analyze traffic for local device service policy control purposes or 911 service typically may be provided for in the basic service contract. Authorization to transmit a complete or filtered version of the traffic analysis to the Service Controller typically may be provided under user selected options in the service plan contract. |
| Successive limitation | Provides capability to begin with one limit on access or data rate according to a set of defined service usage trigger criteria, to further limit access or data rate according to said criteria, and then to successively remove limits according to said criteria. In some embodiments this function provides for service usage that starts at a given level for one or more service aspects, but as said service aspect exhibits usage that potentially threatens an overage on service plan limits then the level of service for said service aspect is reduced successively until the threat of service plan overage is reduced or eliminated. In some embodiments, the limits on service level for said service aspect are eventually removed either all at once or successively over a specified time period or set of time periods so that the limits on service level for said service aspect are eventually removed if the service aspect is used less vigorously for a period of time. In this type of embodiment the projection for future service usage by a given service aspect is assisted by the analyze traffic statistics function. As a more specific example, the service aspect may be a URL address that is popular with the user and demands a high service consumption, and the data rate allowed to that URL may start at a relatively high level when the user first begins to surf and as long as the surfing session is finished quickly there is never a reduction in service level, but if the user surfs for a longer time so that service usage begins to threaten plan limit overage, the data rate allowed to that URL is successively reduced the longer the surfing session occurs. Continuing this | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |

FIG. 42B

| | | |
|---|---|---|
| | example embodiment, if the URL is not visited for a defined period of time then the data rate limitation may be removed in steps over multiple pre-defined time periods, or may be removed all at once back to the initial data rate established in the service policy for that URL. Other specific embodiment examples include email download or upload data rate; download or upload rates for certain types of file transfers; or download or upload rates for a given network access technology or central provider. This command is associated with adaptive policy control mode for the Service Processor. In more advanced adaptive embodiments, the policy control system first identifies those service aspects that are consuming a large percentage of the service usage and then begins to successively limit service level only for these highest usage service aspects so that all other service aspects that are not responsible for potential service plan limit overage continue to receive relatively high service levels. In another embodiment, some high usage service aspects may be exempt or partially exempt from limitations in service level, as for example a service aspect that is associated with a secondary source of service or transaction payment or that may be separately accounted for in the service plan usage reporting. | |
| Limit email file transfers | Sets and enforces limits on email downloads. In some embodiments this can include use of the successively limit functionality. In some embodiments, this is accomplished by identifying specific email downloads or uploads and controlling traffic for those traffic flows. In other embodiments, this includes interacting with the email application to set download or upload file settings. This functionality may be implemented in instantaneous policy implementation mode or adaptive policy control mode, with the more advanced functionality such as successive limitation on email file transfers being implemented in the adaptive policy control mode. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |
| Seek to manage below service limit | Implements adaptive policy control in an attempt to manage service usage to reduce service plan limit overages. In some embodiments there are successive limits on service level for overall traffic, or for the highest usage service aspects, with the successive limits being lowered until average service usage is projected to be below service plan limits. The algorithms that may be applied to achieve this adaptive service level limitation are quite varied and only a few are given here. In one embodiment, the service usage for the service plan period is projected using the analyze traffic functionality, and overall device data rate is successively limited until service usage is projected to be below the service plan limit. In another | Same as above. |

FIG. 42C

| | embodiment, the analyze traffic functionality is used to identify those service aspects that are causing the majority of the service plan usage, and then each of those service plan aspects are limited using the successive limitation functionality, with the service level limitations being based on the traffic usage patterns and specific application scenarios for each service aspect. For example, in some embodiments the service aspects that are creating the most service usage are subjected to more service level limitation than service aspects that are creating less service usage. Service usage may be defined as usage of a raw service measurement such as total data consumption, files downloaded or time spent on network, or it may be translated into an economic measure using the lookup service cost functionality. In some embodiments, the period of time elapsed in the service accounting period is taken into account in determining... | |
|---|---|---|
| Synchronize service usage counters | Synchronizes service usage counters on device from time to time to minimize service accounting errors between the device data base and the central billing data base. In some embodiments this is a part of the Service Processor heartbeat communication system that need not happen every heartbeat. In some embodiments this occurs with a request for update by the device to the central billing system or to a server function in the Service Processor | Provided for in the basic service agreement. |
| Lookup service cost | Provides a data base of service usage vs. cost for each type of service offered on the device. Provides for a lookup function of service cost. | Same as above. |
| Convert service usage to service cost | Uses the service cost vs. usage lookup function to transform one or more service usage aspects to one or more service cost aspect. One example embodiment provides a service cost measure for one specific aspect of service usage, for example total data consumed over a period of time. Another example embodiment provides a total service cost measure for all service usage over a period of time. | Same as above. |
| Notify user of service overage | Sends a notification message or screen to the UI to inform the user that the one or more aspects of service usage has exceeded the specified limits of one or more service plans. In some embodiments, the user notice is a pop-up window and in some embodiments there is a continuous display on a small gauge in main screen. | Same as above. |
| Project service usage | Uses the analyze traffic functionality and projects an estimate of what the traffic usage will be at the end of a service plan measurement interval if the service usage does not change. In some embodiments the projected service usage is made based on assuming the average service usage per unit time in the present service plan measurement interval does not change for the remainder of the service plan measurement interval. | Same as above |

FIG. 42D

| | | |
|---|---|---|
| Notify user of service cost overage | Performs a service cost estimate based on one or more aspects of service usage and informs the user that the one or more aspects of service cost has exceeded the specified limits of a service plan. In some embodiments, the user notice is a pop-up window and in some embodiments there is a continuous display on a small gauge in main screen. | Provided for in the basic service agreement. |
| Notify user of usage behavior likely to run over service usage limit | Uses the project service usage functionality to determine if the service usage is projected to go beyond the service plan limit, notifies the user if the projected usage is over the service plan limit for the service plan measurement interval. In some embodiments, the user notice is a pop-up window and in some embodiments there is a continuous display on a small gauge in main screen. In some embodiments the projected service usage is made based on assuming the average service usage per unit time in the present service plan measurement interval does not change for the remainder of the service plan measurement interval. | Same as above. |
| Notify user of usage behavior likely to run over cost limit | Uses the project service usage functionality to determine if the service usage is projected to go beyond the service plan limit, uses convert service measure to service cost functionality to estimate the service cost of the projected service overage, notifies the user if the projected cost is over the service plan cost associated with the service plan service limit for the service plan measurement interval. In some embodiments, the user notice is a pop-up window and in some embodiments there is a continuous display on a small gauge in main screen. In some embodiments the projected cost is made based on assuming the average service usage per unit time in the present service plan measurement interval does not change for the remainder of the service plan measurement interval. | Same as above. |
| Project user service cost if usage behavior continues | Uses the project service usage functionality to determine if the service usage is projected to go beyond the service plan limit, uses convert service measure to service cost functionality to estimate the service cost of the projected service overage, notifies the user of what the projected cost will be if the service usage behavior remains the same. In some embodiments, the user notice is a pop-up window and in some embodiments there is a continuous display on a small gauge in main screen. In some embodiments the projected cost is made based on assuming the average service usage per unit time in the present service plan measurement interval does not change for the remainder of the service plan measurement interval. | Same as above. |

FIG. 42E

| | | |
|---|---|---|
| Limit access likely to cause overage and notify | Uses the project service usage functionality to determine if the service usage is projected to go beyond the service plan limit, if the service usage is projected to go over the service limit, notifies the user that limits are being applied to keep service usage or cost under the service limit, applies limits to various aspects of service usage to bring down usage so that projections are within service limits. In one embodiment, the seek to manage below service limit functionality is used. | Authorization to limit data rate for all traffic or a subset of traffic typically may be provided in the options the user specifies for how to limit potential or actual service plan usage or cost overages. For example, one user may choose to have no limits and be notified when service usage is over or about to go over, while another user may choose to allow traffic control sufficient to keep service usage under the service plan limit without any notification. |
| Require acknowledgment of notification | Requires the user to acknowledge a notification of potential service or cost overage or a notification of an option to limit the service overage or cost of service overage. | Provided for in the basic service agreement. |
| Log or report acknowledgment of notification | In some embodiments, the user acknowledgment of notification is stored, or sent to the Service Controller, or stored and later sent to the service Controller. | Same as above. |
| Notify user of service plan options prior to running over service usage limit | Notifies the user of options to extend the service plan limit before reaching the service plan limit. In some embodiments, accepts user input on which service plan extension option if any the user wishes to accept. In some embodiments, notifies the billing system when the user has accepted a service plan extension option. | Same as above. |
| Notify user of service plan options after running over service usage limit | Notifies the user of options to extend the service plan limit after reaching the service plan limit. In some embodiments, accepts user input on which service plan extension option if any the user wishes to accept. In some embodiments, notifies the billing system when the user has accepted a service plan extension option. | Same as above. |
| Time of day variations | Each of the functionalities for traffic control, service cost, service limits may be modified with a time of day variation so that the values used are different for different times of day. | Same as above. |

FIG. 42F

| | | |
|---|---|---|
| Access control enable list | List of service usage activities that are enabled. | Authorization restricted to service controller, VSP or other network function with proper credentials to access the control data base. |
| Access control block list | List of service usage activities that are blocked. | Same as above. |
| User service control option UI | Provides the user with a list of options for how they would like to control service usage or service cost. | In some embodiments UI screens and scripts are defined by the UI agent software version and access to modifying this software is restricted to service controller, VSP or other network function with proper credentials to access the UI data base. Some embodiments call for the UI screens or UI screen content to be generated by the service controller, VSP or another network function (e.g. service usage notification gateway or billing system) and in this case access is restricted to service controller, VSP or other network function with proper credentials to access the UI pass through screens. |
| User service notification option preference | Provides the user with a list of options for how they would like service notification information to be displayed. In some embodiments provides the user with the option to turn off one or more aspects of service notification. In some embodiments the user is not allowed to turn off notification for service usage events that require user decision or acknowledgement. | In some embodiments UI screens and scripts are defined by the UI agent software version and access to modifying this software is restricted to service controller, VSP or other network function with proper credentials to access the UI data base. Some embodiments call for the UI screens or UI screen content to be generated by the service controller, VSP or another network function (e.g. service usage notification gateway or billing system) and in this case access is restricted to service controller, VSP or other network function with proper credentials to access the UI pass through screens. |

FIG. 42G

| | | |
|---|---|---|
| User CRM or service usage monitoring filtering option preference | Filters the device and/or user information that is being collected before it is reported to the network to maintain the desired level of user privacy. In some embodiments the user defines preferences on user privacy that are used to define the filter settings. | In some embodiments this is not accessible by the network and only may be modified by the user. In other embodiments it may be read but not written by the network and in this case authorization is restricted to service controller, VSP or other network function with proper credentials to access the filter settings data base. In some embodiments the network is allowed to change the CRM filter settings and in this case Authorization restricted to service controller, VSP or other network function with proper credentials to access the CRM filter settings data base. |
| Service usage billing event record | A record of service usage billing events. In some embodiments this record is transmitted to the billing server or another network function to aid service billing or billing reconciliation. | In some embodiments authorization restricted to service controller, VSP or other network function with proper credentials to access the billing data base. In some embodiments the user is allowed to read but not write the data base. |
| Bill by account | The bill by account embodiments provide for service billing to accounts different than the main user account, for example tracking network device chatter that is not desired to be billed to the user, transaction partner access costs that are shared with or billed to the transaction partner, ambient service cost tracking, tracking temporary account costs, etc. | In some embodiments authorization restricted to service controller, VSP or other network function with proper credentials to access the billing data base. In some embodiments the user is allowed to read but not write the data base. |
| Central billing transaction and event recording | Billing event tracking and reporting associated with the central provider open billing embodiments. Some embodiments include generation of billing certificates or receipts. In some embodiments the device may serve as a billing feed. | In some embodiments authorization restricted to service controller, VSP or other network function with proper credentials to access the billing data base. In some embodiments the user is allowed to read but not write the data base. |
| Service owner registration or re-registration | Function that allows a portion of the device credentials to be programmed to indicated the VSP. | In some embodiments authorization to write the device is restricted with security signatures or other security methods to the VSP and possibly the central provider. Some embodiments involve provisions to report to a network function when the VSP settings are changed or the software is uninstalled. Other embodiments involve restoring VSP settings or software if removed. |

FIG. 42H

| | | |
|---|---|---|
| Credentials swap | Function that provides for swapping of credentials, for example temporary credentials to permanent credentials. | Authorization restricted to service controller, VSP or other network function with proper credentials to access the credentials data base. |
| Account information swap | Function that provides for swapping the account information, for example temporary account to permanent account. | Authorization restricted to service controller, VSP or other network function with proper credentials to access the activation service profile data base. |
| Configure or re-configure service processor for new device service | Function that provides for service processor programming for all the information that defines the service profile, device credentials, VSP and other necessary parameters. | Authorization restricted to service controller, VSP or other network function with proper credentials to access the service profile data base. |
| Ambient service profile definition | Function that provides for service processor programming for all the information that defines the ambient service profile, device credentials, VSP and other necessary parameters. | Authorization restricted to service controller, VSP or other network function with proper credentials to access the ambient service profile data base. |
| Analyze service usage statistics | VSP function to analyzer service usage statistics for a device, defined group of devices, defined group of service plans or service profiles, defined group of users or other groupings. | Authorization typically restricted to service controller, VSP or other network entity with the credentials to access the service usage history data bases. |
| Dry lab test new service policy | Allows simulated testing of draft service profiles and/or service plans against device usage statistics for a defined group of devices or users or service profiles, or against simulated device service usage behavior. Some embodiments show the estimated profitability of proposed service profile and service plan. Some embodiments allow decomposition of the service usage statistics to identify the user group service usage activities that may be modified by changing the service usage control policies or made more profitable by changing the service plan billing policies. | Authorization typically restricted to service controller, VSP or other network entity with the credentials to access the service usage history data bases. |
| Beta test publishing system | Function that provides for service processor programming for all the information that defines the service profile device credentials, VSP and other necessary parameters for a beta test device group. | Authorization restricted to service controller, VSP or other network function with proper credentials to access the service profile data base. |
| Publish new service | Function that provides for service processor programming for all the information that defines the service profile, device credentials, VSP and other necessary parameters for a production device group. | Authorization restricted to service controller, VSP or other network function with proper credentials to access the service profile data base. |

FIG. 42I

| | | |
|---|---|---|
| Roaming selection service | Function that surveys available roaming service partners, looks up the billing rates for the partners, and displays to the user the set of choices and billing rates. In some embodiments the roaming partner billing rates for one or more roaming partners are applied to a typical user service usage scenario for the purpose of estimating possible projected roaming costs and displaying those costs to the user. In some embodiments the roaming data is stored locally on the device and periodically updated with network refreshes, while in other embodiments the data base is looked up at the time of service. In some embodiments, the user is asked if they would like to modify their service usage notification or control profiles to save roaming costs and if the user responds yes they are provided with a set of options for changing service usage notification or service usage control policies. | Authorization to modify the policies typically restricted to the VSP or other entity responsible for managing the roaming service. |
| Roaming usage count | Provides a service usage estimate to the user while roaming. | Same as above. |
| Roaming cost service | Provides a service cost estimate to the user while roaming. | Same as above. |
| Roaming policy control service | Provides the user or VSP with the capability to switch service usage control policies while roaming. Some embodiments provide for restrictions to roaming carrier options. Some embodiments provide policies based on carrier chosen. Some embodiments provide policies based on the service cost for carrier chosen. Some embodiments specify preferred roaming lists that may be different than the central provider roaming list. | Same as above. |
| Switch policies for new network | Provides the user or VSP with the capability to switch service usage notification or service usage control policies depending on which network the device is connected to. Some embodiments provide for restrictions to certain network options. Some embodiments provide policies based on network chosen. Some embodiments provide policies based on the service cost for network chosen. Some embodiments provide for a network connection preference list. | Authorization to modify the policies typically restricted to the VSP or other entity responsible for managing the network selection policies. |

FIG. 42J

SERVICE PROFILE MANAGEMENT WITH USER PREFERENCE, ADAPTIVE POLICY, NETWORK NEUTRALITY AND USER PRIVACY FOR INTERMEDIATE NETWORKING DEVICES

CROSS REFERENCE TO OTHER APPLICATIONS

This application claims priority to U.S. Provisional Patent Application No. 61/206,354 entitled SERVICES POLICY COMMUNICATION SYSTEM AND METHOD filed Jan. 28, 2009, U.S. Provisional Patent Application No. 61/206,944 entitled SERVICES POLICY COMMUNICATION SYSTEM AND METHOD filed Feb. 4, 2009, U.S. Provisional Application No. 61/207,393 entitled SERVICES POLICY COMMUNICATION SYSTEM AND METHOD filed Feb. 10, 2009, and U.S. Provisional Patent Application No. 61/207,739 entitled SERVICES POLICY COMMUNICATION SYSTEM AND METHOD filed on Feb. 13, 2009, which are incorporated herein by reference for all purposes.

BACKGROUND OF THE INVENTION

With the advent of mass market digital communications and content distribution, many access networks such as wireless networks, cable networks and DSL (Digital Subscriber Line) networks are pressed for user capacity, with, for example, EVDO (Evolution-Data Optimized), HSPA (High Speed Packet Access), LTE (Long Term Evolution), WiMax (Worldwide Interoperability for Microwave Access), and Wi-Fi (Wireless Fidelity) wireless networks increasingly becoming user capacity constrained. Although wireless network capacity will increase with new higher capacity wireless radio access technologies, such as MIMO (Multiple-Input Multiple-Output), and with more frequency spectrum being deployed in the future, these capacity gains are likely to be less than what is required to meet growing digital networking demand.

Similarly, although wire line access networks, such as cable and DSL, can have higher average capacity per user, wire line user service consumption habits are trending toward very high bandwidth applications that can quickly consume the available capacity and degrade overall network service experience. Because some components of service provider costs go up with increasing bandwidth, this trend will also negatively impact service provider profits.

BRIEF DESCRIPTION OF THE DRAWINGS

Various embodiments of the invention are disclosed in the following detailed description and the accompanying drawings.

FIGS. 22A through 22B provide tables summarizing various service processor agents (and/or components/functions implemented in software and/or hardware) in accordance with some embodiments.

FIG. 23 provides a table summarizing various service controller server elements (and/or components/functions implemented in software and/or hardware) in accordance with some embodiments.

FIGS. 26A through 26H provide tables summarizing various service processor heartbeat functions and parameters in accordance with some embodiments.

FIGS. 27A through 27P provide tables summarizing various device based service policy implementation verification techniques in accordance with some embodiments.

FIGS. 28A through 28 E provide tables summarizing various techniques for protecting the device based service policy from compromise in accordance with some embodiments.

FIG. 41 provides a table summarizing various privacy levels for service history reporting in accordance with some embodiments.

FIGS. 42A through 42J provide tables summarizing various service policy control commands in accordance with some embodiments.

DETAILED DESCRIPTION

Figure 1:
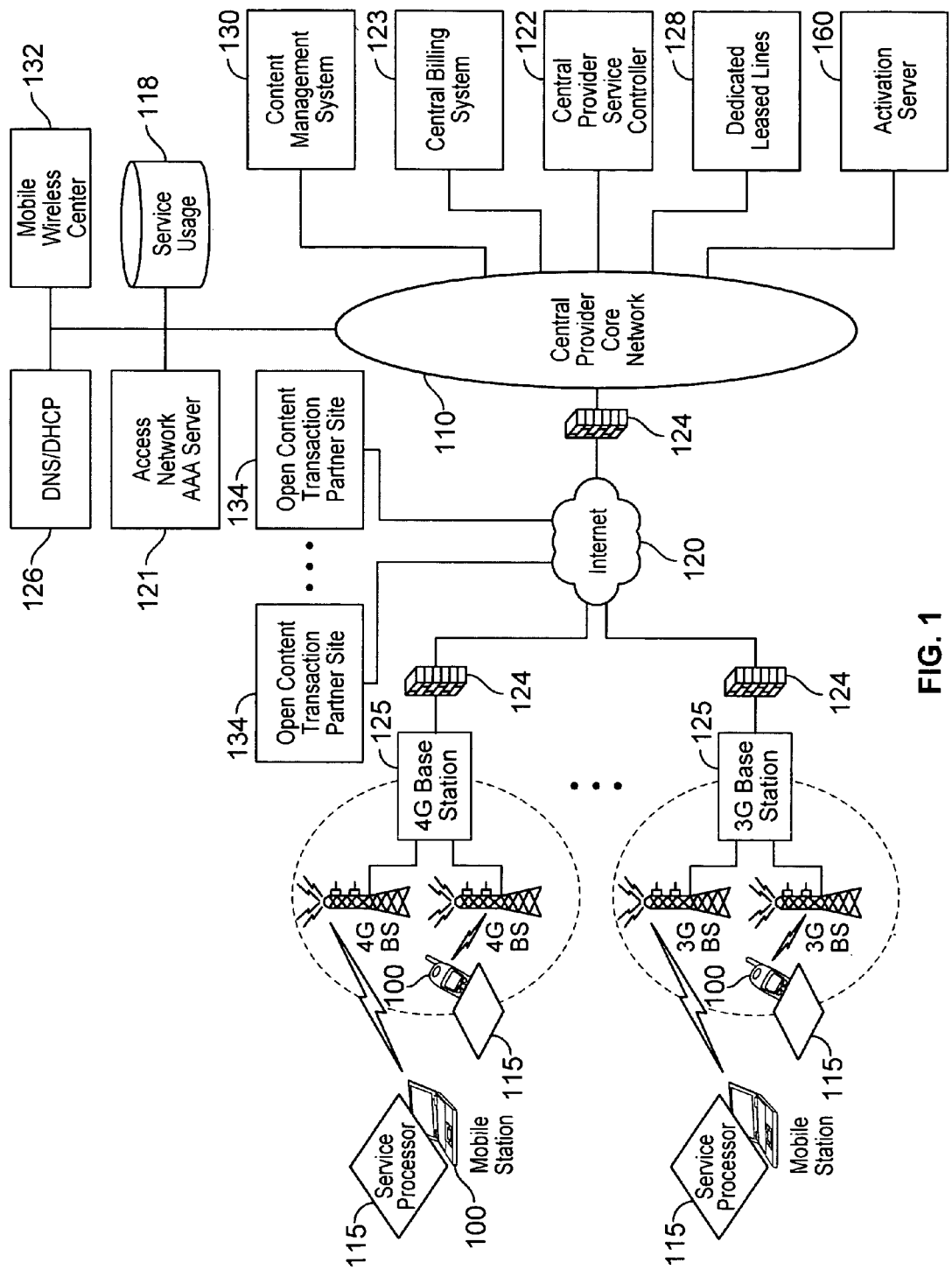
FIG. 1 illustrates a simplified (e.g., "flattened") network architecture in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

With the development and increasing proliferation of mass market digital communications and content distribution, communication network capacity gains are being outpaced by growing digital networking demand. For example, some industry experts project average wireless device usage of four devices per subscriber, with a mixture of general purpose devices like smart phones and computers along with special purpose devices like music players, electronic readers, connected (e.g., networked) cameras and connected gaming devices. In addition, wire line user service consumption habits are trending toward very high bandwidth applications that can quickly consume the available capacity and degrade overall network service experience if not efficiently managed. Because some components of service provider costs go up with increasing bandwidth, this trend will also negatively impact service provider profits.

There is a need for a communication system and method that provides for flexible service plans and management of user network services to provide consumer choice of more refined service plan offerings and efficient management of network capacity.

Also, it is becoming increasingly important to more deeply manage the level of services delivered to networked devices to provide cost effective services that match growing digital networking usage patterns. For example, access providers can move away from only billing for basic access and move toward billing for higher level service delivery with example services including rich Internet access and email, application based billing, content distribution, entertainment activities, information or content subscription or gaming. In addition, a growing number of new special purpose and general purpose networked devices are fueling demand for new service plans, for example, tailored to the new device usage models (e.g., a special service plan for an e-book reader device).

As network capabilities grow and new networked device offerings grow, access network service providers will realize increasing value in opening up their networks to allow innovation and expanded offerings for network service consumers. However, opening up the networks to provide efficient third party definition of alternative service and billing models requires more flexible service and billing policy management solutions. For example, machine to machine applications such as telemetry, surveillance, shipment tracking and two way power control systems are example new applications that would require new offerings to make such available to network service customers. The need to customize service offerings for these new applications requires more efficient methods for defining, testing and launching new services with more refined control of service functions and service costs. In some embodiments, this means billing for different types of service elements, such as total traffic, content downloads, application usage, information or content subscription services, people or asset tracking services, real time machine to machine information or electronic commerce transactions.

In some embodiments, network user capacity is increased and user service costs are reduced by managing and billing for service consumption in a more refined manner (e.g., to satisfy network neutrality requirements). By managing service consumption in a user friendly manner, the overall service capacity required to satisfy the user device needs can be tailored more closely to the needs of a given user thereby reducing user service costs and increasing service provider profits. For example, managing service usage while maintaining user satisfaction includes service usage policy implementation and policy management to identify, manage and bill for service usage categories, such as total traffic consumption, content downloads, application usage, information or content subscription services, electronic commerce transactions, people or asset tracking services or machine to machine networking services. As described herein, service activity is used to refer to any service usage or traffic usage that can be associated with, for example, an application; a network communication end point, such as an address, uniform resource locator (URL) or other identifier with which the device is communicating; a traffic content type; a transaction where content or other material, information or goods are transacted, purchased, reserved, ordered or exchanged; a download, upload or file transfer; email, text, SMS, IMS or other messaging activity or usage; VOIP services; video services; a device usage event that generates a billing event; service usage associated with a bill by account activity (also referred to as billing by account) as described herein; device location; device service usage patterns, device user interface (UI) discovery patterns, content usage patterns or other characterizations of device usage; or other categories of user or device activity that can be identified, monitored, recorded, reported, controlled or processed in accordance with a set of verifiable service control policies. As will be apparent to one of ordinary skill in the art in view of the embodiments described herein, some embodiments identify various service activities for the purpose of decomposing overall service usage into finer subcategories of activities that can be verifiably monitored, categorized, cataloged, reported, controlled, monetized and used for end user notification in a manner that results in superior optimization of the service capabilities for various levels of service cost or for various types of devices or groups. In some embodiments, it will be apparent to one of ordinary skill in the art that the terms service activity or service usage are associated with categorizing and possibly monitoring or controlling data traffic, application usage, communication with certain network end points, or transactions, and it will also be apparent that in some embodiments the term service activity is intended to include one or more of the broader aspects listed above. The shortened term service usage can be used interchangeably with service activity, but neither term is intended in general to exclude any aspect of the other. In some cases, where the terms service usage or service activity are used, more specific descriptors such as traffic usage, application usage, website usage, and other service usage examples are also used to provide more specific examples or focus in on a particular element of the more encompassing terms.

In some embodiments, employing this level of service categorization and control is accomplished in a manner that satisfies user preferences. In some embodiments, employing this level of service categorization and control is accomplished in a manner that also satisfies government rules or regulations regarding open access, for example, network neutrality requirements. In some embodiments, service management solutions that also collect and/or report user or device service usage or service activity behavior to determine how best to meet the user's simultaneous desires for service quality and lower service costs are disclosed. For example, such monitoring and reporting are accomplished in a manner that includes approval by the user and in a manner that also protects the privacy of user information and service usage behavior or service activity history.

In some embodiments, a system and method is disclosed for increasing network user capacity for wireless networks in the face of increasing service demand per user by providing for a greater number of base stations, also sometimes referred to as access points, base terminals, terminal nodes or other well known acronyms, to be more easily and/or more cost effectively deployed. For example, to simplify the process of deploying base stations, the installation complexity and the network infrastructure required for the base station to obtain backhaul service to the various networks that users desire to connect with are reduced.

In some embodiments, dense base station deployments are simplified by reducing the requirement to aggregate or concentrate the base station traffic through a specific dedicated core network infrastructure, so that the base stations connect to the desired user networks through a more diverse set of local loop, back bone and core routing options. This approach also reduces network infrastructure equipment, installation and maintenance costs. In some embodiments, this is accomplished by distributing the network traffic policy implementation and control away from the core network by providing for more control for service policy implementation and management on the end user device and, in some embodiments, in the end user device with respect to certain service policies and the network (e.g., control plane servers) with respect to other service policies. For example, this approach facilitates connecting the base stations directly to the local loop Internet with a minimum of specific dedicated networking infrastructure.

In some embodiments, service and transaction billing event capture and logging are distributed to the device. For example, providing service and transaction billing event capture and logging at the device provides a greater capability to monitor, classify and control deeper aspects of service usage or service activity at the device as compared to the relatively less capability for the same in the network infrastructure (e.g., for certain traffic flows, such as encrypted traffic flows). Furthermore, billing at the device provides for very specialized with many different billing and service plans for different device and service usage or service activity scenario combinations without the problem of attempting to propagate and manage many different deep packet inspection (DPI) and traffic shaping profiles in the networking equipment infrastructure. For example, service billing at the device can provide for more sophisticated, more specialized and more scalable billing and service plans.

Another form of billing that needs improvement is electronic commerce transaction billing with device assisted central billing. Today, most central billing and content distribution models require either centralized content distribution maintained by the central service provider or central billing authority, or a centralized ecommerce website or portal traffic aggregation system controlled by the central service provider or central billing provider, or both. In such systems, content and transaction providers such as media providers, application developers, entertainment providers, transaction website providers and others must adapt their mainstream electronic offering and commerce systems, such as shopping experience websites, to fit within the various proprietary customized infrastructure and content storage solutions for ecommerce markets, such as BREW® (Binary Runtime Environment for Wireless from Qualcomm® Inc.), Symbian OS (from Symbian Software Ltd) and Apple iPhone 3G App Store (from Apple Inc.). This approach requires a large amount of unnecessary custom interface development and stifles open market creativity for HTTP, WAP or portal/widget based shopping destinations and experiences. As disclosed below, a superior approach includes device based transaction billing for an open ecosystem in which a central billing provider provides users and ecommerce transaction providers with a central billing solution and experience that does not require extensive custom development or ecommerce infrastructure interfacing.

In some embodiments, products that incorporate device assisted service policy implementation, network services and service profiles (e.g., a service profile includes a set of one or more service policy settings for the device for a service on the network) are disclosed, as described below. For example, aspects of the service policy (e.g., a set of policies/policy settings for the device for network services, typically referring to lower level settings, such as access control settings, traffic control settings, billing system settings, user notification settings, user privacy settings, user preference settings, authentication settings and admission control settings) that are moved out of the core network and into the end user device include, for example, certain lower level service policy implementations, service usage or service activity monitoring and reporting including, for example, privacy filtering, customer resource management monitoring and reporting including, for example, privacy filtering, adaptive service policy control, service network access control services, service network authentication services, service network admission control services, service billing, transaction billing, simplified service activation and sign up, user service usage or service activity notification and service preference feedback and other service capabilities.

As discussed below, product designs that move certain aspects of one or more of these service profile or service policy implementation elements into the device provide several advantageous solutions to the needs described above. For example, benefits of certain embodiments include the ability to manage or bill for a richer and more varied set of network services, better manage overall network capacity, better manage end user access costs, simplify user or new device service activation, simplify development and deployment of new devices with new service plans (e.g., service profile and billing/costs information associated with that service profile), equip central service providers with more effective open access networks for new third party solutions, simplify the equipment and processes necessary to deploy wireless base stations and simplify the core networking equipment required to deploy certain access networks.

As discussed below, there are two network types that are discussed: a central provider network and a service provider network. The central provider network generally refers to the access network required to connect the device to other networks. The central provider network generally includes the physical layer, the Media Access Control (MAC) and the various networking functions that can be implemented to perform authentication, authorization and access control, and to route traffic to a network that connects to the control plane servers, as discussed below. The service provider network generally refers to the network that includes the control plane servers. In some embodiments, a central provider network and a service provider network are the same, and in some embodiments, they are different. In some embodiments, the owner or manager of the central provider network and the owner or manager of the service provider network are the same, and in some embodiments, they are different.

In some embodiments, control of the device service policies is accomplished with a set of service control plane servers that reside in the access network or any network that can be reached by the device. This server based control plane architecture provides for a highly efficient means of enabling third party control of services and billing, such as for central carrier open development programs or Mobile Virtual Network Operator (MVNO) relationships. As device processing and memory capacity expands, moving to this distributed service policy processing architecture also becomes more efficient and economical. In some embodiments, several aspects of user privacy and desired network neutrality are provided by enabling user control of certain aspects of device based service usage or service activity reporting, traffic reporting, service policy control and customer resource management (CRM) reporting.

In many access networks, such as wireless access networks, bandwidth capacity is a valuable resource in the face of the increasing popularity of devices, applications and content types that consume more bandwidth. To maintain reasonable service profit margins, a typical present service provider practice is to charge enough per user for access to make service plans profitable for the higher bandwidth users. However, this is not an optimal situation for users who desire to pay less for lower bandwidth service usage or service activity scenarios.

Accordingly, in some embodiments, a range of service plan pricing can be enabled that also maintains service profitability for the service provider, for example, by providing a more refined set of management and control capabilities for service profiles. For example, this approach generally leads to service management or traffic shaping where certain aspects of a service are controlled down based on service policies to lower levels of quality of service. Generally, there are three problems that arise when these techniques are implemented. The first problem is maintaining user privacy preferences in the reporting of service usage or service activity required to set, manage or verify service policy implementation. This problem is solved in a variety of ways by the embodiments described below with a combination of user notification, preference feedback and approval for the level of traffic information the user is comfortable or approves and the ability to filter service usage or service activity, in some embodiments, specifically traffic usage or CRM reports so that only the level of information the user prefers to share is communicated. The second problem is satisfying network neutrality requirements in the way that traffic is shaped or services are managed. This problem is solved in a variety of ways as described in the embodiments described below by empowering the user to make the choices on how service usage, service activity, traffic usage or CRM data is managed down to control costs, including embodiments on user notification and service policy preference feedback. By allowing the user to decide how they want to spend and manage their service allowance or resources, a more neutral or completely neutral approach to network usage can be maintained by the service provider. The third problem is to help the user have an acceptable and enjoyable service experience for the lower cost plans that will result in much wider scale adoption of connected devices and applications but are more constrained on service activity usage or options or bandwidth or traffic usage. As lower cost service plans are offered, including plans where the basic connection service may be free, these service plans will require service provider cost controls to maintain profitability or preserve network capacity that result in lower limits on service usage or service activity. These lower service usage or service activity limit plans will result in more users who are likely run over service usage limits and either experience service shutdown or service cost overages unless they are provided with more capable means for assistance on how to use and control usage for the lower cost services. This problem is solved in a variety of ways with a rich collection of embodiments on user notification, service usage and cost projection, user notification policy feedback, user service policy preference feedback, and adaptive traffic shaping or service policy implementation. As described herein, some embodiments allow a wide range of flexible and verifiable service plan and service profile implementations ranging from examples such as free ambient services that are perhaps sponsored by transaction revenues and/or bill by account sponsored service partner revenues, to intermediately priced plans for basic access services for mass market user devices or machine to machine communication devices, to more expensive plans with very high levels of service usage or service activity limits or no limits at all. Several bill by account embodiments also provide for the cataloging of service usage that is not a direct benefit to end users but is needed for basic maintenance of the device control channels and access network connection, so that the maintenance traffic service cost can be removed from the user billing or billed to non-user accounts used to track or account for such service costs. These embodiments and others result in a service usage or service activity control capability that provides more attractive device and service alternatives to end users while maintaining profitability for service providers and their partners.

In some embodiments, the above described various embodiments for device based service policy and/or service profile communications control are implemented using network based service control, for example, for satisfying various network neutrality and/or privacy requirements, based on indication(s) received from the device (e.g., user input provided using the device UI using the service processor) and network based service control (e.g., using a DPI service monitor or DPC policy implementation and/or other network elements).

In some embodiments, a virtual network overlay includes a device service processor, a network service controller and a control plane communication link to manage various aspects of device based network service policy implementation. In some embodiments, the virtual network overlay networking solution is applied to an existing hierarchical network (e.g., for wireless services), and in some embodiments, is applied to simplify or flatten the network architecture as will be further described below. In some embodiments, the large majority of the complex data path network processing required to implement the richer service management objectives of existing hierarchical networks (e.g., for wireless services) are moved into the device, leaving less data path processing required in the edge network and in some cases even less in the core network. Because the control plane traffic between the service control servers and the device agents that implement service policies can be several orders of magnitude slower than the data plane traffic, service control server network placement and back-haul infrastructure is much less performance sensitive than the data plane network. In some embodiments, as described further below, this architecture can be overlaid onto all the important existing access network architectures used today. In some embodiments, this architecture can be employed to greatly simplify core access network routing and data plane traffic forwarding and management. For example, in the case of wireless networks, the incorporation of device assisted service policy implementation architectures can result in base stations that directly connect to the Internet local loop and the data traffic does not need to be concentrated into a dedicated core network. This results, for example, in a large reduction in backhaul cost, core network cost and maintenance cost. These cost savings can be redeployed to purchase and install more base stations with smaller cells, which results in higher data capacity for the access network leading to better user experience, more useful applications and lower service costs. This flattened networking architecture also results in latency reduction as fewer routes are needed to move traffic through the Internet. In some embodiments, the present invention provides the necessary teaching to enable this powerful transformation of centralized network service architectures to a more distributed device based service architectures.

Device based billing can be compromised, hacked and/or spoofed in many different ways. Merely determining that billing reports are being received from the device, that the device agent software is present and properly configured (e.g., the billing agent is present and properly configured) is insufficient and easily spoofed (e.g., by spoofing the agent itself, providing spoofed billing reports using a spoofed billing agent or providing spoofed agent configurations). Accordingly, in some embodiments, verifiable device assisted and/or network based service policy implementation is provided. For example, verifiable service usage and/or service usage billing can be provided as described herein with respect to various embodiments.

While much of the below discussion and embodiments described below focus on paid service networks, those of ordinary skill in the art will appreciate that many of the embodiments also apply to other networks, such as enterprise networks. For example, the same device assisted network services that create access control services, ambient activation services and other service profiles can be used by corporate IT managers to create a controlled cost service policy network for corporate mobile devices. As another example, embodiments described below for providing end user service control can also allow a service provider to offer parental controls by providing parents with access to a website with a web page that controls the policy settings for the access control networking service for a child's device.

Network Architecture for Device Assisted/Based Service Control

FIG. 1 illustrates a simplified (e.g., "flattened") network architecture in accordance with some embodiments. As shown, this provides for a simplified service infrastructure that exemplifies a simplified and "flattened" network architecture in accordance with some embodiments that is advantageous for wireless network architectures. This also reduces the need for complex data path protocol interaction between the base station and network infrastructure. For example, in contrast to a complex edge and core network infrastructure connecting base stations to the central service provider network, as shown the base stations 125 are connected directly to the Internet 120 via firewalls 124 (in some embodiments, the base stations 125 include the firewall functionality 124). Accordingly, in some embodiments, a central provider network is no longer required to route, forward, inspect or manipulate data plane traffic, because data plane traffic policy implementation is conducted in the device 100 by the service processor 115. However, it is still an option, in some embodiments, to bring data plane traffic in from the base stations 125 to a central provider network using either open or secure Internet routing if desired. Base station control plane communication for access network AAA (Authentication, Authorization, and Accounting) server 121, DNS/DHCP (Domain Name System/Dynamic Host Configuration Protocol) server 126, mobile wireless center 132 (sometimes referenced to in part as a home location register (HLR) or other acronym) or other necessary functions are accomplished, for example, with a secure IP tunnel or TCP connection between the central provider network and the base stations. The base station 125 is used to refer to multiple base station embodiments where the base station itself is directly connected to the RAN, or where the base station connects to a base station controller or base station aggregator function that in turn connects to the RAN, and all such configurations are collectively referred to herein as base station 125 in FIG. 1 and most figures that follow that reference base station 125 as described below.

As shown, the central provider access network is both 3G and 4G capable, the devices 100 can be either 3G, 4G or multi-mode 3G and 4G. Those of ordinary skill in the art will also appreciate that in the more general case, the network could be 2G, 3G and 4G capable, or the device could be 2G, 3G and 4G capable with all or a subset of Global System for Mobile (GSM), General Packet Radio Service (GPRS), Code Division Multiple Access (CDMA) 1X, High Speed Packet Access (HSPA), Evolution Data Optimized (EVDO), Long Term Evolution (LTE) and WiMax modem capability. If the devices are single mode, then the 3G devices 100 will be activated with a service profile applied to service processor 115 that is consistent with the 3G network capacity and speed, and the 4G devices will be activated with service profiles applied to service processor 115 that are consistent with 4G network capacity and speed. In both cases, the same service controller 122 manages services for both sets of devices in accordance with some embodiments. If the devices are multimode, then the service processor 115 can be activated with a dual mode service profile capability in which the service profile for 3G offers a similar rich set of services as the service profile for 4G but with, for example, scaled back bandwidth. For example, this approach is allows central providers to offer a richer set of service offerings with 3G and then migrate the same set of service offerings to 4G but with higher performance. In particular, this approach allows 3G to 4G rich service migration to occur, for example, with the only change being the increased bandwidth settings in the service profiles that will be available in 4G at the same cost as 3G with lower service profile bandwidth settings.

In some embodiments, if the devices are multimode, a network selection policy implementation within service processor 115 is provided, or in some embodiments, a network selection policy is driven by policy decisions made in service controller 122 based on service availability reports received from service processor 115. The network selection policy allows the selection of the network that corresponds to the most desirable service profile to meet the user's service preferences. For example, if the user specifies, within the framework of the service notification and user preference feedback embodiments described below, that maximum performance is the most important factor in selecting which access network to connect to, then the best profile is likely to be the 4G network as 4G is typically faster, except perhaps, for example, if the device 100 is closer to the 3G base station so that there is a much stronger signal or if the 4G network is much more heavily loaded than the 3G network. On the other hand, if the user preference set specifies cost as the most important factor, then depending on the central provider service costs the 3G network may prove to be the most desirable service profile. This is a simple example and many other selection criteria are possible in the network selection embodiment as discussed further below.

Network Based Service Usage Monitoring for Verification and Other Purposes

In some embodiments, if the base station data plane traffic is transmitted via the Internet 120 as discussed above, then IPDRs (Internet Protocol Detail Records, also sometimes and interchangeably referred to herein as Charging Data Records or CDRs, which as used herein refer to any network measure of service usage or service activity for voice and/or data traffic (e.g., IPDRs can include a time stamp, a device ID, and various levels of network measures of service usage for the device associated with that device ID, such as perhaps total traffic usage, network destination, time of day or device location)) are generated by and collected from the access network equipment. Depending on the specific network configuration, as discussed herein, for a WWAN network the IPDRs can be generated by one or more of the following: base station 125, RAN or transport gateways and AAA 121. In some access network embodiments, the IPDRs are transmitted to equipment functions that aggregated the IPDRs for the purpose of service billing and other functions. Aggregation can occur in the AAA, the transport gateways or other functions including the billing system 123. As discussed below, it is often the case that the IPDRs is assumed to be obtained from the AAA server 121 and/or a service usage data store 118 (e.g., a real-time service usage collection stored in a database or a delayed feed service usage collection stored in a database), or some other network function. However, this does not imply that the IPDRs may not be obtained from a variety of other network functions, and in some embodiments, the IPDRs are obtained from other network functions as disclosed herein. In some embodiments, existing IPDR sources are utilized to obtain network based service usage measures for multiple purposes including but not limited to service policy or profile implementation verification, triggering service verification error responds actions, and service notification synchronization. Certain types of IPDRs can be based on, or based in part on, what are sometimes referred to as CDRs (Charging Data Records, which can track charges for voice and data usage) or modifications of CDRs. Although the capability to monitor, categorize, catalog, report and control service usage or service activity is in general higher on the device than it is in the network, and, as described herein, device based service monitoring or control assistance is in some ways desirable as compared to network based implementations, as described herein many embodiments take advantage of network based service monitoring or control to augment device assisted service monitoring or control and vice versa. For example, even though many embodiments work very well with minimal IPDR service usage or service activity information that is already available in a network, deeper levels of IPDR packet inspection information in general enable deeper levels of service monitoring or service control verification, which can be desirable in some embodiments. As another example, deeper levels of network capability to control service usage or service activity can provide for more sophisticated error handling in some embodiments, for example, providing for more options of the Switched Port Analyzer (SPAN) and network quarantine embodiments as described herein. As another example, in some embodiments it is advantageous to take advantage of network based service monitoring or control for those service aspects the network is capable of supporting, while using device assisted service monitoring or control for the service aspects advantageously implemented on the device.

In some embodiments, where base station data plane traffic is backhauled and concentrated in a central provider core network 110, then the IPDRs can originate in the base stations or a router or gateway in the central provider network 110, and the IPDRs are collected at the AAA server 121 and stored in the service usage data store 118. In some embodiments, the central billing system 123 collects the IPDRs from the AAA server 121 for service billing accounting purposes. In some embodiments, a central billing system 123 collects the IPDRs directly from the initial IPDR source or some other aggregator. In some embodiments, outside partners like MVNOs gain access to the IPDRs from the central billing system 123. As discussed below, it is assumed that the IPDRs are obtained from the AAA server 121, and it is understood that the source of the IPDRs is interchangeable in the embodiments.

In some embodiments, the IPDR information is used by the service processor 115, the service controller 122 and/or other network apparatus or device apparatus to implement service control verification is provided as described below. In some embodiments, an IPDR feed (e.g., also referred to as a charging data record (CDR)) flows between network elements. For example, an IPDR feed can flow from the RAN gateway 410 (e.g., SGSN 410, BSC packet control 510 or RNC 512) and the transport gateway 420 (e.g., GGSN or PDSN). In other embodiments, the IPDRs originate and flow from the base station 125 or some other component/element in the network. In some embodiments, one or more of these IPDR feeds is transmitted to an IPDR aggregation function (e.g., also referred to as a charging gateway). For example, this aggregation function can be located in the AAA 121, in the mobile wireless center 132 (and/or in the home location register (HLR) or other similar function referred to by other common industry names), in the transport gateway 420, or in some other network element. This aggregation function collects the IPDR feeds into a database with an entry for each device 100. In some embodiments, an intermediate aggregation function is provided that feeds a higher level aggregation function, for example, the transport gateway 420 can receive IPDR feeds from the RAN gateway 410 or the base station 125 before sending them to another aggregation function. At some point in time (e.g., at the end of a specified time period, at the end of a device network connection session and/or at a specified time of day), the IPDR aggregation function sends summary information or detailed information of the IPDRs for a given device or group of devices to the billing system for billing and/or reconciliation. In some embodiments, in which the IPDR aggregation feed to the billing system is frequent enough for one or more of the IPDR information purposes described herein, the IPDR feed for the service controller 122 is derived from the aggregated feed, either by having the billing system 123 transmit it to the service controller 122, or by copying it from the IPDR aggregation function.

In some embodiments, the IPDR feed is obtained from the network function that is generating or aggregating the IPDR feed as described herein. In some embodiments, the IPDR feed is copied from the aggregation function in a manner that does not interrupt the operation of the network. For example, a switch based port analysis function can be used to copy the traffic to a traffic analysis or server element that filters out the IPDR traffic and records it to a data base that is then either pushed to the service controller 122 (or any other network element that uses IPDR information as described herein), or is queried by the service controller 122 (or any other function that uses the IPDR information as described herein). In some embodiments, if the aggregated IPDR information transmitted to the billing system is delayed from real-time traffic usage events by an amount of time that is, for example, too long for desired operation, or for any other reason that makes it less desirable to obtain the IPDR information from the same aggregated feed used for the billing system 123, the IPDR information can be collected from one or more of the sources discussed above including, for example, from another aggregation point (e.g., the feed to the charging gateway, AAA server and/or mobile wireless center/HLR), one or more of the gateways 410, 420, 508, 512, 520, 608, 612, 620, 708, 712, 720 the base station 125 and/or another network element. In some embodiments, the IPDR feeds from these or other network functions are copied to a database as described above, which is either pushed or queried to get the information to the service controller 122 or other network elements that request the IPDR information.

In some embodiments, the service processor 115 includes various components, such as device agents, that perform service policy implementation or management functions. In some embodiments, these functions include service policy or implementation verification, service policy implementation tamper prevention, service allowance or denial, application access control, traffic control, network access control services, various network authentication services, service control plane communication, device heartbeat services, service billing, transaction billing, simplified activation services and/ or other service implementations or service policy implementations. It will be apparent to those of ordinary skill in the art that the division in functionality between one device agent and another is a design choice, that the functional lines can be re-drawn in any technically feasible way that the product designers see fit, and that the placing divisions on the naming and functional breakouts for device agents aids in understanding, although in more complex embodiments, for example, it can make sense to the product designer to break out device agent functionality specifications in some other manner in order to manage development specification and testing complexity and workflow.

In some embodiments, network control of the service policy settings and services as discussed above is accomplished with the service controller 122 which in various embodiments includes one or more server functions. As with the service processor 115 agent naming and functional break out, it is understood that service controller 122 server naming and functional breakout is also a design choice and is provided mainly to aid in the discussion. It will be apparent to those of ordinary skill in the art that the server names and functional breakouts do not imply that each name is an individual server, and, for example, a single named function in the various embodiments can be implemented on multiple servers, or multiple named functions in the various embodiments can be implemented on a single server.

As shown, there are multiple open content transaction partner sites 134 (e.g., open content transaction servers), which represent the websites or experience portals offered by content partners or ecommerce transaction partners of the service provider. For example, transaction servers 134 can provide an electronic commerce offering and transaction platform to the device. In some embodiments, the central provider has ownership and management of the service controller 122, so the central provider and the service provider are the same, but as discussed below the service provider that uses the service controller 122 to manage the device services by way of service processor 115 is not always the same as the central provider who provides the access network services.

In some embodiments, further distribution of central provider access networking functions such as access network AAA server 121, DNS/DHCP server 126, and other functions are provided in the base stations 125. In some embodiments, network based device service suspend/resume control are also provided in the base stations 125 (or in some embodiments, for hierarchical or overlay networks, this function is provided by one or more of the following: RAN gateways, transport gateways, AAA 121 or some other network function). As shown, the following are connected (e.g., in network communication with) the central provider network 110: central provider billing system 123, dedicated leased lines 128 (e.g., for other services/providers), central provider service controller 122, a content management (e.g., content switching, content billing, and content catching) system 130, central provider DNS/DHCP server 126, access network AAA server 121, service usage data store 118 and central provider mobile wireless center 132. These embodiments may be advantageous particularly for flat networks as that shown in FIG. 1 that are provided by the present invention.

In some embodiments, the base stations 125 implement a firewall function via firewall 124 and are placed directly onto the local loop Internet for backhaul. Voice traffic transport is provided with a secure protocol with Voice Over IP (VOIP) framing running over a secure IP session, for example, Virtual Private Network (VPN), IP Security (IPSEC) or another secure tunneling protocol. In some embodiments, the VOIP channel employs another layer of application level security on the aggregated VOIP traffic trunk before it is placed on the secure IP transport layer. Base station control traffic and other central provider traffic can be provided in a number of ways with secure transport protocols running over Transmission Control Protocol (TCP), Internet Protocol (IP) or User Datagram Protocol (UDP), although TCP provides a more reliable delivery channel for control traffic that is not as sensitive to delay or jitter. One example embodiment for the control channel is a control link buffering, framing, encryption and secure transport protocol similar to that described below for the service control link between a device and the network. In some embodiments, a service control heartbeat function is provided to the base stations 125 similar to that implemented between the service controller 122 and the service processor 115 as described below. If the need to maintain a bandwidth efficient control plane channel between the base stations and the central provider base station control network is not as critical as it is in the case of access network connection to the device, then there are many other approaches for implementing a secure control channel over the Internet including, for example, one or more of various packet encryption protocols running at or just below the application layer, running TCP Transport Layer Security (TLS), and running IP level security or secure tunnels.

In some embodiments, the device based services control plane traffic channel between the service processor 115 and the service controller 122 is implemented over the same control plane channel used for the flat base station control architecture, or in some embodiments, over the Internet. As discussed below, it is assumed that the device bases services control plane channel for service processor 115 to service controller 122 communications is established through the Internet 120 or through the access network using IP protocols as this is the more general case and applies to overlay network applications for various embodiments as well as applications where various embodiments are used to enable flattened access networks.

In some embodiments, by enabling the device to verifiably implement a rich set of service features as described herein, and by enabling the base station 125 to connect directly to the Internet 120 with a local firewall for device data traffic, tunnel the voice to a voice network with VOIP and secure Internet protocols, and control the base station 125 over a secure control plane channel using base station control servers located in a central provider network, base stations 125 can be more efficiently provisioned and installed, because, for example, the base station 125 can accommodate a greater variety of local loop backhaul options. In such embodiments, it is advantageous to perform certain basic network functions in the base station 125 rather than the central provider network.

In some embodiments, a basic device suspend/resume function for allowing or disallowing the device Internet access is provided by the base stations 125 (or in some embodiments, for hierarchical or overlay networks in some embodiments this function is provided by one or more of the following: RAN gateways, transport gateways, AAA 121 or some other network function). This functionality, as will be discussed below, is important for certain embodiments involving taking action to resolve, for example, service policy verification errors. In some embodiments, this function is performed at the base station (e.g., base stations 125) thereby eliminating the need for a more complex networking equipment hierarchy and traffic concentration required to perform the suspend/resume function deeper in the network. Access network base stations control media access and are therefore designed with awareness of which device identification number a given traffic packet, group of packets, packet flow, voice connection or other traffic flow originates from and terminates to. In some embodiments, the suspend/resume function is implemented in the base station 125 by placing an access control function in the traffic path of each device traffic flow. The suspend resume function can be used by various network elements, and in the context of the present embodiment can be used by the service controller 122 (e.g., in some embodiments, access control integrity server 1654 (FIG. 16) of service controller 122 or other service controller elements) to suspend and resume device service based on the assessment of the service policy implementation verification status as described below.

In some embodiments, at least a basic traffic monitoring or service monitoring function is performed at the base station (e.g., base stations 125) similar to the service history records or IPDRs collected deeper in the network in more conventional hierarchical access network infrastructure architectures. For example, the service or traffic monitoring history records are advantageous for tracking device network service usage or service activity behavior and for certain verification methods for device based service policy implementation or higher device based services as discussed below. In some embodiments, a traffic monitoring function is provided in the base station 125 in which the traffic for each device is at least counted for total traffic usage and recorded. In some embodiments, traffic inspection beyond simply counting total traffic usage is provided. For example, the base station traffic monitor can record and report IP addresses or include a DNS lookup function to report IP addresses or IP addresses and associated Uniform Resource Locators (URLs). Another example allows the base station 125 to attach location data to the IPDR to provide device location data in the records. In some embodiments, traffic inspection includes recording deeper levels of traffic or service monitoring.

In some embodiments, device traffic associated with service verification conditions indicating service usage is out of policy or profile limits or allowances is routed to a quarantine network rather than or as an initial alternative to a suspending service. For example, the advantages for this approach and a more detailed description of the quarantine network are discussed below. In some embodiments, the quarantine network capability is provided for in which rather than simply suspending device traffic completely from the network as described above, the base station 125 includes a firewall function (e.g., firewall 124) that is capable of passing device access traffic with the quarantine network destinations and blocking device access to all other destinations. In some embodiments, when it is discovered that service verification conditions indicate that service usage is out of policy or profile limits or allowances, then one or more of the following actions are taken: the user is notified of the overage condition, the user is required to acknowledge the overage condition, the user account is billed for the overage condition, and the device is flagged for further analysis by a network device analysis function or a network manager.

In some embodiments, network complexity is reduced using the device without moving completely to a flat base station network as described above. Device participation in the core network services implementation provides for numerous measures for simplifying or improving network architecture, functionality or performance. For example, two approaches are discussed below ranging from a simple overlay of the service processor 115 onto devices and the service controller 122 in a conventional hierarchical access network as illustrated in FIGS. 4 through 7, to a completely flat network as illustrated in FIGS. 1 through 3 and 8. Those of ordinary skill in the art will appreciate that the disclosed embodiments provided herein can be combined with the above embodiments and other embodiments involving flat network base stations to provide several advantages including, for example, richer service capability, less access network complexity, lower access network expenses, more flexible base station deployments, or less complex or less expensive base station back haul provisioning and service costs.

Figure 16:
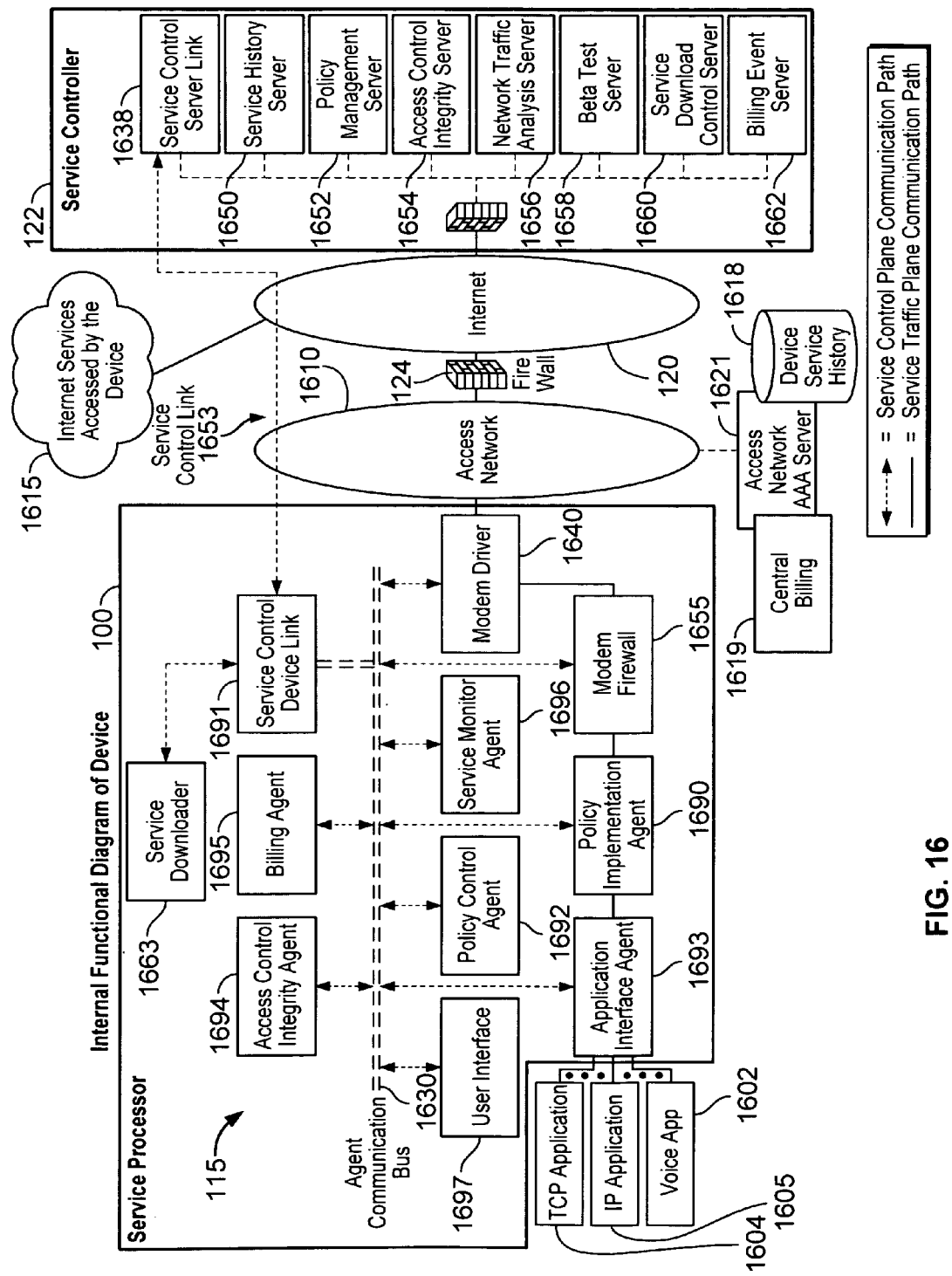
FIG. 16 is a functional diagram illustrating a device based service processor and a service controller in accordance with some embodiments.

In most of the discussion that follows, the network based service history records and the network based suspend-resume functionality used in certain embodiments involving service implementation verification are assumed to be derived from the device service history 1618 (as shown in FIG. 16) central provider network element and the AAA server 121 central provider network element, and in some embodiments, working in conjunction with other central provider network elements. It is understood that these functions provided by the network can be rearranged to be provided by other networking equipment, including the base station as discussed above. It is also understood that the network based device traffic monitoring, recording and reporting to the device service history 1618 element can be accomplished at the base stations. Furthermore, it is understood that while the AAA server 121 is assumed to provide the suspend/resume functionality, quarantine network routing or limited network access called for in some embodiments, the AAA server 121 can be a management device in which the actual implementation of the traffic suspend/resume, firewall, routing, re-direction forwarding or traffic limiting mechanisms discussed in certain embodiments can be implemented in the base stations as discussed above or in another network element.

In some embodiments, an activation server 160 (or other activation sequencing apparatus) provides for provisioning, as described below, of the devices 100 and/or network elements in the central provider network so that, for example, the device credentials can be recognized for activation and/or service by the network. In some embodiments, the activation server 160 provides activation functions, as described below, so that, for example, the devices can be recognized by the network, gain access to the network, be provided with a service profile, be associated with a service account and/or be associated with a service plan. As shown in FIG. 1, the activation server 160 is connected to the central provider core network 110. In this configuration, the activation server 160 acts as, an over the network or over the air, activation function. In some embodiments, the activation server 160, or variations of the activation server 160 as described below, is connected to apparatus in the manufacturing or distribution channel, or over the Internet 120, or as part of the service controller 122 to service provisioning or activation functions. In some embodiments, the activation server 160 is connected to the central provider core network 110. In some embodiments, the activation server 160 is connected to other network extensions such as an MVNO network or the Internet 120 if, for example, the routers in the service gateways or base stations have the capability to direct traffic from devices that are not fully activated or provisioned to an Internet destination, or if the service processor 115 is used for such direction. In some embodiments, the activation server 160 is included in the service controller 122.

Figure 2:
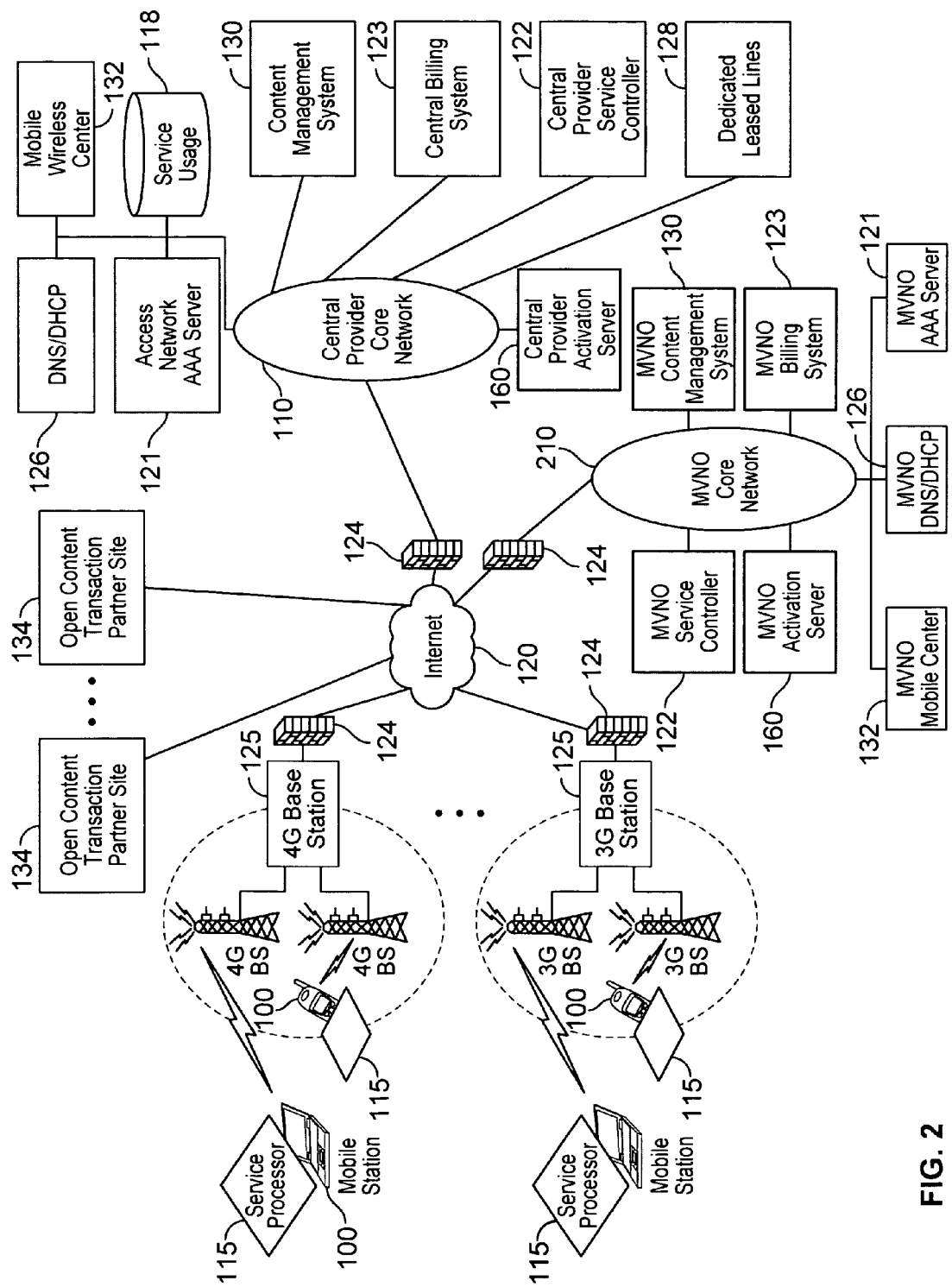
FIG. 2 illustrates another simplified (e.g., "flattened") network architecture including an MVNO (Mobile Virtual Network Operator) relationship in accordance with some embodiments.

FIG. 2 illustrates another simplified (e.g., "flattened") network architecture including an MVNO (Mobile Virtual Network Operator) relationship in accordance with some embodiments. As shown, an open MVNO configuration is provided in a simplified network as similarly described above with respect to FIG. 1. In some embodiments, the service provider (e.g., service owner) is defined by the entity that maintains and/or manages the service controller 122 associated with and controlling the service processors 115 that are inside the devices 100 using the service. In some embodiments, the service controller 122 requires only a non-real time relatively low data rate secure control plane communication link to the service processors 115. Accordingly, in some embodiments, the service controller 122 servers can reside in any network that can connect to (e.g., be in network communication with) the Internet 120. For example, this approach provides for a more efficient provisioning of the equipment used to set up an MVNO partnership between the central provider and the service provider, and as shown in FIG. 2, an MVNO network 210 is in network communication with the Internet 120 just as with the central provider network 110 is in network communication with the Internet 120. As shown, the following are connected to (e.g., in network communication with) the MVNO core network 210: MVNO billing system 123, MVNO service controller 122, MVNO content management system 130, MVNO DNS/DHCP server 126, MVNO AAA server 121, and MVNO mobile wireless center 132.

By showing two service controllers 122, one connected to (e.g., in network communication with) the MVNO network 210 and one connected to the central provider network 110, FIG. 2 also illustrates that some embodiments allow two entities on the same access network to each use the service controller 122 and service processor 115 to control different devices and offer different or similar services. As described below, the unique secure communication link pairing that exists between the two ends of the service control link, 1691 and 1638 (as shown in FIG. 16), ensure that the two service controllers 122 can only control the devices associated with the correct service provider service profiles.

Figure 3:
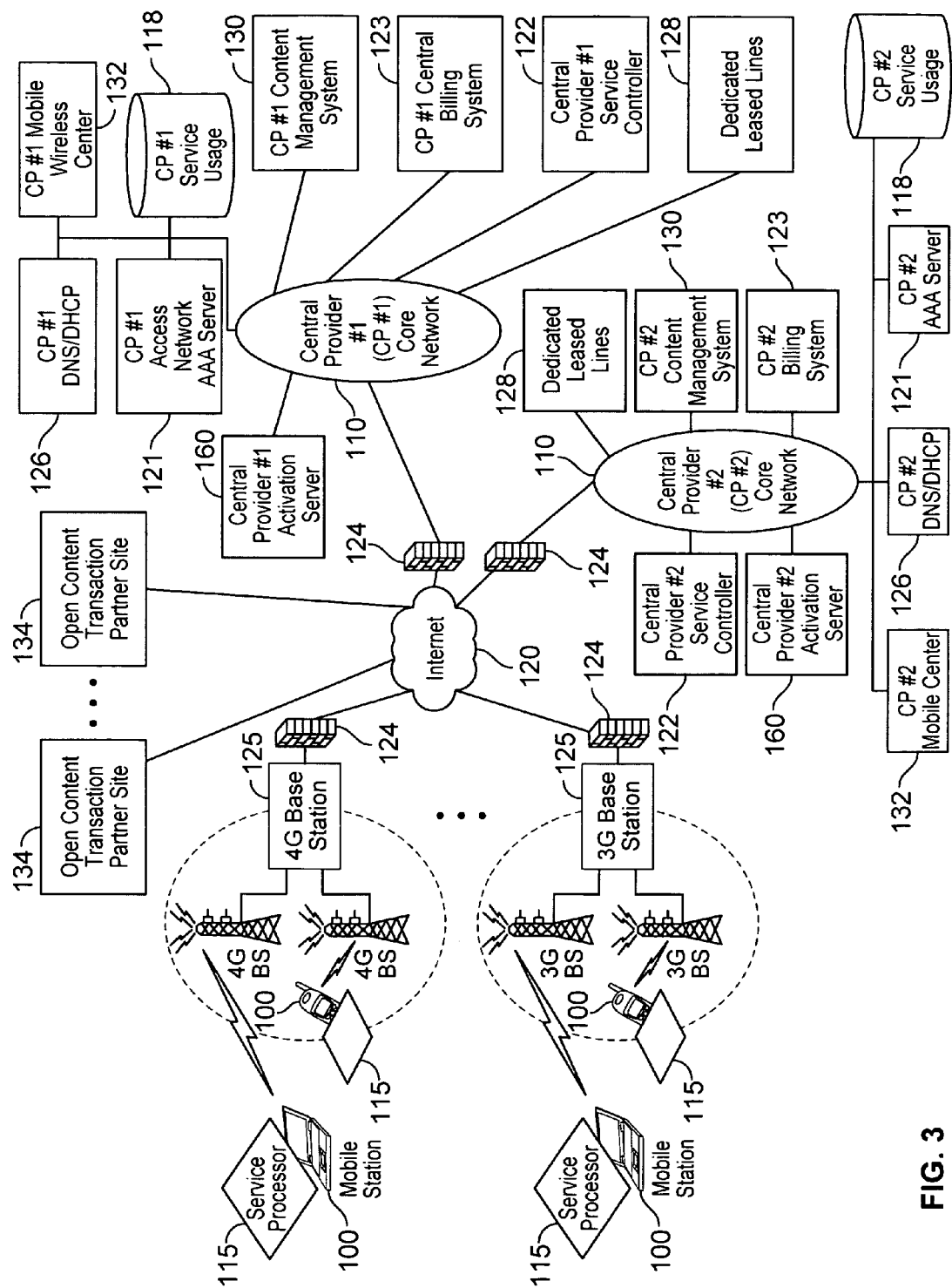
FIG. 3 illustrates another simplified (e.g., "flattened") network architecture including two central providers in accordance with some embodiments.

FIG. 3 illustrates another simplified (e.g., "flattened") network architecture including two central providers in accordance with some embodiments. For example, this provides for roaming agreements while maintaining rich services across different networks with completely different access layers. As shown, the mobile devices 100 are assumed to have a dual mode wireless modem that will operate on both a 4G network, for example LTE or WiMax, and a 3G network, for example HSPA or EVDO. One example roaming condition would be both Central Provider #1 and Central Provider #2 providing 3G and 4G network resources. In this example, the mobile devices 100 can connect to both 3G and 4G base stations 125 owned and operated by the central provider with whom they have signed up for service, or when neither is available from the central provider the user signed up with the device can roam onto the other central provider access network and still potentially offer the same rich service set using the same service profiles provided, for example, the roaming service costs are reasonable. In some embodiments, if roaming service costs are significantly more expensive than home network service costs, then the service processor 115 is configured with a roaming service profile that reduces or tailors service usage or service activity through a combination of one or more of user notification, user preference feedback regarding traffic shaping or service policy management preference collected and acted on by service processor 115, adaptive policy control in service processor 115 that tracks increasing roaming service costs and scales back service, or recognition of the change in network that causes the service controller 122 to configure service processor 115 of device 100 with a roaming service profile. In some embodiments, in roaming situations, network selection can be based on an automatic network selection with network selection being determined, for example, by a combination of user service profile preferences, service provider roaming deals and/or available roaming network capabilities and cost, as discussed further below.

In some embodiments, the devices 100 are again assumed to be multimode 3G and 4G devices (e.g., the mobile devices 100 are assumed to have a dual mode wireless modem that will operate on both a 4G network, for example LTE, and a 3G network, for example HSPA or EVDO), with the devices 100 being billed for service by Central Provider #1 being, for example, EVDO and LTE capable, and the devices 100 being billed for service by Central Provider #2 being, for example, HSPA and LTE capable. For example, the devices 100 can roam using the 4G LTE network of the roaming central provider when neither the 3G nor 4G networks are available with the home central provider. As similarly discussed above with respect to the above described roaming embodiments, the service processors 115 and service controllers 122 are capable of providing similar services on the 4G roaming network and the 3G home network as on the 4G home network, however, the varying costs and available network capacity and speed differences of 3G home, 4G roaming and 4G home may also encourage the use of different, such as three different, service profiles to allow for the most effective and efficient selection and control of services based on the current network.

Figure 4:
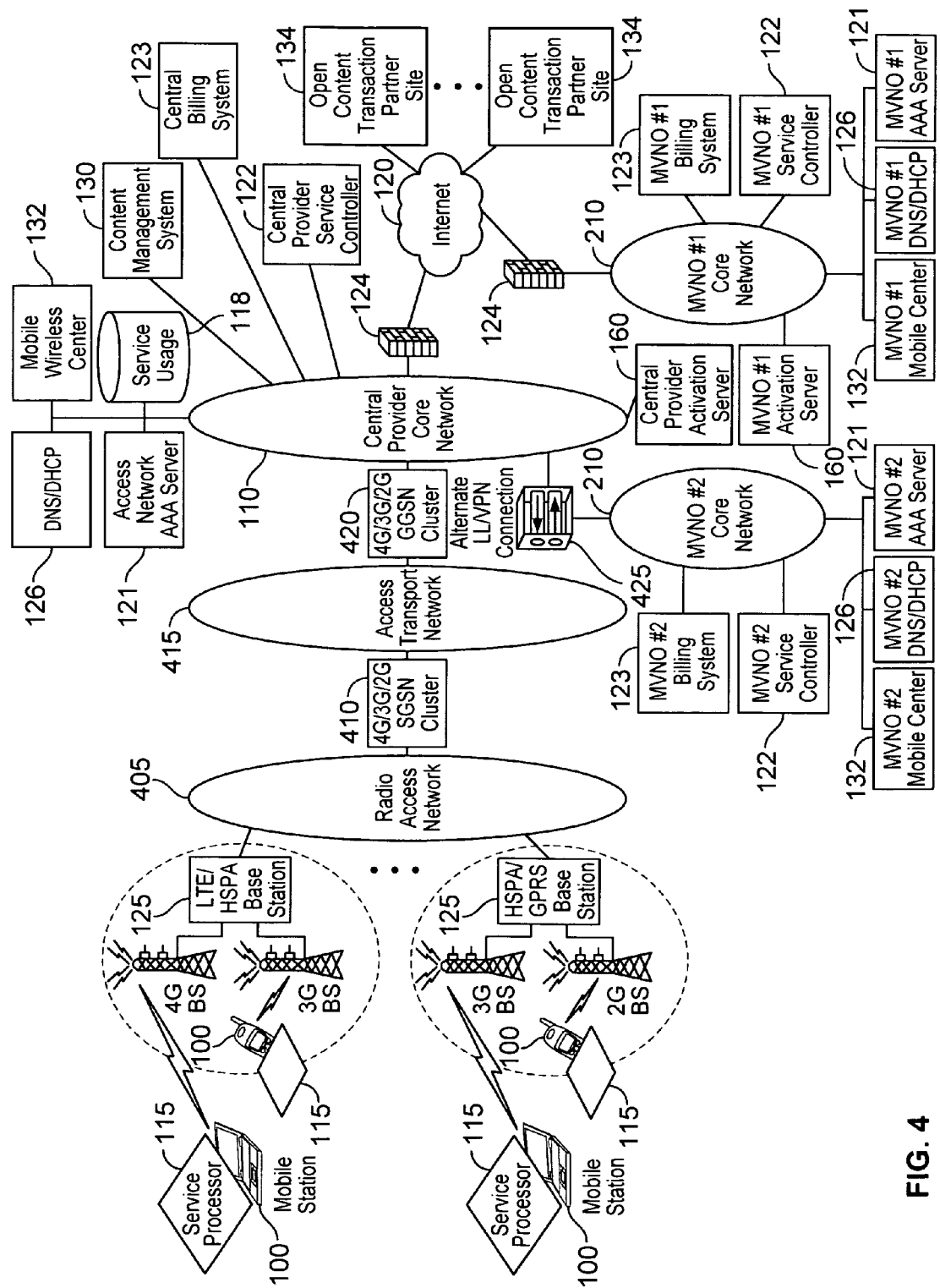
FIG. 4 illustrates a network architecture including a Universal Mobile Telecommunications System (UMTS) overlay configuration in accordance with some embodiments.

FIG. 4 illustrates a network architecture including a Universal Mobile Telecommunications System (UMTS) overlay configuration in accordance with some embodiments. As shown, FIG. 4 includes a 4G/3G/2G HSPA/Transport access network operated by a central provider and two MVNO networks 210 operated by two MVNO partners. In some embodiments, the central provider can offer improved service capabilities using a conventional UMTS network. As shown, the base stations 125 do not connect directly to the Internet 120, and instead the base stations 125 connect to the conventional UMTS network. However, as in various previous embodiments, the service processor 115 still connects through the secure control plane link to service controller 122. In some embodiments, the data plane traffic is backhauled across the various UMTS network routers and gateways as is the control plane traffic, and the IPDRs are obtained from the access network AAA server 121. Referring now to the 4G/3G/2G HSPA/Transport access network as shown in FIG. 4, the LTE/HSPA and HSPA/GPRS base stations/nodes 125 are in communication with 4G/3G/2G Service/Serving GPRS Support Nodes (SGSNs) cluster 410 via a radio access network 405, which are in communication with 4G/3G/2G Gateway GPRS Support Nodes (GGSNs) cluster 420 via an access transport network 415 (e.g., a GPRS-IP network), which are then in communication with central provider core network 110.

As shown in FIG. 4, as discussed elsewhere, service usage data store 118 is a functional descriptor for a network level service usage information collection and reporting function located in one or more of the networking equipment boxes attached to one or more of the sub-networks in the Figure (e.g., RAN, transport and/or core networks). As shown in FIG. 4, service usage 118 is shown as an isolated function connected to the central provider core network 110 and the intention of this depiction is to facilitate all the possible embodiments for locating the service usage 118 function. In some UMTS network embodiments, the service usage 118 function is located or partially located in the GGSN gateway (or gateway cluster) 420. In some embodiments, service usage 118 functionality is located or partially located in the SGSN gateway (or gateway cluster) 410. In some embodiments, service usage 118 functionality is located or partially located in the equipment cluster that includes the AAA 121 and/or the mobile wireless center 132. In some embodiments, service usage 118 functionality is located or partially located in the base station, base station controller and/or base station aggregator, collectively referred to as base station 125 in FIG. 4 and many other figures described herein. In some embodiments, service usage 118 functionality is located or partially located in a networking component in the transport network 415, a networking component in the core network 110, the billing system 123 and/or in another network component or function. This discussion on the possible locations for the network based service usage history logging and reporting function can be easily generalized to all the other figures described herein by one of ordinary skill in the art (e.g., RAN Gateway 410 and/or Transport Gateway 420), and this background will be assumed even if not directly stated in all discussion above and below.

In some embodiments, a central provider provides open development services to MVNO, Master Value Added Reseller (MVAR) and/or Original Equipment Manufacturer (OEM) partners. In some embodiments, all three service providers, central provider service provider, MVNO #1 service provider and MVNO #2 service provider have service control and billing control of their own respective devices 100 through the unique pairing of the service processors 115 and service controllers 122. For example, MVNO #1 and MVNO #2 can each have open development billing agreements with the central provider and each can own their respective billing systems 123. As shown in FIG. 4, MVNO #1 core network 210 is in communication with the central provider core network 110 via the Internet 120, and MVNO #2 core network 210 is in communication with the central provider core network 110 via an alternate landline(LL)/VPN connection 425. In some embodiments, the two MVNOs each offer completely different devices and/or services, and the devices and/or services also differ significantly from those offered by the central provider, and the service profiles are adapted as required to service the different devices and respective service offerings. In addition, the central billing system 123 allows all three service provider user populations to access ecommerce experiences from transaction provider partners operating transaction servers 134, to choose central provider billing options that combine their third party transaction bills on their service provider bill, and each subscriber population can experience a service provider specified look and feel that is unique to the respective service provider even though the different user populations are interfacing to the same transaction servers and the transaction partners do not need to require significant custom development to provide the unique central billing and unique consistent user experience look and feel.

In some embodiments, a central provider offers open network device and service developer services using one service controller server 122 (e.g., a service controller server farm) and allows the open development partners to lease server time and server tools to build their own service profiles. The central provider also provides service billing on behalf of services to the open development partners. For example, this reduces costs associated with setting up an MVNO network for the open development partners and does not require the partners to give up significant control or flexibility in device and/or service control.

Figure 5:
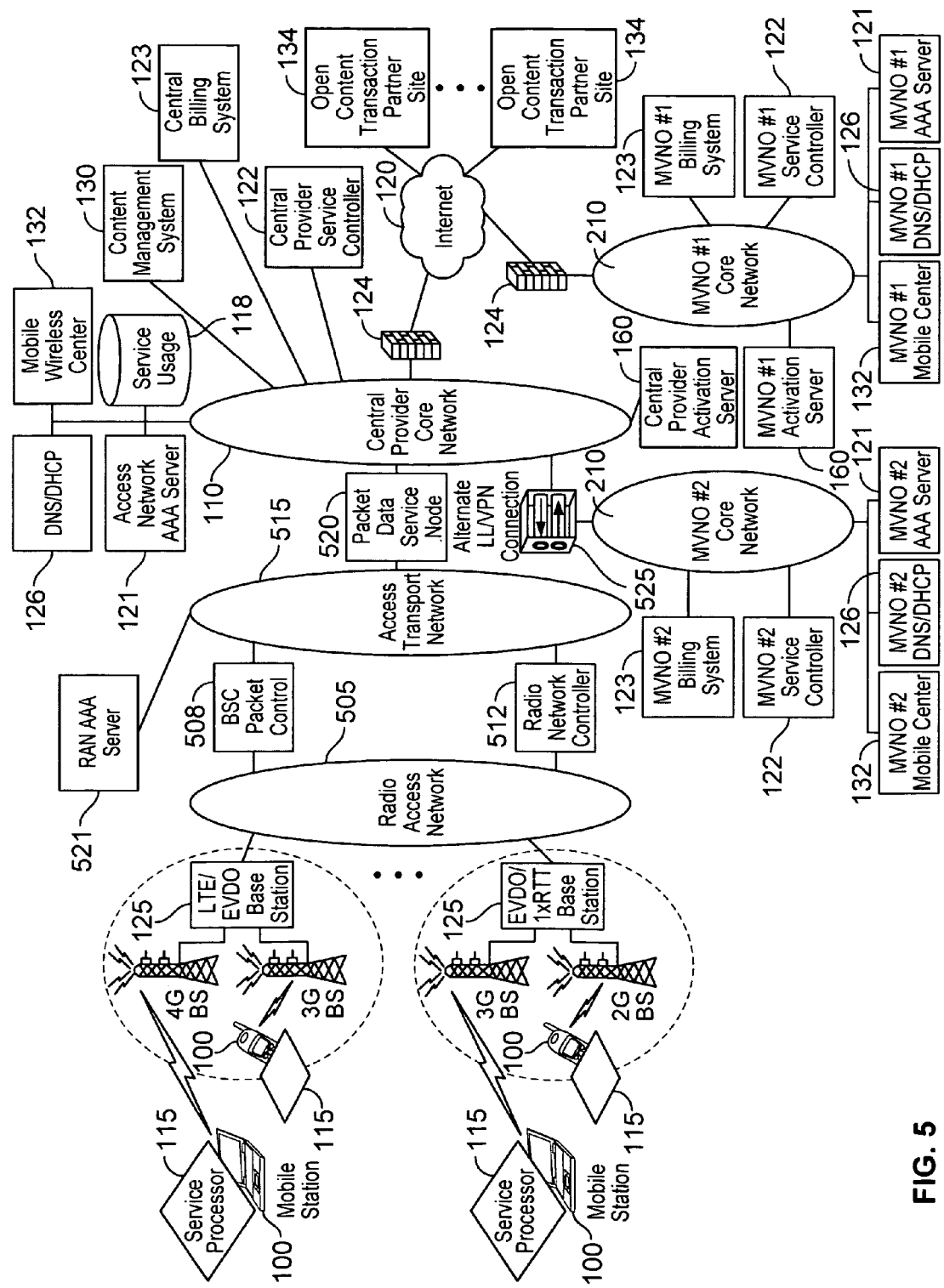
FIG. 5 illustrates a network architecture including an Evolution Data Optimized (EVDO) overlay configuration in accordance with some embodiments.

FIG. 5 illustrates a network architecture including an Evolution Data Optimized (EVDO) overlay configuration in accordance with some embodiments. This figure is similar to FIG. 4 except for the various particular variations of the EVDO network architecture as compared to the HSPA/GPRS wireless access network architecture as will be apparent to one of ordinary skill in the art. As shown, FIG. 5 includes an EVDO access network operated by a central provider and two MVNO networks 210 operated by two MVNO partners. The EVDO access network includes LTE/EVDO and EVDO/1× RTT base stations 125 in communication with Base Station Controller (BSC) packet control 508 and radio network controller 512 via a radio access network (RAN) 505, which are in communication with packet data service node 520 via an access transport network 515, which is in communication with central provider core network 110. As shown, a RAN AAA server 521 is also in communication with the access transport network 515.

In some embodiments, the central provider can offer improved service capabilities using a wireless access network. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 6:
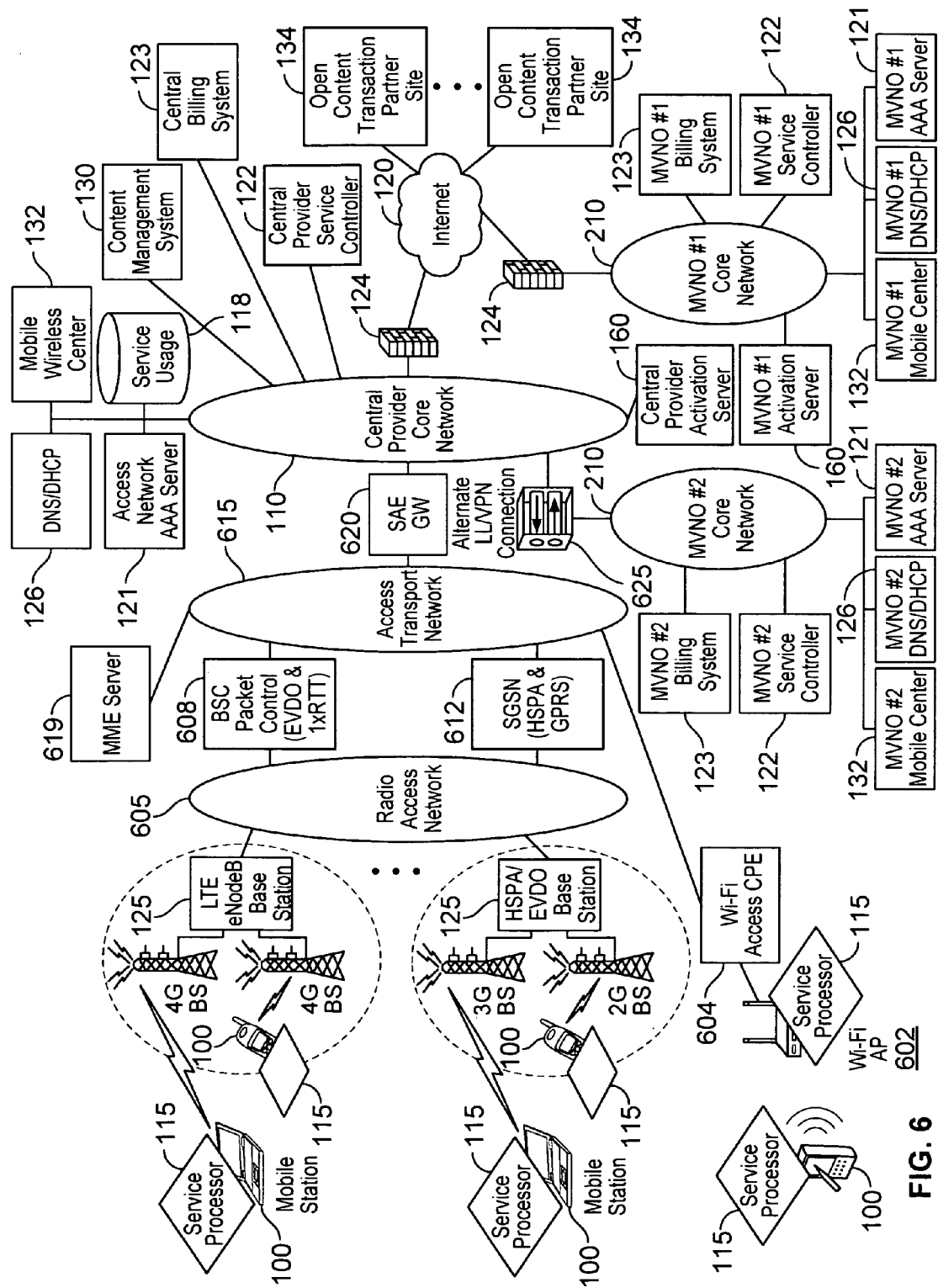
FIG. 6 illustrates a network architecture including a 4G LTE and Wi-Fi overlay configuration in accordance with some embodiments.

FIG. 6 illustrates a network architecture including a 4G LTE and Wi-Fi overlay configuration in accordance with some embodiments. This figure is also similar to FIG. 4 except for the various particular variations of the 4G LTE/Wi-Fi network architecture as compared to the HSPA/GPRS wireless access network architecture as will be apparent to one of ordinary skill. As shown, FIG. 6 includes a 4G LTE and Wi-Fi access network operated by a central provider and two MVNO networks 210 operated by two MVNO partners. The 4G LTE/Wi-Fi access network as shown includes LTE eNodeB and HSPA/EVDO base stations 125 in communication with Base Station Controller (BSC) packet control (EVDO & 1×RTT) 608 and SGSN (HSPA & GPRS) 612 via a radio access network (RAN) 605, which are in communication with System Architecture Evolution (SAE) Gateway (GW) 620 via an access transport network 615, which is then in communication with central provider (core) network 110. As shown, a Mobile Management Entity (MME) server 619 is also in communication with the access transport network 615. Also as shown, a Wi-Fi Access Point (AP) 602 is also in communication with the access transport network 615 via Wi-Fi Access Customer Premises Equipment (CPE) 604. As will be apparent to those of ordinary skill in the art, the embodiments of network architectures shown, for example, in FIGS. 1-8 are exemplary network architecture embodiments in which one or more of the shown network elements may not be required or included, alternative network elements included, and/or additional network elements included based on network design choices, network standards and/or other functional/design considerations and choices.

In some embodiments, the central provider can offer improved service capabilities using the wireless access network as depicted in FIG. 6. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121. Accordingly, as shown in FIGS. 4 through 6, various embodiments can be implemented independent of the wireless access network technology, and for example, can be implemented in 3G, 4G and any other wireless access network technology.

Figure 7:
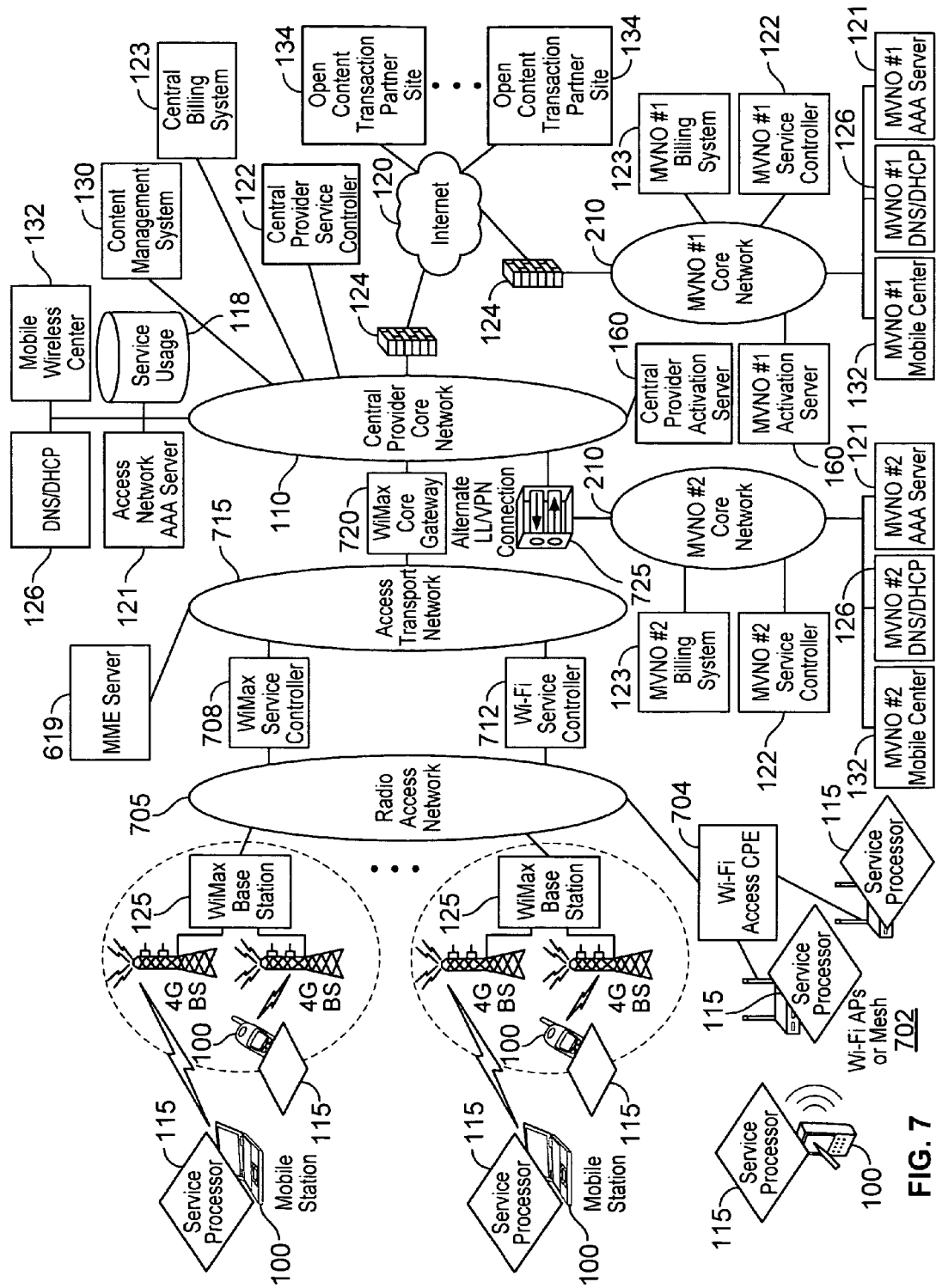
FIG. 7 illustrates a network architecture including a WiMax and Wi-Fi overlay configuration in accordance with some embodiments.

FIG. 7 illustrates a network architecture including a WiMax and Wi-Fi overlay configuration in accordance with some embodiments. This figure is also similar to FIG. 4 except for the various particular variations of a combined WiMax/Wi-Fi network as compared to the HSPA/GPRS wireless access network architecture as will be apparent to one of ordinary skill in the art. As shown, FIG. 7 includes both a WiMax and Wi-Fi network (e.g., a combined WiMax/Wi-Fi network) operated by a central provider and two MVNO networks 210 operated by two MVNO partners. Although the Wi-Fi and WiMax access technologies are different wireless access networking technologies, with WiMax providing a wide area networking technology and Wi-Fi providing a local area networking technology, which efficiently operates using the two wireless access networking capabilities. As similarly discussed above with respect to the switching between 3G and 4G networks, some embodiments employ the automatic network selection capability as described above to choose the best available network service profile, and, for example, the user can force the decision or the service controller can make the decision. For example, if free Wi-Fi services have adequate coverage, in most cases, the decision criteria programmed into the automatic network selection algorithm will select Wi-Fi as long as the Wi-Fi access points are associated with a known and trusted provider. In some embodiments, transaction billing from central provider billing system 123 or MVNO #1 or MVNO #2 billing systems 123 will work with the transaction servers when connected over Wi-Fi just as when connected over any other access technology (including wire line based connections). The WiMax/Wi-Fi access network as shown includes WiMax base stations 125, Wi-Fi access points/hotspots 702 and/or Wi-Fi mesh access networks 702 (in some embodiments, femto cells can be used in addition to and/or as an alternative to Wi-Fi), and Wi-Fi access customer-premises equipment (CPE) 704 in communication with WiMax service controller 708 and Wi-Fi service controller 712 via a radio access network 705, which are in communication with WiMax core gateway 720 via an access transport network 715, which is then in communication with central provider (core) network 110.

In some embodiments, the central provider can offer improved service capabilities using the wireless access network as depicted in FIG. 7. As shown, the base stations 125 do not connect directly to the Internet 120, and instead the base stations 125 connect to the wireless access network. However, as in various previous embodiments, the service processor 115 still connects through the secure control plane link to service controller 122. In some embodiments, the data plane traffic is backhauled as shown across the various network routers and gateways as is the control plane traffic, and the IPDRs are obtained from the access network AAA server 121.

Figure 15A:
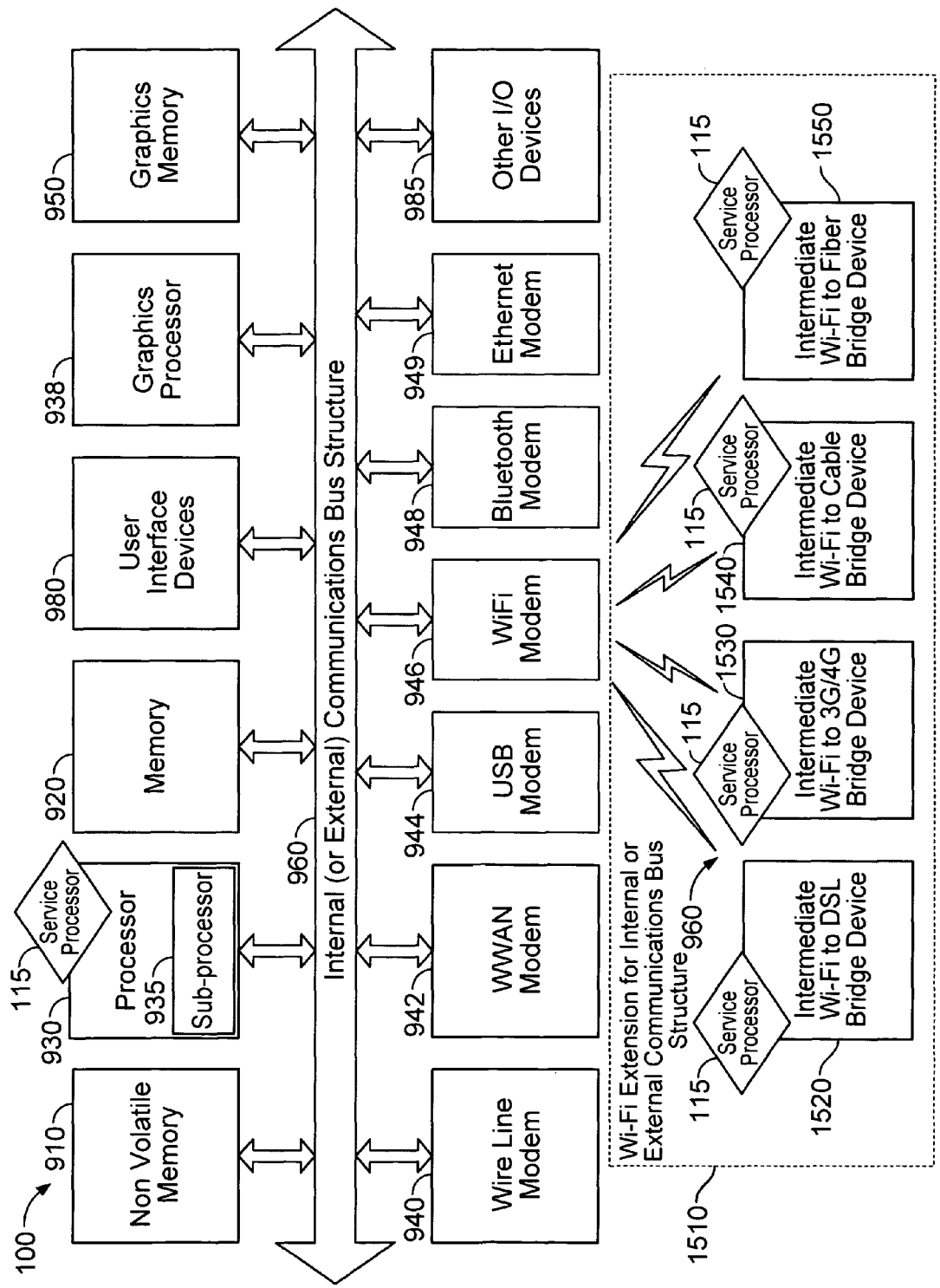
FIGS. 15A through 15C illustrate hardware diagrams of a device that include a service processor and a bus structure extension using intermediate modem or networking device combinations in accordance with various embodiments.
Figures 1, 2, 15B:
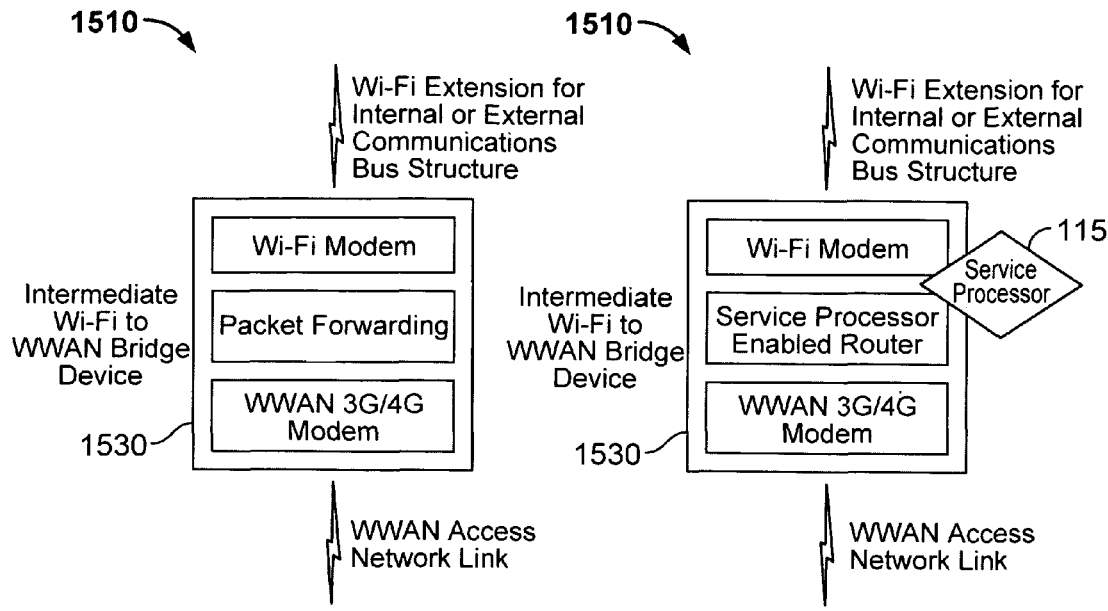
Figures 3, 4, 15B:
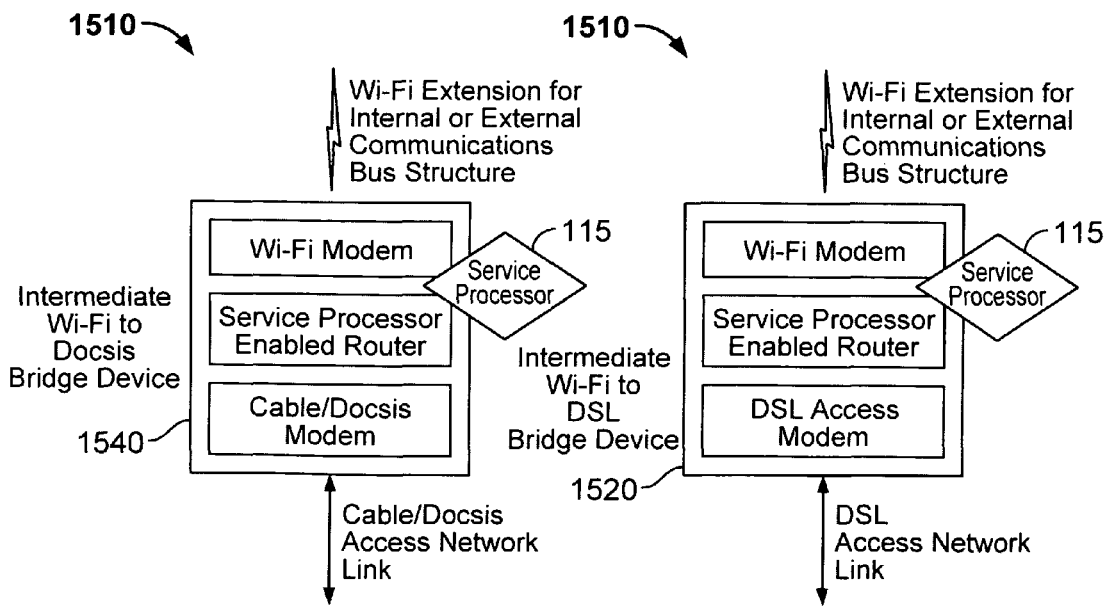

Referring to FIG. 7, the Wi-Fi connection can be replaced with a femto cell (and the Wi-Fi modem shown in FIGS. 15B(3) and 15B(4) can be replaced with a femto cell modem (base station side functionality)). In some embodiments, the service processor 115 is provided on the femto cell to control subscriber access in a verifiable manner as similarly described herein with respect to various embodiments (e.g., the Wi-Fi related embodiments). For example, the femto cell service provider (e.g., the entity that owns the spectrum the femto cell is using) can operate the femto cell as a local access mechanism for the home subscriber (or other who purchased or installed the femto cell), and then also use it to provide pay-for-service or additional free services, with controlled access and/or traffic control and/or service control and/or billing control performed locally or in combination with network equipment as described herein. In some embodiments, the WWAN devices being used at home or work with the femto cell include a portion of the service processor functionality. For example, this allows the service provider for femto cells to provide service and monetize service in a controlled way even though the femto cell is not connected to the service provider network the way conventional base stations are connected to the service provider network, but is connected through the Internet 120. For example, the secure heartbeat function can be extended to include data traffic so that it is encrypted and secured along with the control plane traffic. The decision of whether or not to admit a device onto the femto cell can be made through the service processor 115 connection to the service controller 122 and subsequent look up of the credentials for the device and the associated service plan and service profile that is then programmed into the service processor on the femto cell and/or the device itself. The femto cell can also offer a landing page to devices through the service processor so that devices that do not belong to the network can gain access to the network by signing up over the femto cell. For example, the intermediate device embodiments for Wi-Fi on one end and WWAN on the other can be accomplished by using the Wi-Fi connection in the cell phone in AP mode so that it becomes the intermediate device. The service processor 115 on the cell phone can then act in the same manner as described for the intermediate device as described herein.

Figure 8:
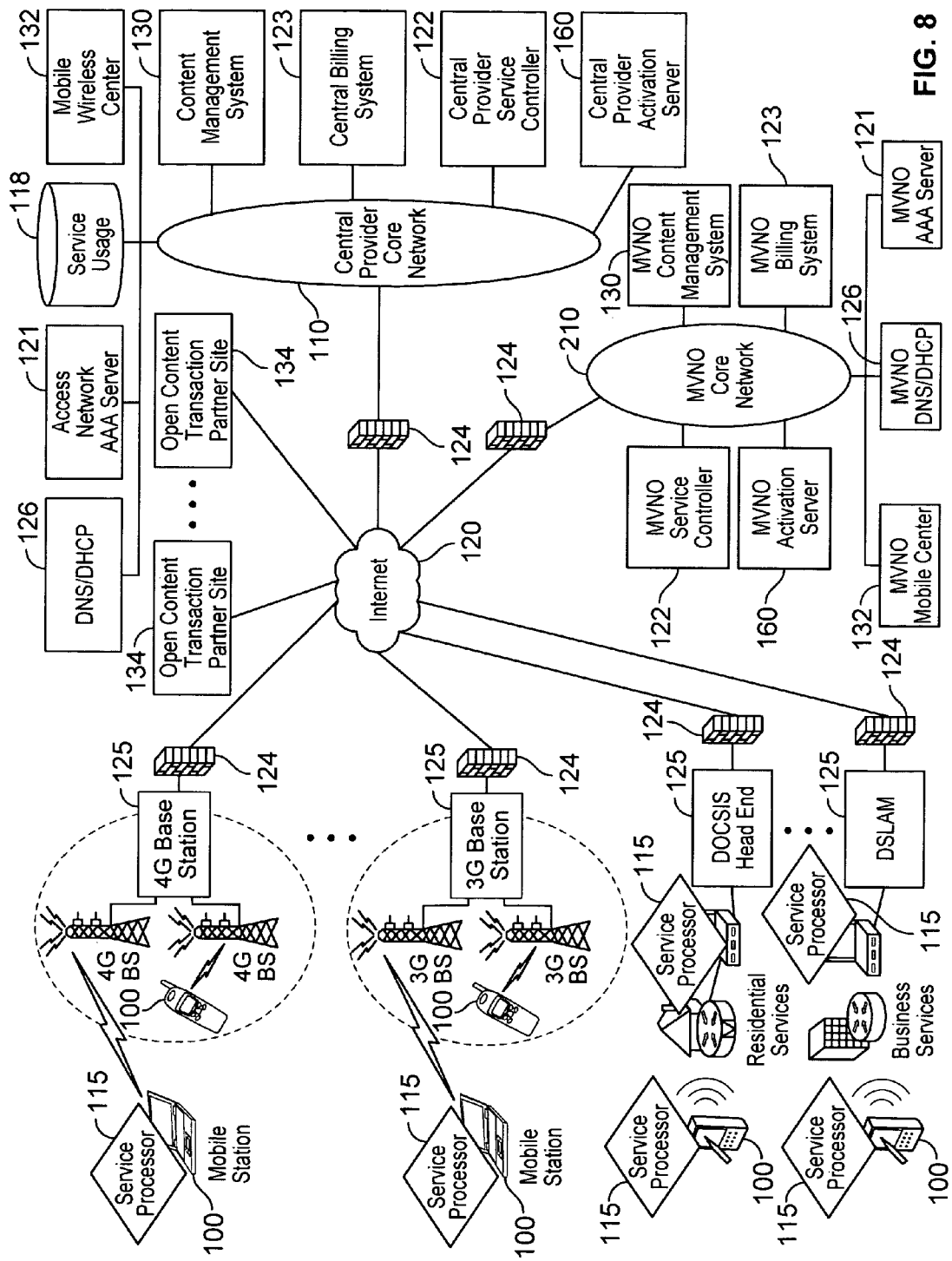
FIG. 8 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments.

FIG. 8 illustrates another simplified (e.g., "flattened") network architecture including multiple wireless access networks (e.g., 3G and 4G Wireless Wide Area Networks (WWANs)) and multiple wire line networks (e.g., Data Over Cable Service Interface Specification (DOCSIS) and Digital Subscriber Line Access Multiplexer (DSLAM) wire line networks) in accordance with some embodiments. It is a common network architecture for multi-access central providers to have one or more wired access networks and one or more wireless access networks. As shown, FIG. 8 includes both 3G and 4G wireless access networks, including a 4G base station 125 and a 3G base station 125, and both DOCSIS and DSLAM wire line networks (e.g., a combined WWAN/wire line network), including DOCSIS Head End 125 and DSLAM 125, operated by a central provider via central provider (core) network 110 and an MVNO partner via MVNO network 210 via the Internet 120.

As shown, the service processor 115 can reside on a number of different types of devices 100 that work on 3G or 4G wireless, DSL or DOCSIS, and the service controller 122 is capable of controlling each of these types of devices with a consistent service experience, for example, using different service profiles, service capabilities and service profile cost options depending on which network the device is connected to and/or other criteria. For example, a download of a High Definition (HD) movie can be allowed when the service controller 122 is managing service profile policies for a service processor 115 residing on a DOCSIS device 100 (e.g., a computer or laptop connected to a cable modem), but not when the same service controller 122 is managing service profile policies for a service processor 115 residing on a 3G device 100 (e.g., a smart phone connected to a mobile 3G network).

As will now be apparent to one of ordinary skill in the art in view of the above description of FIGS. 1 through 8, the present invention can be provided across any access network and a set of service profiles can be defined in a variety of ways including, for example, to user preference feedback, access network performance, access network cost, access network central provider partnership status with the service provider central provider and roaming deals and costs. For example, as discussed below, various embodiments allow for users to have superior service experiences based on the ability to control certain of their service settings, and service providers can also more efficiently deploy a greater variety of services/service plans to users.

Figure 54:
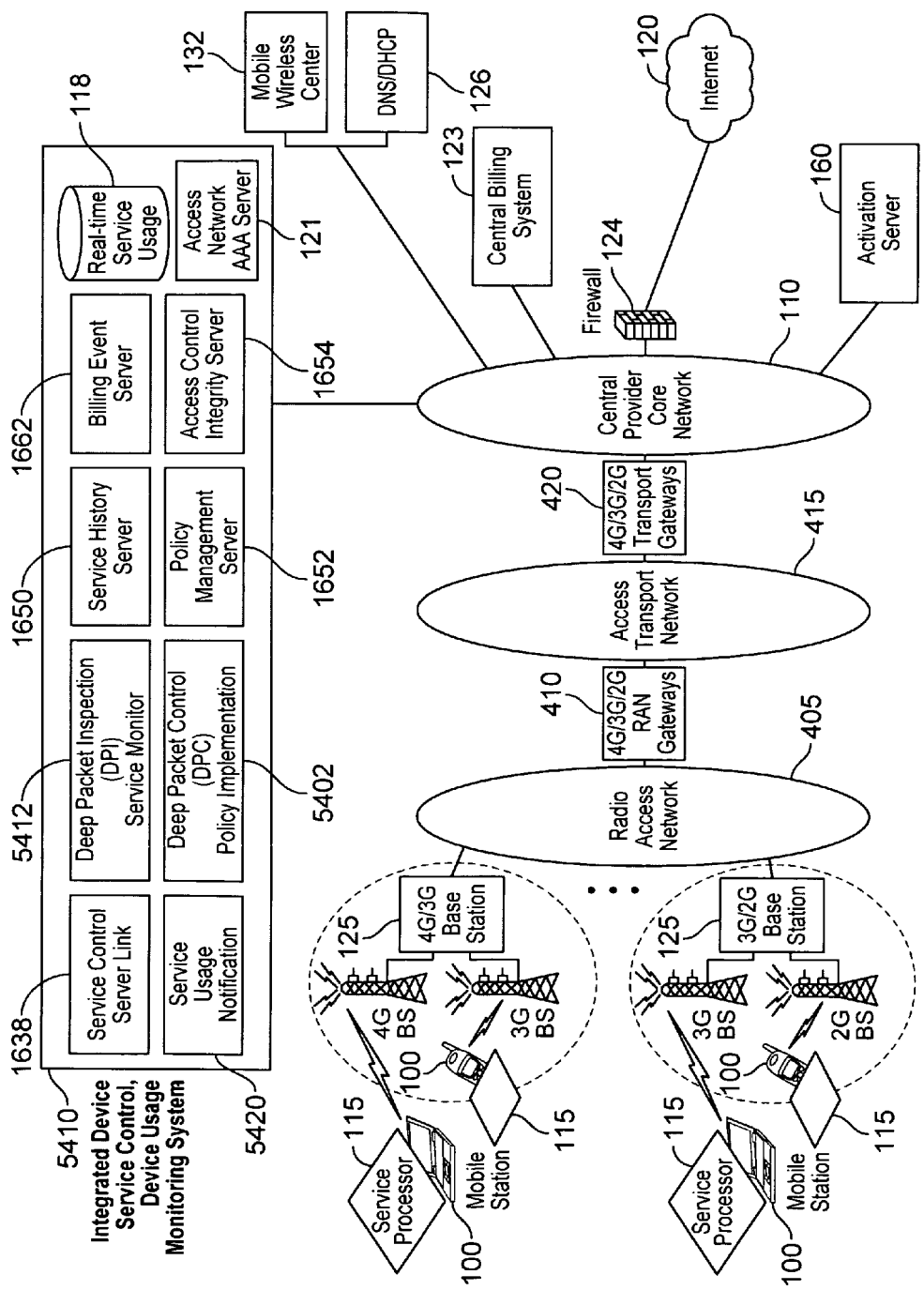
FIG. 54 illustrates a network architecture for locating service controller device control functions with AAA and network service usage including deep packet inspection functions in accordance with some embodiments.

In some embodiments, the service processor 115 and the service controller 122 provide an overlay for existing networks without significantly changing the billing system 123, gateways/routers or other network components/elements, and also provide verifiable service monitoring to control services and/or service usage/costs without involving, for example, a service provider or MVNO (e.g., for smart phone devices and/or laptops or netbooks (or any other network accessible device) with an unlimited data plan or any other service plan). For example, applications that are deployed by device owners or service subscribers (e.g., an IT manager) and do not involve a service provider include roaming services provided as an after-market product without carrier/service provider involvement. In this example, device activity is recorded by the service processor 115 and transmitted to the service controller 122 (e.g., the IT manager controls the service controller 122). In another example, a third party after-market product is provided in which the service controller 122 is hosted by the third party and the device management entity (e.g., the IT manager or parents of the device user for parental controls) uses a secure Virtual Service Provider (VSP) website to control the devices that belong to that management entity's device partition (e.g., VSP partitions and techniques are described below with respect to FIG. 49). The VSP secure website techniques described herein can also be applied to service provider owned servers with device partitions for the purpose of controlling, for example, Deep Packet Inspection (DPI) controllers (e.g., DPC policy implementation 5402 as shown in FIG. 54) to provide similar or substantially equivalent service usage/control capabilities using network based service control techniques, as similarly described in detail below with respect to FIGS. 49 and 54 (e.g., IT manager VSP control of a group partition and/or MVNO VSP control of a group partition).

Service Processor Configurations for Devices

Figure 9:
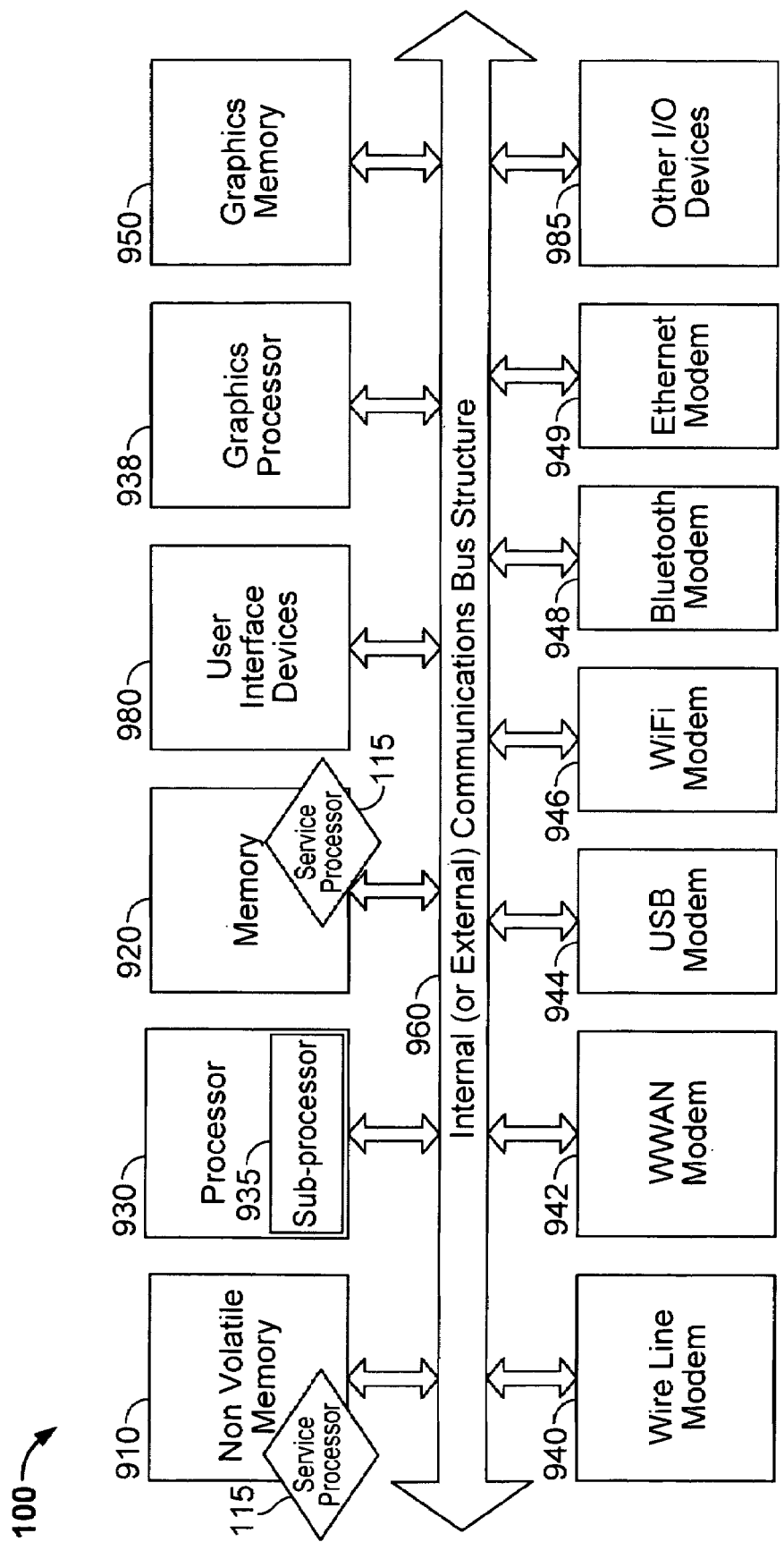
FIG. 9 illustrates a hardware diagram of a device that includes a service processor in accordance with some embodiments.

FIG. 9 illustrates a hardware diagram of a device 100 that includes a service processor 115 in accordance with some embodiments. As shown in FIG. 9, the service processor 115 is stored in a non volatile memory 910 and a memory 920 of the device 100. As will be appreciated by those of ordinary skill in the art, the present invention can operate with virtually any device architecture, and the device architectures discussed herein (e.g., with respect to FIGS. 9 through 15) are examples of various implementations on certain devices (e.g., of different representations of device 100).

As shown in FIG. 9, device 100 also includes a processor 930, sometimes referred to as a CPU or central processor unit, an APU or application processor unit, a core processor, a computing device, or many other well known terms. In some embodiments, device 100 includes one or more processors and/or a multicore processor. As shown, processor 930 includes a sub-processor 935. In some embodiments, processor 930 and/or sub-processor 935 are based on an architecture sometimes referred to as a complex instruction set computer or CISC, a reduced instruction set computer or RISC, a parallel processor, a combination of two or more architectures or any other processor architecture. In some embodiments, processor 930 has a design that is based on logic and circuitry from one or more standard design library or published architecture, or includes specialized logic and circuitry designed for a given device 100 or collection of such devices. In some embodiments, a device includes more than one processor and/or sub-processor, and in such a device, one processor and/or sub-processor can have one architecture while another may have a somewhat different or completely different architecture. In some embodiments, one or more of the processors and/or sub-processors can have a general purpose architecture or instruction set, can have an architecture or instruction set that is partially general or partially specialized, or can have an instruction set or architecture that is entirely specialized. In some embodiments, a device includes more than one processor and/or sub-processor, and in such a device, there can be a division of the functionality for one or more processors and/or sub-processors. For example, one or more processors and/or sub-processors can perform general operating system or application program execution functions, while one or more others can perform communication modem functions, input/output functions, user interface functions, graphics or multimedia functions, communication stack functions, security functions, memory management or direct memory access functions, computing functions, and/or can share in these or other specialized or partially specialized functions. In some embodiments, any processor 930 and/or any sub-processor 935 can run a low level operating system, a high level operating system, a combination of low level and high level operating systems, or can include logic implemented in hardware and/or software that does not depend on the divisions of functionality or hierarchy of processing functionality common to operating systems.

As shown in FIG. 9, device 100 also includes non-volatile memory 910, memory 920, graphics memory 950 and/or other memory used for general and/or specialized purposes. As shown, device 100 also includes a graphics processor 938 (e.g., for graphics processing functions). In some embodiments, graphics processing functions are performed by processor 930 and/or sub-processor 935, and a separate graphics process 938 is not included in device 100. As shown in FIG. 9, device 100 includes the following modems: wire line modem 940, WWAN modem 942, USB modem 944, Wi-Fi modem 946, Bluetooth modem 948, and Ethernet modem 949. In some embodiments, device 100 includes one or more of these modems and/or other modems (e.g., for other networking/access technologies). In some embodiments, some or all of the functions performed by one or more of these modems are performed by the processor 930 and/or sub processor 935. For example, processor 930 can implement some or all of certain WWAN functional aspects, such as the modem management, modem physical layer and/or MAC layer DSP, modem I/O, modem radio circuit interface, or other aspects of modem operation. In some embodiments, processor 930 as functionality discussed above is provided in a separate specialized processor as similarly shown with respect to the graphics and/or multimedia processor 938.

As also shown in FIG. 9, device 100 includes an internal (or external) communication bus structure 960. The internal communication bus structure 960 generally connects the components in the device 100 to one another (e.g., allows for intercommunication). In some embodiments, the internal communication bus structure 960 is based on one or more general purpose buses, such as AMBA, AHP, USB, PCIe, GPIO, UART, SPI, I$^2$C, Fire wire, DisplayPort, Ethernet, Wi-Fi, Bluetooth, Zigbee, IRDA, and/or any other bus and/or I/O standards (open or proprietary). In some embodiments, the bus structure is constructed with one or more custom serial or parallel interconnect logic or protocol schemes. As will be apparent to one of ordinary skill in the art, any of these or other bus schemes can be used in isolation and/or in combination for various interconnections between device 100 components.

In some embodiments, all or a portion of the service processor 115 functions disclosed herein are implemented in software. In some embodiments, all or a portion of the service processor 115 functions are implemented in hardware. In some embodiments, all or substantially all of the service processor 115 functionality (as discussed herein) is implemented and stored in software that can be performed on (e.g., executed by) various components in device 100. FIG. 9 illustrates an embodiment in which service processor 115 is stored in device memory, as shown, in memory 920 and/or non-volatile memory 910, or a combination of both. In some embodiments, it is advantageous to store or implement certain portions or all of service processor 115 in protected or secure memory so that other undesired programs (and/or unauthorized users) have difficulty accessing the functions or software in service processor 115. In some embodiments, service processor 115, at least in part, is implemented in and/or stored on secure non-volatile memory (e.g., non volatile memory 930 can be secure non-volatile memory) that is not accessible without pass keys and/or other security mechanisms. In some embodiments, the ability to load at least a portion of service processor 115 software into protected non-volatile memory also requires a secure key and/or signature and/or requires that the service processor 115 software components being loaded into non-volatile memory are also securely encrypted and appropriately signed by an authority that is trusted by a secure software downloader function, such as service downloader 1663 as discussed below (and as shown in FIG. 16). In some embodiments, a secure software download embodiment also uses a secure non-volatile memory. Those of ordinary skill in the art will also appreciate that all memory can be on-chip, off-chip, on-board and/or off-board. In some embodiments, the service processor 115 which as shown in FIG. 9 is stored or implemented in non volatile memory 910 and memory 920, can be implemented in part on other components in device 100.

As shown, device 100 also includes a user interfaces device component 980 for communicating with user interface devices (e.g., keyboards, displays and/or other interface devices) and other I/O devices component 985 for communicating with other I/O devices. User interface devices, such as keyboards, display screens, touch screens, specialized buttons or switches, speakers, and/or other user interface devices provide various interfaces for allowing one or more users to use the device 100.

Figure 10:
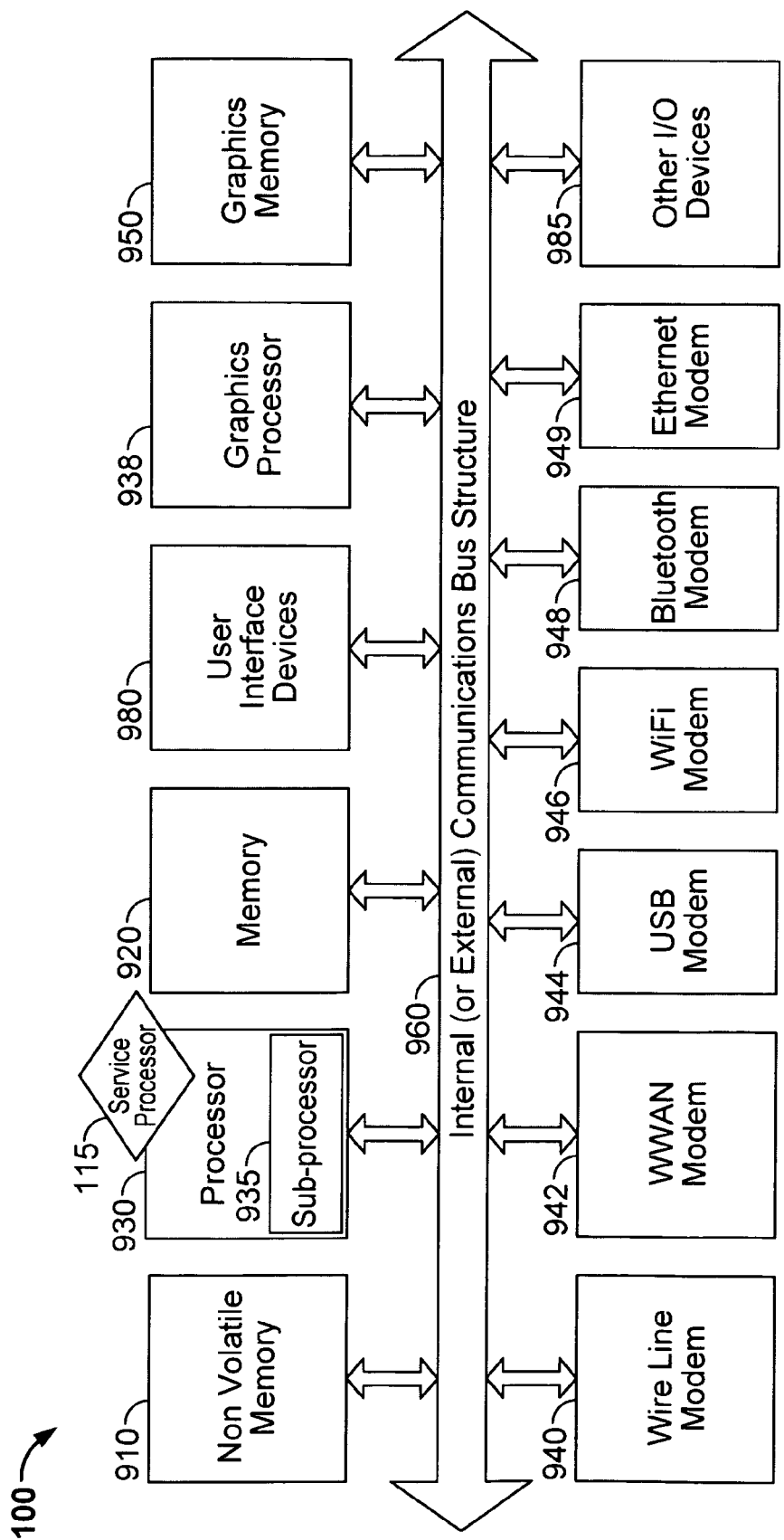
FIG. 10 illustrates another hardware diagram of a device that includes a service processor in accordance with some embodiments.

FIG. 10 illustrates another hardware diagram of a device 100 that includes a service processor 115 in accordance with some embodiments. As shown in FIG. 10, the service processor 115 is implemented on the processor 930 of the device 100. In some embodiments, this implementation can be in part or whole accomplished in software stored, implemented and/or executed on the processor 930. In some embodiments, the implementation and/or execution can be in part or whole accomplished in hardware that is on the processor 930. While the service processor 115 is shown in FIG. 10 as stored, implemented and/or executed on the processor 930, in other embodiments, the service processor 115 is implemented in part on other components in device 100, for example, as discussed below.

Service Processor Implemented on a Communications Modem

Figure 11:
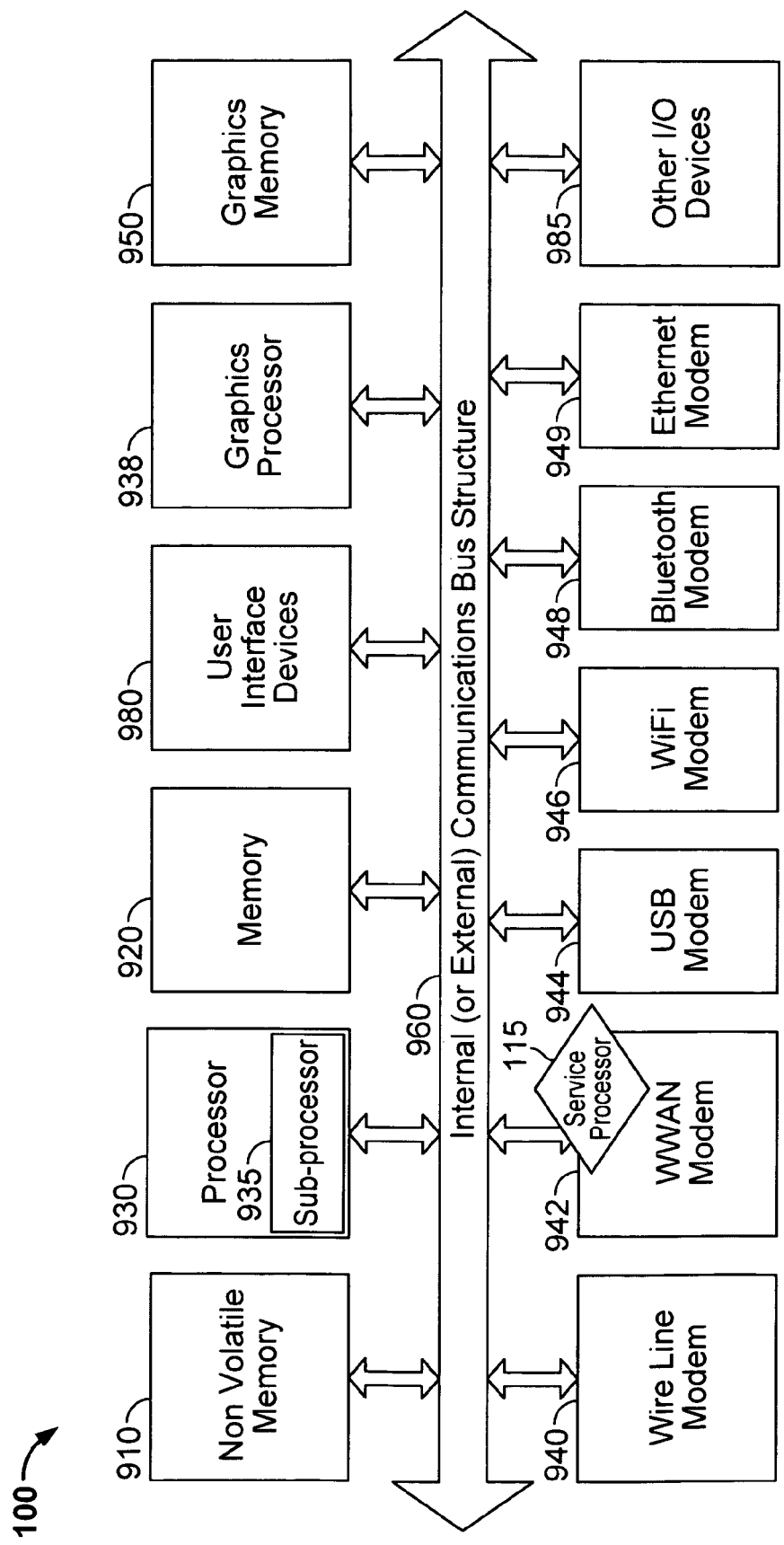
FIG. 11 illustrates another hardware diagram of a device that includes a service processor in accordance with some embodiments.

FIG. 11 illustrates another hardware diagram of a device 100 that includes a service processor 115 in accordance with some embodiments. As shown in FIG. 11, the service processor 115 is implemented on the WWAN modem 942 of the device 100. In some embodiments, this implementation can be in part or whole accomplished in software stored, implemented and/or executed on the WWAN modem 942. In some embodiments, the implementation and/or execution can be in part or whole accomplished in hardware that is on the WWAN modem 942. In some embodiments, service process 115 is implemented on another modem component of device 100 and/or one or more of the modem components of device 100.

In some embodiments, the service processor 115 is implemented on a modem processor (e.g., WWAN modem 942 or WWAN/Wi-Fi modem), and the service processor 115 can be installed and/or executed in protected and/or secure memory or processor hardware on the modem. The modem memory can be made robust to hacking or tampering and, in some embodiments, is only accessible from a secure network management channel or secure device management port and not by most end users. In some embodiments, a portion of the service processor 115 is implemented on a modem processor (e.g., WWAN modem 942 hardware or software), and a portion of the service processor 115 is implemented on another device 100 processor 930. For example, the device service monitor agent 1696 and one or more service usage measurement points (see discussion associated with FIG. 21) can be implemented on a modem processor, and other service processor 115 elements can be implemented in the main device operating system processor 930. As another example, a second (or first) service monitor agent 1696 and one or more service usage measurement points can be implemented on a modem processor, and a first (or second) service monitor 1696 with one or more service measurement points can be implemented on the main operating system processor 930 for device 100. For example, such embodiments can be configured to provide a service usage measurement and reporting system that offers a diversified countermeasure to protect against hacking, tampering or other errors for device based service usage measurements that can be made harder to hack or tamper with than certain software embodiments on the processor 930. For example, such embodiments can be employed when one or more of the following capabilities are not available: network based service usage measures, network based service profile or policy implementation verification measures, and network based service usage verification error response action capabilities.

In some embodiments, certain portions of the service processor 115 that deal with application layer service monitoring or traffic flow identification (e.g., tagging or traffic flow shaping as disclosed elsewhere) are implemented on a main processor 930, and other portions of the service processor 115 are implemented on a modem processor (e.g., WWAN modem 942).

In some embodiments, the WWAN modem is a wide area access technology modem such as 2G, 2.5G, 3G or 4G. As discussed above and below, the connection to the WWAN modem 942 can be a connection internal to device 100, for example a USB, GPIO, AMBA or other bus, or can be a connection that extends external to the device such as for example a USB, Ethernet, Wi-Fi, Bluetooth or other LAN or PAN connection. Three example embodiments in which the bus is internal to the device are as follows: a PCIe modem card running over USB or PCIe, a GPIO connection running from a processor 930 chipset to a modem chipset inside a mobile device, or a Wi-Fi connection running from a Wi-Fi modem inside of device 100 to an intermediate modem or networking device combination that forwards the access network traffic between the access network connection and the device via the Wi-Fi connection. In some embodiments, in addition to the service processor 115 being implemented on the WWAN modem 942 either internal or external to the device 100, similarly service processor 115 can be implemented on a wire line modem 940, such as DSL, Cable or fiber, another wireless LAN or PAN modem, such as Wi-Fi, Zigbee, Bluetooth modem 948, White Space, or some other modem, connected internal to device 100 or external to device 100 via a LAN or PAN extension of internal or external communications bus structure 960.

In some embodiments, a complete turn-key reference design product for the device modem (one or more of 942, 946, 948, 949, 944, 940) combined with a built-in service processor 115, possibly with a well defined and documented application interface and a well defined and documented service processor developers kit (SPDK) provides for a powerful product embodiment for the purpose of achieving mass market distribution and usage for the modem with service processor 115 and associated service controller 122 features. For example, embodiments that include the WWAN modem 942, possibly in combination with one or more additional modems including Wi-Fi modem 946, bluetooth modem 948, USB modem 944 and Ethernet modem 949, can be combined with a pre-tested or pre-certified integrated embodiment of the service processor 115, possibly in combination with a well defined API for writing software applications that interface to, reside on or communicate with this turn-key modem embodiment. As disclosed herein, the advantageous capabilities of the service processor 115, possibly in conjunction with the service controller 122, to assist in monitoring, control, billing and verification for services is made more available for device 100 manufacturers in such a form, because the manufacturers do not need to spend as much time and resources to develop a custom modem only for a subset of devices that the turn-key modem can be used to support. In some embodiments, the service processor 115, as discussed herein, can be configured to provide device assisted service monitoring, control, billing and/or verification across not just when connected to the WWAN network via the WWAN modem, but also when connected to the other networks corresponding to the other access modems included in the turn-key combined module plus service processor 115 (or SPDK or chipset plus service processor 115) design. The pre-integrated service processor 115 and API possibly in combination with testing and certification can be packaged in a small form factor that may have standardized interfaces such as USB, PCIe, firewire, Display Port, GPIO, or other interface. The form factor may be miniaturized into standard configurations such as minicard, half minicard or even smaller form factors, or it can be designed into a non-standard or proprietary form factor. The module form factor can be well documented to simplify integration into various device 100 designs. The SPDK embodiments can be designed to contain one or more of the following: hardware integration and use documentation, software integration documentation, software programming documentation, application interface documentation, service controller documentation, overall testing guidelines and overall use guidelines. In some embodiments, the modem module can be integrated with the service processor 115 functionality as a combined chipset, firmware and/or software product, with other SPDK features very similar to those listed above. The service controller programming guide for these turn-key embodiments can also be documented for the SPDK service processor 115 software, turn-key module with service processor 115 or integrated chipset with service processor 115. Accordingly, these embodiments provide various solutions to simplify the OEM task of integrating, developing, testing and shipping device 100 products (or integrated networking device products) with any of the device assisted service monitoring, control, billing or verification capabilities disclosed herein.

Figure 12:
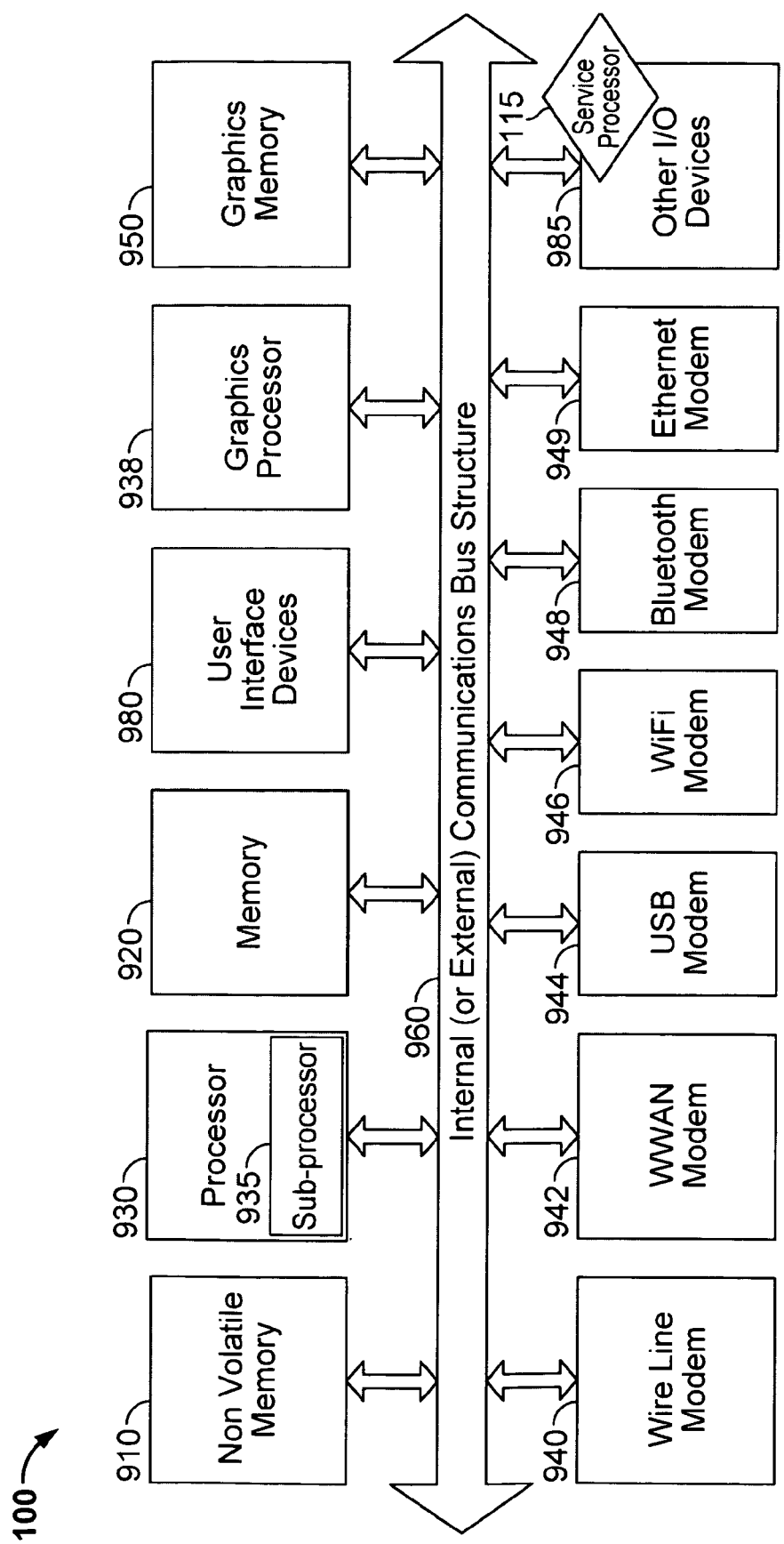
FIG. 12 illustrates another hardware diagram of a device that includes a service processor in accordance with some embodiments.

FIG. 12 illustrates another hardware diagram of a device 100 that includes a service processor 115 in accordance with some embodiments. As shown in FIG. 12, the service processor 115 is implemented on the other I/O devices component 980 of the device 100. In some embodiments, this implementation can be in part or whole accomplished in software stored, implemented and/or executed on the other I/O devices component 980 (e.g., a SIM/USIM card or other secure hardware I/O device). In some embodiments, the implementation and/or execution can be in part or whole accomplished in hardware that is on the other I/O devices component 980.

As discussed above, various embodiments include product designs in which the service processor 115 resides on device volatile or non-volatile memory (see FIG. 9), the device application processor or CPU (see FIG. 10), the wireless access modem (see FIG. 11) (or any other modem), or another I/O device (see FIG. 12). While these are just a few of the example service processor 115 placement embodiments, these embodiments show that the placement of where the software or hardware for implementing the service processor 115 can reside in the device 100 is very flexible and can be implemented in a myriad of places and ways depending on the device and/or other technical design choices.

Figure 13:
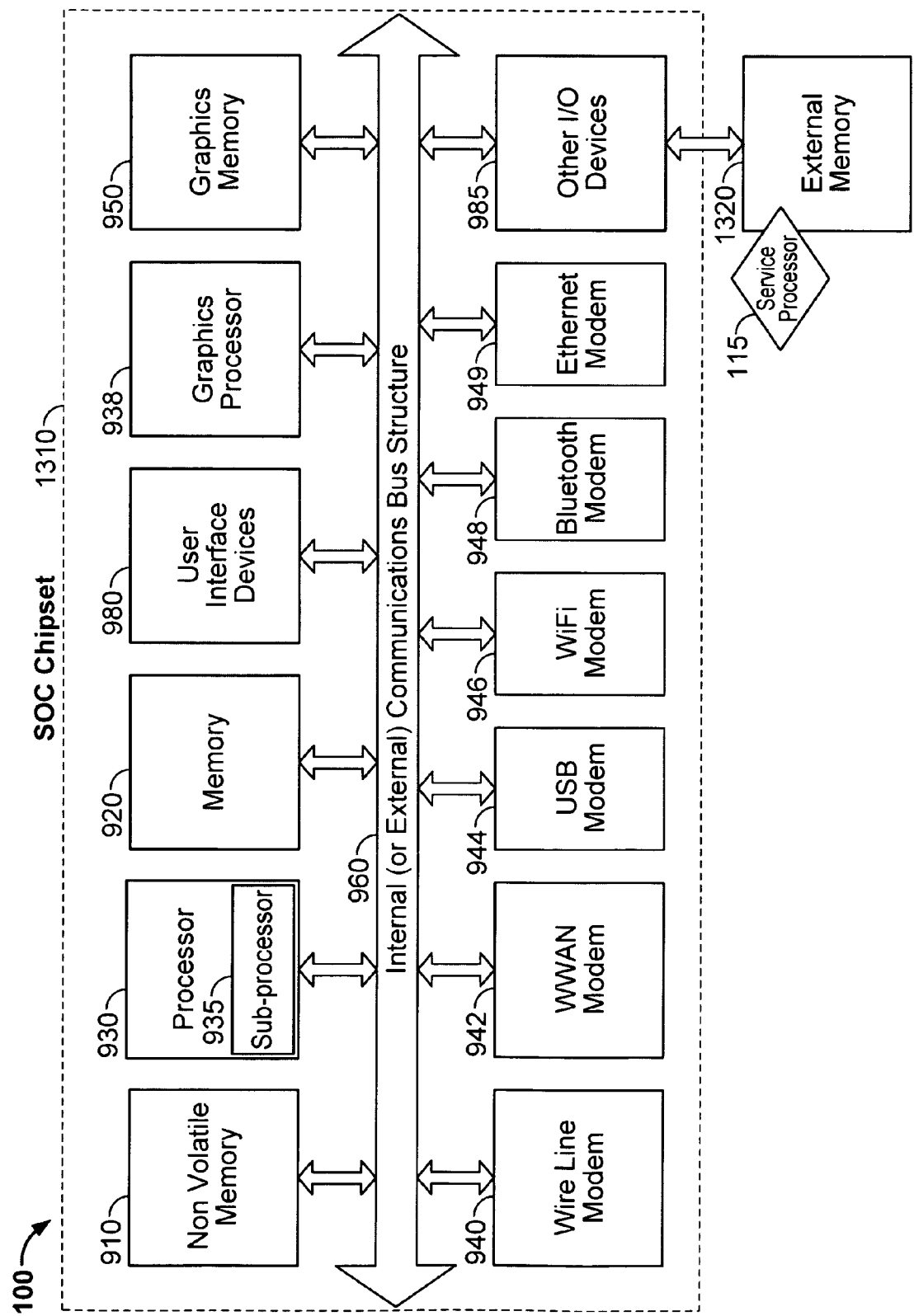
FIG. 13 illustrates another hardware diagram of a device that includes a service processor implemented in external memory of a System On Chip (SOC) in accordance with some embodiments.

FIG. 13 illustrates another hardware diagram of a device 100 that includes a service processor 115 implemented in external memory of a System On Chip (SOC) 1310 in accordance with some embodiments. As shown in FIG. 13, the service processor 115 is implemented on the external memory 1320 of the device 100. In some embodiments, this implementation can be in part or whole accomplished in software stored, implemented and/or executed on the external memory 1320. In some embodiments, the implementation and/or execution can be in part or whole accomplished in hardware that is on the external memory 1320. In some embodiments, SOC chipset 1310 and external memory 1320 provide a portion or all of the hardware of device 100.

Figure 14:
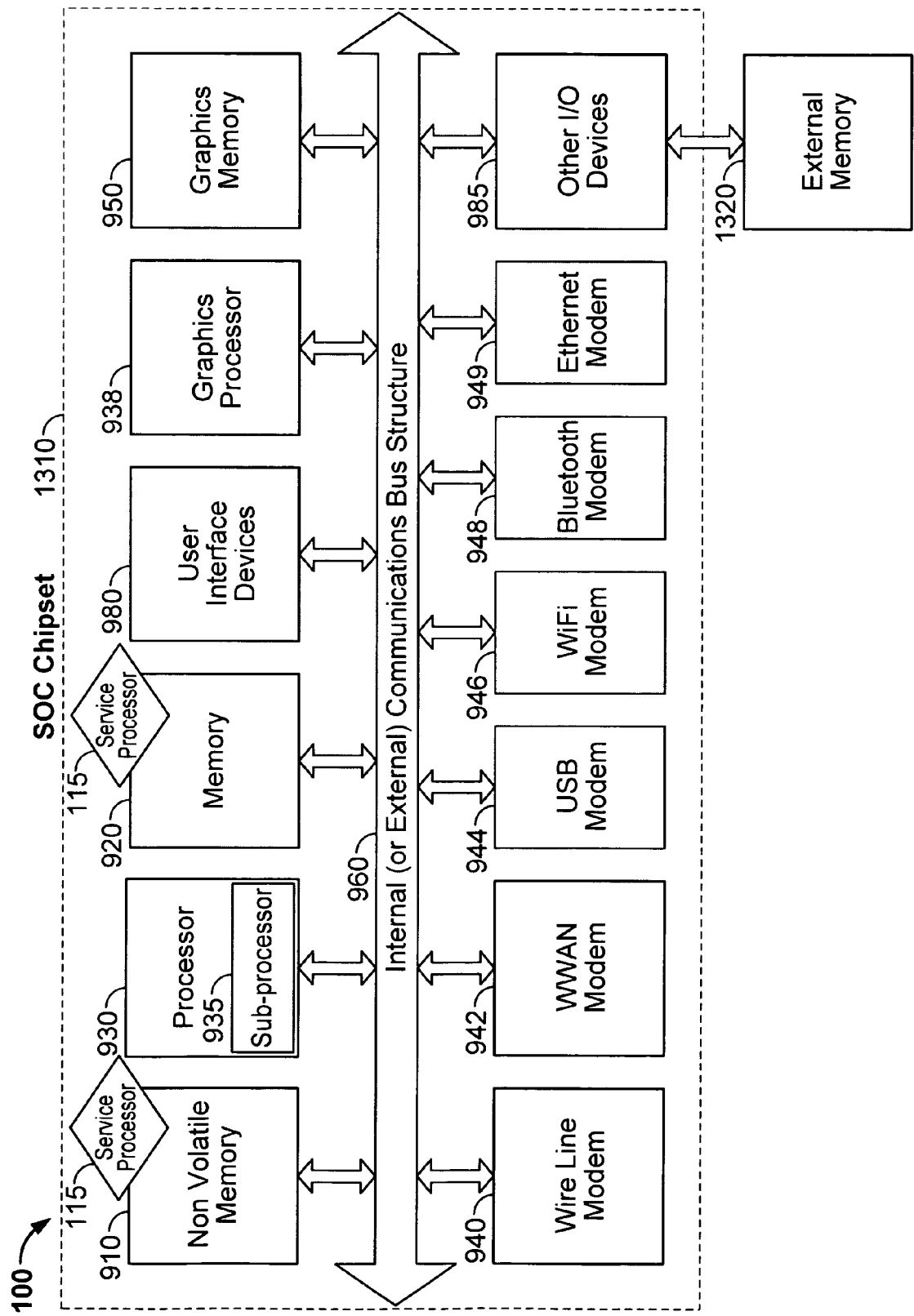
FIG. 14 illustrates another hardware diagram of a device that includes a service processor implemented in external memory of a System On Chip (SOC) in accordance with some embodiments.

FIG. 14 illustrates another hardware diagram of a device 100 that includes a service processor 115 implemented in external memory of a System On Chip (SOC) 1310 in accordance with some embodiments. As shown, the service processor 115 is stored in a non volatile memory 910 and a memory 920 of the SOC chipset 1310, as similarly discussed above with respect to FIG. 9. In some embodiments, SOC chipset 1310 and external memory 1320 provide a portion or all of the hardware of device 100.

As similarly discussed above with respect to FIGS. 9 through 12, various embodiments include product designs including the SOC chipset 1310 in which the service processor 115 resides on internal volatile or non-volatile memory 910 of the SOC chipset 1310 (see FIG. 14), the device application processor or CPU 930 and/or sub processor 935, the modems 940, 942, 944, 946, 948, and/or 949 (or any other modem), another I/O device 985, and/or external memory 1320 (see FIG. 13) (and/or any combinations thereof). While these are just a few of the example service processor 115 placement embodiments, these embodiments show that the placement of where the software or hardware for implementing the service processor 115 can reside in the SOC chipset 1310 and/or the external memory 1320 of the device 100 is very flexible and can be implemented in a myriad of places and ways depending on the device and/or other technical design choices.

The above discussion with respect to FIGS. 9 through 14 illustrating various internal hardware embodiments for device 100 applies equally to this partitioning of device functionality or any other partitioning of how the components in device 100 are configured, whether they are all separate components, some of the components are combined into a single chipset but there are still multiple chipsets, or all of the components are combined into a chipset. For example, FIGS. 9 through 14 illustrating various internal hardware embodiments for device 100 show several access modem components including the wire line modem 940, wireless wide area network (WWAN) modem 942, USB modem 944, Wi-Fi modem 946, Bluetooth modem 948, and Ethernet modem 949. In some embodiments, wire line modem 940 is a DSL or cable modem such as DOCSIS, or some other modem with a hard connection such as fiber. In some embodiments, as discussed above and below, connection to the wire line or wireless access network is accomplished through an extension of the internal or external communications bus structure 960. For example, such an extension is accomplished using one or the other modems, such as Wi-Fi modem 946 or Ethernet modem 949, connecting to a local area network that in turn connects to the access network via a device that bridges the local area network to the access network. One of ordinary skill in the art will appreciate that when discussing device connection to any access network the connection can be via a direct connection to the network, such as a 3G or 4G WWAN modem 942 connection to a 3G or 4G WWAN network, or can be a connection to the access network through an intermediate connection, such as a Wi-Fi modem 946 connection to a modem or networking device combination that has a Wi-Fi LAN connection and a 3G or 4G network access network connection. Another example of an extended modem connection embodiment includes a Wi-Fi modem 946 device connection to a modem or networking device combination that includes a Wi-Fi LAN connection and a DOCSIS or DSL network access connection. Other examples of such combinations will be readily apparent to one of ordinary skill in the art.

Service Processor Configurations for Intermediate Networking Devices

Figure 15C:
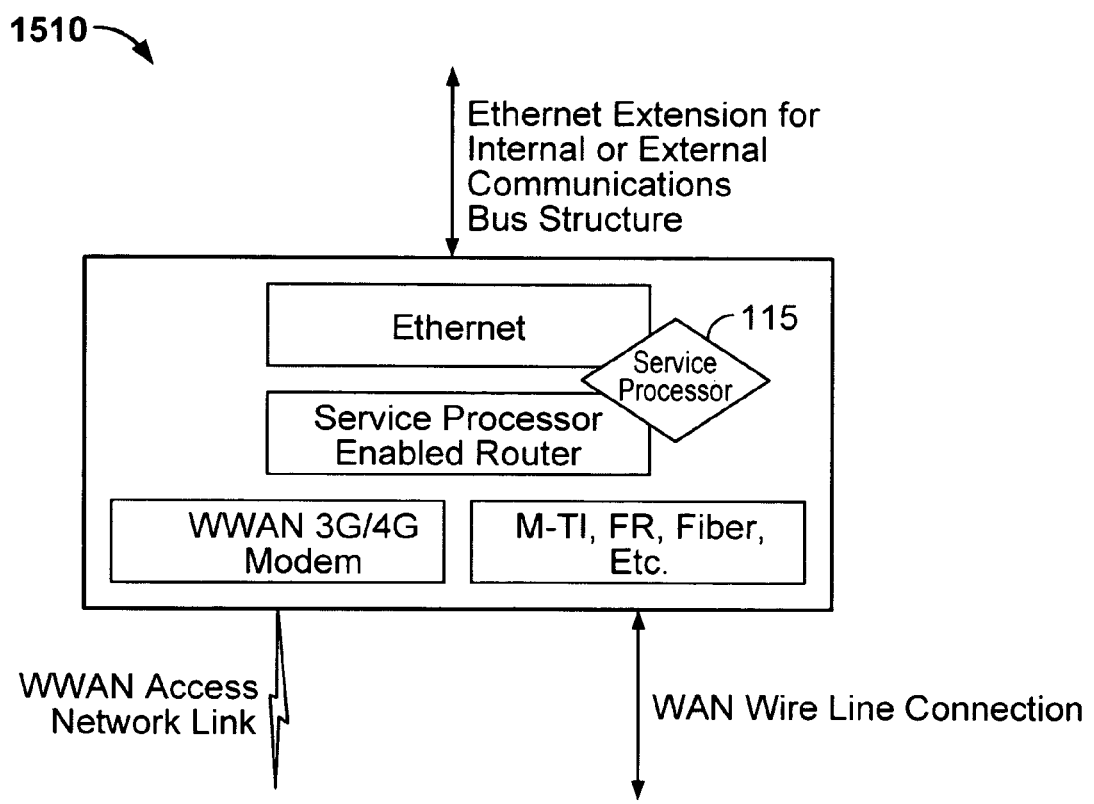

FIGS. 15A through 15C illustrate hardware diagrams of a device 100 that include a service processor 115 and a bus structure extension 1510 using intermediate modem or networking device combinations in accordance with various embodiments. For example, FIGS. 15A and 15B illustrate various extended modem alternatives for access network connection through an intermediate modem or networking device combination that has a connection (e.g., LAN connection) to one or more devices 100.

In some embodiments, device 100 includes a 3G and/or 4G network access connection in combination with the Wi-Fi LAN connection to the device 100. For example, the intermediate device or networking device combination can be a device that simply translates the Wi-Fi data to the WWAN access network without implementing any portion of the service processor 115 as shown in FIG. 15B(1). In some embodiments, an intermediate device or networking device combination includes a more sophisticated implementation including a networking stack and some embodiments a processor, as is the case for example if the intermediate networking device or networking device combination includes a router function, in which case the service processor 115 can be implemented in part or entirely on the intermediate modem or networking device combination. The intermediate modem or networking device combination can also be a multi-user device in which more than one user is gaining access to the 3G or 4G access network via the Wi-Fi LAN connection. In the case of such a multi-user network, the access network connection can include several managed service links using multiple instantiations of service processor 115, each instantiation, for example, being implemented in whole or in part on device 100 with the intermediate modem or networking device combination only providing the translation services from the Wi-Fi LAN to the WWAN access network.

Referring now to FIGS. 15A and 15B(2)-(4), in some embodiments, the service processors 115 are implemented in part or in whole on the intermediate modem or networking device combination. In the case where the service processor 115 is implemented in part or in whole on the intermediate modem or networking device combination, the service processor 115 can be implemented for each device or each user in the network so that there are multiple managed service provider accounts all gaining access through the same intermediate modem or networking device combination. In some embodiments, the functions of service processor 115 are implemented on an aggregate account that includes the WWAN access network traffic for all of the users or devices connected to the Wi-Fi LAN serviced by the intermediate modem or networking device combination. In some embodiments, the central provider can also provide an aggregated account service plan, such as a family plan, a corporate user group plan and/or an instant hotspot plan. In the case where there is one account for the intermediate modem or networking device combination, the intermediate modem or networking device combination can implement a local division of services to one or more devices 100 or users in which the services are controlled or managed by the intermediate modem or networking device combination or the device 100, but the management is not subject to service provider control and is auxiliary to the service management or service policy implementation performed by service processors 115. In some embodiments, another service model can also be supported in which there is an aggregate service provider plan associated with one intermediate modem or networking device combination, or a group of intermediate modems or networking device combinations but where each user or device still has its own service plan that is a sub-plan under the aggregate plan so that each user or device has independent service policy implementation with a unique instantiation of service processor 115 rather than aggregate service policy implementation across multiple users in the group with a single instantiation of service processor 115.

As shown in FIG. 15A and 15B(2), in some embodiments, device 100 includes a Wi-Fi modem 946, a Wi-Fi modem 946 combined with a 3G and/or 4G WWAN modem 1530 on intermediate modem or networking device combination 1510, and the intermediate modem or networking device combination forwards WWAN access network traffic to and from device 100 via the Wi-Fi link. For example, the service processor 115 can be implemented in its entirety on device 100 and the service provider account can be associated exclusively with one device. This is an embodiment associated with one or more of FIG. 29, 31, 32 or 34 discussed below, in which the modem bus represents the Wi-Fi LAN connection via the Wi-Fi modem 946. Similarly, as shown in FIGS. 15A and 15B(3), such an implementation can be provided using a different access modem and access network, such as a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use DSL as shown in FIGS. 15A and 15B(4), USB, Ethernet, Bluetooth, or another LAN or point to point connection from device 100 to the intermediate modem or networking device combination 1510.

In some embodiments, a portion of the service processor 115 is implemented on the device 100, such as the application interface agent 1693 and other supporting agents (see FIG. 16), and another portion of the service provider 115 is implemented on the intermediate modem or networking device combination, such as policy implementation agent 1690 or possibly modem firewall 1655 as well as other agents (see FIG. 16). This is an embodiment associated with one or more of FIG. 30 or 36 discussed below, in which the modem bus in the figure represents the Wi-Fi LAN connection via the Wi-Fi modem 946. In this example, the service provider 115 can still offer individual service plans associated exclusively with one device, or can offer an aggregate plan in which the portion of the service processor 115 located on the intermediate modem or networking device combination 1510 aggregates service plans into one WWAN connection but each individual device 100 has a unique service interface via the application interface agents and associated agents located on device 100. Similarly, such an implementation can be provided using a different access modem and access network, for example a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, all of the service processor 115 is implemented on the intermediate modem or networking device combination 1510 and the aggregate device or user traffic demand from the LAN port is serviced through one service provider service plan account. This is an embodiment associated with FIG. 35 in which as discussed below the modem bus in the figure represents the Wi-Fi LAN connection via the Wi-Fi modem 946. Similarly, such an implementation can be provided using a different access modem and access network, for example a 2G and/or 3G WWAN, DSL wire line, cable DOCSIS wire line or fiber wire line configuration in place of the 3G and/or 4G access network connection to the intermediate modem or networking device combination 1510. In addition, various other embodiments similarly use USB, Ethernet, Bluetooth, or another LAN or point to point connection from device 100 to the intermediate modem or networking device combination 1510.

In some embodiments, the device 100 uses the on-board WWAN modem 942 when it is outside of Wi-Fi LAN coverage area for one or more trusted access networks for the device, and when the device comes within range of a Wi-Fi network associated with a intermediate modem or networking device combination connected to a trusted wire line access network, the device can switch to the Wi-Fi link service to connect service processor 115 to the trusted wire line access network. In some embodiments, the decision to switch to the Wi-Fi LAN associated with a trusted wire line access network can be made automatically by the device based on the policy implementation rules settings for the modem selection and control 1811 and/or the policy control agent 1692, can be made by the user, or can be made by the service controller 122 (see FIG. 18). In addition, various other embodiments similarly use USB, Ethernet, Bluetooth, or another LAN or point to point connection from device 100 to the intermediate modem or networking device combination 1510.

FIG. 15C illustrates another hardware diagram of a device 100 that includes a service processor 115 and a bus structure extension 1510 using intermediate modem or networking device combinations in accordance with various embodiments. In some embodiments, more than one access network connection is implemented in the intermediate modem or networking device combination 1510. This allows the device 100 to potentially connect through the intermediate modem or networking device combination with a choice of access network services. An example of such an embodiment is illustrated in FIG. 15C in which an access network router (e.g., an enterprise router) connected to a LAN with a wire line primary backhaul connection and a back up WWAN connection, for example 3G or 4G, to provide access services when the primary wire line connection fails. As discussed above, the service provider service profile for service processor 115 and the service plan account can be set up as an aggregate account with multiple users connected to the LAN. The service provider can elect to use an embodiment that includes a portion of the service processor 115 on each device 100 so that the account can be managed for each user or each device, or the service provider can elect to implement all of the necessary features in the service processor 115 on the intermediate modem or networking device combination so that there is no visibility to the individual devices 100 or users.

As described herein, various embodiments provide many service policy implementation options that can enhance the service provider control of the service experience and cost, or enhance the user control of the service experience and cost by providing a verifiable or compromise resistant solutions to manage service policy implementation on the intermediate modem or networking device combination, for one or both of the WWAN or wire line access networks, when the WWAN access network is active, or when the WWAN access network is inactive. The level of service control, user preference feedback and service policy implementation verification or compromise resistance enabled by these embodiments improves the offered back up services and primary wire line services. One of ordinary skill in the art will also now appreciate that any number of wire line and/or wireless network access connections can be supported by the various embodiments as described herein, with any number of device architectures and architectures for intermediate modem or networking device combinations bridging the device to the access network of choice. Accordingly, various embodiments provide a verifiable managed service architecture, design and implementation for any number of single access and/or multi-access networks in which the service account can be consistent across multiple networks, and the service policies can be changed from network to network as deemed appropriate by the service provider with service notification, service cost control and privacy preference inputs from the user.

In various embodiments, the verification embodiments discussed herein for service policy implementation verification or service policy implementation compromise protection can be applied. In some embodiments, rather than attaching a service provider service plan account to a single device, it is attached to (e.g., associated with) a user. For example, when the user logs onto an access network with a service controller controlled by a service provider, regardless of what device the user logs onto with the user's service plan profile can be automatically looked up in the central billing system 123 and dynamically loaded (e.g., downloaded) onto the device 100 from the service controller 122 (e.g., a service profile provided on demand based on the user's identity). In some embodiments, in addition to dynamically loading the user's service policy implementation and control settings, one or more of the user's preferences including notification, service control, traffic monitor reporting privacy and Customer Relationship Management (CRM) reporting privacy are also dynamically loaded. For example, this allows the user to have the same service settings, performance and experience regardless of the device the user is logged into and using on the network. In addition, as discussed herein, in the various embodiments that call for roaming from one type of access network to another, the user service plan profile, that includes all of the above in addition to the service plan profile changes that take effect between different types of access network, can be used on any device and on any network, providing the user with a verifiable or compromise resistant, consistent service experience regardless of network or device.

Many of the embodiments described herein refer to a user using device 100. It is understood that there are also applications for these various embodiments that do not involve user interfaces. Examples of such applications include equipment, apparatus or devices for automation, telemetry, sensors, security or surveillance, appliance control, remote machine to machine data connections, certain remote access configurations, two way power metering or control, asset tracking, people tracking or other applications in which a human user interface is not required for device 100.

Various embodiments of the device 100 described above include other I/O devices 985. In some embodiments, these other devices include other modems, other special purpose hardware components, and/or other I/O devices or drivers or modems to connect to other I/O devices. In some embodiments, these other devices include a Subscriber Identity Module (SIM) or Universal Subscriber Identity Module (USIM) device. In some embodiments, it is advantageous to implement some or all of the service processor 115 functions on an embodiment of device 100 that includes a SIM and/or a USIM. In some embodiments, the other I/O devices 985 include a hardware device designed to implement a portion or all of the service processor 115 functions. For example, this is advantageous in cases in which the original device 100 was not manufactured with the service processor 115; in cases in which dedicated hardware is desired to improve one or more aspects of service processor 115 performance; allowing users, for example, to have the same service settings, performance and experience regardless of the device the user is using on the network by using such a SIM and/or USIM (e.g., or implemented as a type of dongle); and/or in cases in which a separate component is desired to assist in compromise protection for one or more aspects of service processor 115.

As discussed above, some embodiments described herein provide for billing of certain access services. In some embodiments, various applications do not require or involve billing of certain services. For example, applications like enterprise IT (Information Technology) group management of enterprise workforce access policy implementation or access cost control or access security policy, privacy control, parental control, network quality of service control or enhancement, private network services, free access services, publicly funded access services, flat rate no-options service and other services, or other examples that will be apparent to one of ordinary skill in the art do not require billing functionality but benefit from many other aspects of various embodiments.

Service Processor and Service Controller for Verifiable Service Monitoring, Notification and Control FIG. 16 is a functional diagram illustrating a device based service processor 115 and a service controller 122 in accordance with some embodiments. For example, this provides relatively full featured device based service processor implementation and service controller implementation. As shown, this corresponds to a networking configuration in which the service controller 122 is connected to the Internet 120 and not directly to the access network 1610. As shown, a data plane (e.g., service traffic plane) communication path is shown in solid line connections and control plane (e.g., service control plane) communication path is shown in dashed line connections. As previously discussed, it is understood that the division in functionality between one device agent and another is based on, for example, design choices, networking environments, devices and/or services/applications, and various different combinations can be used in various different implementations. For example, the functional lines can be re-drawn in any way that the product designers see fit. As shown, this includes certain divisions and functional breakouts for device agents as an illustrative implementation, although other, potentially more complex, embodiments can include different divisions and functional breakouts for device agent functionality specifications, for example, in order to manage development specification and testing complexity and workflow. In addition, the placement of the agents that operate, interact with or monitor the data path can be moved or re-ordered in various embodiments. For example, as discussed below in some embodiments, one or more of the policy implementation or service monitoring functions can be placed on one of the access modems located below the modem driver and modem bus in the communication stack as illustrated in certain figures and described herein. As discussed below, some simplified embodiment figures illustrate that not all the functions illustrated in all the figures are necessary for many designs, so a product/service designer can choose to implement those functions believed to be most advantageous or sufficient for the desired purposes and/or environment. The functional elements shown in FIG. 16 are described below.

As shown, service processor 115 includes a service control device link 1691. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link 1691 provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link 1691 also provides the communications link and heartbeat timing for the agent heartbeat function. As discussed below, various embodiments disclosed herein for the service control device link 1691 provide an efficient and secure solution for transmitting and receiving service policy implementation, control, monitoring and verification information with other network elements.

In some embodiments, the service control device link 1691 agent messages are transmitted asynchronously as they are generated by one or more of the service agents. In some embodiments, the service control device link 1691 performs collection or buffering of agent messages between transmissions. In some embodiments, the service control device link 1691 determines when to transmit based potentially on several parameters including, for example, one or more of the following parameters: periodic timer trigger, waiting until a certain amount of service usage or traffic usage has occurred, responding to a service controller message, responding to a service controller request, initiated by one or more agents, initiated by a verification error condition, initiated by some other error or status condition. In some embodiments, once a transmission trigger has occurred, the service control device link 1691 assembles all buffered agent communications and frames the communications.

In some embodiments, the transmission trigger is controlled by waiting for an amount of service usage, such as waiting until a certain amount of data traffic has passed, which reduces the control plane communication channel traffic usage to a fraction of the data plane traffic. For example, this approach preserves network capacity and reduces service cost even in traffic scenarios in which data traffic is light.

In some embodiments, the transmission trigger is based on waiting for an amount of service usage, and also including a minimum transmission rate that triggers a transmission according to one or more of the following parameters: a maximum time between transmissions clock to keep the service processor 115 in communication with the service controller 122 when little or no service usage is occurring, a polling request of some kind from the service controller 122, a response to a service controller heartbeat, a transmission generated by a service verification error event, or a transmission generated by some other asynchronous event with time critical service processor 115 (or service controller 122) messaging needs, such as a transaction or service billing event or a user request. For example, service control plane traffic down is reduced to a relatively inexpensive and capacity conserving trickle when device 100 data traffic is not significant. At the same time, this approach also provides an effective flow of real time or near real-time service control plane traffic that is both cost and capacity efficient, because the service control plane traffic is a relatively small percentage of the data plane traffic when data plane traffic usage is heavy. For example, when data plane traffic usage is heavy is generally the time when close monitoring of service policy implementation verification or compromise prevention can be particularly important and by keeping the control plane overhead to a fraction of data plane traffic close monitoring and control of services are maintained at a reasonable cost in terms of percentage of both bandwidth used and network capacity. In some embodiments, the service usage or service activity trigger occurs based on some other measure than traffic usage, such as a number of messages transacted, one or more billing events, number of files downloaded, number of applications run or time that an application has been running, usage of one or more specified applications, GPS coordinate changes, roaming event, an event related to another network connection to the device and/or other service related measures.

In some embodiments, the service control device link 1691 provides for securing, signing, encrypting or otherwise protecting communications before sending. For example, the service control device link 1691 can send to the transport layer or directly to the link layer for transmission. In some embodiments, the communications are further secured with transport layer encryption, such as TCP TLS (Transport Control Protocol Transport Layer Security) or another secure transport layer protocol. In some embodiments, communications are encrypted at the link layer, such as IPSEC (Internet Protocol Security), various VPN (Virtual Private Network) services, other forms of IP layer encryption and/or another link layer encryption technique.

In some embodiments, the service control link 1691 includes the above discussed agent heartbeat function in which the agents provide certain required reports to the service controller 122 for the purpose of service policy implementation verification (e.g., verification related reports on certain aspects of the service processor 115) or for other purposes. For example, such agent heartbeat messages can be in the open/clear (unencrypted) or encrypted, signed and/or otherwise secured. In some embodiments, these messages include one or more of the below described types of messages: an agent information message, an agent check-in message and/or agent cross check message.

In some embodiments, an agent information message is included in the agent heartbeat service policy implementation verification message, which includes, for example, any information the agent needs to communicate to the service controller 122 as part of the operation of the service policy implementation system. For example, an agent response to a service controller challenge, as described below, can be included in the agent heartbeat service policy implementation verification message.

In some embodiments, an agent check-in message is included in an agent heartbeat service policy implementation verification message, which includes, for example, a transmission of a unique agent identifier, secure unique identifier, and/or hashed encrypted and signed message beginning with some shared secret or state variable for the hash. For example, an agent self-check can be included in the agent heartbeat service policy implementation verification message, which includes reporting on agent configuration, agent operation, agent code status, agent communication log, agent error flags, and/or other agent associated information potentially hashed, encrypted, signed or otherwise secured in the message (e.g., using a shared secret unique to that agent).

In some embodiments, an agent cross-check message is included in the agent heartbeat service policy implementation verification message, which includes, for example, reports on the status, configuration, operation observations, communication log or other aspects of another agent. For example, agent environment reports can be included in the agent heartbeat service policy implementation verification message, which includes, for example, reports on certain aspects of the service processor 115 operating environment, such as software presence (e.g., installation status of certain operating system and/or application software and/or components thereof), observed communication with agents or communication attempts, memory accesses or access attempts, network accesses or access attempts, software downloads or attempted downloads, software removal or download blocking, service policy implementation verification or compromise event error conditions with respect to the operating environment for the service processor 115, and/or other messages regarding the verification or possibility of compromise associated with the service processor 115 operating environment or agents.

In some embodiments, the agent heartbeat function also provides regular updates for information important to user service notification services. For example, the network based elements can provide regular synchronization updates for the device based service usage or service activity counters in which service usage or service activity measures available from one or more network service history elements is transmitted to the device 100. This allows the service usage counter errors between the device service counter and the counters used for central billing to be minimized. A common service usage or service activity measure is total traffic usage measured to date within a time frame over which a service limit is applicable. Other service usage or service activity measures can also be tracked and reconciled in a similar manner.

In some embodiments for the heartbeat function, the service controller 122 verifies that the scheduled agent reports are being received and that the reports are within expected parameters. In some embodiments, the access control integrity server 1654 issues signed challenge/response sequences to the policy implementation agent 1690. For example, the challenges can be asynchronous, issued when an event or error condition occurs, issued on a schedule or issued when a certain amount of data has passed. This approach, for example, provides a second layer of service policy implementation verification that strengthens the service usage or service activity measurement verification. For example, a challenge/response can be sent over the heartbeat link for the purpose of verifying device agent integrity. Various challenge/response related verification embodiments are described below.

In some embodiments, the challenge/response heartbeat message can include sending any kind of command or query, secure or transmitted in the open, receiving a response from the agent and then evaluating the response to determine if the response is within a range of parameters expected for a correctly configured agent, an agent that is operating properly, an agent that is not partially compromised or an agent that is not entirely compromised. In some embodiments, the agent is only required to respond with a simple acknowledgement of the challenge. In some embodiments, the agent is required to respond with a message or piece of information that is known by the agent. In some embodiments, the agent is required to respond with a message or piece of information that is difficult for the agent to respond correctly with if it were to be partially or entirely compromised. In some embodiments, the agent is required to respond back with information regarding the operation or configuration of the agent that is difficult for the agent to respond properly with if the agent is not properly configured, not operating properly, is partially compromised or is entirely compromised. In some embodiments, the first agent is required to respond back with information regarding the operation, configuration, status or behavior of a second agent that is difficult for the first or second agent to respond properly with if the first or second agent is not properly configured, not operating properly, is partially compromised or is entirely compromised. In some embodiments, the agent is required to respond with a response that includes a shared secret. In some embodiments, the agent is required to respond with information regarding the presence, configuration, operating characteristics or other information regarding other programs in the operating environment of the agent. In some embodiments, the agent is required to respond with hashed information to be portions of code or a code sample (e.g., the code portion or code sample can be specified by the service controller 122).

In some embodiments, the information the agent responds with is a response to a signed or encrypted message from the service controller 122 in which the agent must know how to decode the encrypted controller message in order to respond correctly or it would be difficult for the agent to respond properly if the agent is not configured properly, is not operating within appropriate limits, is partially compromised or is entirely compromised. In some embodiments, the agent signs or encrypts information in such a manner that it is difficult to respond correctly when the message is decoded by the service controller 122 unless the agent is configured properly, is operating within appropriate limits, is not partially compromised and is not entirely compromised. In some embodiments, the agent is required to respond with a signed or encrypted hash of information that is difficult for the agent to generate unless the agent is configured properly, is operating within appropriate limits, is not partially compromised and is not entirely compromised. For example, the hashed information can be local device configuration information, portions of code or all of the code, and/or the code portion to be used in the response can be specified by the service controller. In another example, the hashed information the agent responds with can include a shared secret, and/or the hashed information can be information regarding the presence, configuration, operating characteristics or other information regarding other programs in the operating environment of the agent.

Accordingly, as described above, the agent heartbeat function provides an important and efficient system in some embodiments for verifying the service policy implementation or protecting against compromise events. For example, there are many other functions the agent heartbeat service can perform and some are described herein while others will be apparent to one of ordinary skill in the art given the principles, design background and various embodiments provided herein.

In some embodiments, the service control device link 1691 facilitates another important function, which is the download of new service processor software elements, revisions of service processor software elements, and/or dynamic refreshes of service processor software elements. There are many embodiments for such operations. In some embodiments, the software is received as a single file over the service control device link 1691. For example, the file can have encryption or signed encryption beyond any provided by the communication link protocol itself. In some embodiments, the software files are segmented into smaller packets that are communicated in multiple messages sent over the service control device link 1691. In some embodiments, once the file(s) are received, or the segmented portions of the file(s) are received, they are communicated to a service downloader 1663 for file aggregation and installation, which, in some embodiments, is performed after further measures to verify the service processor software are completed. In some embodiments, the files are sent using other delivery means, such a direct TCP socket connection to the service downloader 1663 or some other software installer, which can also involve secure transport and additional levels of encryption.

As shown in FIG. 16, an agent communication bus 1630 represents a functional description for providing communication for the various service processor 115 agents and functions. In some embodiments, as represented in the functional diagram illustrated in FIG. 16, the architecture of the bus is generally multipoint to multipoint so that any agent can communicate with any other agent, the service controller or in some cases other components of the device, such user interface 1697 and/or modem components. As described below, the architecture can also be point to point for certain agents or communication transactions, or point to multipoint within the agent framework so that all agent communication can be concentrated, or secured, or controlled, or restricted, or logged or reported. In some embodiments, the agent communication bus is secured, signed, encrypted, hidden, partitioned and/or otherwise protected from unauthorized monitoring or usage.

In some embodiments, as described below, there are multiple layers of security applied to the agent communication bus 1630 communication protocols, such as including one or more of the following: point to point message exchange encryption using one or more keys that are partially shared or shared within the service processor 115 agent group and/or the service controller 122, point to point message exchange that using one or more keys that are private to the two end-points of the communication, a bus-level message exchange encryption that can be in place of or in addition to other encryption or security, or using one or more keys that are partially shared or shared within the service processor 115 agent group and/or the service controller 122, a set of secure messages that can only be decoded or observed by the agents they are intended for, a set of secure messages that allow communication between certain agents or service processor functions and entities outside of the service processor operating environment. In some embodiments, and as described herein, the service control device link 1691 is assumed to be equivalent to an agent for communication purposes, and, in the case of the service control device link 1691, the communication is not restricted to the agent communication bus 1630 but also extends to the service control communications link 1653. In some embodiments, the system has the capability to replace keys or signatures on occasion or on a regular basis to further secure against monitoring, eavesdropping or compromise of the agent communication system.

For example, various forms of message encryption and security framework techniques can be applied to encrypt and/or secure the agent communication bus 1630, including one or more of the following: agent bus encryption using shared key for all agents provided and updated by the secure server; agent bus encryption using point to point keys in which the secure server informs the bus and agents of keys and updates as appropriate; agent level encryption using agent to agent shared keys in which the secure server informs agents of the key and updates the key as appropriate; agent level encryption using agent to agent point to point key in which the secure server informs agent of the point to point keys that are required and updates the keys as appropriate; agent level access authorization, which only allows access to the agents that are on the secure authorization list and in which the list is provided by the secure server and signatures are provided by the secure server; UI messages are only analyzed and passed, in which the UI cannot have access to configuration information and cannot issue challenges; agent level heartbeat encryption, which can be point to point or shared key for that agent; control link level heartbeat encryption; TLS (Transport Layer Security) communication protocols; server level heartbeat encryption, which can be point to point or shared key for that secure server; and/or the access control integrity agent 1694 or heartbeat function can become point to multipoint secure communications hubs.

In some embodiments of the agent communication bus 1630, the design of the agent communication bus depends on the nature of the design embodiments for the agents and/or other functions. For example, if the agents are implemented largely or entirely in software, then the agent communication bus can be implemented as an inter-process software communication bus. In some embodiments, such an inter-process software communication bus is a variant of D-bus (e.g., a message bus system for inter-process software communication that, for example, helps applications/agents to talk to one another), or another inter-process communication protocol or system, running a session bus in which all communications over the session bus can be secured, signed, encrypted or otherwise protected. For example, the session bus can be further protected by storing all software (e.g., software components, applications and/or agents) in secure memory, storing all software in encrypted form in secure memory, and/or executing all software and communications within a secure execution environment, hardware environment and/or protected memory space. In some embodiments, if the agents and other functions are designed with a mixture of software and hardware, or primarily with hardware, then the implementation of the bus design will vary, and the principles and embodiments described herein will enable one of ordinary skill in the art to design the specifics of the agent communication bus 1630 to meet a particular set of product and desired functional requirements.

As shown in FIG. 16, an access control integrity agent 1694 collects device information on service policy, service usage or service activity, agent configuration and agent behavior. In some embodiments, the access control integrity agent 1694 also cross checks this information to identify integrity breaches in the service policy implementation and control system. In some embodiments, the access control integrity agent 1694 also initiates action when a service policy violation or a system integrity breach is suspected. In some embodiments, the access control integrity agent 1694 also performs asynchronous or periodic agent checks to verify presence, configuration or proper operation of other agents. In some embodiments, the access control integrity agent 1694 also performs challenge-response sequence verification of other agents.

Figure 21:
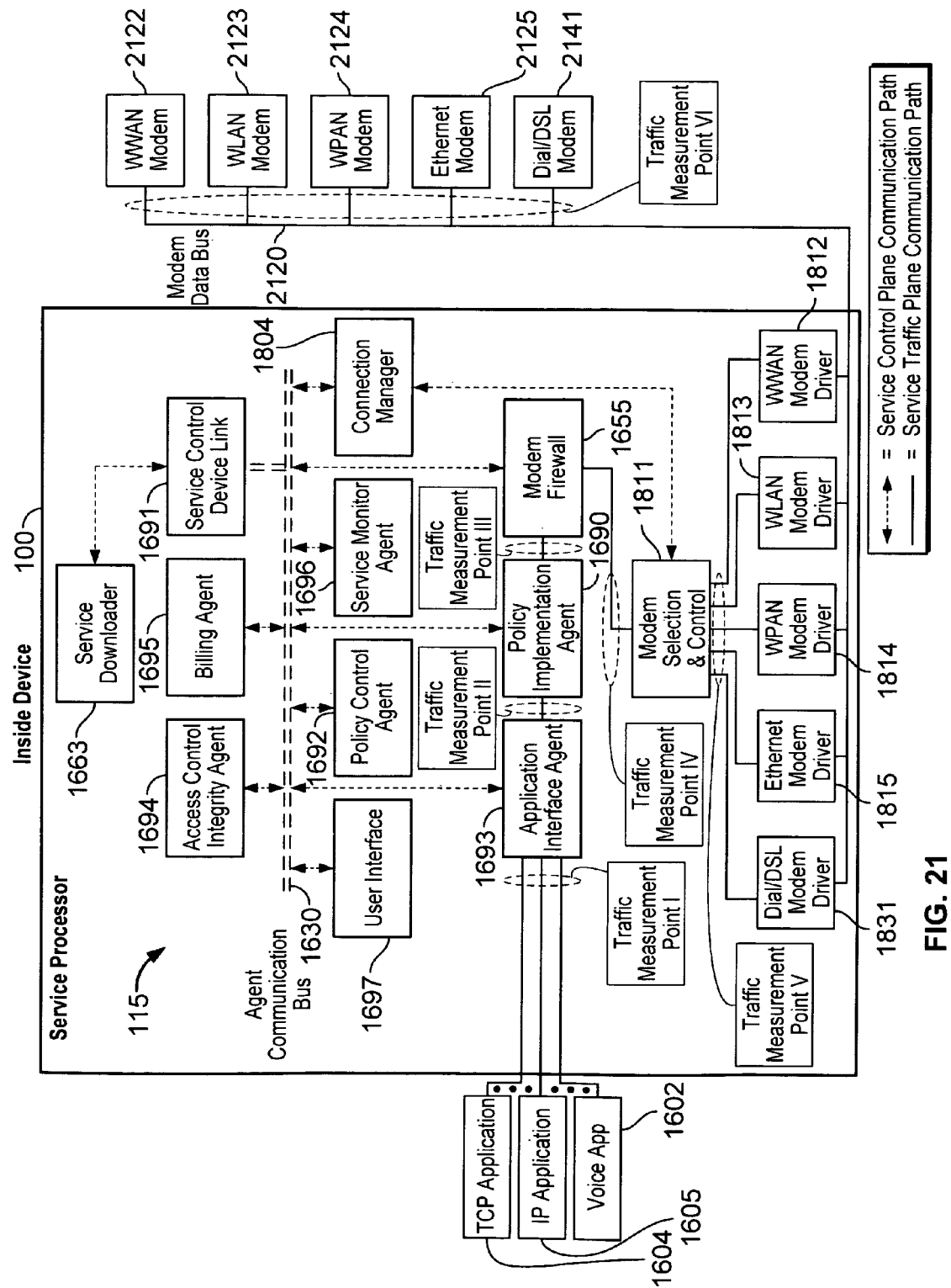
FIG. 21 is another functional diagram illustrating the service processor and the service controller in accordance with some embodiments.

In some embodiments, the access control integrity agent 1694 obtains service usage or service activity measures from a service monitor agent 1696 and compares one or more first service usage measurement points against one or more second service usage measurement points to verify service policy implementation. For example, as shown in FIG. 21, if the service usage at measurement point IV is inconsistent with measurement point III, which, for example, can indicate, for example, that an unauthorized or unmonitored usage of the access modem (e.g., modems 2122, 2123, 2124, 2125 or 2141) is taking place. As another example, as also shown in FIG. 21, if one or more aspects of upstream traffic usage measurement point II, which represents the upstream demand side of policy implementation agent 1690, is inconsistent with upstream traffic measurement point III, which represents delivered traffic from the policy implementation agent 1690, then the policy implementation agent 1690 may not be operating properly. As another example, as also shown in FIG. 21, if service measurement point III and IV indicate that firewall agent 1655 is passing traffic to URLs or IP addresses that are in the blocked policy settings, then a verification error condition can be set for the access control policy. As another example, if the policy controller reports traffic usage statistics that are inconsistent with traffic usage policy settings, then a traffic usage policy verification error may have occurred. As another example, if the service usage counter synchronization information received from the service controller 122, the device service history 1618 and/or the central billing system 1619, is compared to the service usage history reported by the service monitor agent and the two are found to be outside of acceptable tolerance limits for the comparison, then there may be a verification error in the service monitor service usage or service activity accounting. There are numerous additional embodiments of such comparisons as described herein and others as will be readily apparent to one of ordinary skill in the art given the principles, design background and specific examples and various embodiments described herein.

In some embodiments, device service policy implementations are verified by comparing various service usage measures used at the device against expected service usage or service activity behavior given the policies (e.g., one or more service policy settings, service profile or service profile settings for network based access/services, and/or service plan or service plan for network based access/services). For example, verification is performed based on a measure of total data passed at the device as compared to the service policy for total data usage. For example, verification is performed based on a measure of data passed in a period of time at the device as compared to the service policy for data passed in such a period of time. For example, verification is performed based on a monitoring of communications from the device based on IP addresses as compared to the policy for permissible IP addresses. For example, verification is performed based on a measure of total data passed from the device per IP address as compared to the policy for total data usage per IP address. Other examples include such actual versus policy comparisons based on other measures at/from/to the device, such as location, downloads, email accessed, URLs, and/or any other data, location, application, time or other criteria or any combination of criteria that can be measured for comparing with various policy settings and/or restrictions.

In some embodiments, the access control integrity agent 1694 monitors agent self-check reports to verify that agents are properly configured. In some embodiments, the access control integrity agent 1694 reports the agent self check reports to the service controller 122. In some embodiments, the access control integrity agent 1694 performs a role in service usage test transmission, reception and/or monitoring, with the usage test being tailored to test monitoring or control aspects for any subset of service activities. In some embodiments, the access control integrity agent 1694 performs a role in billing test event generation and/or monitoring. In some embodiments, the access control integrity agent 1694 checks and reports the result of service usage monitoring verification tests, service usage billing verification tests and/or transaction billing verification tests.

In some embodiments, the access control integrity agent 1694 receives agent access attempt reports to determine if unauthorized agent access attempts are occurring. In some embodiments, the access control integrity agent 1694 acts as a central secure communications hub for agent to agent or service controller 122 to agent communication. For example, the access control integrity agent 1694 can be used so that no other software or function can access other agents or so that agents cannot access other agents except through the secure point to multipoint communications hub. In some embodiments, this approach further enhances compromise resistance for the agents. In some embodiments, some or all of the agent communications, including agent to agent or service controller 122 to agent communications, and possibly including unauthorized attempts to communication with agents, are monitored and logged so that a trace log of some or all agent communications can be maintained. For example, the agent communication trace log can be summarized and/or compressed for transmission efficiency or regularly reported, such as through the heartbeat function, or the agent communication trace log can be reported only when the service controller 122 requests the agent communication trace log or when there is a verification error event. As similarly described above, the partitioning of agent functions and server functions is provided herein mainly to aid in disclosing various embodiments but those of ordinary skill in the art will appreciate that other partitioning of agent functions and server functions can be used based on different design choices. For example, the central agent communication hub function is performed in some embodiments by the access control integrity agent 1694, however, in other embodiments that function is performed by the service control device link 1691. For example, when the central agent communication hub function is located in the service control device link 1691, then architecturally the device link can be a single point to multipoint secure communications hub for all agent to agent and service controller 122 to agent communications. In some embodiments, this approach has certain advantages from a service policy implementation verification or compromise protection robustness perspective, or has certain advantages from a communications protocol efficiency perspective, or simply can be more efficient to implement. It should be noted that in other embodiments described herein the agent to agent and agent to service controller 122 communications can be multipoint to multipoint, with each agent having the capability to communicate with other agents or the service controller, this communication can be secure, signed or otherwise encrypted or protected in some embodiments and in the open/clear in others. Also, as discussed in some embodiments, the agents can maintain their own communications or attempted communications log, which can then be reported to the service controller 122. In some embodiments, the agents implement restrictions on which device components or agents the agents will conduct communications with so that only agents that need to communicate with one another can do so.

In some embodiments, the service control device link 1691 reviews local billing event history and compares such history to billing event reports to verify that a billing agent 1695 is functioning properly (e.g., has not been tampered with or compromised). In some embodiments, the service control device link 1691 cross-checks service usage or service activity against billing event reports from the billing agent 1695 to verify that billing events are properly billing for service usage or service activity. In some embodiments, the service control device link 1691 cross-checks transaction billing process or records against transaction billing reports to ensure that transaction billing events are being properly reported by the billing agent 1695. In some embodiments, the service control device link 1691 determines if one or more agents have been compromised, and if so, initiates a dynamic agent download process to replace any such potentially compromised agent.

In some embodiments, the access control integrity agent 1694 verifies that the service usage counter is reporting service usage or service cost to the user within acceptable limits of accuracy when compared to the service usage reports obtained from the service monitor agent 1696, the service controller 122, the device service history 1618 and/or the central billing system 1619. In some embodiments, the access control integrity agent 1694 checks to verify that user privacy filter preferences are being properly implemented. In some embodiments, the access control integrity agent 1694 checks to verify that the user is properly receiving UI warnings regarding service usage or roaming service usage conditions.

In some embodiments, the access control integrity agent 1694 checks to verify that the device is not beginning service usage until it has been authenticated, authorized or granted access to the network. In some embodiments, access control integrity agent 1694 checks with the service controller 122 or the billing system 1619 to verify that the user or device has a valid service standing and should be admitted to access on the network.

In some embodiments, an Activation Tracking Service (ATS) is provided in which the service monitoring function (e.g., performed by the service monitor agent 1696 and/or some other agent/component or combinations thereof on the device) is used in part to determine which access networks are being connected to and to record and/or report this information. In some embodiments, the ATS is only enabled if the device user approves reporting of access networks connected to by the user device. In some embodiments, the ATS is protected from tampering. For example, the ATS can be hardened, that is, to be more tamper resistant, using a variety of techniques, including any of the following: the ATS can be located (e.g., stored) in secure memory and/or secure hardware; the ATS can be implemented in the system BIOS, the access modem and/or another hard to access portion of the device; a second device agent can confirm the presence of the ATS with a report to a network based server; the second agent or the network server can initiate a reinstall of the ATS if it is missing or is found to be operating improperly; and/or the ATS can be placed in a secure area of the OS so that it cannot be removed or if removed must be replaced for proper device operation to resume. A variety of other tamper resistance techniques can also be used to protect the ATS from tampering as similarly described herein with respect to other device based functions/software components/agents.

In some embodiments, the access control integrity agent 1694 verifies that ATS software or hardware is present, properly configured or operating properly. In some embodiments, the access control integrity agent 1694 reviews network connection or activity history and compares such to ATS reports to verify activation tracking service reports are occurring properly. In some embodiments, the access control integrity agent 1694 replaces ATS software if it has been removed. In some embodiments, the access control integrity agent 1694 monitors access or compromise of ATS software to determine if it may have been compromised. In some embodiments, the access control integrity agent 1694 reports status of ATS functions.

In some embodiments, the access control integrity agent 1694 scans the local agent execution environment to determine if there are unauthorized accesses to service processor functions, settings or code. In some embodiments, the access control integrity agent 1694 monitors software loading activity, protected memory access or communication with service processor 115 agents to detect unauthorized changes to service processor software or configuration. For example, the access control integrity agent 1694 can have a local database of potentially malicious elements and compare entries in the database against the elements detected locally. As another example, the access control integrity agent 1694 can communicate a list of some or all of the elements detected locally to the service controller 122 to augment or take the place of the database comparison function that may be performed locally. In some embodiments, the access control integrity agent 1694 detects new software downloads, installs or invocations and immediately issues an error flag report when potentially malicious software is downloaded, installed or invoked. In some embodiments, the access control integrity agent 1694 scans the local software loading and invocation activity along with a log of other software runtime events and regularly reports this trace so that when an error or compromise event occurs the trace preceding the event can be analyzed to determine the offending software or activity trace that took place to cause the compromise or error. Once the software or activity that caused the compromise is known, it can be entered into a refreshed version of the database that the device and other devices use to detect potentially malicious pre-cursor conditions. Examples of such pre-cursor events include software invocations, software downloads, attempts to uninstall certain agent and/or application software/components or OS components, a sequence of memory I/O events, a sequence of software access events, a sequence of network address or URL communications or downloads or a sequence of access modem I/O activity. In various other embodiments of the access control integrity agent 1694, the agent performs or (securely) communicates with other software/hardware device/network components that perform other well known signature, behavior blocking and/or intrusion detection identification/detection and/or blocking techniques based on the presence of potentially unwanted and/or potentially or known malicious software and/or intrusion attempts by unauthorized software and/or unauthorized users, using, for example, real-time, on access, periodic, and/or on demand scanning.

In some embodiments, the access control integrity agent 1694 detects or blocks potentially compromising behavior of other software programs/users attempting unauthorized behavior in the service processor 115 operating environment. In some embodiments, the access control integrity agent 1694 detects software that is being loaded that has the same or similar name, identification, memory location or function as one or more of the service processor 115 agents. In some embodiments, the access control integrity agent 1694 blocks operation or loading of such software. In some embodiments, the access control integrity agent 1694 detects or blocks unauthorized access of service processor 115 protected memory. In some embodiments, the access control integrity agent 1694 verifies configuration and operation of secure service downloader 1663. In some embodiments, the access control integrity agent 1694 monitors network and I/O activity to detect potentially compromising events, such as a program that is downloaded from known detrimental or potentially suspect IP addresses or URLs or a program that accesses certain IP addresses or URLs. In some embodiments, the access control integrity agent 1694 scans of the service processor operating environment are recorded and kept for a period of time, and if a service policy verification error occurs, then the scans immediately prior to the error are analyzed or reported to the service controller 122 for analysis. In some embodiments, such scans are regularly reported to the service controller 122 without the presence of service policy verification error conditions.

In some embodiments, the access control integrity agent 1694 requests a dynamic agent download of certain critical service processor functions, including in some cases the access control integrity agent 1694 on a periodic basis, or on a periodic basis when network access activity is not required or minimal.

In some embodiments, the access control integrity agent 1694 determines if a threshold has been surpassed for a max usage trigger for ambient and/or other services that should not be using significant amounts of data (e.g., based on the type of device and/or service profile settings).

In some embodiments, the access control integrity agent 1694 determines if verification errors exist in one or more of the verification process embodiments and, in some embodiments, reports errors immediately or in the next agent heartbeat to the service controller 122. In some embodiments, any number of results from the above checks, monitoring activities, reports or tests are reported to the service controller 122.

In some embodiments, a policy control agent 1692 receives policy instructions from the service controller 122 and/or the user via the billing agent 1695 and adapts device service policy settings (e.g., instantaneous device service policy settings) in one or more of the following agents/components: a policy implementation agent 1690, the modem firewall 1655 and/or an application interface agent 1693. As shown in FIG. 16, the modem firewall 1655 is in communication with a modem driver 1640, which is in communication with the agent communication bus 1630 and access network 1610. As shown with respect to access network 1610, a central billing server 1619, an access network AAA server 1621 and device server history 1618 are also provided. As shown, the Internet 120 is accessible via the access network 1610 and firewall 124, from which device 100 can then access various Internet services 1615.

In some embodiments, the policy control agent 1692 adapts low level service policy rules/settings to perform one or more of the following objectives: achieve higher level service usage or cost objectives, reduce network control channel capacity drain, reduce network control plane server processing bandwidth, and/or provide a higher level of user privacy or network neutrality while satisfying service usage or service activity objectives. In some embodiments, the policy control agent 1692 performs a policy control function to adapt instantaneous service policies to achieve a service usage objective. In some embodiments, the policy control agent 1692 receives service usage information from the service monitor agent 1696 to evaluate service usage history as compared to service usage goals. In some embodiments, the policy control agent 1692 uses service monitor 1696 service usage or service activity history and various possible algorithm embodiments to create an estimate of the future projected service usage. In some embodiments, the policy control agent 1692 uses a future projection of service usage to determine what service usage or service activity controls need to be changed to maintain service usage goals. In some embodiments, the policy control agent 1692 uses service usage history to perform a service usage or service activity analysis to determine the distribution of service usage across service usage elements within categories, such as usage by application, usage by URL, usage by address, usage by content type, usage by time of day, usage by access network, usage by location, and/or any other categories for classifying service usage. In some embodiments, the policy control agent 1692 uses the service usage distribution analysis to determine which service usage elements or service activities are creating the largest service usage (e.g., if e-mail, social networking, or multimedia/online video application categories are creating the largest service usage).

In some embodiments, the policy control agent 1692 is instructed, for example, by the user, through billing agent 1695 to perform a service control algorithm, such as traffic shaping or download management, to manage service usage or service activities to assist the user in controlling service costs. As a basic example of such a traffic shaping algorithm, the traffic shaping algorithm can simply reduce traffic speed for all applications and traffic types successively until the service usage projections are within service usage limits for the present service billing period. To illustrate an algorithm that is more sophisticated and provides the advantage of leaving many service usage elements or service activities unaffected while only controlling down usage on the most aggressive service usage elements or service activities, the traffic shaping algorithm can identify the highest traffic usage applications and/or websites and successively reduce traffic speed just for the highest usage applications and/or websites until the service usage projections are within service usage limits for the present service billing period. These examples thereby reduce network traffic for the user in accordance with the user's service usage objectives while maintaining overall satisfactory service usage experience for the user in a manner that satisfies various net neutrality requirements (e.g., the traffic throttling of certain applications/websites based on user input in which categories based on service usage history are selected by the user, for example, a certain application may be using 90% of the aggregate traffic usage). For example, adaptive throttling algorithms can be used to throttle application traffic that the user requests throttling, such as recursively throttling of the specified application traffic (e.g., to denigrate the traffic usage associated with that application and thereby reduce overall service data usage).

In some embodiments, the policy control agent 1692 adjusts service policy based on time of day. In some embodiments, the policy control agent 1692 obtains a measure of network availability and adjusts traffic shaping policy settings based on available network capacity. In some embodiments, the policy control agent 1692 automatically and dynamically adjusts service policy based on one or more other service policy settings, the service profile and/or the service plan associated with the device and/or user of the device.

In some embodiments, various lower level service policy implementation embodiments are combined with a higher level set of service policy supervision functions to provide device assisted verifiable network access control, authentication and authorization services.

In some embodiments, device based access control services are extended and combined with other policy design techniques to create a simplified device activation process and connected user experience referred to herein as ambient activation. In some embodiments, ambient access generally refers to an initial service access in which such service access is in some manner limited, such as where service options are significantly limited (e.g., low bandwidth network browsing and/or access to a specific transactional service), limited bandwidth, limited duration access before which a service plan must be purchased to maintain service or have service suspended/disabled or throttled or otherwise limited/reduced/downgraded, and/or any other time based, quality based, scope of service limited initial access for the network enabled device. In some embodiments, ambient activation is provided by setting access control to a fixed destination (e.g., providing access to a portal, such as a web page (e.g., for a hotspot) or WAP (Wireless Application Protocol) page, that provides the user with service plan options for obtaining a service plan for the user desired access, such as the service plan options for data usage, service types, time period for access (e.g., a day pass, a week pass or some other duration), and costs of service plan(s)). In some embodiments, service data usage of the ambient activated device is verified using IPDRs (e.g., using the device ID/device number for the device 101 to determine if the device has been used in a manner that is out of plan for the service plan associated with the device 101, such as based on the amount of data usage exceeding the service plan's service data usage limits, out of plan/unauthorized access to certain websites, and/or out of plan/unauthorized transactions). In some embodiments, service data usage of the ambient activated device is verified by setting a maximum data rate in the policy control agent 1692 and if/when it is determined that the device is exceeding a specified data rate/data usage, then the service data usage is throttled accordingly. In some embodiments, various other verification approaches are used for ambient activation purposes.

In some embodiments, the policy control agent 1692 (and/or another agent/component of the service processor 115 and/or service controller 122) performs a service control algorithm to assist in managing overall network capacity or application QoS (Quality of Service). In some embodiments, the policy control agent 1692 (and/or another agent/component of the service processor 115) performs an access network selection algorithm to determine which access network to connect to based on connection options and determined strengths of available wireless networks, network preference or security settings, service usage cost based network preferences, and/or any other criteria.

Accordingly, as described herein with respect to various embodiments, service usage or service activities can be measured by various agents at various different measurement points, which provides for a more robust verification and integrity of device based services communication. For example, it is much less likely and more difficult to compromise and/or spoof multiple agents. As described herein, various verification and integrity checks are performed, including, for example, network based service usage measurement (e.g., using IPDRs); heartbeat monitoring; agent based heartbeat (e.g., challenge/response queries); agent operating environment protection; monitoring agent communications; agent cross-checks; comparing device based and network based measures (e.g., service usage measures); dynamic software/agent download; and/or any combination of these and various other verification/integrity check techniques described herein and/or apparent from the various embodiments described herein.

In some embodiments, the device 100 is capable of connecting to more than one network and device service policies are potentially changed based on which network the device is connected to at the time. In some embodiments, the network control plane servers detect a network connection change and initiate the service policy implementation established for the second network. In some embodiments, the device based adaptive policy control agent, as described herein (e.g., policy control agent 1692), detects network connection changes and implements the service policies established for the second network.

In some embodiments, when more than one access network is available, the network is chosen based on which network is most preferred according to a network preference list or according to which network that optimizes a network cost function. For example, the network preference list can be pre-established by the service provide and/or the user and/or later modified/adjusted by either the service provider and/or the user. For example, the cost function can be based on determining a minimum service cost, maximum network performance, whether or not the user or device has access to the network, maximizing service provider connection benefit, reducing connections to alternative paid service providers, and/or any other cost related criteria for network selection purposes.

In some embodiments, the device 100 detects when one or more preferred networks are not available, implements a network selection function or intercepts other network selection functions, and offers a connection to the available service network that is highest on a preference list. For example, the preference list can be set by the service provider, the user and/or the service subscriber. In some embodiments, a notification is provided to the device/user when the device is not connected to a network (e.g., indicating in a pop-up/bubble or other UI based display a notification, such as "You are not connected to the network. Click here to learn more, get free trial, use a session, sign-up for service"). In some embodiments, the notification content can be determined based on usage service patterns, locally stored and/or programmable logic on the device and/or a server (e.g., device reports that user is not connected and WWAN is available). Decisions on what bubble to present when may be in pre-stored logic on device.

In some embodiments, service policies are automatically adapted based on the network to which device 100 is connected. For example, the device can be a cellular communication based device connected to a macrocell, a microcell, a picocell, or a femtocell (e.g., femto cells generally provide a low power, small area cellular network used, for example, in homes or offices, which, for example, can be used as an alternative to Wi-Fi access). In some embodiments, service monitoring agent 1696 and/or billing agent 1695 modify service usage counting and/or billing based on whether the device is connected to a macrocell, microcell, picocell or femtocell. In some embodiments, the device recognizes which type of network it is currently connecting to (e.g., looking up in a local or network table for the current base station connected to, and/or the information is broadcast to the device upon the connection with the base station), that is, whether it is a macrocell, microcell, picocell or femtocell. In other embodiments, the device does not recognize which type of network it is currently connected to, but reports its current base station, and the network uses a network lookup function to determine which type of network it is connected to. In some embodiments, the device adjusts the billing based on the type of network it is connected to, or in other embodiments, the device calculates an offset to such billing based on the type of network it is connected to, and/or in other embodiments, the device records such service usage associated with the type of network it is connected to and the network billing can adjust the billing accordingly. For example, the billing can be lower for service data usage over a femtocell versus a macrocell. In some embodiments, service policies are adjusted based on the type of network that the device is connected, such as billing, user notification, data usage/bandwidth, throttling, time of day, who owns the cellular network connection (e.g., user's home femtocell, or user's work femtocell, or a commercial business's femtocell like a coffee shop or any other common area like an airport) and/or any other service policy can be different for a femtocell connection (or for any other type of connection, such as a macrocell, microcell, or picocell). In some embodiments, the local service usage counter is adjusted based on the type of network (and/or based on the time of day of such service activity) that the device is connected, such as billing, user notification, data usage/bandwidth, and/or any other service policy can be different for a femtocell connection (or for any other type of connection, such as a macrocell, microcell, or picocell). In some embodiments, the service policies and/or billing policies are adjusted based on network congestion.

In some embodiments, if adaptive service policy control is not required, then the policy control agent 1692 can simply pass instantaneous service policy settings directly to the agents responsible for implementing instantaneous service policies.

In some embodiments, a policy implementation agent 1690 implements traffic shaping and QoS policy rules for the device 100. In some embodiments, the policy implementation agent 1690 provides a firewall function. In some embodiments, the policy implementation agent 1690 performs traffic inspection and characterization. In some embodiments, packet inspection is aided by literal or virtual application layer tagging while in other embodiments packet inspection is performed entirely in/by the policy implementation agent 1690. In some embodiments, the policy implementation agent 1690 accepts service policy implementation settings from the policy control agent 1692 or directly from the service controller 122. More detail on specific embodiments for the policy implementation agent 1690 is provided below with respect to the figures associated with communication stack and communication protocol flow.

In some embodiments, the burst size, buffer delay, acknowledgement delay and drop rate used in upstream and downstream traffic shaping are optimized with the goal of reducing access network traffic overhead, and excess capacity usage that can result from mismatches in traffic transmission parameters with the access network MAC and PHY or from excess network level packet delivery protocol re-transmissions. In some embodiments, the application interface agent 1693 is used to literally tag or virtually tag application layer traffic so that the policy implementation agent(s) 1690 has the necessary information to implement selected traffic shaping solutions. As shown in FIG. 16, the application interface agent 1693 is in communication with various applications, including a TCP application 1604, an IP application 1605, and a voice application 1602.

In some embodiments, downstream literal or virtual application tagging are delayed until a traffic flow passes through the service policy implementation functions and to the application interface function where the service flow is then identified and associated with the underlying traffic and application parameters, and the literal or virtual tag is then communicated to the first policy implementation function or service monitoring function in the downstream traffic processing stack. In some embodiments, prior to being associated with a literal or virtual tag, the traffic flow is allowed to pass with no traffic shaping, and once the traffic flow is identified and tagged, the appropriate traffic shaping is applied. In some embodiments, a set of traffic shaping policy parameters are applied to the unidentified traffic flow before the flow is identified, and then the traffic shaping policy for the flow is updated when the flow is tagged. In some embodiments, the traffic flow can be blocked at the application interface agent even before the tag is passed to the policy implementation functions if it is found to be associated with traffic parameters that are blocked by policy once packet processing, framing and encryption are removed.

In some embodiments, a service monitor agent 1696 records and reports device service usage or service activities of device 100. In some embodiments, service usage history is verified by a number of techniques including verifying against network based service usage history (e.g., device service history 1618) and the various service policy implementation techniques as described herein.

In some embodiments, the service monitor agent 1696 includes the capability to filter service usage history reporting with the decision on which aspects of service history to report being determined by policies including possibly privacy policies defined by the device user or control plane servers in the network. In some embodiments, the service monitor agent 1696 monitors and possibly records or reports Customer Resource Management (CRM) information such as websites visited, time spent per website, interest indications based on website viewing, advertisements served to the device, advertisements opened by the user, location of the user, searches conducted by the user, application usage profile, device user interface usage history, electronic commerce transactions, music or video files played, applications on device, and/or when the user is actively working or playing or inactive. In some embodiments, to protect the privacy of this user CRM information, the user is provided with options on how much of the information to share and the user's response to the options are recorded and used to determine the filtering policy for how much of the CRM data to report (e.g., CRM filter level options selected by the user via the device UI and/or via various service plan or service profile or service policy options) and how much to suppress or to not even monitor/record/store in the first place. In some embodiments, to protect the privacy of this user's GPS/location tracking related information, the user is provided with options on how much of the information to share and the user's response to the options are recorded and used to determine the filtering policy for how much of the GPS/location tracking related data to report (e.g., GPS/location tracking filter level options) and how much to suppress or to not even monitor/record/store in the first place. In some embodiments, the service processor 115 allows the user to provide feedback on the user's preferences, such as for privacy/CRM data to report. In some embodiments, the user can also specify their preference(s) for notification (e.g., related to service usage/cost, traffic reporting and other service usage/monitored information) and/or service controls. In some embodiments, the service monitor agent 1696 observes and possibly records or reports service usage categorized by network possibly including roaming networks, paid service networks or free service networks. In some embodiments, the service monitor agent 1696 observes and possibly records or reports service usage categorized by sub-accounts for various types of traffic or various types of network.

For example, service monitor reports can be provided to the service controller 122. Service is monitored through various embodiments that can involve service usage logging or traffic inspection and usage logging at the application level, various levels in the networking communication stack or the access modem. Some embodiments involve multiple levels of service or traffic measurement at various levels in the communications stack as described further below.

In some embodiments, service or traffic monitoring includes monitoring one or more of the following: traffic associated with one or more users; traffic downstream and/or upstream data rate; total traffic received and/or transmitted over a period of time; traffic transmitted and/or received by IP addresses, domain names, URLs or other network address identifiers; traffic transmitted and/or received by email downloads or uploads; traffic transmitted and/or received by an application; traffic transmitted and/or received by network file transfers; traffic transmitted and/or received by file download or upload content types; traffic transmitted and/or received by mobile commerce transactions; traffic transmitted and/or received by one or more time periods; traffic transmitted and/or received by differing levels of network activity and network capacity availability; traffic transmitted and/or received by one or more delivered levels of quality of service; traffic transmitted and/or received by software downloads; traffic transmitted and/or received by application downloads; traffic transmitted and/or received by one or more activities associated with the service control plane link or other network related functions, or traffic that may not directly result in service usage or service activity that the user values or desires; traffic transmitted and/or received to support one or more service provider third party service partner offerings; software usage history; application usage history; device discovery history for UI components, applications, settings, tutorials; ads served history; ads visited history; and/or device location history.

In some embodiments, some or all of the service usage monitoring occurs at the application layer. In some embodiments, the service monitor agent 1696 implements traffic inspection points between the applications and the networking stack application interface, such as the sockets API. In other embodiments, the application interface agent 1693 performs traffic inspection and reports the results to the service monitor agent 1696. Traffic inspection can be accomplished in several ways, including, for example, implementing a T-buffer at each socket connection and feeding the side traffic into a traffic flow analyzer, which in combination with a mapping of application to socket provides much of the information listed above. In cases in which it is necessary to obtain traffic information from the application itself, some embodiments call for the application to be adapted to provide the information to either the application interface agent 1693 or the service monitor agent 1696. As an example, the application interface agent 1693 or the service monitor agent 1696 can monitor and decode advertisements downloaded via HTTP, but if the browser and HTTP server employ security above the sockets protocol stack layer then the application interface agent can communicate with the browser via a java applet or some other inter-process communication method. In some embodiments, the service monitor agent 1696, the billing agent 1695 and/or the policy control agent 1692 (or some other software or hardware function on the device) can monitor and/or control (e.g., allow, block and/or replace) advertisement traffic flow into the device. In some embodiments, the monitoring and control of advertisement traffic flow into the device is also used for bill by account purposes (e.g., charges, such as service charges, billed to the advertiser, sponsor, and/or service or transactional service provider).

In some embodiments, some or all of the service usage monitoring occurs below the application interface for the networking stack. In this case, some portion of the information listed above may not always be available due to encryption applied at the higher layers and/or the computational costs associated with performing deep packet inspection on mobile devices.

In some embodiments, the service monitor agent 1696 is also monitors the operating software install or loading systems, and/or otherwise monitors software installs or loads and/or software uninstalls/deinstallations.

Some of the information above may be considered by some users, advocacy groups or agencies as customer sensitive personal information. Simply sending the above information to the network for unspecified purposes may not, therefore, be acceptable for some service providers. However, if the user provides specific approval (e.g., informed consent) for the device, network or service provider to use some or all of the information that may be sensitive for specified purposes, then the user can control the level of information that is used and the purpose the information is used for. Accordingly, various embodiments described herein provide the user with control of what information is used and the purposes it is used for thereby allowing the user adequate control of any such sensitive information. In some embodiments, information that is thought to perhaps be sensitive and is reported to the network must first receive user approval for the reporting. Some basic information is generally not considered sensitive and is necessary for certain basic service provider needs. For example, total data transmitted and/or received, traffic downstream and/or upstream speed, overall traffic usage by time of day are generally not considered private from the service provider's perspective and are necessary in many basic service policy implementations. As additional examples, perhaps other service usage history, such as total traffic email downloads and uploads but not the type of files or any specifics about the email traffic, the total web browsing traffic but nothing specific about the sites visited or content viewed, total file transfer traffic but not the type of files transferred or the addresses involved in the transfer, and other examples may not be viewed as private and, in some embodiments, provide valuable information for the service provider to manage services. Conversely, information such as websites visited, content viewed, mobile commerce transactions completed, advertisements visited, GPS location history and other service usage history the service monitor is capable of recording may be sensitive or private for some users and would thereby benefit from the various embodiments that provide enhanced user control of the reporting of such potentially sensitive or private data. It should also be appreciated that there is an inherent advantage to implementing traffic monitoring, traffic, service monitoring or service control on a device, because it is not necessary to report sensitive information to the network to accomplish many of these service policy implementation objectives.

In some embodiments, the service monitor agent 1696 assists in virtual application tagging of traffic flows through the networking stack policy implementation by tracking the virtually tagged packets through the stack processing and communicating the flow tags to the service policy implementation agent(s) 1690. In some embodiments, the service monitor agent 1696 maintains a history and provides reports or summary reports of which networks in addition to the networks controlled by the service controller 122 to which the device has connected. In some embodiments, this network activity summary includes a summary of the networks accessed, activity versus time per connection, and/or traffic versus time per connection. In some embodiments, the traffic reports that go to the network, possibly to service controller 122, billing system 1619 and/or device service history 1618, are first filtered according to rules defined by user preference selection at the time of service activation (e.g., service plan/service plan option selection), time of first device use, at a time the user selected the option on the service UI or at a time the user chose to change the option on the service UI or some other time/mechanism allowing for user preference selection.

In some embodiments, the service monitor agent 1696 monitors application usage (e.g., which application the user executes on the device 101, such as e-mail applications, web browsing applications and/or media content streaming applications). In some embodiments, the service monitor agent 1696 monitors multimedia file usage (e.g., based on multimedia file type and/or based on specific multimedia files, such as specific movies and/or songs). In some embodiments, the service monitor agent 1696 monitors the device user interface, application, and content discovery history (e.g., monitoring which applications/content the user accesses from the device, including monitoring the pattern by which the user accesses such applications/content, such as how the user navigates the user interface on the device to access such applications/content and maintaining such patterns and history, such as which icons the user access on a home page, secondary or other portion/mechanism on the device for accessing various applications/content). In some embodiments, the service monitor agent 1696 monitors advertisements provided to the user on the device 101. In some embodiments, the service monitor agent 1696 monitors advertisements viewed (e.g., accessed, such as by clicking on a web advertisement) by the user on the device 101. In some embodiments, the service monitor agent 1696 monitors GPS/location information for the device 101. As will be appreciated by those of ordinary skill in the art, the service monitor agent 1696 can monitor a wide variety of activities performed by the device/user of the device and/or based on other information related to the device 101 such as GPS/location information. As described herein, in some embodiments, the user of the device 101 can also specify which activities that the user authorizes for such monitoring (e.g., the user may prefer to not allow for such GPS/location monitoring).

In some embodiments, the application interface agent 1693 provides an interface for device application programs. In some embodiments, the application interface agent 1693 identifies application level traffic, reports virtual service identification tags or appends literal service identification tags to assist service policy implementation, such as access control, traffic shaping QoS control, service type dependent billing or other service control or implementation functions. In some embodiments, the application interface agent 1693 assists with application layer service usage monitoring by, for example, passively inspecting and logging traffic or service characteristics at a point in the software stack between the applications and the standard networking stack application interface, such as the sockets API. In some embodiments, the application interface agent 1693 intercepts traffic between the applications and the standard network stack interface API in order to more deeply inspect the traffic, modify the traffic or shape the traffic (e.g., thereby not requiring any modification of the device networking/communication stack of the device OS). In some embodiments, the application interface agent 1693 implements certain aspects of service policies, such as application level access control, application associated billing, application layer service monitoring or reporting, application layer based traffic shaping, service type dependent billing, or other service control or implementation functions.

In some embodiments, application layer based traffic monitoring and shaping can be performed as described below. The traffic from each application can be divided into one or more traffic flows that each flow through a traffic queue, with each queue being associated with one or more additional classifications for that application (e.g., the application can be a browser that is associated with multiple queues representing different destinations or groups of destinations it is connected to, with each destination or group of destinations having potentially different access control or traffic control policies, or the application can be associated with different content types or groups of content types with each content type having different queues, the application might be an email program with email text traffic going to one queue and downloads going to another with different policies for each). In some embodiments, queues are formed for all applications or groups of applications that are associated with one or more traffic parameters such as destination, content type, time of day or groups of applications can be similarly assigned to different queues. The functions performed by the application layer queues can be similar to the functions described for the policy implementation agent, such as pass, block, buffer, delay, burst in order to control the traffic or network access associated with the queue. The drop function can also be implemented, such as for application layer protocols that include reliable transmission methods, but if the application layer protocol does not involve reliable retransmission of lost information this can result in lost data or unreliable communication which may be acceptable in some cases. The manner in which the queues are controlled can be constructed to result in a similar approach for controlling services or implementing service activity control similar to the other embodiments described herein, including, for example, the policy control agent 1692 implementing an higher layer of service control to achieve a higher level objective as discussed herein.

In some embodiments, the application interface agent 1693 interacts with application programs to arrange application settings to aid in implementing application level service policy implementation or billing, such as email file transfer options, peer to peer networking file transfer options, media content resolution or compression settings and/or inserting or modifying browser headers. In some embodiments, the application interface agent 1693 intercepts certain application traffic to modify traffic application layer parameters, such as email file transfer options or browser headers. In some embodiments, the application interface agent 1693 transmits or receives a service usage test element to aid in verifying service policy implementation, service monitoring or service billing. In some embodiments, the application interface agent 1693 performs a transaction billing intercept function to aid the billing agent 1695 in transaction billing. In some embodiments, the application interface agent 1693 transmits or receives a billing test element to aid in verifying transaction billing or service billing.

In some embodiments, a modem firewall 1655 blocks or passes traffic based on service policies and traffic attributes. In some embodiments, the modem firewall 1655 assists in virtual or literal upstream traffic flow tagging. Although not shown in FIG. 16, in some embodiments, the modem firewall 1655 is located on either side of the modem bus and in some embodiments it is advantageous to locate it on the modem itself.

In some embodiments, the billing agent 1695 detects and reports service billing events. In some embodiments, the billing agent 1695 plays a key role in transaction billing. In some embodiments, the billing agent 1695 performs one or more of the following functions: provides the user with service plan options, accepts service plan selections, provides options on service usage notification policies, accepts user preference specifications on service usage notification policies, provides notification on service usage levels, provides alerts when service usage threatens to go over plan limits or to generate excess cost, provides options on service usage control policy, accepts choices on service usage control policy, informs policy control agent 1692 of user preference on service usage control policy, provides billing transaction options and/or accepts billing transaction choices. In some embodiments, the billing agent 1695 interacts with transaction servers (e.g., open content transaction partner sites 134) to conduct ecommerce transactions with central billing 1619.

In some embodiments, service processor 115 includes one or more service usage or service activity counters. For example, the service monitor agent 1696, billing agent 1695 or a combination of these agents and/or other agents/components of service processor 115 can include such a local service usage counter(s) for the device 101. In some embodiments, a service usage counter monitors service usage including data usage to/from the device 101 with the access network 1610. In some embodiments, the service usage counter periodically, in response to a user request, in response to a service processor 115 agent's request (e.g., the billing agent 1695, the policy control agent 1692, or another agent of service processor 115), in response to the service controller 122, and/or in response to the central billing 1619 (e.g., for billing purposes and/or for storing in the device service history 1618), provides a service usage report, including monitored service usage for the device 101. In some embodiments, the service usage counter periodically, or in response to a request, synchronizes the service usage counter on the device 101 with a network (and/or billing) service usage counter, such as that maintained potentially at central billing 1619. In some embodiments, service processor 115 utilizes the service usage counter to provide a service usage projection. In some embodiments, service processor 115 utilizes the service usage counter to provide a service usage cost estimate. In some embodiments, service usage projections from policy control agent 1692 are used to estimate the projected future service usage if user service usage behavior remains consistent. In some embodiments, service processor 115 utilizes the service usage counter to provide a cost of service usage, and the service processor 115 then periodically, or in response to a request, synchronizes the cost of service usage with, for example, the central billing 1619. In some embodiments, the service processor 115 utilizes the service usage counter to determine whether the user is exceeding and/or is projected to exceed their current service plan for data usage, and then various actions can be performed as similarly described herein to allow the user to modify their service plan and/or modify (e.g., throttle) their network data usage. In some embodiments, the service usage counter can support providing to the user the following service usage related data/reports: service usage, known usage and estimated usage, projected usage, present costs, projected costs, cost to roam, cost to roam options, and/or projected roaming costs. For example, including a local service data usage counter on the device 101 allows the service processor 115 to more accurately monitor service data usage, because, for example, network (and/or billing) service usage counters may not accurately also include, for example, control plane data traffic sent to/from the device 101 in their monitored service data usage count.

In some embodiments, verifiable device based service billing solutions are provided. For example, as described herein, various device based service billing solutions can include a wide range of verification techniques to ensure that the device is properly reporting service billing events (e.g., to verify/ensure that the service billing is not malfunctioning and/or has not been tampered with/compromised such that it is not accurately or timely providing service billing information). As described herein, service billing generally refers the billing for one or more services for a device, such as device 101 (e.g., email service billing for data usage associated with received/sent email related data over the access network 1610, web browsing service billing for data usage associated with received/sent web browsing related data over the access network 1610 and/or any other network based service, and/or any transactional based services, such as for multimedia content purchases or other transactions).

In some embodiments, verifiable device based service billing is provided by sending dummy(/test) billing events, such as having an access control integrity server 1654 of the service controller 122 instruct the access control integrity agent 1694 to send a dummy(/test) billing event to the billing agent 1695. If the billing agent does not then send the expected report, which should reflect the dummy(/test) (or fails to timely send any report), then the system can verify whether the billing process is working properly. In addition, a dummy(/test) transaction can be used to verify transaction based billing through a variety of approaches (e.g., the access control integrity agent 1694 can similarly send a dummy(/test) transactional billing event to the billing agent 1695 as a test to determine whether the billing agent 1695 then provides the expected report reflecting that dummy(/test) transaction). For example, the test billing events can be trapped by a device assisted billing mediation server and removed from the user account billing.

In some embodiments, verifiable device based service billing is provided by sending one or more data bursts to the device to confirm that data was received and to confirm that the service monitor agent 1696 properly logged the data burst(s) in the local service usage or service activity counter. In some embodiments, data bursts can be used to verify data throttling (e.g., if the device has exceeded service data usage limits and/or is approaching such limits such that service data usage should be throttled, then sending data bursts can be used to verify whether the expected throttling is properly being performed on the device). In some embodiments, verifiable device based service billing is provided by submitting requests to connect to an unauthorized service/website to verify if that unauthorized service usage is properly blocked. In some embodiments, verifiable device based service billing is provided by submitting requests to perform an unauthorized transaction to verify if that unauthorized transaction is properly blocked.

In some embodiments, verifiable device based service billing is provided by verifying device service activities relative to IPDRs for the device. In some embodiments, the IPDRs for the device (possibly in a modified format) are periodically and/or upon request sent to the device, as described herein.

For example, IPDRs for the device can be compared to the device's local service data usage counter and/or to the service plan for the device to determine if the overall service data usage limit has been exceeded, whether out of plan/unauthorized/unrecorded websites/other services have been performed by the device, whether service plan/profile bandwidth limits have been exceeded, whether out of plan/unauthorized/unrecorded transactions have been performed (e.g., verifying IPDR transaction logs, assuming such are included in the IPDRs, with the local transaction logs of the device to determine, for example, whether the local device records indicate that fewer than the network recorded number of content downloads, such as downloaded songs, were purchased), and/or whether any other activities verifiable based on a comparison of IPDRs indicate that the device has been used in any manner that is out of or exceeds the service plan/profile for the device.

In some embodiments, device based service billing includes recording billing option response history. For example, this approach can be particularly important for service plan overage conditions (e.g., when the use of the device is exceeding the service plan associated with the device in some manner, such as service data usage, bandwidth, service or transaction access and/or in some other manner). In some embodiments, in a service plan overage condition, the user is requested to confirm that user has acknowledged notification of service plan overage, such as via the user interface 1697. In some embodiments, such service plan overage acknowledgements require that the user enter a unique identification to validate authorization by the user identity associated with the device (e.g., another type of verification mechanism, in the event a device is stolen or being used by someone other than the authorized user of the device, then that unauthorized user would not be able to confirm the service plan overage acknowledgement, and appropriate actions can then be taken, such as throttling, quarantining or (temporarily) suspending service/network access). In some embodiments, if the device is compromised/hacked (e.g., by the user of the device), and the device is used in a manner that results in a service usage overage (e.g., determined based on device assisted service usage monitoring, and/or network based service usage monitoring using IPDRs/CDRs), then the billing system determines billing for such service usage overage costs. This overage billing can be initiated by the device 100 (e.g., service processor 115), the service controller 122, the billing system 123, the AAA 121, or some other network function. In some embodiments, if the device is compromised/hacked (e.g., by a user of the device), and the device is used in a manner that results in a service usage overage, one or more of the following actions is taken: the user is notified, the user is required to acknowledge the notification, the device traffic is sent to SPAN (or similar traffic sampling and analysis function), and/or the device is flagged for further analysis.

In some embodiments, device based service billing includes an option to bill by account, such as to bill different service activities and/or transactions to a specified account (e.g., other than the user's account associated with the general service plan for the device). For example, bill by account can provide for billing according to application, content type, website, transaction, network chatter (e.g., heartbeat communications and/or other network traffic that is used by, for example, the central/service provider to generally maintain network access for the device), and/or transaction partner sponsored activities and then report such bill by account information for billing mediation/reconciliation. For example, a bill by account report can be sent by billing agent 1695 from the device to central billing 1619 (e.g., as a billing event); or alternatively, sent to an intermediate server/aggregator, which can then reformat and send the reformatted report to central billing 1619 (e.g., providing the billing report in a format required by central billing 1619); or alternatively, sent to a mediation server, which can re-compute the billing based on the bill by account report (e.g., offset the bill based on network chatter, transaction based billing, transaction partner sponsored activities, content providers, website providers and/or advertising providers) and then send the recomputed (and potentially reformatted) report to central billing 1619.

In some embodiments, one or more of the mediation/reconciliation functions for device assisted billing, device generated billing events, device generated bill by account events and device generated open transaction billing events can be implemented in the service controller 122 (e.g., the billing event server 1662) or in another function located in the billing system 123 or elsewhere. This billing mediation server function accepts the device based billing events discussed immediately above, reformats the billing events into a format accepted and recognized by the billing system, mediates the billing event information to remove service usage billing from the user account and place it in other bill by account categories as appropriate according to the bill by account mediation rules, adds other billing events for service usage or transactions to the user account as appropriate according to the device based billing rules, and then applies the information to the billing information the user account to correct or update the account.

For example, a bill by account can allow for a website provider, such as Google or Yahoo, to pay for or offset certain account usage for web browsing, web based searching, web based email, or any other web based or other service usage activities, which may also be based (in whole or in part) on the activities performed by the user on such transactional services (e.g., based on advertisement viewing/accessing or click-through activities by the user, by which an advertisement business model used by such website providers directly or indirectly supports such service account subsidies). As another example, a bill by account can allow for an advertiser to pay for or offset certain account usage for viewing and/or accessing (e.g., clicking through) a web placed advertisement or other advertisement sent via the network to the device. As yet another example, various network chatter (e.g., heartbeat related network and other network chatter related service data usage) can be assigned to a dummy account and such can be used to offset the bill and/or used for tracking the data usage for such activities for the device. In another example, service data usage for access to a transactional service, such as a multimedia content download service (e.g., music, eBook, music/video streaming, and/or movie or other multimedia content download service), or an online shopping site (e.g., Amazon, eBay or another online shopping site), can be billed to a transactional service account assigned to a transactional service partner that sponsors access to that sponsor's transactional service, thereby allowing that transactional service partner to pays for or offset (e.g., subsidize) the account usage for such activities, which may also be based (in whole or in part) on the transactions actually performed by the user on such transactional services (e.g., based on the volume/cost of the multimedia service download purchases by the user and/or online activities).

In some embodiments, device based service billing includes recording billing events on the device and then reporting such billing to the network (e.g., central billing 1619). In some embodiments, device based service billing includes reporting service usage events and/or applying cost look-up and logging/reporting service billing updates. For example, this allows for reporting not only service usage but also cost of such service usage to the user via the user interface of device 101. Also, for example, the cost of such service usage can also be reported to the billing server. In some embodiments, device based service billing includes reporting service usage to the network, and the network determines the cost for such service usage.

In some embodiments, billing information for roaming partners is provided. For example, a roaming server can include a roaming service cost data table for roaming service partners. In this example, when the device (e.g., device 101) connects to a roaming network provided by a roaming service partner, then the device can also receive the roaming service data rate based on the roaming service cost data table provided by the roaming server. Alternatively, the roaming server can send the roaming service cost data table (or a modified format of the same) to the device thereby allowing the device to determine the costs for such roaming network service usage or service activity. As described herein, the device can also automatically use a roaming service profile when connecting to the roaming network service and/or the user can be notified of the roaming service profile options based on the roaming service data costs and then select the desired roaming service profile accordingly.

In some embodiments, the user is provided with a list of service costs based on locally stored roaming table and a search of available roaming partners that the device 100 detects and can connect to. In some embodiments, the user is provided with a projected cost per day for one or more roaming service provider options based on typical service usage history and the cost for each service provider. In some embodiments, the user is provided with a set of options for service usage notification, controlling or throttling service usage and/or cost while roaming (e.g., using the service notification and cost control techniques as similarly discussed herein but applied to the roaming network). In some embodiments, these controls are set by a VSP (or, e.g., an IT manager using VSP functions). In some embodiments, roaming tables are updated periodically in the background while on a home network (or other low cost network) and cached. In some embodiments, cache updates occur based on fixed time period (e.g., late at night when updates are less expensive due to network inactivity). In some embodiments, the roaming partner cost table cache updates are done whenever connected to a desirable network that is not as expensive or bandwidth constrained (e.g., at home, work, or off the WWAN). In some embodiments, updates occur at time of day that network is not busy. In some embodiments, updates occur based on network push when roaming table is changed (e.g., one or more of the roaming partners changes the rate). In some embodiments, the service cost to update the roaming service cost table is charged to bill by account and possibly not charged to end user. In some embodiments, the roaming service center is provided as a service that is paid for (e.g., potentially bill by account tracks all related costs). For example, this type of roaming cost control can be provided as a service through central provider, MVNO, roaming partner provider, VSP or as a third party application not associated with any service provider (e.g., IT manager). For example, the controls for how to update cache, set service control policies, and other controls can be defined by any number of VSP entities including the user through a website service.

In some embodiments, a roaming service center is provided as a service in which, for example, the user is provided with a list of service costs based on a locally stored (or remotely accessed) roaming table. In some embodiments, the roaming service center provides the user with a projected cost per day for one or more roaming service provider options based on typical service usage history and the cost for each service provider. In some embodiments, the roaming service center provides the user with a set of options for controlling/throttling usage and/or cost while roaming. In some embodiments, these controls are set by a VSP (e.g., an IT manager using VSP functions). For example, roaming tables can be updated periodically in the background while on a home network and cached. In some embodiments, cache updates occur based on a fixed time period. In some embodiments, the roaming partner cost table cache updates are done whenever the device is connected to a desirable network that is not as expensive or bandwidth constrained (e.g., at home, work and/or off the WWAN). In some embodiments, updates occur at time of day that network is not busy. In some embodiments, updates occur based on a network push when a roaming table is changed (e.g., one or more of the roaming partners changes the rate). In some embodiments, the service cost to update the roaming service cost table is charged to bill by account and possibly not charged to the user. In some embodiments, the roaming service center is provided as a service that is paid for by the user and/or part of a service plan. In some embodiments, a bill by account function tracks all related costs. For example, the roaming service center can be provided as a service through central provider, MVNO, roaming partner provider, VSP or as a third party application not associated with any service provider (e.g., IT manager).

In some embodiments, a synchronized local service usage counter based on time stamped central billing information is provided. For example, the local service usage counter, as similarly described above, can also be synchronized to past service usage records (e.g., time stamped central billing records of service usage for the device) and use local estimates for current/present service usage estimates for the device. In this example, the central billing system (e.g., central billing 1619) can push the time stamped central billing information to the device (e.g., device 101), the device can pull the time stamped central billing information, and/or an intermediate server can provide a mediated push or pull process. In some embodiments, synchronization is performing periodically based on service usage levels with free-running estimates between synchronizations.

In some embodiments, service usage is projected based on calculated estimates of service usage based on synchronized service usage and local service usage count information. For example, projected service usage can be calculated on the device or calculated on a server (e.g., a billing server or an intermediate billing server), which provides the calculated projected service usage information to the device, such as using various adaptive algorithms for service usage projections. For example, an adaptive algorithm can use historical/past synchronized network service usage information (e.g., synchronized with local service usage data based on time stamps associated with IPDRs) to assist in service usage projections, based on, for example, total service usage count, service usage count by certain service related criteria (e.g., application, content, service type, website and/or time of day). In another example, an adaptive algorithm synchronizes to past service usage data (e.g., the local estimate of past service usage data is updated to be synchronized up through the point in time associated with the latest IPDR time stamp that has been received) and current local estimates of service usage collected since the latest time stamp are then added to the time stamped IPDR service usage counter to minimize the service usage counter offset so that it is no greater than the difference between the network service usage measure and the local service usage measure since the latest IPDR time stamp. In some embodiments, these adaptive algorithm techniques are performed on the device and/or performed on the network (e.g., on a network server) for processing. In some embodiments, if there is an offset in the local device based service usage count between IPDR synchronization events and the IPDR service usage count between IPDR synchronization events, then an algorithm can be employed to estimate any systematic sources for the offset and correct the local service usage count to minimize the offsets. As an example, if the IPDR service usage count is typically off by a fixed percentage, either high or low, then an algorithm can be employed to estimate a multiplier that is applied to the local service usage count to minimize the offset between IPDR service usage synchronization events. In another example, there can be a consistent constant offset and a multiplier offset, both of which can be estimated and corrected for. Those of ordinary skill in the art will appreciate that more sophisticated algorithms can be employed to estimate the nature of any systematic offsets, including, for example, offsets that occur due to specific service usage activities or network chatter to manage the device, and such offsets can then be minimized between IPDR service synchronization events. In some embodiments, synchronized service usage data is used to create an improved analysis of the statistical patterns of service usage to provide more accurate service usage projections. Those of ordinary skill in the art will also appreciate that a variety of additional adaptive algorithm techniques can be used including those that provide for various statistical analysis techniques and/or other techniques.

In some embodiments, service usage is projected for the end of a billing/service period for a service plan versus the service usage allowed under the service plan for that billing/service period. A display of excess charges is also provided for the projected rate of service usage based on the monitored service usage behavior through the end of the billing/service period (e.g., this can be zero if the service usage is projected to be less than that allowed under the service plan and a positive cost number if it is projected to be more than the service plan). For example, this can be implemented in numerous ways, such as on a server in the network, on a gateway/router/switch in the network, and/or on the device, as discussed below and generally described herein with respect to other service/cost usage monitoring and notification embodiments. If implemented in the network server or gateway/router/switch, then the service/cost usage projections and related information can be pushed to the device, or the device can be notified that such information is available to pull and/or periodically pushed/pulled. The service usage information/estimates can be collected from the device, the network or both (e.g., reconciled and/or synchronized) as similarly described herein. The service usage information/estimates are then analyzed to determine service usage/cost projects as similarly described herein and compared to the service plan for the device to determine the projected service/cost usage overage (if any). In some embodiments, one or more of the following are determined by, reported to and/or displayed on the device: service usage value, projected service usage value, service usage plan limit, projected service usage overage, projected service cost overage, service plan period time duration, service plan time remaining before end of period and/or other pertinent information.

In some embodiments, the device also determines service costs based on the synchronized service usage count thereby allowing the device to also report the service cost information to the user. For example, the device can locally store a service cost look-up table(s), locally store different service cost look-up tables for different networks and/or for roaming networks, and/or request such information from a billing or intermediate billing server (and/or a roaming server) on the network. As another example, the device can obtain the calculated service costs based on the synchronized local service usage count and/or network service usage count from an intermediate server (e.g., a billing or intermediate billing server) thereby offloading the computational costs associated with calculated these projections and the data storage for service cost lookup tables onto the intermediate server on the network using the network service usage counter with or, alternatively, without the synchronized local service usage counter.

In some embodiments, service usage count categorization by network (e.g., a home network (such as a Wi-Fi, WAN, femtocell or other home network) versus a roaming network) is provided. Similarly, the synchronized local service usage counter can be synchronized by network. Also, a synchronized local service usage count for networks controlled by a central provider, for networks controlled by other providers (e.g., MVNO), and/or free networks can similarly be provided.

In some embodiments, a service notification and billing interface is provided. For example, service usage and projected service usage, such as described herein, can be displayed to the user of the device (e.g., via user interface 1697). Similarly, expected/projected service or cost overrun/overage, such as described herein, can also be displayed to the user. As another example, a most cost effective plan can be determined/projected based on historical and/or projected service usage, and this determined/projected most cost effective plan can be displayed to the user. In yet another example, a list of available networks accessible by the device can be displayed to the user. In this example, one or more undesired available networks can also be blocked from display thereby only displaying to the user desired and/or preferred available networks. In this example, service usage plans and/or service usage plan option comparison for one or more alternative networks or roaming networks can also be displayed to the user. Similarly, service cost plans and/or service/cost plan option comparison for one or more alternative networks or roaming networks can also be displayed to the user. In addition, roaming service usage, projected roaming service usage, estimated roaming service cost, and/or projected estimated roaming service cost can also be displayed to the user. These roaming service usage/costs can also be displayed to the user so that the user can utilize this information for selecting various roaming service billing options. In another example, alternative and/or least cost networks are determined and displayed to the user. In another example, alternative warnings are displayed to the user for any or specified roaming networks.

In some embodiments, the service notification and billing interface notifies the user of expected network coverage (e.g., based on the device's current geography/location and the accessible networks for the device from that current geography/location) and displays options to the user based on the expected network coverage information. In some embodiments, the service notification and billing interface notifies the user of their current service usage at specified service usage points and displays various options to the user (e.g., service usage options and/or billing options). For example, the user's responses to the presented options are recorded (e.g., stored locally on the device at least temporarily for reporting purposes or permanently in a local configuration data store until such configuration settings are otherwise modified or reset) and reported, such as to the billing server (e.g., central billing 1619). For example, user input, such as selected options and/or corresponding policy settings, can be stored locally on the device via a cache system. As another example, the service notification and billing interface displays options to the user for how the user wants to be notified and how the user wants to control service usage costs, the user's input on such notification options is recorded, and the cost control options (e.g., and the billing agent 1695 and policy control agent 1692) are configured accordingly. Similarly, the user's input on service plan options/changes can be recorded, and the service plan options/changes (e.g., and the billing agent 1695 and policy control agent 1692) are configured/updated accordingly. In another example, the service notification and billing interface provides various traffic control profiles, such as for where the user requests assistance in controlling service usage costs (e.g., service data usage and/or transactional usage related activities/costs). Similarly, the service notification and billing interface can provide various notification options, such as for where the user wants advance warning on service coverage. In another example, the service notification and billing interface provides options for automatic pre-buy at a set point in service usage. In another example, the service notification and billing interface provides the option to choose different notification and cost control options for alternative networks or roaming networks.

In some embodiments, an online portal or web server is provided for allowing the user to select and/or update policy settings. For example, user input provided via the online portal/web server can be recorded and reported to the billing server (e.g., central billing 1619). In another example, the online portal/web server can display transaction billing information and/or accept input for a transaction billing request, which can then be reported to the billing server accordingly.

As shown in FIG. 16, the service processor 115 includes a service interface or user interface 1697. In some embodiments, the user interface 1697 provides the user with information and accepts user choices or preferences on one or more of the following: user service information, user billing information, service activation, service plan selection or change, service usage or service activity counters, remaining service status, service usage projections, service usage overage possibility warnings, service cost status, service cost projections, service usage control policy options, privacy/CRM/GPS related options, and/or other service related information, settings, and/or options. For example, the user interface 1697 can collect service usage information from service monitor agent 1696 to update the local service usage counter (and/or, alternatively, the service usage information is obtained from the service controller 122) to update user interface service usage or service cost information for display to the user. As another example, service billing records obtained from central billing system 1619 can be used to synchronize local service usage counters and service monitor agent 1696 information to perform real-time updating of local service usage counters between billing system 1619 synchronizations. As another example, the user interface 1697 can display options and accept user preference feedback, such as similarly discussed above with respect to user privacy/CRM/GPS filtering, traffic monitoring and service controls. For example, the user interface 1697 can allow the user of the device to modify their privacy settings, provide user feedback on service preferences and/or service experiences, modify their service profiles (e.g., preferences, settings, configurations, and/or network settings and options), to review service usage data (e.g., based on local service usage counters and/or other data monitored by the service processor 115), to receive various events or triggers (e.g., based on projected service usage/costs), and/or the user interface 1697 can provide/support various other user input/output for service control and service usage.

In some embodiments, by providing the service policy implementation and the control of service policy implementation to the preferences of the user, and/or by providing the user with the option of specifying or influencing how the various service notification and control policies or control algorithms are implemented, the user is provided with options for how to control the service experience, the service cost, the capabilities of the service, the manner in which the user is notified regarding service usage or service cost, the level of sensitive user information that is shared with the network or service provider entity, and the manner in which certain service usage activities may or may not be throttled, accelerated, blocked, enabled and/or otherwise controlled. Accordingly, some embodiments provide the service control to beneficially optimize user cost versus service capabilities or capacities in a manner that facilitates an optimized user experience and does not violate network neutrality goals, regulations and/or requirements. For example, by offering the user with a set of choices, ranging from simple choices between two or more pre-packaged service control settings options to advanced user screens where more detailed level of user specification and control is made available, some embodiments allow the service provider, device manufacturer, device distributor, MVNO, VSP, service provider partner, and/or other "entity" to implement valuable or necessary service controls while allowing the user to decide or influence the decision on which service usage activities are controlled, such as how they are controlled or throttled and which service usage activities may not be throttled or controlled in some manner. These various embodiments allow the service provider, device manufacturer, device distributor, MVNO, VSP, service provider partner, or other "entity" to assist the user in managing services in a manner that is network neutral with respect to their implementation and service control policies, because the user is making or influencing the decisions, for example, on cost versus service capabilities or quality. By further providing user control or influence on the filtering settings for the service usage reporting or CRM reporting, various levels of service usage and other user information associated with device usage can be transmitted to the network, service provider, device manufacturer, device distributor, MVNO, VSP, service provider partner, and/or other "entity" in a manner specified or influenced by the user to maintain the user's desired level of information privacy.

As shown in FIG. 16, the service processor 115 includes the service downloader 1663. In some embodiments, the service downloader 1663 provides a download function to install or update service software elements on the device. In some embodiments, the service downloader 1663 requires a secure signed version of software before a download is accepted. For example, the download can require a unique key for a particular service downloader 1663. As another example, the service downloader 1663 can be stored or execute in secure memory or execute a secure memory partition in the CPU memory space. Those of ordinary skill in the art will appreciate that there are a variety of other security techniques that can be used to ensure the integrity of the service downloader 1663.

Figure 18:
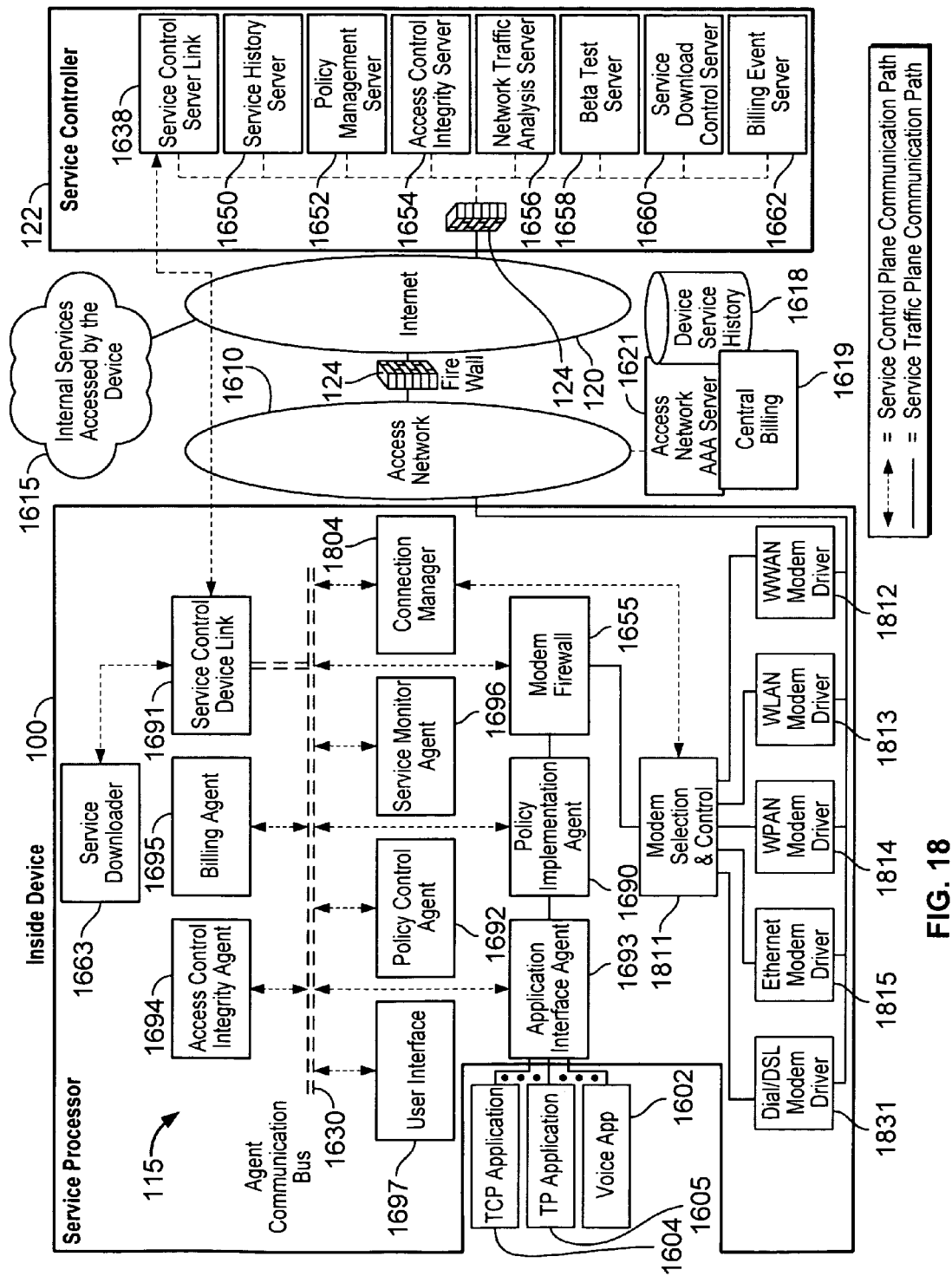
FIG. 18 is another functional diagram illustrating the device based service processor and the service controller in which the service processor controls the policy implementation for multiple access network modems and technologies in accordance with some embodiments.

As shown in FIG. 16, the service processor 115 includes a modem driver 1640. In some embodiments, the modem driver 1640 converts data traffic into modem bus (not shown) traffic for one or more modems via the modem firewall 1655. As shown in FIG. 18, in some embodiments, modem selection and control 1811 selects the access network connection and is in communication with the modem firewall 1655, and modem drivers 1831, 1815, 1814, 1813, 1812 convert data traffic into modem bus traffic for one or more modems and are in communication with the modem selection and control 1811. As shown in FIG. 21, in some embodiments, modems 2141, 2125, 2124, 2123, 2122, which are in communication with the modem bus 2120, connect the device to one or more networks. In some embodiments, different profiles are selected based on the selected network connection (e.g., different service profiles/policies for WWAN, WLAN, WPAN, Ethernet and/or DSL network connections), which is also referred to herein as multimode profile setting. For example, service profile settings can be based on the actual access network (e.g., home DSL/cable or work network) behind the Wi-Fi not the fact that it is Wi-Fi (or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider (e.g., as described herein with respect to FIG. 49) or the service controller can be owned by the hotspot service provider that uses the service controller on their own without any association with an access network service provider. For example, the service processors can be controlled by the service controller to divide up the available bandwidth at the hotspot according to QoS or user sharing rules (e.g., with some users having higher differentiated priority (potentially for higher service payments) than other users). As another example, ambient services (as similarly described herein) can be provided for the hotspot for verified service processors.

In some embodiments, the service processor 115 and service controller 122 are capable of assigning multiple service profiles associated with multiple service plans that the user chooses individually or in combination as a package. For example, a device 100 starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased form the device 100). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email and SMS service. In this case, the service controller 122 would obtain from the billing system 123 in the case of network based billing (or in some embodiments the service controller 122 billing event server 1622 in the case of device based billing) the billing plan code for the new Internet, email and SMS service. In some embodiments, this code is cross referenced in a database (e.g., the policy management server 1652) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device 100 service processor. In some embodiments, the device 100 (service processor 115) can determine the superset profile rather than the service controller 122 when more than one "stackable" service is selected by the user or otherwise applied to the device. The flexibility of the service processor 115 and service controller 122 embodiments described herein allow for a large variety of service profiles to be defined and applied individually or as a superset to achieve the desired device 100 service features.

As shown in FIG. 16, the service controller 122 includes a service control server link 1638. In some embodiments, device based service control techniques involving supervision across a network (e.g., on the control plane) are more sophisticated, and for such it is increasingly important to have an efficient and flexible control plane communication link between the device agents (e.g., of the service processor 115) and the network elements (e.g., of the service controller 122) communicating with, controlling, monitoring, or verifying service policy. For example, the communication link between the service control server link 1638 of service controller 122 and the service control device link 1691 of the service processor 115 can provide an efficient and flexible control plane communication link, a service control link 1653 as shown in FIG. 16, and, in some embodiments, this control plane communication link provides for a secure (e.g., encrypted) communications link for providing secure, bidirectional communications between the service processor 115 and the service controller 122. In some embodiments, the service control server link 1638 provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link 1638 also provides the communications link and heartbeat timing for the agent heartbeat function. As discussed below, various embodiments described herein for the service control server link 1638 provide an efficient and secure mechanism for transmitting and receiving service policy implementation, control, monitoring and verification information between the device agents (e.g., service processor agents/components) and other network elements (e.g., service controller agents/components).

In some embodiments, the service control server link 1638 can employ the counterpart service control plane secure transmission methods discussed above with respect to the service control device link 1691. For example, one or more layers of security can be used to secure the communications link, including, for example, basic IP layer security, TCP layer security, service control link layer security, and/or security specific from service controller servers to service processor agents.

In some embodiments, the service control server link 1638 reduces network chatter by efficiently transmitting service control related communications over the link. For example, the service control server link 1638 can transmit server messages asynchronously as they arrive. As another example, the service control server link 1638 can perform collection or buffering of server messages between transmissions. As another example, the service control server link 1638 can determine when to transmit based potentially on several parameters, such as one or more of: periodic timer trigger, waiting until a certain amount of service usage or traffic usage has occurred, responding to a service agent message, responding to a service agent request, initiated by one or more servers, initiated by a verification error condition, and/or initiated by some other error condition. For example, once a transmission trigger has occurred, the service control server link 1638 can take all buffered agent communications and frame the communications. In addition, the service control server link 1638 can provide for an efficient communication link based on various embodiments related to the timing of transmissions over the service control link, as similarly discussed above with respect to the service control device link 1691 description. For example, the timing functions, such as asynchronous messages or polling for messages, constant frequency transmission, transmission based on how much service usage or data traffic usage has taken place, transmission in response to device side control link message, service verification error events, other error events, and/or other message transmission trigger criteria can be determined, controlled and/or initiated by either the device side or the network side depending on the embodiment.

In some embodiments, the service control server link 1638 provides for securing, signing, encrypting and/or otherwise protecting the communications before sending such communications over the service control link 1653. For example, the service control server link 1638 can send to the transport layer or directly to the link layer for transmission. In another example, the service control server link 1638 further secures the communications with transport layer encryption, such as TCP TLS or another secure transport layer protocol. As another example, the service control server link 1638 can encrypt at the link layer, such as using IPSEC, various possible VPN services, other forms of IP layer encryption and/or another link layer encryption technique.

In some embodiments, the service control server link 1638 includes the agent heartbeat function in which the agents provide certain required reports to the service processor for the purpose of service policy implementation verification or for other purposes. For example, the heartbeat function can also be used to issue queries or challenges, messages, service settings, service control objectives, information requests or polling, error checks and/or other communications to the agents. As another example, agent heartbeat messages can be in the open or encrypted, signed and/or otherwise secured. Additional heartbeat function and the content of heartbeat messages can be provided as similarly described herein, such as described above with respect to the service control device link 1691 and the access control integrity agent 1694 and other sections. In some embodiments, the service controller 122 and/or agents of the service controller 122 are programmed to periodically provide reports, such as upon a heartbeat response (e.g., an agent can repeatedly send necessary reports each heartbeat), and appropriate actions can then be taken based upon such received reports. Accordingly, the heartbeat function provides an important and efficient system in various embodiments described herein for verifying the service policy implementation and/or protecting against compromise events. There are many other functions the agent heartbeat service can perform many of which are discussed herein, while many others will be apparent to one of ordinary skill in the art given the principles, design background and various embodiments provided herein.

In some embodiments, the service control server link 1638 also provides a service control software download function for various embodiments, which, for example, can include a download of new service software elements, revisions of service software elements, and/or dynamic refreshes of service software elements of the service processor 115 on the device. In some embodiments, this function is performed by the service control server link 1638 transmitting the service control software as a single file over the service control link. For example, the file can have encryption or signed encryption beyond any provided by the communication link protocol itself for service control link 1653. In another example, the service control software files can be segmented/divided into smaller packets that are transmitted in multiple messages sent over the service control link 1653. In yet another example, the service control software files can be transmitted using other delivery mechanism, such as a direct TCP socket connection from a service download control server 1660, which can also involve secure transport and additional levels of encryption. In some embodiments, the service control server link 1638 and/or service download control server 1660 use(s) an agent serial number and/or a security key look up when agents are updated and/or when a dynamic agent download occurs.

As shown in FIG. 16, the service controller 122 includes an access control integrity server 1654. In some embodiments, the access control integrity server 1654 collects device information on service policy, service usage, agent configuration and/or agent behavior. For example, the access control integrity server 1654 can cross check this information to identify integrity breaches in the service policy implementation and control system. In another example, the access control integrity server 1654 can initiate action when a service policy violation or a system integrity breach is suspected.

In some embodiments, the access control integrity server 1654 (and/or some other agent of service controller 122) acts on access control integrity agent reports and error conditions. Many of the access control integrity agent 1654 checks can be accomplished by the server. For example, the access control integrity agent 1654 checks include one or more of the following: service usage measure against usage range consistent with policies (e.g., usage measure from the network and/or from the device); configuration of agents; operation of the agents; and/or dynamic agent download.

In some embodiments, the access control integrity-server 1654 (and/or some other agent of service controller 122) verifies device service policy implementations by comparing various service usage measures (e.g., based on network monitored information, such as by using IPDRs, and/or local service usage monitoring information) against expected service usage behavior given the policies that are intended to be in place. For example, device service policy implementations can include measuring total data passed, data passed in a period of time, IP addresses, data per IP address, and/or other measures such as location, downloads, email accessed, URLs, and comparing such measures expected service usage behavior given the policies that are intended to be in place.

In some embodiments, the access control integrity server 1654 (and/or some other agent of service controller 122) verifies device service policy, and the verification error conditions that can indicate a mismatch in service measure and service policy include one or more of the following: unauthorized network access (e.g., access beyond ambient service policy limits); unauthorized network speed (e.g., average speed beyond service policy limit); network data amount does not match policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy.

In some embodiments, the access control integrity server 1654 (and/or some other agent of service controller 122) verifies device service policy based at least in part on, for example, various error conditions that indicate a mismatch in service measure and service policy. For example, various verification error conditions that can indicate a mismatch in service measure and service policy include one or more of the following: mismatch in one service measure and another service measure; agent failure to report in; agent failure to respond to queries (e.g., challenge-response sequence and/or expected periodic agent reporting); agent failure to respond correctly to challenge/response sequence; agent improperly configured; agent failure in self checks; agent failure in cross-checks; unauthorized agent communication or attempted unauthorized communication; failure in service policy implementation test; failure in service usage reporting test; failure in service usage billing test; failure in transaction billing test; failure in download sequence; environment compromise event, such as unauthorized software load or execution (or attempt), unauthorized memory access (or attempt), unauthorized agent access (or attempt), known harmful software, and/or known harmful communications signature; and/or failure to respond to various messages, such as send message and suspend and/or send message and quarantine. In some embodiments, the access control integrity server 1654 (and/or some other agent of service controller 122) verifies device service policy by performing automated queries and analysis, which are then reported (e.g., anomalous/suspicious report results can be reported for further analysis by a person responsible for determining whether such activities indicate out of policy activities or to provide information to the user to inform the user of such anomalous/suspicious report results that may indicate out of policy activities). For example, the user can review the report to authorize whether such activities were performed by the user (e.g., website access requests, specific transactions, and/or phone calls) and/or indicate that such activities were not authorized by the user (e.g., indicate a potential compromise of the device, such as by malware or other unauthorized software/user use of the device). In another example, the user can also be connected to communicate with service support of the service provider regarding such reported activities (e.g., by text/chat, voice/phone, and/or video conference to a service support). Accordingly, in some embodiments, the access control integrity server 1654 (and/or some other agent of service controller 122) provides a policy/service control integrity service to continually (e.g., periodically and/or based on trigger events) verify that the service control of the device has not been compromised and/or is not behaving out of policy.

In some embodiments, upon detection of one or more service verification errors, such as the various service verification errors discussed above, the device is directed to a quarantine network status in which the device can, for example, only access network control plane functions, billing functions, and other functions generally controlled by the access network service provider or the central service provider. For example, quarantine network access restrictions and routing can be accomplished with the access network AAA and routing system (e.g., access network AAA server 1621 and one or more of the gateways 410, 420, 508, 512, 520, 608, 612, 620, 708, 712, 720) or can be accomplished with device based access control or traffic control policy implementation. Quarantine network equipment or servers can, for example, be located within the access network or within another network with access to the access network. Communication with the quarantine network infrastructure can be accomplished, for example, with a secure link with one or more encryption levels or a dedicated private link. In some embodiments, quarantining a device includes, for example, a two step process for routing quarantine network device traffic, first, to a quarantine traffic handling router or server and, second, from there to the actual quarantine network infrastructure, with the route being determined by device parameters, user parameters, access service provider parameters or other parameters associated with the quarantine network routing. In some embodiments, the device is completely suspended from the network in which, for example, the device can first issue a user interface message to the user or issuing another form of a message to the user or service subscriber, such as via email, hard copy message and/or voice message. In some embodiments, the device network access, service capabilities and/or traffic shaping are limited, partially restricted or completely restricted, service capabilities. For example, these limitations and/or restrictions can be implemented in the device and/or in the network. For example, implementing a device quarantine (e.g., using a RADIUS server to quarantine the device) can involve assigning the device to a different billing profile.

In some embodiments, upon detection of one or more service verification errors, such as the various service verification errors discussed above, switch based port analysis is performed to further monitor the device (e.g., referred to as Switched Port Analyzer (SPAN) on Cisco switches, and various other vendors have different names for it, such as Roving Analysis Port (RAP) on 3Com switches). In some embodiments, the device service policy implementation behavior is monitored at a deeper level in the network by copying device traffic in the switch so that it goes to both an intended data path destination and to a specified port for switch based port analysis (e.g., the traffic content can be analyzed and recorded using deep packet inspection (DPI) techniques, which can provide a finer level of detail than the typical IPDR). For example, an advantage of performing a switch based port analysis function is that the traffic need not be analyzed in real time, and a sample subset of the devices on the network can be selected for such analysis based on, for example, either identifying devices that have suspect service policy implementation behavior and/or a regular sampling algorithm that eventually samples all devices, or some other selection approaches. As another example, a scheduled switch based port analysis sampling can be applied that eventually rotates through all devices and designates a higher priority in the sampling queue for devices that are suspect.

In some embodiments, switch based port analysis allows for off-line sampled or non-real-time DPI, as described above, as a verification measure for the device based service control measures that are implemented. In some embodiments, sophisticated DPI techniques are used to enhance the content of the IPDRs so that they provide detailed information that can be made available in the network. For example, some of the DPI packet analysis may be redundant between the device and the network, but this approach provides for a much finer grain validation for the device based service and less reliance on the device for some of the service traffic analysis that service providers need. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that the network level traffic inspection is accomplished in, or in one or more servers integrated to operate in a coordinated manner with the DPI boxes. In some embodiments, the device control server functions and the service control policy verification functions are implemented in an integrated hardware/software system (e.g., a gateway, server, router, switch, base station, base station aggregator, AAA server cluster or any other hardware or hardware/software system) located in the network that provides deep service control capability (e.g., using DPI techniques) for devices that have some or all of the service processor functions installed and, in some embodiments, also providing coarser network control of the basics for devices that do not have a service processor installed in the device (e.g., such coarser network control functions include max data rate and/or max total data).

In some embodiments, the SPAN function is used in a revolving periodic manner as well to augment CDR data with deeper packet information for the purpose of spot-checking device based service usage measures. Examples of where this can be beneficial include spot checking network address access policies, spot checking ambient access policies, spot checking billing event reports, spot checking intermediate networking device/end point device count (via checking network source or destination addresses, token, cookies or other credentials, etc). For example, the periodic SPAN can be scheduled for all devices equally, for certain devices or users with higher priority, frequency or depth of SPAN than others, higher priority, higher frequency or immediate priority for devices with higher usage patterns or unusual usage patterns, immediate or very high priority for devices with a policy violation status.

In some embodiments, a combination traffic inspection and service control approach implements traffic and service control functions in the network that are conducive for a network based implementation and implements traffic and service control functions in the device that are either more conducive for performing in the device or can only be performed in the device (e.g., activities involving inspection of traffic that is encrypted once it is transmitted to the network). For example, using this approach, activities that can be done in the network are generally performed in the network and/or are more efficiently performed in the network than the device, and activities that are more efficiently performed in the device or can only be performed in the device are performed in the device (e.g., depending on device processing/storage capabilities and/or other design/security considerations). For example, the following are various traffic and service control functions that, in some embodiments, are preferably or can only be performed in the device: network based packet processing capability limitations (e.g., encrypted traffic, application layer information unavailable once the traffic goes into the networking stack, other application/usage context information available on the device but not in the network); information that is generally/preferably maintained and processed locally in the device for network neutrality reasons (e.g., network neutrality issues can generally be efficiently implemented by keeping all, substantially all or at least some aspect of decisions on how to implement algorithms to control traffic local to the device and under user decision control, and/or by providing the user with a set of pre-packaged choices on how to manage service usage or service activity usage or manage service usage versus service cost or price); information that is generally/preferably maintained and processed locally in the device for user privacy reasons (e.g., deeper levels of traffic monitoring and service usage monitoring data where it is available for assisting the user in achieving the best, lowest cost experience and implementing a CRM filter function to the user so that the user can control the level of CRM the network is allowed to receive, such as with the higher levels of information being exchanged for something of value to the user, and/or user location information); information that is generally/preferably maintained and processed locally in the device for the purpose of informing the user of service control settings or service activity usage or to adjust service activity control settings or receive user feedback to choices regarding service usage policies or billing options (e.g., providing the user with a UI for the purpose of monitoring an estimate of service usage and/or notifying the user of at least some aspect of estimated service usage or projected service usage, providing the user with a UI for the purpose of monitoring an estimate of service cost and/or notifying the user of at least some aspect of estimated service cost or projected service cost, providing the user with a UI for the purpose of providing the user with one or more service usage and/or service cost notification messages that require user acknowledgement and/or a user decision and obtaining or reporting the user acknowledgements and/or decisions, providing the user with a UI for the purpose of providing the user with service options and/or service payment options, providing the user with a UI for the purpose of obtaining user choice for such options when service usage or cost estimates are about to run over limits or have run over limits or are projected to run over limits, providing the user with a UI for the purpose of monitoring or conducting open central billing transactions or other transactions, providing the user with a UI for the purpose of selecting the service control techniques and/or policies and/or algorithms and/or pre-packaged configurations that can be used to define or partially define the service activity usage control policies implemented in the device service processor or the network service control equipment/billing system or a combination of both); service control for roaming on different networks that typically do not have compatible DPI-type techniques with the home network; certain service notification and traffic control algorithms (e.g., stack-ranked activity statistical analysis and control of only the high usage activities); and/or a function for assigning a device to a service experience or ambient activation experience or virtual service provider (VSP) at various times from manufacturing to device distribution to a user of the device. In some embodiments, certain activities are implemented in the device as a solution for networks in which a new centralized DPI approach is not possible, not economically feasible, or for any number of reasons not an option or not a preferred option.

In some embodiments, a network based solution is provided for a more basic set of services for all devices that do not have service control capabilities, and a super-set of services and/or additional services are provided for devices that include a service processor. As described herein, a service controller function can be located in various places in the network in accordance with various embodiments. It should also be noted that various other embodiments described herein also employ a hybrid service control function performing certain service control functions in the network (e.g., collecting network service usage information, such as IPDRs, and/or performing DPI related functions in the network for collecting network service usage information and/or throttling/shaping traffic) and service control functions in the device (e.g., service processor 115, which, for example, monitors service usage in the device and/or performs throttling or traffic shaping in the device and/or performs certain billing event recording and reporting functions that are aptly performed on the device).

In some embodiments, lower level service policy implementation embodiments are combined with a higher level set of service policy supervision functions to provide device assisted verifiable network access control, authentication and authorization services.

In some embodiments, device based access control services are extended and combined with other policy design techniques to create a simplified device activation process and connected user experience referred to herein as ambient activation. As similarly discussed above, ambient activation can be provided by setting access control to a fixed destination, verifying access with IPDRs, verifying access by setting a max data rate and triggering off in the network if it exceeds the max data rate, and/or by various other techniques.

As shown in FIG. 16, service controller 122 includes a service history server 1650. In some embodiments, the service history server 1650 collects and records service usage or service activity reports from the Access Network AAA Server 1621 and the Service Monitor Agent 1696. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server 1650 provides the service history on request to other servers and/or one or more agents. In some embodiments, the service history server 1650 provides the service usage history to the device service history 1618. In some embodiments, for purposes of facilitating the activation tracking service functions (described below), the service history server 1650 maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

As shown in FIG. 16, service controller 122 includes a policy management server 1652. In some embodiments, the policy management server 1652 transmits policies to the service processor 115 via the service control link 1653. In some embodiments, the policy management server 1652 manages policy settings on the device (e.g., various policy settings as described herein with respect to various embodiments) in accordance with a device service profile. In some embodiments, the policy management server 1652 sets instantaneous policies on policy implementation agents (e.g., policy implementation agent 1690). For example, the policy management server 1652 can issue policy settings, monitor service usage and, if necessary, modify policy settings. For example, in the case of a user who prefers for the network to manage their service usage costs, or in the case of any adaptive policy management needs, the policy management server 1652 can maintain a relatively high frequency of communication with the device to collect traffic and/or service measures and issue new policy settings. In this example, device monitored service measures and any user service policy preference changes are reported, periodically and/or based on various triggers/events/requests, to the policy management server 1652. In this example, user privacy settings generally require secure communication with the network (e.g., a secure service control link 1653), such as with the policy management server 1652, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server 1652 provides adaptive policy management on the device. For example, the policy management server 1652 can issue policy settings and objectives and rely on the device based policy management (e.g., service processor 115) for some or all of the policy adaptation. This approach can require less interaction with the device thereby reducing network chatter on service control link 1653 for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history) is not communicated to the network without the user's approval. In some embodiments, the policy management server 1652 adjusts service policy based on time of day. In some embodiments, the policy management server 1652 receives, requests or otherwise obtains a measure of network availability and adjusts traffic shaping policy and/or other policy settings based on available network capacity.

In some embodiments, the policy management server 1652 performs a service control algorithm to assist in managing overall network capacity or application QoS. In some embodiments, the policy management server 1652 performs an algorithm to determine which access network is best to connect to, such as based on network capacity or application QoS, service usage costs, and/or any other criteria. In some embodiments, the device is capable of connecting to more than one network, and accordingly, device service policies can be selected/modified based on which network the device is connected to. In some embodiments, the network control plane servers detect a network connection change from a first network to a second network and initiate the service policy implementation established for the second network. In other embodiments, the device based adaptive policy control agent (e.g., policy control agent 1692 described herein) detects network connection changes from the first network to the second network and implements the service policies established for the second network.

In some embodiments, when more than one access network is available, the network is chosen based on which network is most preferred according to a network preference list or according to the network that optimizes a network cost function. For example, the preference list can be pre-established by the service provide and/or the user. For example, the network cost function can be based on a minimum service cost, maximum network performance, determining whether or not the user or device has access to the network, maximizing service provider connection benefit, reducing connections to alternative paid service providers, and/or a variety of other network preference criteria. In other embodiments, the device detects when one or more preferred networks are not available, implements a network selection function or intercepts other network selection functions, and offers a connection to the available service network that is highest on a preference list. For example, the preference list can be set by the service provider, the user and/or the service subscriber.

As shown in FIG. 16, service controller 122 includes a network traffic analysis server 1656. In some embodiments, the network traffic analysis server 1656 collects/receives service usage history for devices and/or groups of devices and analyzes the service usage. In some embodiments, the network traffic analysis server 1656 presents service usage statistics in various formats to identify improvements in network service quality and/or service profitability. In other embodiments, the network traffic analysis server 1656 estimates the service quality and/or service usage for the network under variable settings on potential service policy. In other embodiments, the network traffic analysis server 1656 identifies actual or potential service behaviors by one or more devices that are causing problems for overall network service quality or service cost.

As shown in FIG. 16, service controller 122 includes a beta test server 1658. In some embodiments, the beta test server 1658 publishes candidate service plan policy settings to one or more devices. In some embodiments, the beta test server 1658 provides summary reports of network service usage or user feedback information for one or more candidate service plan policy settings. In some embodiments, the beta test server 1658 provides a mechanism to compare the beta test results for different candidate service plan policy settings or select the optimum candidates for further policy settings optimization.

As shown in FIG. 16, service controller 122 includes a service download control server 1660. In some embodiments, the service download control server 1660 provides a download function to install and/or update service software elements (e.g., the service processor 115 and/or agents/components of the service processor 115) on the device, as described herein.

As shown in FIG. 16, service controller 122 includes a billing event server 1662. In some embodiments, the billing event server 1662 collects billing events, provides service plan information to the service processor 115, provides service usage updates to the service processor 115, serves as interface between device and central billing server 1619, and/or provides trusted third party function for certain ecommerce billing transactions.

As shown in FIG. 16, the Access Network AAA server 1621 is in network communication with the access network 1610. In some embodiments, the Access Network AAA server 1621 provides the necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. This additional layer of access control can be implemented, for example, by the service processor 115 on the device. In some embodiments, the Access Network AAA server 1621 also provides the ability to suspend service for a device and resume service for a device based on communications received from the service controller 122. In some embodiments, the Access Network AAA server 1621 also provides the ability to direct routing for device traffic to a quarantine network or to restrict or limit network access when a device quarantine condition is invoked. In some embodiments, the Access Network AAA server 1621 also records and reports device network service usage (e.g., device network service usage can be reported to device service history 1618).

As shown in FIG. 16, the device service history 1618 is in network communication with the access network 1610. In some embodiments, the device service history 1618 provides service usage data records used for various purposes in various embodiments. In some embodiments, the device service history 1618 is used to assist in verifying service policy implementation. In some embodiments, the device service history 1618 is used to verify service monitoring. In some embodiments, the device service history 1618 is used to verify billing records and/or billing policy implementation. In some embodiments, the device service history 1618 is used to synchronize and/or verify the local service usage counter.

As shown in FIG. 16, the central provider billing server 1619 is in network communication with the access network 1610. In some embodiments, the central provider billing server 1619 provides a mediation function for central provider billing events. For example, the central provider billing server 1619 can accept service plan changes. In some embodiments, the central provider billing server 1619 provides updates on device service usage, service plan limits and/or service policies. In some embodiments, the central provider billing server 1619 collects billing events, formulates bills, bills service users, provides certain billing event data and service plan information to the service controller 122 and/or device 100.

Establishing Coordinated Service and Verification Policies for Service Processor, Service Controller and Network Functions In some embodiments, device and network apparatus coordinate one or more of the following: network service policy implementation settings, device service policy implementation settings, network service profile implementation settings, device service profile implementation settings, network service usage measures used for the purpose of verifying service policy implementation, device service usage measures used for the purpose of verifying service policy implementation, network actions taken upon detection of service usage policy violation and device actions taken upon detection of service usage policy violation. In some embodiments, local device settings for the service monitoring, usage and/or billing profile or policy settings used, for example, by a device service processor 115, are associated with corresponding records for the various network apparatus that also rely upon the service policy and profile settings to monitor, control and/or bill for services or to respond to out of policy service usage conditions. For example, such network apparatus include the service controller 122 or similar functions, the billing system 123 or similar functions, the network AAA 121, gateways 410, 420, 508, 512, 520, 608, 612, 620, 708, 712, 720, or other networking equipment. In some embodiments, the service profile or policy settings are associated between the device and network in a manner that allows for effective and coordinated operation between the device service processor 115 and the network apparatus, but does not require an explicit function that simultaneously controls/coordinates the service policy or profile implementation and/or verification actions taken by the device 100 (e.g., the service processor 115) and the network apparatus. As an example, such embodiments can be applied in overlay applications as discussed below.

In some embodiments, a network function (e.g., the service controller 122, and/or more specifically the policy management server 1652 function, or other similar function) obtain, derive or otherwise determine the association of the service profile or policy settings to program a device service processor 115 and the various network apparatus functions (e.g., possibly including but not limited to the service controller 122 or similar functions, the billing system 123 or similar functions, the network AAA 121, gateways 410, 420, 508, 512, 520, 608, 612, 620, 708, 712, 720, or other networking equipment) by reading, receiving, querying, pulling or otherwise obtaining the settings from one or more of the network apparatus functions or from a data base that stores the service policy or profile settings for one or more of the network apparatus functions. After obtaining one or more of the network apparatus settings, a mapping (e.g., an association) of the network apparatus settings to the appropriate device 100 (service processor 115) settings can be determined to advantageously support the service usage monitoring, service usage control, service usage billing or service usage verification objectives being addressed. The policy or profile settings for the device can be a direct translation of the policy or profile settings used for the network apparatus, or the device policy or profile settings can be less directly derived from the network apparatus policy or profile settings. For example, service usage limits contained in the billing system 123 service plan can be either directly mapped to usage limit settings on the device service processor 115 (e.g., service usage stops when the limit is hit or the user is notified or the user is billed), or the usage limits can be mapped to a number of service profiles the user may select from (e.g., as discussed herein, the user can select from options involving various actual usage versus usage limit notification policies and/or service usage control, limitations or throttling policies).

For example, the service usage policy or profile limits or allowances maintained for the network apparatus functions (e.g., the service profile or service plan usage limits stored in the billing system 123 or AAA 121) can be read or queried by a network function (e.g., the service controller 122 or the service controller 122 through a second intermediary server connected to the billing system 123 and/or the AAA system 121), and the service usage limits stored in these networking apparatus can be either directly translated to the settings for the service processor 115 or may need to be interpreted, expanded or otherwise modified to obtain the required service processor 115 policy and/or profile settings.

In some embodiments, the service usage limits set in the billing system 123 service plan record, and/or the service profile record stored in the AAA system 121 can be acquired (e.g., from the apparatus or from a database storing the settings for the apparatus) by the service controller (or another network function) and directly translated and used to program the settings in the service processor 123. In some embodiments, the service usage limits are determined or obtained by the activation server apparatus embodiments, other apparatus embodiments associated with service activation, or the virtual service provider embodiments, as described herein. In this manner, once the association of the service usage profile or policy settings used by a device service processor 115 and the profile or policy settings used by the various network apparatus functions is established, then the service policy or profile for service monitoring, control, billing, verification and/or actions taken on verification error can be coordinated between device and network even if some of the network functions act independent of some of the device functions.

For example, associating the service usage policies and/or profiles between the device service processor 115 and the various network apparatus functions, and then allowing for independent operation or action by the various functions in a manner that results in a coordinated outcome, facilitates an overlay of the device assisted services technology onto existing network equipment in a manner that results in reliable and verifiable service enhancements while minimizing the need for major existing network equipment upgrades.

In some embodiments, the association of the service profile or policy settings used by a device service processor 115 and the service profile or policy settings used by the various network apparatus functions can be provided by a centralized network function that determines the appropriate settings for the network apparatus and the service processor 115 and sets one or more settings to each function. In some embodiments, this networking function is provided by a centralized network management function or service account activation function (e.g., the activation server apparatus embodiments, one of the other disclosed apparatus embodiments associated with service activation or the virtual service provider apparatus embodiments, as described herein).

In some embodiments, the association of the service profile or policy settings used by a device service processor 115 and the service profile or policy settings used by the various network apparatus functions can be provided by a network function that by reads, receives, queries, pulls or otherwise obtains the setting used by the service controller 122 or the service processor 115. The network function can then determine the association of the service profile or policy settings used by a device service processor 115 and the service profile or policy settings required by the various network apparatus functions before writing, transmitting, pushing, or otherwise recording the appropriate settings required by each of the other network apparatus functions. In some embodiments, this functionality can be implemented in the service controller (e.g., the policy management server, possibly acting in coordination with another network function or server), which then links into the databases used for storing the policy or profile settings for the other network apparatus.

In some embodiments, once the association is established between service policy or profile settings in the network apparatus and the service policy or profile settings in the service processor 115, then the network based service usage measures (e.g., IPDRs communicated to the billing system 123, the AAA 121, service controller 122 or other network functions used to verify service usage and/or take actions) used for verification of device 100 service usage versus service policy or profile can be monitored by the network apparatus (e.g., billing system 123 and AAA 121) independent of coordination with the service processor 115 and/or independent of the service controller 122. In some embodiments, in addition to independent monitoring and verification of service usage versus policy, independent service profile or policy verification error response actions can be taken by the network apparatus (e.g., suspend, quarantine, SPAN or flag device 100, notify the user and possibly require acknowledgement, or bill the user account for service usage overage) without direct involvement by the service processor 115 and/or the service controller 122.

Accordingly, the association between service profile and/or service policy that is implemented on the device 100 (e.g., service processor 115) and the service profile and/or policy usage limits recorded in network apparatus can be associated with one another by one or more of the following: (A) implementing a function to read from the network database (e.g., the billing 123 data base, AAA 121 data base, service controller 122 data base, etc.) and mapping the network profiles and/or policies to device 100 (e.g., service processor 115) profiles and/or policies; (B) implementing a function that simultaneously sets the device profile and/or policy and the network equipment profile and/or policy recorded in the appropriate data base records; and (C) implementing a function that reads the profile and/or policy on the device 100 (e.g., service processor 115) or the service controller 122 and then sets the network equipment profile and/or policy recorded in the appropriate data base records. This allows for a simplified but coordinated response to monitoring, controlling and billing for service usage, for verifying service usage versus service usage profile or policy, and/or initiating or carrying out network actions in response to service usage versus profile or policy verification errors and/or device actions in response to service usage versus profile or policy verification errors.

Figure 17:
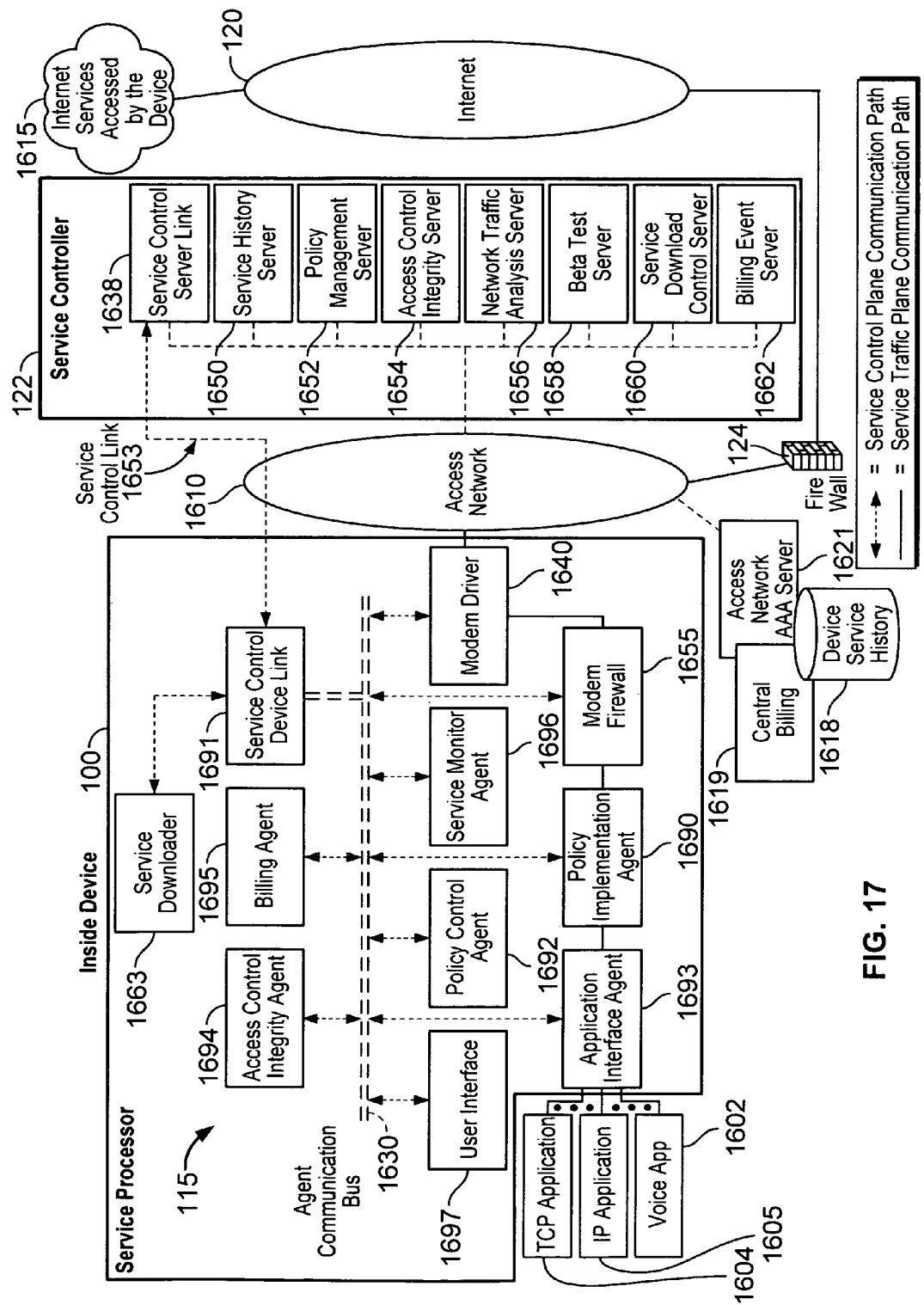
FIG. 17 is another functional diagram illustrating the device based service processor and the service controller in accordance with some embodiments.

FIG. 17 is another functional diagram illustrating the device based service processor 115 and the service controller 122 in accordance with some embodiments. FIG. 17 provides for various embodiments as similarly described above with respect to the various embodiments described above with respect to FIG. 16, with one of the differences being that the service controller 122 as shown in FIG. 17 is connected to the access network and not (directly) connected to the Internet. Accordingly, as shown in FIG. 17, in some embodiments, the service control link 1653 is a communications link between the service controller 122 and the service processor 115 over the access network 1610.

FIG. 18 is another functional diagram illustrating the device based service processor 115 and the service controller 122 in which the service processor controls the policy implementation for multiple access network modems and technologies in accordance with some embodiments. As shown, FIG. 18 provides for various embodiments as similarly described above with respect to the various embodiments described above with respect to FIG. 16, with one of the differences being that the service processor controls the policy implementation for multiple access network modems and technologies. Accordingly, as shown in FIG. 18, in some embodiments, a connection manager 1804, which as shown is in control plane communication with a modem selection and control 1811, provides a control and supervision function for one or more modem drivers or modems that connect to an access network. In some embodiments, the modem selection and control 1811 selects the access network connection and is in communication with the modem firewall 1655, and modem drivers, which as shown include Dial/DSL modem driver 1831, Ethernet modem driver 1815, WPAN modem driver 1814, WLAN modem driver 1813, and WWAN modem driver 1812, convert data traffic into modem bus traffic for one or more modems and are in communication with the modem selection and control 1811.

Figure 19:
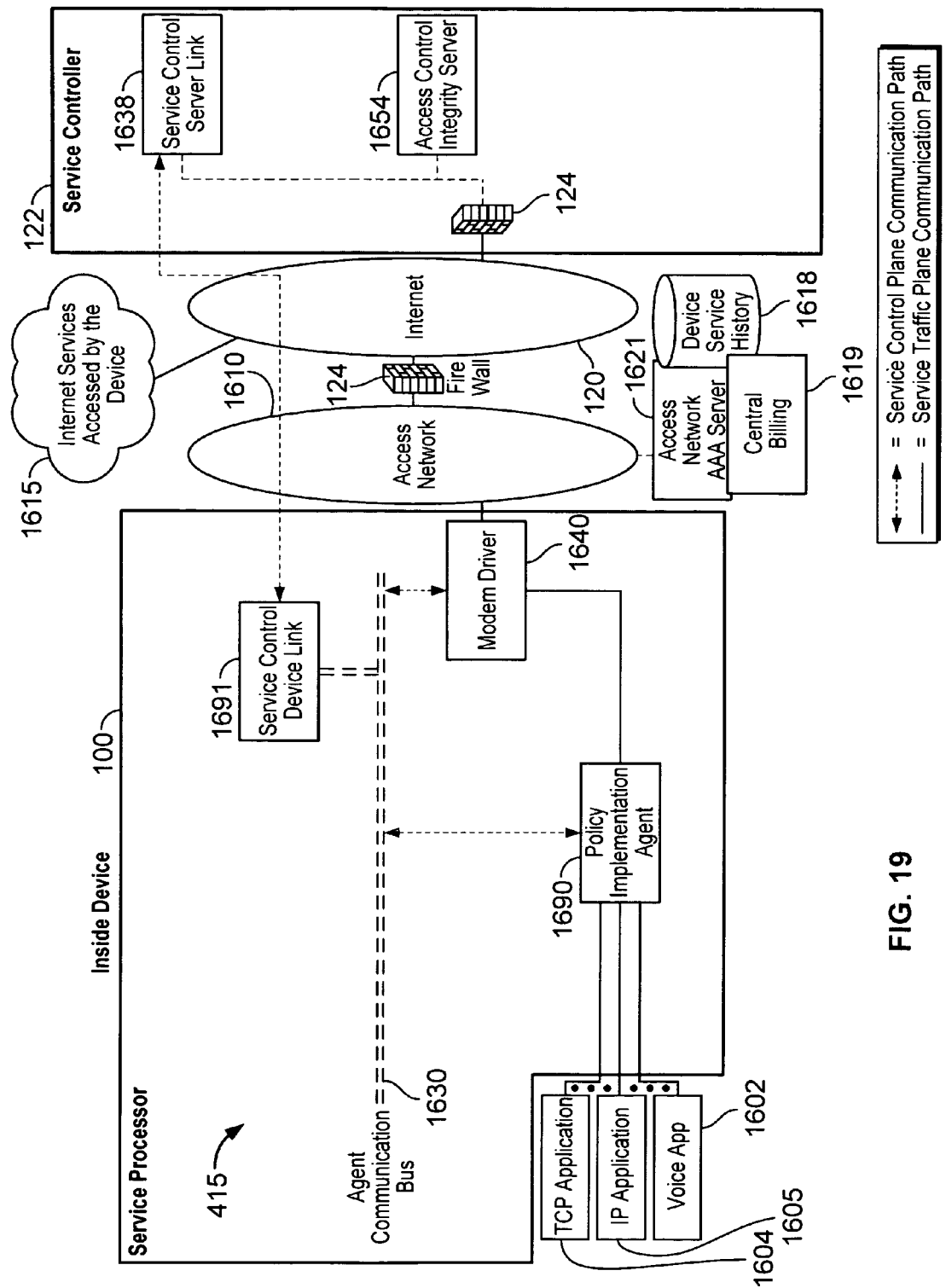
FIG. 19 is another functional diagram illustrating the service processor and the service controller in accordance with some embodiments.

FIG. 19 is another functional diagram illustrating the service processor 115 and the service controller 122 in accordance with some embodiments. As shown in FIG. 19, a stripped down (e.g., reduced set of agents/components/functionality) embodiment of the service processor 115 and the service controller 122 are provided in which service policy is not adaptive but rather is set by the service controller 122. In this example, the agent within the service processor 115 that implements service policy is the policy implementation agent 1690. Also, in this example, the service controller 122 is similarly stripped down to a simplified configuration (e.g., reduced set of agents/components/functionality).

Referring to FIG. 19, in some embodiments, many of the service policy implementation verification and compromise protection techniques are similarly provided using these simplified configurations of the service processor 115 and the service controller 122, as described above with respect to, for example, FIG. 16. For example, the service control device link 1691 and service control server link 1638 can be used for downloading service policies to the policy implementation agent 1690 (but, in some embodiments, cannot perform the heartbeat or authentication function).

For example, a basic service profile or service policy implementation verification technique for this reduced configuration calls for the access control integrity server 1654 to obtain IPDRs from access network AAA server 1621 (or 121) (e.g., or other network functions as described herein) and compare the service usage exhibited by device 100 with a range of expected service usage that would be expected if the intended service policies were in place on the device. In some embodiments, the access control integrity server 1654 initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

In some embodiments, a service profile or service policy implementation verification technique for this reduced configuration calls for the billing system 123 to obtain IPDRs from access network AAA server 1621 (or 121) (or other network functions as discussed herein) and compare the service usage exhibited by device 100 with a range of expected service usage that would be expected if the intended service policies were in place on the device. In some embodiments, the billing system 123 initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

In some embodiments, a service profile or service policy implementation verification technique for this reduced configuration calls for the AAA server 1621 (or 121) itself to compare the service usage exhibited by device 100 with a range of expected service usage that would be expected if the intended service policies were in place on the device. In some embodiments, the AAA server 1621 (or 121) initiates or carries out one or more of the service usage profile or policy verification error response actions disclosed herein, including, for example, one or more of the following: notify the user of the out of policy or overage condition, require the user to acknowledge the condition and/or acknowledge a subsequent billing event to proceed, bill the user for service overage, suspend the device from the network, quarantine the device, SPAN the device, or notify a network manager or device management or error handling function.

Accordingly, this approach provides a basic first layer of service policy implementation verification that does not depend on device based agent behavior for the verification. If the service policy is in error in a way that violates the expected service policy usage limits, then the access control integrity server 1654 will detect this condition and appropriate action can be taken. In some embodiments, if one or more service policy integrity verification tests fail, the appropriate responsive actions can include routing the device to quarantine status, sending an error message to the device or device user interface and then suspend access for the device, and/or limiting access in some way without completely suspending access, as similarly described above. In some embodiments, if one or more service policy integrity verification tests fail, the appropriate responsive actions can include logging excess service usage above the intended service policy limits and billing the user for some or all of the excess usage, sending the user a notification and/or acknowledgement response request (possibly including a simple keystroke acknowledgement, or a password, a biometric signature or other secure response), and/or limiting access in some way without completely suspending access, as similarly described above.

In some embodiments, a billing system technique provides another verification overlay. For example, the service processor 115 can have a set of service policy implementations (or service profile) that calls for maintaining service usage within a certain limit, or assisting the user or network to maintain service usage to that limit. The billing system 123 can be implemented in a way to provide a "back stop" to the service usage controls or limits provided for by the service processor 115, so that even if the service processor 115 is compromised, hacked, spoofed or is otherwise in error, the billing system 123 protects the service provider, "service owner", carrier, VSP or network operator from unpaid access beyond the service limits. This can be accomplished, for example, by assigning a service usage limit within the billing system 123 so that if the service processor 115 is compromised and the service usage runs over the desired limit, the billing system 123 automatically charges the user account for the overage. The billing system 123 can receive service usage information from the IPDRs that are aggregated in the network as in the case of a conventional billing system, and because these network based measures are independent from the device agent operation, they cannot be spoofed by merely spoofing something on the device or service processor 115. In this manner, defeating the service processor 115 service agent control mechanisms described herein simply results in a billing charge and not free service. In some embodiments, if the service usage runs over the service usage limit specified in the service profile, the user can be notified as discussed herein, and the user can be required to acknowledge the overage and approve a billing charge for the overage as also discussed herein, with the acknowledgement being communicated back to the network in some embodiments. This positive acknowledgement also provides a layer of protection and verification of the service control and usage limit control for the device service processor 115. In some embodiment also discussed herein, the user is requested to input a password, biometric or other secure response to the usage overage notification, providing yet another layer of protection to verify that the user intends to pay for the service usage overage. In these embodiments taken individually or in combination, the service processor 115 assistance for service usage control can be verified and/or protected from compromise.

In some embodiments, the service control device link 1691 and service control server link 1638 are used to implement the service processor 115 heartbeat authentication and communication functions to strengthen the verification of a proper service policy implementation of the embodiments of FIG. 19. For example, the heartbeat function can be used as authentication for service monitoring versus network reports. In addition, the heartbeat function can be used as authentication for challenge/response queries of agents. Also, the heartbeat function can be used as authentication for access control. In some embodiments, to strengthen verification of the basic system illustrated in FIG. 19, the communication access to the policy implementation agent 1690 is restricted so that software or hardware on device 100 and/or on a network cannot have authorized access to the policy implementation agent 1690. For example, authorized access to the policy implementation agent 1690 can be restricted to include only the service controller 122 through the service control device link 1691 and the service control server link 1638. For example, the agent control bus 1630 can be secured with encryption and/or other security techniques so that only the service control device link 1691 can have authorized access to the policy implementation agent 1690. As another example, the agent level message encryption can be used as described herein.

In some embodiments, the service policy implementation agent 1690 of the embodiments of FIG. 19 can be further strengthened against errors, intrusion, tampering, hacking and/or other inadvertent or intentional integrity degradation by using various other techniques. For example, the dynamic agent download feature of the service controller 122 can download a new version of the policy implementation agent 1690. In this example, the new agent code can be identical in functionality and also hashed, obfuscated or ordered differently before signing and encryption so that any hacking attempt must be reinitiated, and this process can be periodically repeated or repeated upon a triggering event. Additionally, once the new dynamically loaded agent is in place, it can be required to perform an environment scan to determine if the system configuration or operation are as expected, and/or it can seek to detect elements in the execution environment that can be harmful or threatening to the integrity of the policy implementation. The agent can also be required to report back on the scan within a relatively short period of time so that any attempt to compromise the agent does not have sufficient time to be effective.

In some embodiments, the service policy implementation agent 1690 of the embodiments of FIG. 19 can be further strengthened to protect the policy implementation from compromise attempts by locating the software and/or hardware used onto an access modem associated with the service. For example, the modem can make it difficult to get access to the policy implementation agent 1690 by employing one or more security elements on one or more access ports into the modem, such as the device bus, an I/O port, a network connection or the debug port. The modem can also store and/or execute the policy implementation agent in secure memory. The modem can also require a secure download key or a secure software signature to accept any updates to the agent software.

In some embodiments, the service policy implementation agent 1690 of the embodiments of FIG. 19 can be further strengthened against compromise attempts by performing scans of the device 100 code execution environment and/or code storage environment to identify potentially malicious and/or unwanted/untrusted software or hardware. For example, this function can be performed by the policy implementation agent 1690. The agent can have a local database of potentially malicious elements and compare the entries in the database against the elements detected locally using various malicious code, behavior blocking, intrusion detection, and/or other well known techniques for security analysis. Alternatively or in addition, the agent can communicate a list of some or all of the elements detected locally to the service controller 122 to augment or take the place of the database comparison function that can be performed locally, thereby performing such or further such security analysis on the network (e.g., by the service controller 122), and, in some embodiments, if not automatically detected, such elements detected locally (e.g., and/or samples of such detected potentially malicious code or logs of potentially malicious/suspicious behavior/intrusions) forwarded to security analysts for the service provider for further security analysis (e.g., service provider security analysts and/or an outside security vendor engaged to protect the service provider's network and supported devices). In some embodiments, the agent detects new software downloads, installs and/or invocations and immediately issues an error flag report when potentially malicious software is downloaded, installed or invoked (e.g., file and network based on access security detection techniques). In some embodiments, the agent scans the local software loading and invocation activity along with a log of other software runtime events and regularly reports this trace so that when an error or compromise event occurs the trace preceding the event can be analyzed to determine the offending software or activity trace that took place to cause the compromise or error. For example, once the software or activity that caused the compromise is known or otherwise detected, it can be entered into a refreshed version of the database that the device and other devices use to detect potentially malicious precursor conditions. Examples of such precursor events can include software invocations, software downloads, a sequence of memory I/O events, a sequence of software access events, a sequence of network address or URL communications or downloads, or a sequence of access modem I/O activity.

Figure 20:
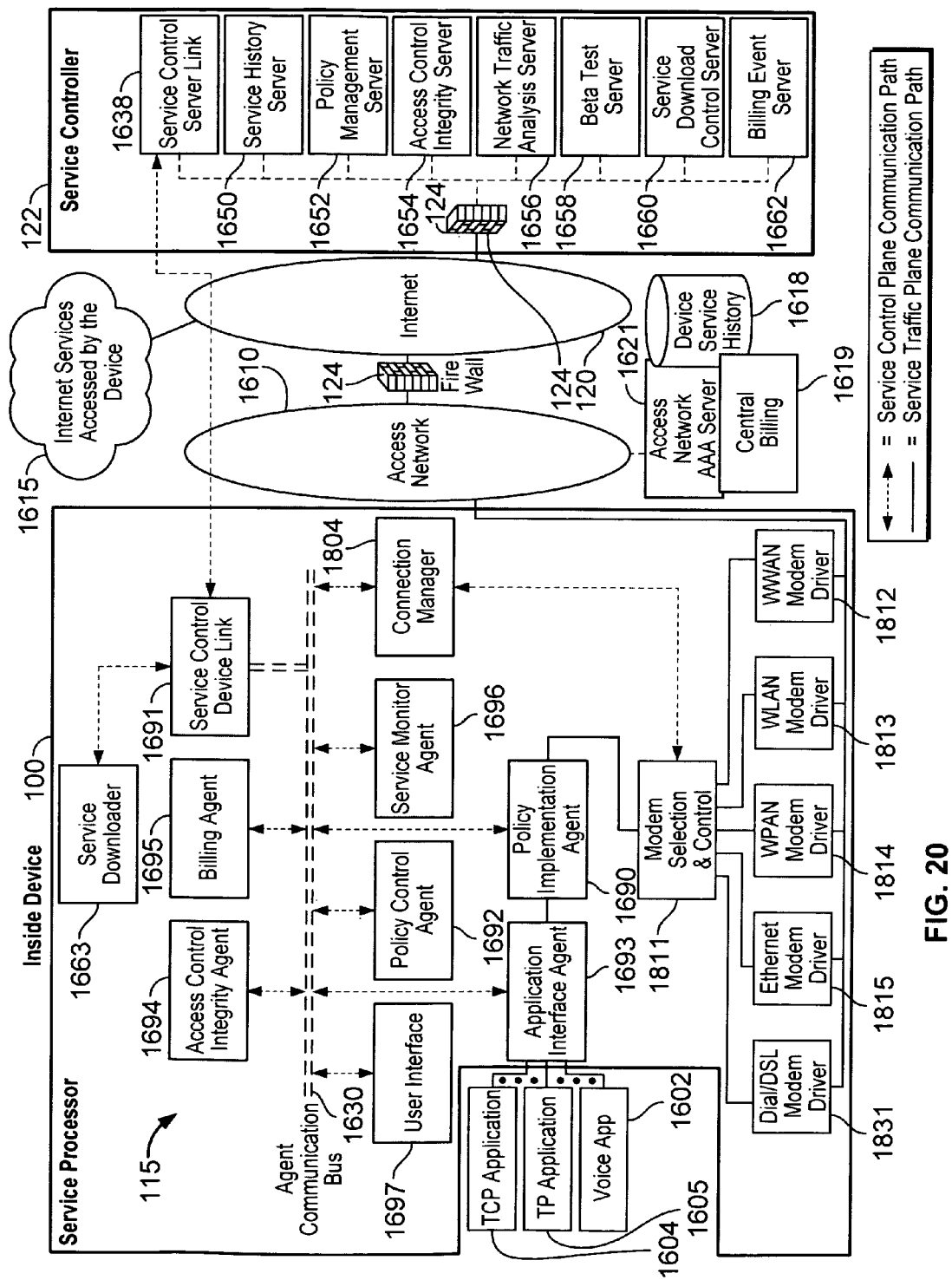
FIG. 20 is another functional diagram illustrating the service processor and the service controller in accordance with some embodiments.

FIG. 20 is another functional diagram illustrating the service processor 115 and the service controller 122 in accordance with some embodiments. As shown in FIG. 20, the modem firewall 1655 has been removed, and firewall and access control and traffic shaping functions are performed in these embodiments by the policy implementation agent 1690 and application interface agent 1693.

FIG. 21 is another functional diagram illustrating the service processor 115 and the service controller 122 in accordance with some embodiments. FIG. 21 illustrates the various modem drivers and modems 2122 through 2125 and 2141. In some embodiments, the modems, which include WWAN modem 2122, WLAN modem 2123, WPAN modem 2124, Ethernet modem 2125, and Dial/DSL modem 2141, which are in communication with the modem bus 2120, connect the device to one or more networks. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or, in some embodiments, the modem firewall agent 1655 or the application interface agent 1693, in making a determination regarding the traffic parameters or type once the traffic is farther down in the communication stack where it is sometimes difficult or impossible to make a complete determination of traffic parameters. It should be noted that although the present invention does not need to implement any or all of the measurement points illustrated in FIG. 21 to have an effective implementation as was similarly shown with respect to FIG. 19, various embodiments benefit from these and/or similar measurement points. It should also be noted that the exact measurement points can be moved to different locations in the traffic processing stack, just as the various embodiments described herein can have the agents affecting policy implementation moved to different points in the traffic processing stack while still maintaining effective operation.

As shown in FIG. 21, measurement point I occurs at the application interface agent 1693 interface to the applications. At this measurement point, the application traffic can be monitored before it is framed, packetized or encrypted by the lower layers of the networking stack. For example, this allows inspection, characterization, tagging (literal or virtual) and, in some embodiments, shaping or control of services or traffic. At this measurement point, traffic can be more readily associated with applications, URLs or IP addresses, content type, service type, and other higher level parameters. For example, at this level email traffic and downloads, web browser applications and end points, media file transfers, application traffic demand, URL traffic demand and other such service monitoring parameters are more readily observed (e.g., accessible in the clear without the need for deep packet inspection and/or decryption), recorded and possibly shaped or controlled. As described herein, it is also possible to monitor upstream traffic demand at this point and compare it to the other measurement points to determine if the traffic policies in place are meeting overall traffic control policy objectives or to determine if traffic policy implementation is operating properly. For example, the downstream delivered traffic can be optimally observed at this measurement point.

As shown in FIG. 21, traffic measurement points II and III are situated on the upstream and downstream sides of policy implementation agent 1690. As described herein, these two locations allow potential tracking of upstream and downstream traffic through the stack portions associated with the policy implementation agent 1690. These two locations also provide for potential cross-checking of how the policy implementation agent 1690 is impacting the demand and delivery of traffic. In a similar manner, measurement point III in connection with measurement point IV provide an opportunity for packet tracing through the stack components associated with the modem firewall 1655 and provide for the opportunity to observe the demand and delivery sides of the modem firewall 1655. Traffic measurement point V provides the potential for observing the traffic at the modem bus drivers for each of the modems.

As shown in FIG. 21, traffic measurement point VI provides, in some embodiments, the ultimate measure of access traffic, for example, the traffic that actually transacts over the access network through the modem. As shown, measurement point VI is at the modem side of the internal or external communications bus 1630, and it will be appreciated that, in some embodiments, this measurement point can be further down the modem stack closer to the MAC or physical layer (e.g., at the designer's discretion). An advantage of having a measurement point deep in the modem is, for example, that if the software or hardware that implements the measurement and reporting is well secured against compromise, then this measure can be almost as strong from a verification perspective as the measure that comes from the network (e.g., from the network elements). Accordingly, this makes it possible to compare this measure against the other measures to determine if there is a traffic path that is leaking past the other measurement point or one or more policy implementation points.

FIGS. 22A through 22B provide tables summarizing various service processor 115 agents (and/or components/functions implemented in software and/or hardware) in accordance with some embodiments. Many of these agents are similarly described above, and the table shown in FIGS. 22A through 22B are not intended to be an exhaustive summary of these agents, nor an exhaustive description of all functions that the agents perform or are described herein, but rather FIGS. 22A through 22B are provided as a summary aid in understanding the basic functions of each agent in accordance with some embodiments and how the agents interact with one another, with the service controller server elements, and/or with other network functions in certain embodiments to form a reliable device based service delivery solution and/or platform.

FIG. 23 provides a table summarizing various service controller 122 server elements (and/or components/functions implemented in software and/or hardware) in accordance with some embodiments. Many of these agents are similarly described above, and the table shown in FIG. 23 is not intended to be an exhaustive summary of these server elements, nor an exhaustive description of all functions that the elements perform or are described herein, but rather FIG. 23 is provided as a summary aid in understanding the basic functions of each element in accordance with some embodiments and how the elements interact with one another, certain network elements, and/or the service processor agents in certain embodiments to form a reliable device based service delivery solution and/or platform.

In some embodiments, it is desirable to provide a control plane between the service processor and the service controller using a flexible connection or communication path that, for example, will work between virtually any two network connection endpoints, one being the service controller and one being the device, in a secure yet scalable manner. In view of the embodiments described herein, one of ordinary skill in the art will recognize that it is possible to achieve such features with a variety of different embodiments that share similar core features to the embodiments described herein.

Service Control Device Link and Continuous Heartbeat Authentication

As described herein, there are numerous ways to implement the control plane communication channel between the service processor 115 and the service controller 122. Various embodiments described herein disclose a secure and bandwidth efficient control plane that is compatible with any IP based network (including the ability to locate the service controller 122 over the Internet); provides for consistent device assisted service monitoring, control, verification and/or billing while roaming across multiple networks with different access technologies; and allows continuous device assisted service control verification and/or authentication with a variety of mechanisms for setting the transmission heartbeat frequency. Other techniques that could be used for this function include, for example, encapsulating the control plane in the access network control plane channel, encapsulating the control plane in IP or data packet framing mechanisms (e.g., IPV6), running a more conventional VPN or IPSEC channel, and/or using an independent access network connection.

Figure 24:
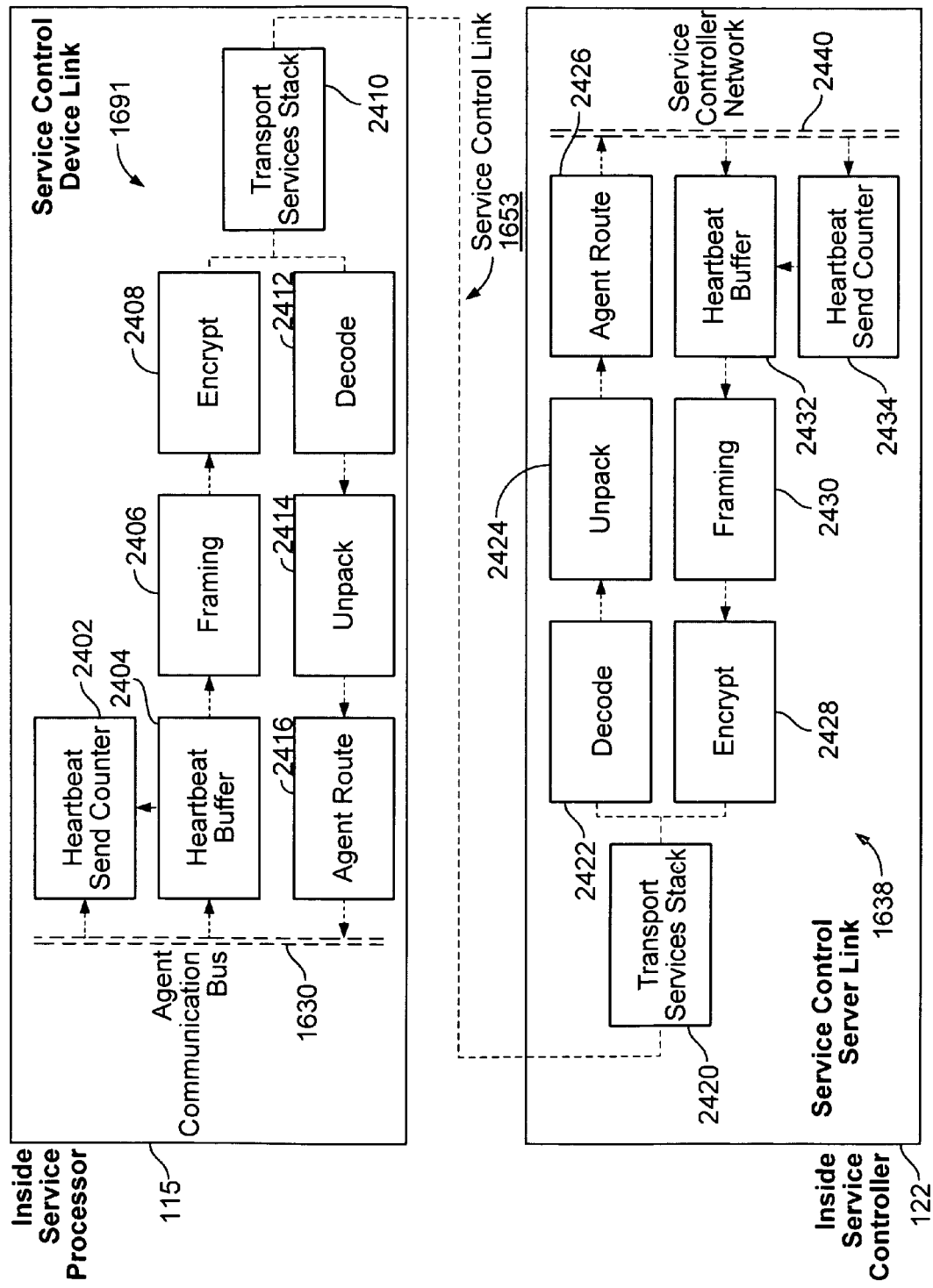
FIG. 24 is a functional diagram illustrating the service control device link of the service processor and the service control service link of the service controller in accordance with some embodiments.

FIG. 24 is a functional diagram illustrating the service control device link 1691 of the service processor 115 and the service control service link 1638 of the service controller 122 in accordance with some embodiments. In particular, the service control device link 1691 of the service processor 115 and the service control service link 1638 of the service controller 122 as shown in FIG. 24 provide for secure control plane communication over the service control link 1653 between the service processor 115 and the service controller 122 in accordance with some embodiments. Various embodiments include two or three layers of encryption in the service control link, with one embodiment or layer being implemented in the encrypt functions (2408, 2428) and decode functions (2412, 2422), and another embodiment or layer implemented in the transport services stack (2410, 2420). An optional third embodiment or layer of encryption is implemented below the transport services stack, for example, with IPSEC or another IP layer encryption, VPN or tunneling scheme. For example, various known security encryption techniques can be implemented in the encrypt functions (2408, 2428), with public/private or completely private keys and/or signatures so that very strong levels of security for service processor control plane traffic can be achieved even through the basic transport services (2410, 2420) implemented with standard secure or open Internet networking protocols, such as TLS or TCP. For example, the service processor agent communications local to the device can be conducted to and from the service controller elements via the service control device link 1691 connection to the agent communication bus 1630. The combination of the service control device link 1691 and the agent communication bus 1630, which in some embodiments is also securely encrypted or signed, provides a seamless, highly secure, asynchronous control plane connection between the service processor and service controller server elements and the service controller and service controller agents that works over a wide range of access networks, such as any access network that has the capability to connect IP or TCP traffic to another TCP or IP endpoint on the access network, another private network or over the Internet 120. As described herein, in some embodiments, the agent communication bus 1630 also provides a fourth level of encrypted or signed communication to form a secure closed system on the device for agent to agent communication, for example, making it very difficult or practically impossible for software or applications to gain access to one or more of the a service processor agents on the device in any way other than the service control device link 1691. In this way, in some embodiments, the agent communication bus 1630 and the service processor agents can only be accessed by one another as necessary or permitted by agent communication policies, or by the service controller or other authorized network function with proper security credentials communicating over the service control device link 1691. Additionally, in some embodiments, communications between a subset of two or more agents, or between one or more agents and one or more service controller server elements are encrypted with unique keys or signatures in such a way that a fourth level of security providing private point to point, point to multipoint, or multipoint to multipoint secure communication lines is provided.

In some embodiments, all of the service control device link 1691 communications are transformed into a continuous control plane connection, with a frequency based on the rate of service usage, a minimum set period between connections, and/or other methods for establishing communication frequency. In some embodiments, this heartbeat function provides a continuous verification link by which the service controller verifies that the service processor and/or device are operating properly with the correct service policies being implemented. In view of the following heartbeat function embodiments described herein, it will be apparent to one of ordinary skill in the art that different approaches for implementing the various heartbeat embodiments are possible, and it will be clear that there are many ways to achieve the essential features enabling a reliable, sometimes continuous control link and verification function for the purpose of assisting control of service usage in a verifiable manner. As shown, inside the service processor 115, the service control device link 1691 includes a heartbeat send counter 2402 in communication with the agent communication bus 1630. For example, the heartbeat send counter 2402 can provide a count for triggering when a service processor 115 communication (e.g., periodic communication based on a heartbeat mechanism) should be sent to the service controller 122, and a heartbeat buffer 2404, also in communication with the agent communication bus 1630, buffers any such information for the next service processor 115 communication, in accordance with various heartbeat based embodiments, as similarly described herein. The heartbeat buffer 2404 is in communication with a framing element 2406 and an encrypt element 2408 for framing and encrypting any service processor 115 communications transmitted to the service controller 122 by a transport services stack 2410 over the service control link 1653. Similarly, as shown inside the service controller 122, the service control server link 1638 includes a heartbeat send counter 2434 in communication with a service controller network 2440, a heartbeat buffer 2432, also in communication with the service controller network 2440, buffers any such information for the next service controller 122 communication, in accordance with various heartbeat based embodiments, as similarly described herein. The heartbeat buffer 2432 is in communication with a framing element 2430 and an encrypt element 2428 for framing and encrypting any such service controller 122 communications transmitted to the service processor 115 by a transport services stack 2420 over the service control link 1653.

As also shown inside the service processor 115 of FIG. 24, the service control device link 1691 includes a decode element 2412 for decoding any received service controller 122 communications (e.g., decrypting encrypted communications), an unpack element 2414 for unpacking the received service controller 122 communications (e.g., assembling packetized communications), and an agent route 2416 for routing the received service controller 122 communications (e.g., commands, instructions, heartbeat related information or status reports, policy related information or configuration settings and/or updates, challenge/response queries, agent refreshes and/or new software for installation) to the appropriate agent of the service processor 115. Similarly, as shown inside the service controller 122, the service control server link 1638 also includes a decode element 2422 for decoding any received service processor 115 communications (e.g., decrypting encrypted communications), an unpack element 2424 for unpacking the received service processor 115 communications (e.g., assembling packetized communications), and an agent route 2426 for routing the received service processor 115 communications (e.g., responses to instructions and/or commands, heartbeat related information or status reports, policy related information or configuration settings and/or updates, challenge/response queries, agent status information, network service/cost usage and/or any other reporting related information) to the appropriate agent of the service controller 122. Accordingly, as described herein with respect to various embodiments, the various secure communications between the service controller 122 and the service processor 115 can be performed using the embodiment as shown in FIG. 24, and those of ordinary skill in the art will also appreciate that a variety of other embodiments can be used to similarly provide the various secure communications between the service controller 122 and the service processor 115 (e.g., using different software and/or hardware architectures to provide secure communications, such as using additional and/or fewer elements/functions or other design choices for providing such secure communications).

In some embodiments, an efficient and effective communication framing structure between the service processor and service controller is provided, and the following embodiments (e.g., as shown and described with respect to FIG. 25) teach such a structure that packs the various service processor agent control plane communications and the various service controller element control plane connections into a format that does not consume excessive bandwidth to enable a continuous control plane connection between the device and service controller. In some embodiments, an efficient and effective communication framing structure between the service processor and service controller is provided to buffer such communication messages for some period of time before framing and transmitting, such as in a heartbeat frequency that is based on rate of service usage. In some embodiments, an efficient and effective communication framing structure between the service processor and service controller is provided to allow for the frame to be easily packed, encrypted, decoded, unpacked and the messages distributed. In view of the various embodiments described herein, it will be apparent to one of ordinary skill in the art that many framing structures will work for the intended purpose of organizing or framing agent communications and the uniqueness and importance of combining such a system element with the device service controller functions, the service processor functions, the service control verification functions and/or the other purposes.

Figure 25:
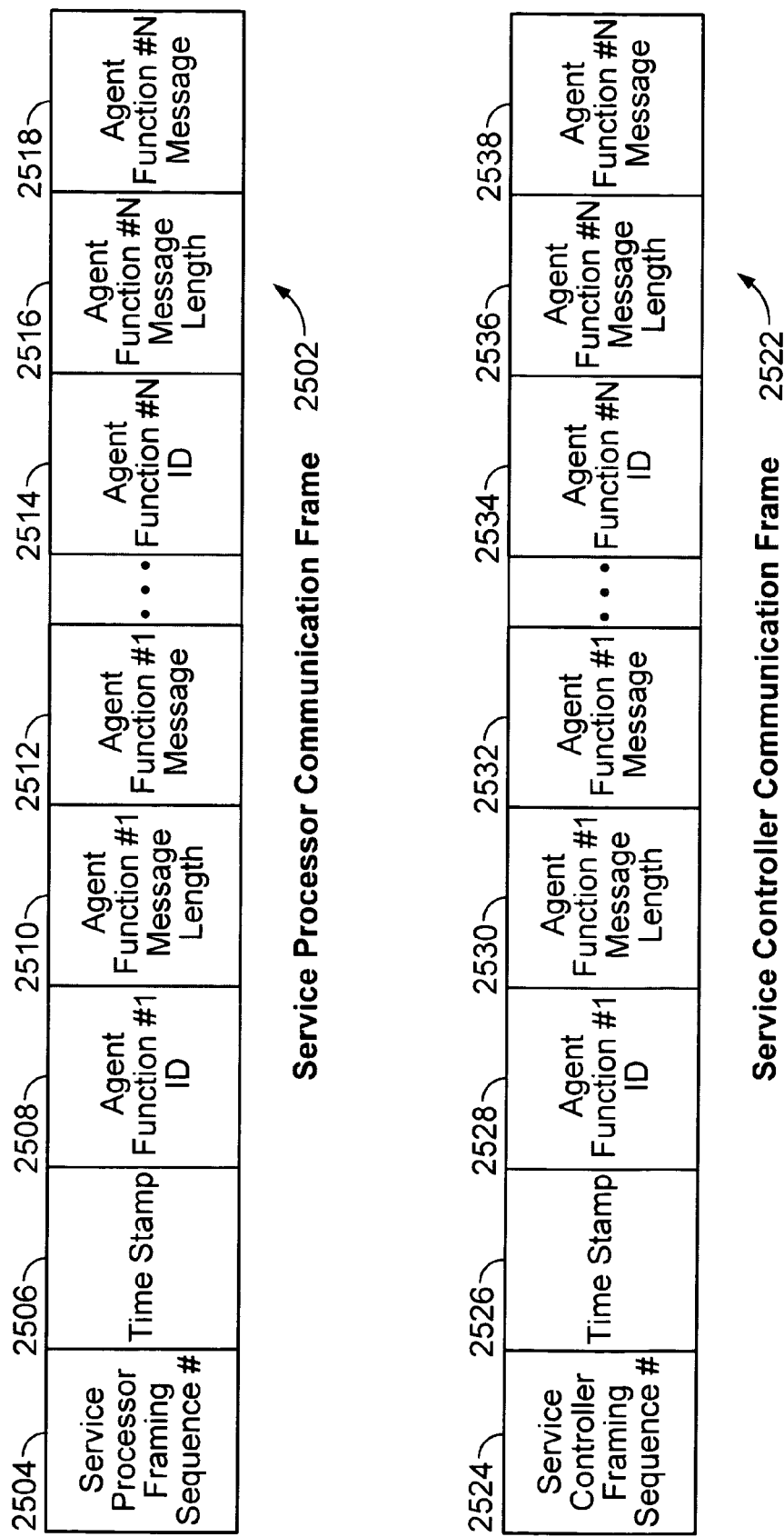
FIG. 25 is a functional diagram illustrating framing structure of a service processor communication frame and a service controller communication frame in accordance with some embodiments.

FIG. 25 is a functional diagram illustrating a framing structure of a service processor communication frame 2502 and a service controller communication frame 2522 in accordance with some embodiments. In particular, the service control device link 1691 of the service processor 115 and the service control service link 1638 of the service controller 122 (e.g., as shown in FIG. 24) provide for secure control plane communication over the service control link 1653 between the service processor 115 and the service controller 122 using communication frames in the format of the service processor communication frame 2502 and the service controller communication frame 2522 as shown in FIG. 25 in accordance with some embodiments. As shown, the service processor communication frame 2502 includes a service processor framing sequence number 2504, a time stamp 2506, an agent first function ID 2508, an agent first function message length 2510, an agent first function message 2512, and assuming more than one message is being transmitted in this frame, an agent Nth function ID 2514, an agent Nth function message length 2516, and an agent Nth function message 2518. Accordingly, the service processor communication frame 2502 can include one or more messages as shown in FIG. 25, which can depend on networking frame length requirements and/or other design choices. Similarly, as shown, the service controller communication frame 2522 includes a service controller framing sequence number 2524, a time stamp 2526, an agent first function ID 2528, an agent first function message length 2530, an agent first function message 2532, and assuming more than one message is being transmitted in this frame, an agent Nth function ID 2534, an agent Nth function message length 2536, and an agent Nth function message 2538. Accordingly, the service controller communication frame 2522 can include one or more messages as shown in FIG. 25, which can depend on networking frame length requirements and/or other design choices.

FIGS. 26A through 26H provide tables summarizing various service processor heartbeat functions and parameters (e.g., implemented by various agents, components, and/or functions implemented in software and/or hardware) in accordance with some embodiments. Many of these heartbeat functions and parameters are similarly described above, and the tables shown in FIGS. 26A through 26H are not intended to be an exhaustive summary of these heartbeat functions and parameters, but rather are provided as an aid in understanding these functions and parameters in accordance with some heartbeat based embodiments described herein.

FIGS. 27A through 27P provide tables summarizing various device based service policy implementation verification techniques in accordance with some embodiments. Many of these device based service policy implementation verification techniques are similarly described above, and the tables shown in FIGS. 27A through 27P are not intended to be an exhaustive summary of these device based service policy implementation verification techniques, but rather are provided as an aid in understanding these techniques in accordance with some device based service policy embodiments described herein.

FIGS. 28A through 28E provide tables summarizing various techniques for protecting the device based service policy from compromise in accordance with some embodiments. Many of these techniques for protecting the device based service policy from compromise are similarly described above, and the tables shown in FIGS. 28A through 28E are not intended to be an exhaustive summary of these techniques for protecting the device based service policy from compromise, but rather are provided as an aid in understanding these techniques in accordance with some device based service policy embodiments described herein.

Device Assisted Service Control and Traffic Control

As described below, various techniques are disclosed for implementing device assisted traffic shaping and service control at the lower levels of service usage policy implementation.

Figure 29:
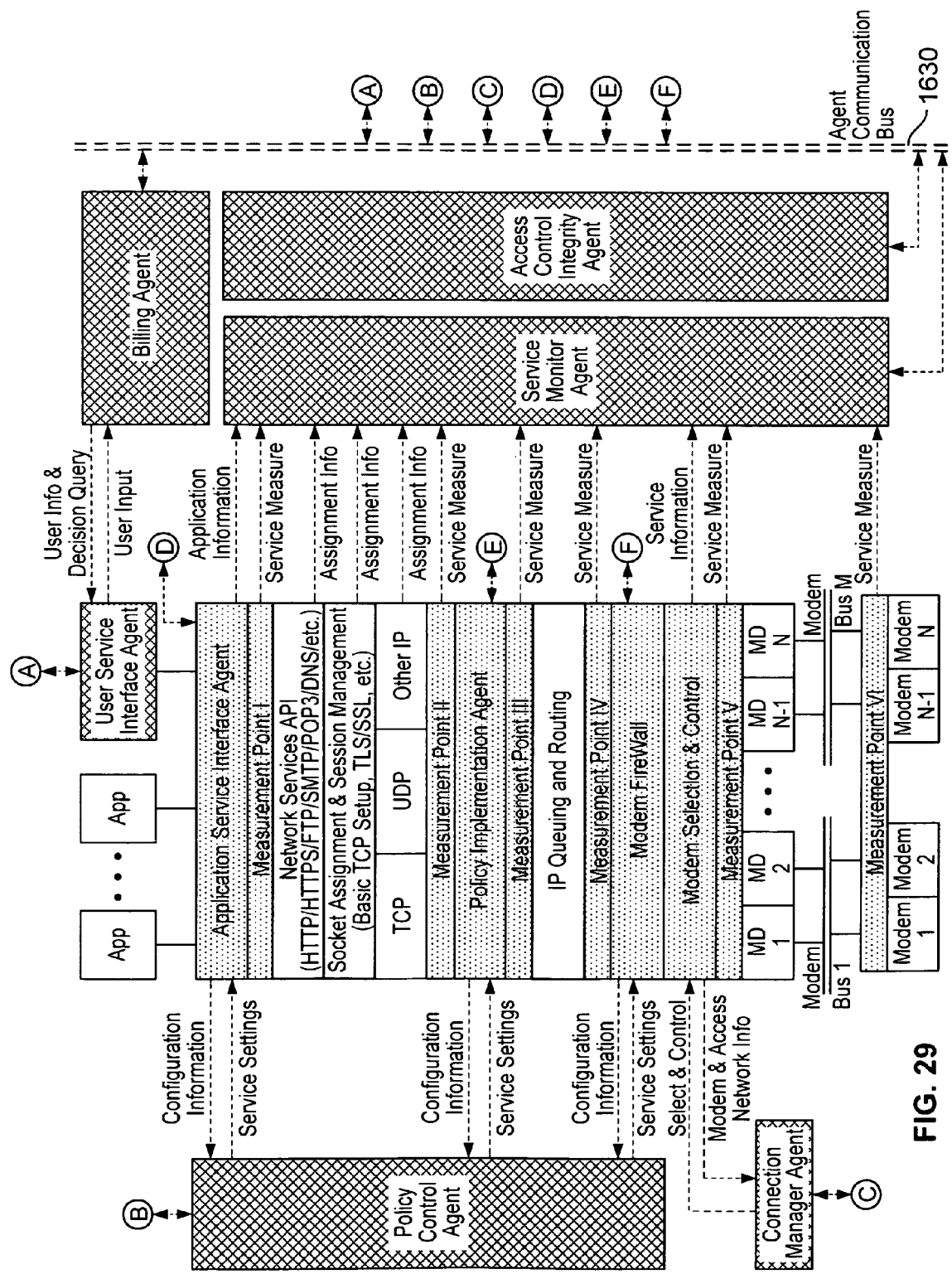
FIG. 29 is a functional diagram illustrating a device communications stack that allows for implementing verifiable traffic shaping policy, access control policy and/or service monitoring policy in accordance with some embodiments.

FIG. 29 is a functional diagram illustrating a device communications stack that allows for implementing verifiable traffic shaping policy, access control policy and/or service monitoring policy in accordance with some embodiments. As shown, several service agents take part in data path operations to achieve various data path improvements, and, for example, several other service agents can manage the policy settings for the data path service, implement billing for the data path service, manage one or more modem selection and settings for access network connection, interface with the user and/or provide service policy implementation verification. Additionally, in some embodiments, several agents perform functions to assist in verifying that the service control or monitoring policies intended to be in place are properly implemented, the service control or monitoring policies are being properly adhered to, that the service processor or one or more service agents are operating properly, to prevent unintended errors in policy implementation or control, and/or to prevent tampering with the service policies or control. As shown, the service measurement points labeled I through VI represent various service measurement points for service monitor agent 1696 and/or other agents to perform various service monitoring activities. Each of these measurement points can have a useful purpose in various embodiments described herein. For example, each of the traffic measurement points that is employed in a given design can be used by a monitoring agent to track application layer traffic through the communication stack to assist policy implementation functions, such as the policy implementation agent 1690, or in some embodiments the modem firewall agent 1655 or the application interface agent 1693, in making a determination regarding the traffic parameters or type once the traffic is farther down in the communication stack where it is sometimes difficult or impossible to make a complete determination of traffic parameters. For example, a detailed set of embodiments describing how the various measurement points can be used to help strengthen the verification of the service control implementation are described herein, including, for example, the embodiments described with respect to FIG. 16 and FIG. 21. The particular locations for the measurement points provided in these figures are intended as instructional examples, and other measurement points can be used for different embodiments, as will be apparent to one of ordinary skill in the art in view of the embodiments described herein. Generally, in some embodiments, one or more measurement points within the device can be used to assist in service control verification and/or device or service troubleshooting.

In some embodiments, the service monitor agent and/or other agents implement virtual traffic tagging by tracking or tracing packet flows through the various communication stack formatting, processing and encryption steps, and providing the virtual tag information to the various agents that monitor, control, shape, throttle or otherwise observe, manipulate or modify the traffic. This tagging approach is referred to herein as virtual tagging, because there is not a literal data flow, traffic flow or packet tag that is attached to flows or packets, and the book-keeping to tag the packet is done through tracking or tracing the flow or packet through the stack instead. In some embodiments, the application interface and/or other agents identify a traffic flow, associate it with a service usage activity and cause a literal tag to be attached to the traffic or packets associated with the activity. This tagging approach is referred to herein as literal tagging. There are various advantages with both the virtual tagging and the literal tagging approaches. For example, it can be preferable in some embodiments to reduce the inter-agent communication required to track or trace a packet through the stack processing by assigning a literal tag so that each flow or packet has its own activity association embedded in the data. As another example, it can be preferable in some embodiments to re-use portions of standard communication stack software or components, enhancing the verifiable traffic control or service control capabilities of the standard stack by inserting additional processing steps associated with the various service agents and monitoring points rather than re-writing the entire stack to correctly process literal tagging information, and in such cases, a virtual tagging scheme may be desired. As yet another example, some standard communication stacks provide for unused, unspecified or otherwise available bit fields in a packet frame or flow, and these unused, unspecified or otherwise available bit fields can be used to literally tag traffic without the need to re-write all of the standard communication stack software, with only the portions of the stack that are added to enhance the verifiable traffic control or service control capabilities of the standard stack needing to decode and use the literal tagging information encapsulated in the available bit fields. In the case of literal tagging, in some embodiments, the tags are removed prior to passing the packets or flows to the network or to the applications utilizing the stack. In some embodiments, the manner in which the virtual or literal tagging is implemented can be developed into a communication standard specification so that various device or service product developers can independently develop the communication stack and/or service processor hardware and/or software in a manner that is compatible with the service controller specifications and the products of other device or service product developers.

It will be appreciated that although the implementation/use of any or all of the measurement points illustrated in FIG. 29 is not required to have an effective implementation, such as was similarly shown with respect to various embodiments described herein, such as with respect to FIGS. 19 and 21, various embodiments can benefit from these and/or similar measurement points. It will also be appreciated that the exact measurement points can be moved to different locations in the traffic processing stack, just as the various embodiments described herein can have the agents affecting policy implementation moved to different points in the traffic processing stack while still maintaining effective operation. In some embodiments, one or more measurement points are provided deeper in the modem stack (e.g., such as for embodiments similarly described herein with respect to FIGS. 35 and 36) where, for example, it is more difficult to circumvent and can be more difficult to access for tampering purposes if the modem is designed with the proper software and/or hardware security to protect the integrity of the modem stack and measurement point(s).

Referring to FIG. 29, describing the device communications stack from the bottom to the top of the stack as shown, the device communications stack provides a communication layer for each of the modems of the device at the bottom of the device communications stack. Example measurement point VI resides within or just above the modem driver layer. For example, the modem driver performs modem bus communications, data protocol translations, modem control and configuration to interface the networking stack traffic to the modem. As shown, measurement point VI is common to all modem drivers and modems, and it is advantageous for certain embodiments to differentiate the traffic or service activity taking place through one modem from that of one or more of the other modems. In some embodiments, measurement point VI, or another measurement point, is located over, within or below one or more of the individual modem drivers. The respective modem buses for each modem reside between example measurement points V and VI. In the next higher layer, a modem selection & control layer for multimode device based communication is provided. In some embodiments, this layer is controlled by a network decision policy that selects the most desirable network modem for some or all of the data traffic, and when the most desirable network is not available the policy reverts to the next most desirable network until a connection is established provided that one of the networks is available. In some embodiments, certain network traffic, such as verification, control, redundant or secure traffic, is routed to one of the networks even when some or all of the data traffic is routed to another network. This dual routing capability provides for a variety of enhanced security, enhanced reliability or enhanced manageability devices, services or applications. In the next higher layer, a modem firewall is provided. For example, the modem firewall provides for traditional firewall functions, but unlike traditional firewalls, in order to rely on the firewall for verifiable service usage control, such as access control and security protection from unwanted networking traffic or applications, the various service verification techniques and agents described herein are added to the firewall function to verify compliance with service policy and prevent tampering of the service controls. In some embodiments, the modem firewall is implemented farther up the stack, possibly in combination with other layers as indicated in other Figures. In some embodiments, a dedicated firewall function or layer is provided that is independent of the other processing layers, such as the policy implementation layer, the packet forwarding layer and/or the application layer. In some embodiments, the modem firewall is implemented farther down the stack, such as within the modem drivers, below the modem drivers, or in the modem itself. Example measurement point IV resides between the modem firewall layer and an IP queuing and routing layer. As shown, an IP queuing and routing layer is separate from the policy implementation layer where the policy implementation agent implements a portion of the traffic control and/or service usage control policies. As described herein, in some embodiments, these functions are separated so that a standard network stack function can be used for IP queuing and routing, and the modifications necessary to implement the policy implementation agent functions can be provided in a new layer inserted into the standard stack. In some embodiments, the IP queuing and routing layer is combined with the traffic or service usage control layer. Examples of this combined functionality are shown and described with respect to FIGS. 31, 32 and 33. For example, a combined routing and policy implementation layer embodiment can also be used with the other embodiments, such as shown in FIG. 29. Various detailed embodiments describing how the policy implementation layer can control traffic or other service usage activities are described with respect to FIG. 38. Measurement point III resides between the IP queuing and routing layer and a policy implementation agent layer. Measurement point II resides between the policy implementation agent layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 29.

As shown, the application service interface layer is above the standard networking stack API and, in some embodiments, its function is to monitor and in some cases intercept and process the traffic between the applications and the standard networking stack API. In some embodiments, the application service interface layer identifies application traffic flows before the application traffic flows are more difficult or practically impossible to identify farther down in the stack. In some embodiments, the application service interface layer in this way assists application layer tagging in both the virtual and literal tagging cases. In the case of upstream traffic, the application layer tagging is straight forward, because the traffic originates at the application layer. In some downstream embodiments, where the traffic or service activity classification relies on traffic attributes that are readily obtainable, such as source address or URL, application socket address, IP destination address, time of day or any other readily obtained parameter, the traffic type can be identified and tagged for processing by the firewall agent or another agent as it initially arrives. In other embodiments, as described herein, in the downstream case, the solution is generally more sophisticated when a traffic parameter that is needed to classify the manner in which the traffic flow is to be controlled or throttled is not readily available at the lower levels of the stack, such as association with an aspect of an application, type of content, something contained within TLS, IPSEC or other secure format, or other information associated with the traffic. Accordingly, in some embodiments the networking stack identifies the traffic flow before it is fully characterized, categorized or associated with a service activity, and then passes the traffic through to the application interface layer where the final classification is completed. In such embodiments, the application interface layer then communicates the traffic flow ID with the proper classification so that after an initial short traffic burst or time period the policy implementation agents can properly control the traffic. In some embodiments, there is also a policy for tagging and setting service control policies for traffic that cannot be fully identified with all sources of tagging including application layer tagging.

Various applications and/or a user service interface agent communicate via this communications stack, as shown (illustrating such communications with a reference (A)). Also, the billing agent, which is in communication with the agent communication bus 1630, communicates user information and decision query and/or user input to the user service interface agent, as shown. The policy control agent communicates service settings and/or configuration information via this communications bus 1630, as shown (illustrating such communications with a reference (B) via the application layer, policy implementation agent layer, which is lower in the communications stack as shown, and/or the modem firewall layer). The connection manager agent communicates select and control commands and/or modem and access network information via this communications stack, as shown (illustrating such communications with a reference (C) via the modem selection and control layer). Various other communications (e.g., service processor and/or service controller related communications, such as service usage measure information and/or application information) are provided at various levels of this communications stack, as shown (illustrating such communications with references (D) at the application layer, (E) at the policy implementation agent layer, and (F) at the modem firewall layer).

As shown in FIG. 29, a service monitor agent, which is also in communication with the agent communication bus 1630, communicates with various layers of the device communications stack. For example, the service monitor agent, performs monitoring at each of measurement points I through VI, receiving information including application information, service usage and other service related information, and assignment information. An access control integrity agent is in communication with the service monitor agent via the agent communications bus 1630, as also shown.

In some embodiments, one or more of the networking stack modifications described herein in combination one or more of the service verification and tamper prevention techniques described herein is provided. As similarly described with respect to FIG. 29, the various example embodiments for assisting service control verification described herein and as summarized in the example tables provided in FIGS. 26, 27 and 28 can be employed individually or in combination to create increasingly secure cross-functional service control verification embodiments. In FIG. 29, the presence of the access control integrity agent, policy control agent, service monitor agent and the other agents that perform verification and/or tamper prevention functions illustrates verifiable service control aspects in accordance with some embodiments. Furthermore, the presence of the billing agent combined with the service verification and/or tamper prevention agents and techniques described herein provides for a set of verifiable billing embodiments for service billing, service billing offset corrections, bill by account, transaction billing and other billing functions. In addition, the presence of the user service interface agent in combination with the service control agent functions in the modified networking stack provide for embodiments involving a combination of service control with user preferences, which as described herein, provides the user with the capability to optimize service versus service cost in a network neutral manner. In some embodiments, the user control of service control policy is provided along with the service control verification and/or tamper prevention. The presence of the policy control agent that in some embodiments implements a higher than most basic level of policy decision and control with the policy implementation agents in the modified networking stack allows for, for example, the device to possess the capability to implement a higher level of service control for the purpose of obtaining a higher level service usage or service activity objective. In some embodiments, the application layer tagging in combination with other embodiments described herein provides for deep service activity control that is verifiable.

In some embodiments, verifiable traffic shaping as described herein can be performed using the device communications stack in a variety of embodiments for the combination of service control within the networking stack and service control verification and/or tamper prevention, with various embodiments depicted in FIGS. 29 through 37. Additional levels of detail regarding how such embodiments can be used to implement verifiable traffic shaping are provided in and described with respect to FIGS. 38 through 40 which depict example functional diagrams of packet processing flows for verifiable traffic shaping or service activity control in a device service processor for both upstream and downstream flows. Along with several other interesting features embodied in FIGS. 38 through 40, application traffic layer tagging is depicted in additional detail in accordance with some embodiments. For example, the application interface agent can determine service data usage at the application layer using measurement point I and a local service usage counter, and can, for example, pass this information to the service monitor agent. If service usage exceeds a threshold, or if using a service usage prediction algorithm results in predicted service usage that will exceed a threshold, then the user can be notified of which applications are causing the service usage overrun or potential service usage overrun, via the user service interface agent. The user can then identify which application service (e.g., traffic associated with a specified high service use or non-critical application, such as for example a high bandwidth consumption social networking website or service, media streaming website or service, or any other high bandwidth website or service transmitting and/or receiving data with the service network) that the user prefers to throttle. As another example, the user could select a service policy that allows for video chat services until those services threaten to cause cost over-runs on the user's service plan, and at that time the service policy could switch the chat service to voice only and not transmit or receive the video. The traffic associated with the user specified application can then be throttled according to user preference input. For example, for downstream traffic, packets (e.g., packets that are virtually or literally tagged and/or otherwise associated with the application traffic to be throttled) from the access network can be buffered, delayed and/or dropped to throttle the identified application traffic. For upstream traffic, packets (e.g., packets that are virtually or literally tagged and/or otherwise associated with the application traffic to be throttled) can be buffered, delayed and/or dropped before being transmitted to the access network to throttle the identified application traffic. As similarly described above, traffic shaping as described herein can be verified, such as by the service monitor agent via the various measurement points and/or using other agents.

Figure 30:
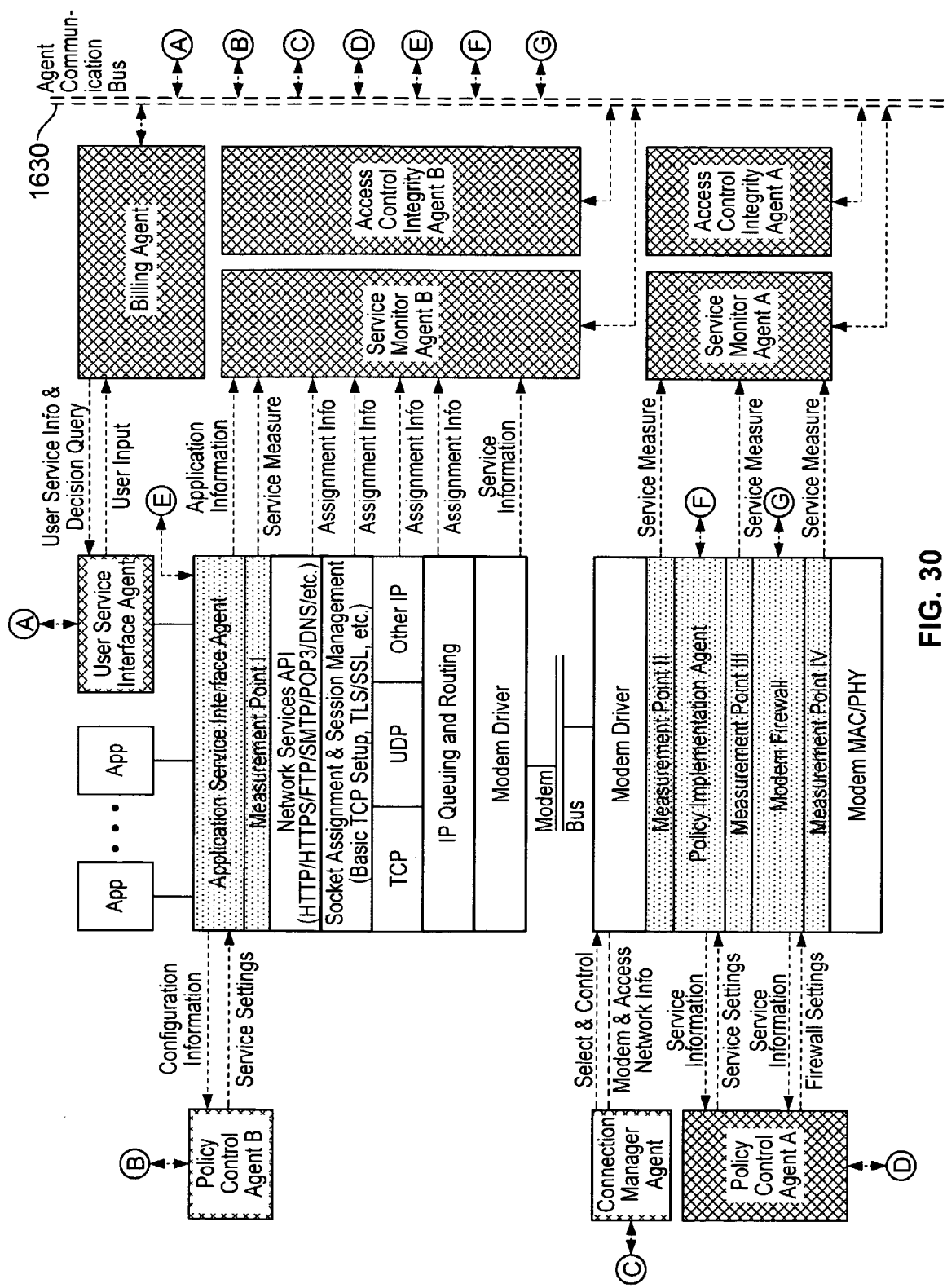
FIG. 30 is another functional diagram illustrating the device communications stack that allows for implementing traffic shaping policy, access control policy and/or service monitoring policy in accordance with some embodiments.

The embodiments depicted in FIG. 30 and other figures generally require enhancements to conventional device networking communication stack processing. For example, these enhancements can be implemented in whole or in part in the kernel space for the device OS, in whole or in part in the application space for the device, or partially in kernel space and partially in application space. As described herein, the networking stack enhancements and the other elements of the service processor can be packaged into a set of software that is pre-tested or documented to enable device manufacturers to quickly implement and bring to market the service processor functionality in a manner that is compatible with the service controller and the applicable access network(s). For example, the service processor software can also be specified in an interoperability standard so that various manufacturers and software developers can develop service processor implementations or enhancements, or service controller implementations or enhancements that are compatible with one another.

FIG. 30 is another functional diagram illustrating the device communications stack that allows for implementing traffic shaping policy, access control policy and/or service monitoring policy in accordance with some embodiments. In some embodiments, a portion of the service processor is implemented on the modem (e.g., on modem module hardware or modem chipset) and a portion of the service processor is implemented on the device application processor subsystem. It will be apparent to one of ordinary skill in the art that variations of the embodiment depicted in FIG. 30 are possible where more or less of the service processor functionality is moved onto the modem subsystem or onto the device application processor subsystem. For example, such embodiments similar to that depicted in FIG. 30 can be motivated by the advantages of containing some or all of the service processor network communication stack processing and/or some or all of the other service agent functions on the modem subsystem (e.g., and such an approach can be applied to one or more modems). For example, the service processor can be distributed as a standard feature set contained in a modem chipset hardware of software package or modem module hardware or software package, and such a configuration can provide for easier adoption or development by device OEMs, a higher level of differentiation for the chipset or modem module manufacturer, higher levels of performance or service usage control implementation integrity or security, specification or interoperability standardization, and/or other benefits.

Referring to FIG. 30, describing the device communications stack from the bottom to the top of the stack as shown, the device communications stack provides a communication layer for modem MAC/PHY layer at the bottom of the device communications stack. Measurement point IV resides above the modem MAC/PHY layer. The modem firewall layer resides between measurement points IV and III. In the next higher layer, the policy implementation agent is provided, in which the policy implementation agent is implemented on the modem (e.g., on modem hardware). Measurement point II resides between the policy implementation agent and the modem driver layer, which is then shown below a modem bus layer. The next higher layer is shown as the IP queuing and routing layer, followed by the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 30.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent B communicates service settings and/or configuration information via this communications stack, as shown (illustrating such communications with a reference (B)) via the application layer. The policy control agent A communicates service settings and/or configuration information via this communications stack, as shown (illustrating such communications with a reference (D)) via the policy implementation agent layer and/or the modem firewall layer. The connection manager agent communicates select & control commands and/or modem and access network information via this communications stack, as shown (illustrating such communications with a reference (C)) via the modem driver layer. Various other communications (e.g., service processor and/or service controller related communications, such as service usage measure information, and/or application information) are provided at various levels of this communications stack, as shown (illustrating such communications with references (E)) at the application layer through the modem driver layer with the service monitor agent B as shown (and an access control integrity agent B is also shown), and communications with references (F) at the policy implementation agent layer and (G) at the modem firewall layer with the service monitor agent A as shown (and an access control integrity agent A is also shown). In some embodiments, the service usage policy verification or tamper prevention embodiments described herein can be applied, in isolation or in combination, in the context of FIG. 31 to provide for embodiments with increasing levels of service usage policy control verification certainty, such as provided with FIGS. 26, 27 and 28.

Figure 31:
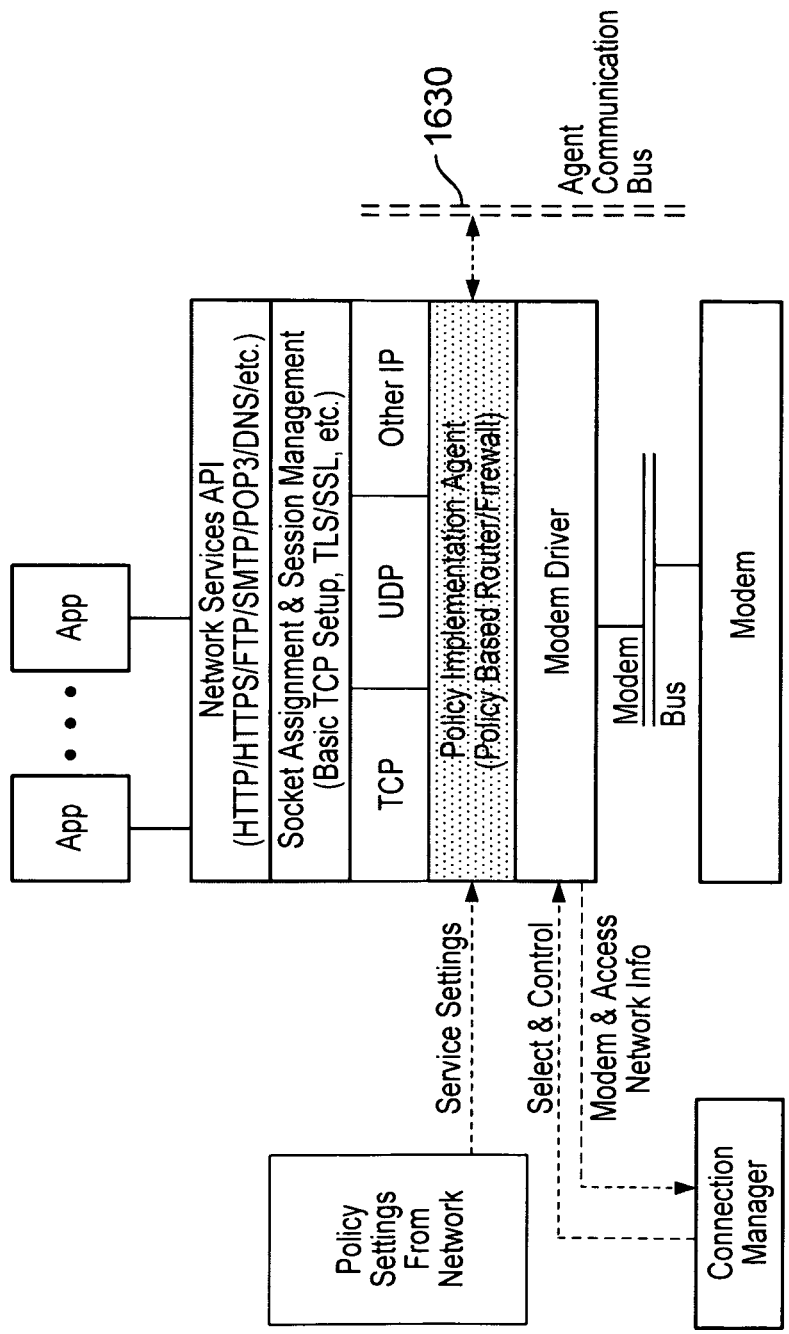
FIG. 31 is another functional diagram illustrating the device communications stack that allows for implementing traffic shaping policy, access control policy and/or service monitoring policy in accordance with some embodiments.

FIG. 31 is another functional diagram illustrating the device communications stack that allows for implementing traffic shaping policy, access control policy and/or service monitoring policy in accordance with some embodiments. In some embodiments, the service processor is a simplified implementation. For example, this approach can be used for applications with less capable device application processors, rapid time to market needs, fewer service usage control needs, and/or other reasons that lead to a need for a lower complexity implementation.

Referring to FIG. 31, describing the device communications stack from the bottom to the top of the stack as shown, the device communications stack provides a communication layer for the modem layer at the bottom of the device communications stack. The modem driver layer resides above the modem bus layer as shown. In the next higher layer, the policy implementation agent is provided, and the policy implementation agent is also in communication with the agent communication bus 1630 as shown. The next higher layer is shown as the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem driver as shown. Although FIG. 31 does not depict all of the service usage control verification functions provided by certain embodiments calling for additional service verification or control agents, a high level of service policy implementation verification certainty can be achieved within the context of the embodiments depicted in FIG. 31 by applying a subset of the service usage policy verification or tamper prevention embodiments described herein. For example, the embodiments depicted in FIG. 31 can be combined with the service controller embodiments that utilize IPDRs to verify service usage is in accordance with the desired service policy. There are also many other service usage control embodiments described herein that can be applied in isolation or in combination to the embodiments depicted in FIG. 31 to provide increasing levels of service usage control verification certainty, as will be apparent to one of ordinary skill in the art in view of FIGS. 26, 27 and 28 and the various embodiments described herein.

Figure 32:
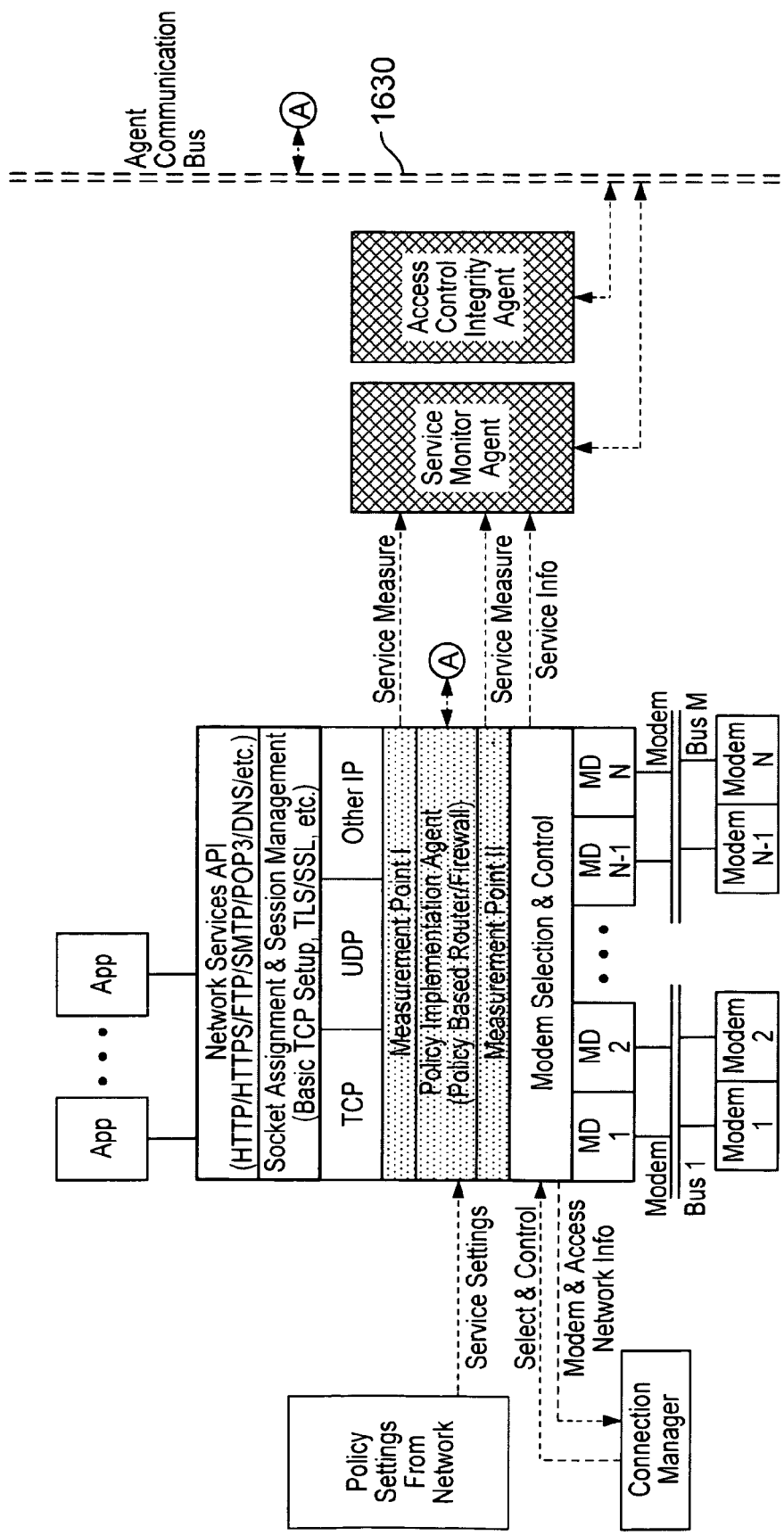
FIG. 32 is another functional diagram illustrating the device communications stack that allows for implementing traffic shaping policy, access control policy and/or service monitoring policy in accordance with some embodiments.

FIG. 32 is another functional diagram illustrating the device communications stack that allows for implementing traffic shaping policy, access control policy and/or service monitoring policy in accordance with some embodiments. In some embodiments, the service processor is a simplified implementation embodiment with device based monitoring and integrity control. For example, FIG. 32 provides for somewhat higher complexity (e.g., relative to the embodiments depicted in FIG. 30) in exchange for the enhanced service monitoring, control or verification that are possible by implement additional agent embodiments, such as the service monitor agent and the access control integrity agent functions.

Referring to FIG. 32, describing the device communications stack from the bottom to the top of the stack as shown, the device communications stack provides a communication layer for each of the modems of the device at the bottom of the device communications stack. Measurement point II resides above the modem selection & control layer, which resides above the modem buses for each modem. Measurement point I resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Applications communicate with the device communications stack via the network services API as shown. Policy settings from the network (e.g., service settings) are communicated with the policy implementation agent as shown. The connection manager communicates select and control as well as modem and access network information via the modem selection and control layer as shown. The service monitor agent, which is also in communication with the agent communication bus 1630, communicates with various layers of the device communications stack. For example, the service monitor agent, performs monitoring at each of measurement points I and II, receiving information including application information, service usage and other service related information, and assignment information. An access control integrity agent is in communication with the service monitor agent via the agent communications bus 1630, as also shown. As similarly described with respect to FIGS. 30 and 31, many of the service usage control verification embodiments described herein can be applied in isolation or in combination in the context of FIG. 32.

Figure 33:
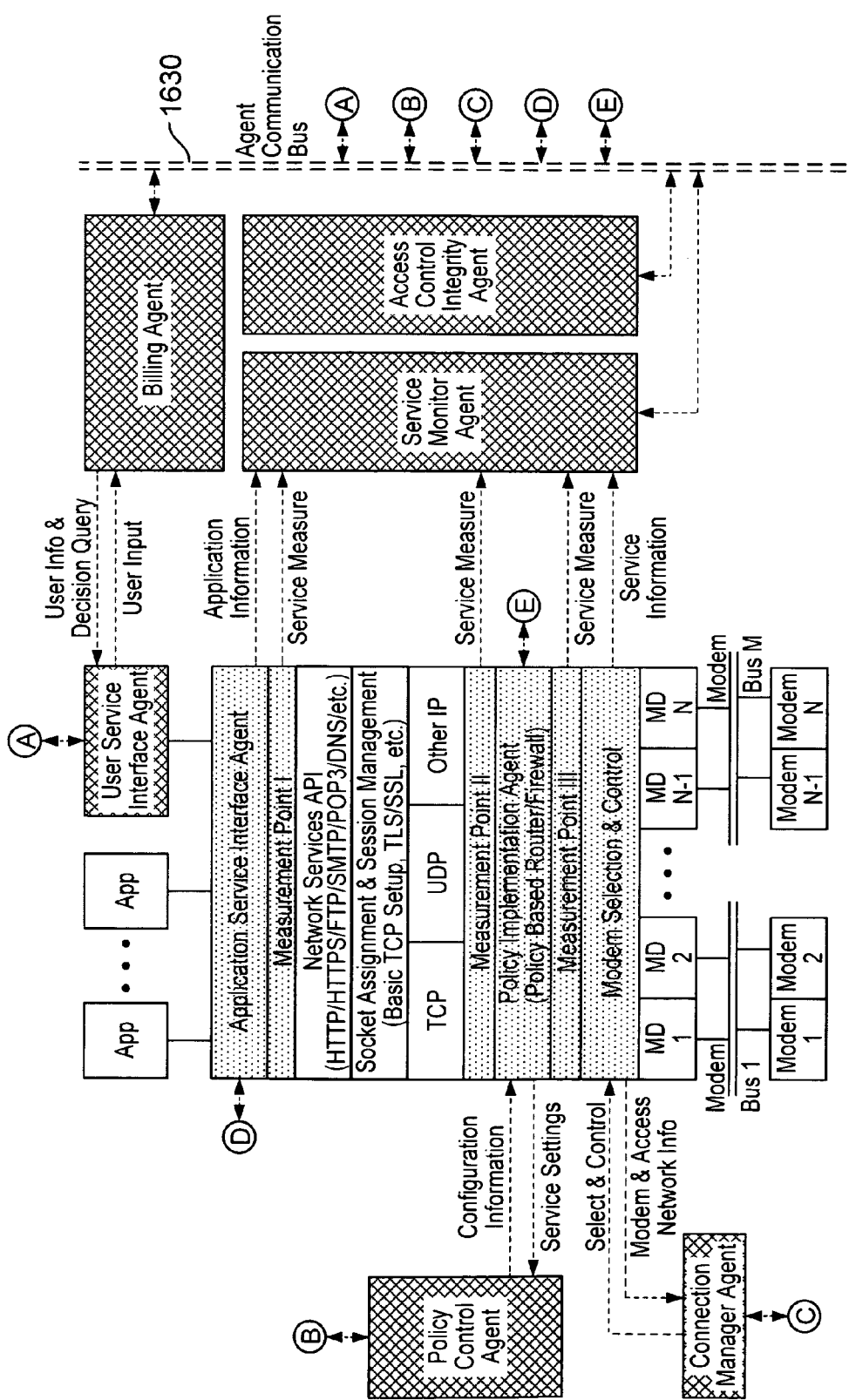
FIG. 33 is another functional diagram illustrating the device communications stack that allows for implementing traffic shaping policy, access control policy and/or service monitoring policy in accordance with some embodiments.

FIG. 33 is another functional diagram illustrating the device communications stack that allows for implementing traffic shaping policy, access control policy and/or service monitoring policy in accordance with some embodiments. Referring to FIG. 33, describing the device communications stack from the bottom to the top of the stack as shown, the device communications stack provides a communication layer for each of the modems of the device at the bottom of the device communications stack. Measurement point III resides above the modem selection & control layer, which resides above the respective modem buses for each modem. Measurement point II resides between the policy implementation agent (policy based router/firewall) layer and the transport layer, including TCP, UDP, and other IP as shown. The session layer resides above the transport layer, which is shown as a socket assignment and session management (e.g., basic TCP setup, TLS/SSL) layer. The network services API (e.g., HTTP, HTTPS, FTP (File Transfer Protocol), SMTP (Simple Mail Transfer Protocol), POP3, DNS) resides above the session layer. Measurement point I resides between the network services API layer and an application layer, shown as application service interface agent in the device communications stack of FIG. 33.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. The connection manager agent communicates select & control commands and/or modem and access network information via this communications stack, as shown (illustrating such communications with a reference (C)) via the modem selection and control layer. Various other communications (e.g., service processor and/or service controller related communications, such as service usage measure information, application information) are provided at various levels of this communications stack, as shown (illustrating such communications with references (D)) at the application layer and (E) at the policy implementation agent layer.

As shown in FIG. 33, a service monitor agent, which is also in communication with the agent communication bus 1630, communicates with various layers of the device communications stack. For example, the service monitor agent, performs monitoring at each of measurement points I through III, receiving information including application information, service usage and other service related information, and assignment information. An access control integrity agent is in communication with the service monitor agent via the agent communications bus 1630, as also shown. As similarly described with respect to FIGS. 30, 31 and 32, many of the service usage control verification embodiments disclosed herein can be applied in isolation or in combination in the context of FIG. 33.

Figure 34:
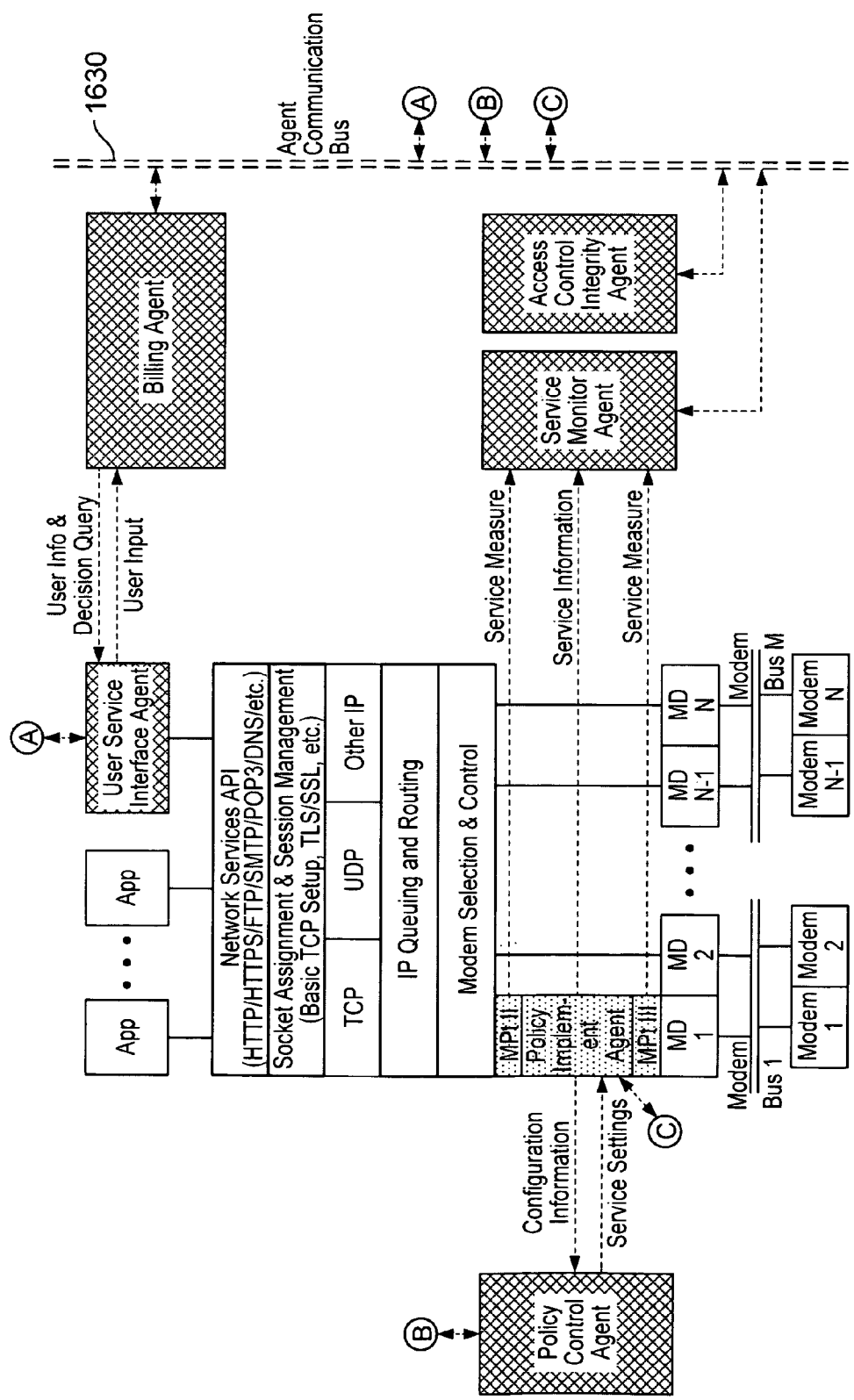
FIG. 34 is another functional diagram illustrating the device communications stack that allows for implementing traffic shaping policy, access control policy and/or service monitoring policy in accordance with some embodiments.

FIG. 34 is another functional diagram illustrating the device communications stack that allows for implementing traffic shaping policy, access control policy and/or service monitoring policy in accordance with some embodiments. In some embodiments, the data path processing for the service processor is provided in conjunction with a single modem driver as shown. As shown, the service processor communication stack processing is provided below the standard network communication stack and in combination with a modem driver (e.g., and this approach can be extended to more than one modem).

Referring to FIG. 34, describing the device communications stack from the bottom to the top of the stack as shown, the device communications stack provides a communication layer for each of the modems of the device at the bottom of the device communications stack. Measurement point II resides above the modem driver 1 layer. Measurement point I resides between the policy implementation agent (policy based router/firewall) layer and the modem selection and control layer, for the modem driver 1 stack in this single modem driver embodiment. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 34, applications communicate with the device communications stack via the network services API as shown (illustrating such communications with a reference (A)). Policy settings from the network (e.g., service settings) are communicated with the policy implementation agent as shown (illustrating such communications with a reference (B)). The service monitor agent, which is also in communication with the agent communication bus 1630, communicates with policy implementation agent layer of the device communications stack. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information, application information) are provided at various levels of this communications stack, as shown (illustrating such communications with references (C)) at the policy implementation agent layer. Also, the billing agent, which is in communication with the agent communication bus 1630 communications user information and decision query and/or user input to the user service interface agent, as shown. As similarly described with respect to FIGS. 30, 31, 32 and 33, many of the service usage control verification embodiments disclosed herein can be applied in isolation or in combination in the context of FIG. 34.

Figure 35:
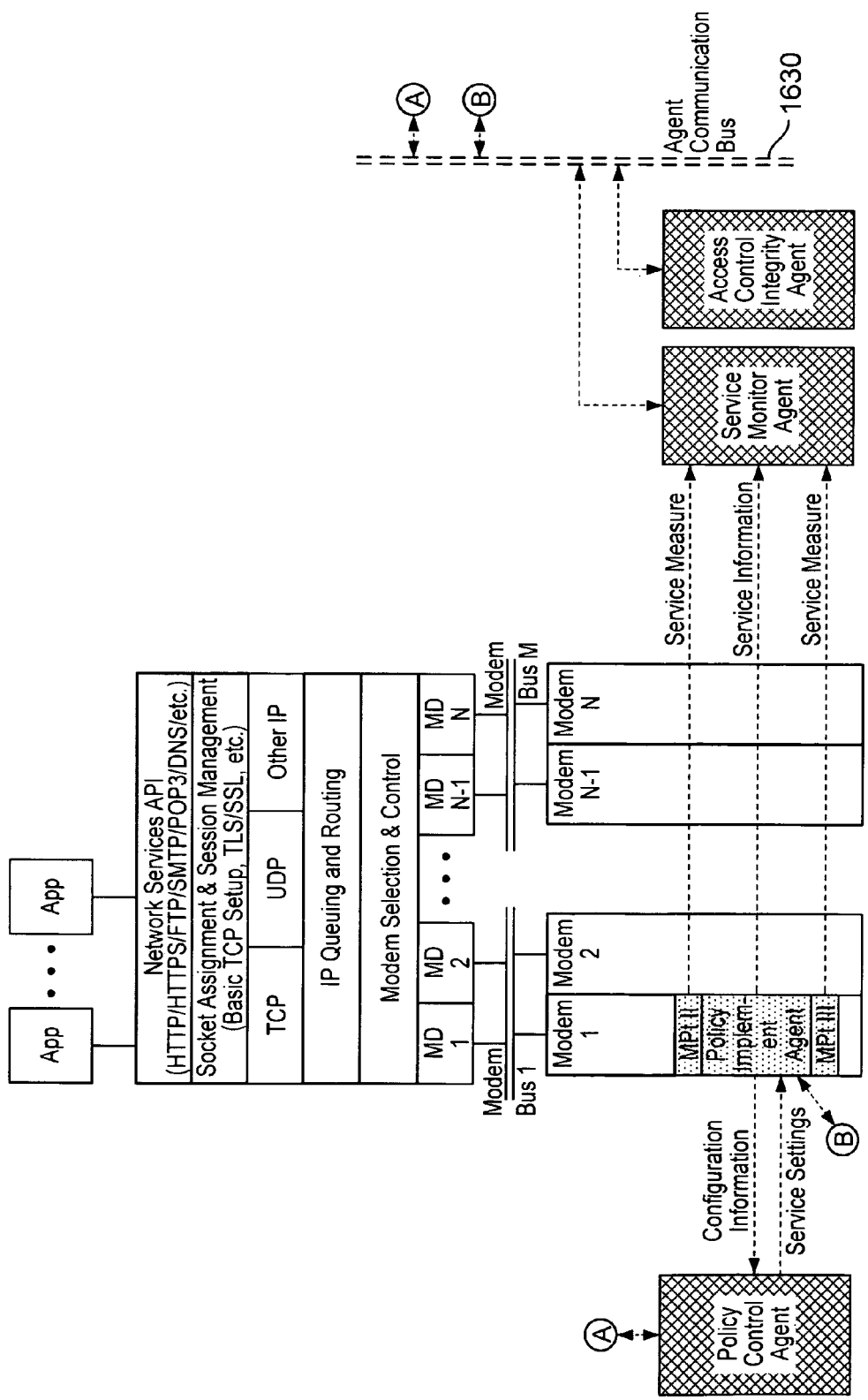
FIG. 35 is another functional diagram illustrating the device communications stack that allows for implementing traffic shaping policy, access control policy and/or service monitoring policy in accordance with some embodiments.

FIG. 35 is another functional diagram illustrating the device communications stack that allows for implementing traffic shaping policy, access control policy and/or service monitoring policy in accordance with some embodiments. In particular, FIG. 35 illustrates a single modem hardware embodiment as shown. As shown, the service processor network communication stack processing is provided on the modem hardware (e.g., and this approach can be extended to more than one modem). This approach allows for the service processor to be distributed as a standard feature set contained in a modem chipset hardware of software package or modem module hardware or software package, which, for example, can provide for easier adoption or development by device OEMs, a higher level of differentiation for the chipset or modem module manufacturer, higher levels of performance or service usage control implementation integrity, or other benefits.

Referring to FIG. 35, describing the device communications stack from the bottom to the top of the stack as shown, the device communications stack provides a communication layer for each of the modems of the device at the bottom of the device communications stack. As shown, measurement points I and II and the policy implementation agent reside on the modem 1 (e.g., implemented as hardware and/or software on modem 1). Measurement point I resides above the policy implementation agent (policy based router/firewall) layer, and measurement point II resides below the policy implementation agent later. The modem selection and control layer resides above the modem drivers layer, as shown. The transport layer, including TCP, UDP, and other IP resides above the IP queuing and routing layer, which resides above the modem selection and control layer, as shown. The session layer, which is shown as a socket assignment and session management (e.g., basic TCP setup, TLS/SSL) layer, resides above the transport layer. The network services API (e.g., HTTP, HTTPS, FTP (File Transfer Protocol), SMTP (Simple Mail Transfer Protocol), POP3, DNS) resides above the session layer.

As shown in FIG. 35, applications communicate with the device communications stack via the network services API as shown. Policy settings from the network (e.g., service settings) are communicated with the policy implementation agent as shown (illustrating such communications with a reference (A)). The service monitor agent, which is also in communication with the agent communication bus 1630, communicates with policy implementation agent layer of the modem 1. Also, the service monitor agent performs monitoring at each of measurement points I and II, receiving information including application information, service usage and other service related information, and assignment information. An access control integrity agent is in communication with the service monitor agent via the agent communications bus 1630, as also shown. Various other communications (e.g., service processor and/or service controller related communications, such as service usage measure information and/or application information) are provided at various levels of this communications stack, as shown (illustrating such communications with references (B)) at the policy implementation agent layer. As similarly described with respect to FIGS. 30, 31, 32, 33 and 34, many of the service usage control verification embodiments disclosed herein can be applied in isolation or in combination in the context of FIG. 35.

Figure 36:
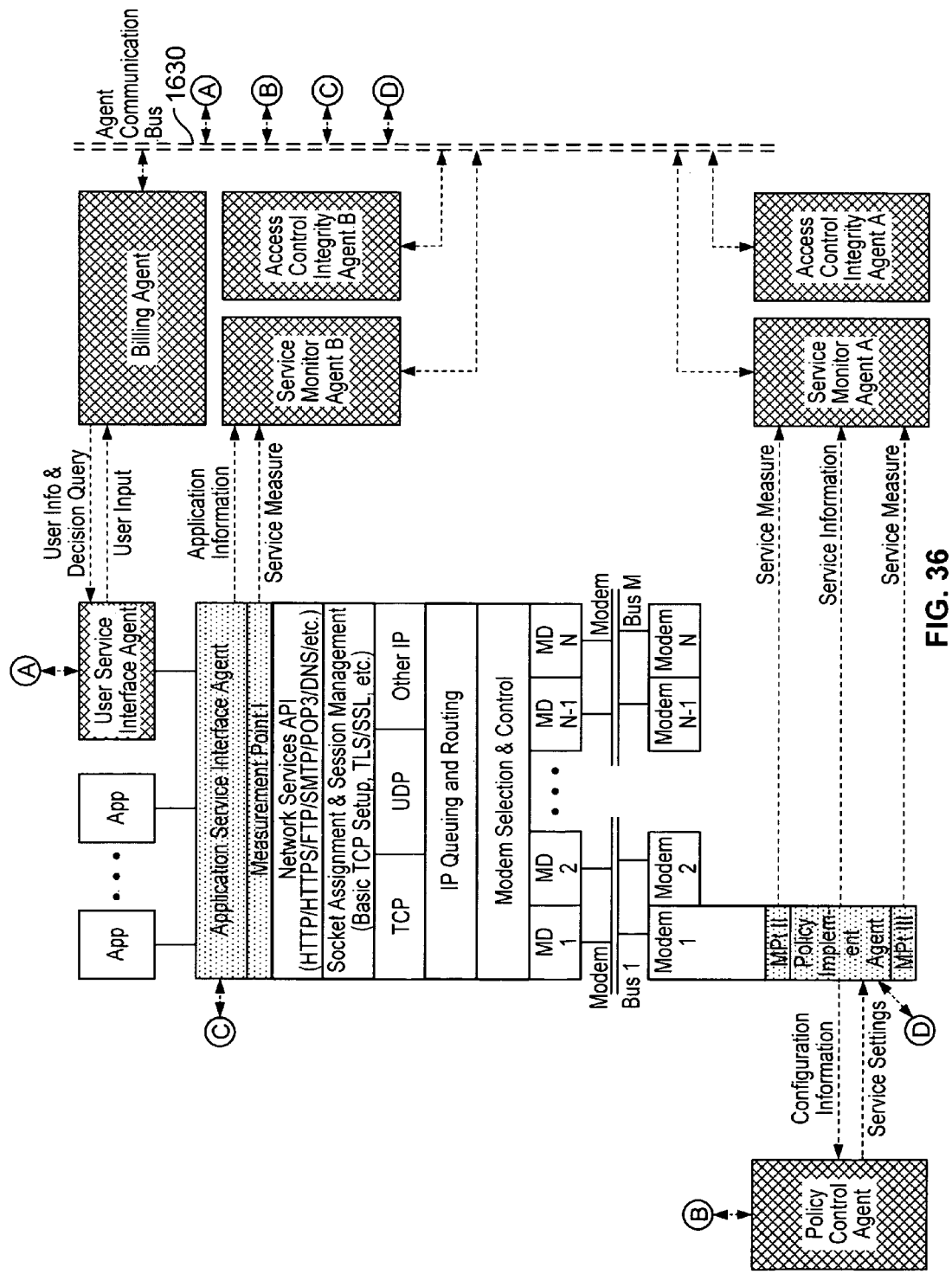
FIG. 36 is another functional diagram illustrating the device communications stack that allows for implementing traffic shaping policy, access control policy and/or service monitoring policy in accordance with some embodiments.

FIG. 36 is another functional diagram illustrating the device communications stack that allows for implementing traffic shaping policy, access control policy and/or service monitoring policy in accordance with some embodiments. In particular, FIG. 36 illustrates a single modem hardware embodiment, in which modem 1 includes a portion of the service processor networking communication stack processing and measurement points II and III and the policy implementation agent, as similarly shown in FIG. 35, and the higher levels of the device communications stack above the modem 1 layer, such as the application service interface layer, are implemented on the device application processor or in the device application processor memory as similarly described above, for example, with respect to FIG. 33, in which a measurement point I is shown between the application service interface agent layer and the network services API layer. For example, this approach allows for the application service interface agent to be provided on the device application processor or memory so that application layer service usage monitoring or control can be implemented. For example, the differences between the embodiments depicted in FIG. 36 and those of FIG. 30 include a simplified implementation and a policy control agent that is entirely implemented on the modem and not partially implemented in the application processor memory.

Various applications and/or a user service interface agent communicate via this communications stack, as shown (illustrating such communications with a reference (A)). Also, the billing agent, which is in communication with the agent communication bus 1630 communications user information and decision query and/or user input to the user service interface agent, as shown. The policy control agent communicates service settings and/or configuration information via this communications stack, as shown (illustrating such communications with a reference (B)) via the policy implementation agent layer. Various other communications (e.g., service processor and/or service controller related communications, such as service usage measure information and/or application information) are provided at various levels of this communications stack, as shown (illustrating such communications with reference (C) at the application layer and communications with reference (D) at the policy implementation agent layer). As shown, the service monitor agent B communicates with the application service interface agent and measurement point I, and the service monitor agent A communicates with the policy implementation agent layer and measurement points II and III of the modem 1. As similarly described with respect to FIGS. 30, 31, 32, 33, 34 and 35, many of the service usage control verification embodiments disclosed herein can be applied in isolation or in combination in the context of FIG. 36.

Figure 37:
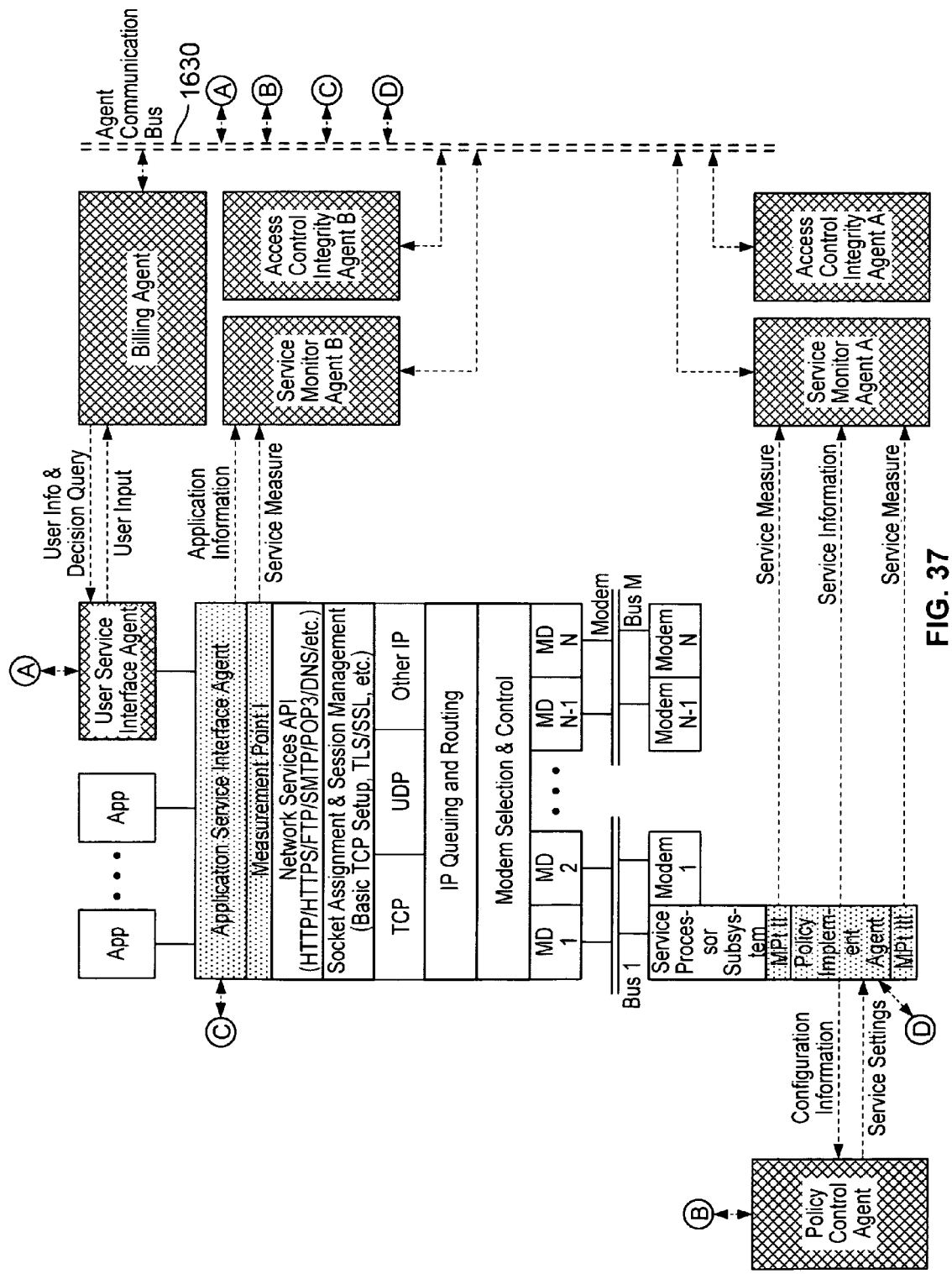
FIG. 37 is another functional diagram illustrating the device communications stack that allows for implementing traffic shaping policy, access control policy and/or service monitoring policy in accordance with some embodiments.

FIG. 37 is another functional diagram illustrating the device communications stack that allows for implementing traffic shaping policy, access control policy and/or service monitoring policy in accordance with some embodiments. In particular, FIG. 37 illustrates a device communications stack as similarly shown in FIG. 36, with the difference being that the service processor subsystem networking communication stack processing is implemented on a hardware function that is separate from the application processor and the modem. For example, this approach provides security advantages with a dedicated hardware system to protect some or all of the service usage control system from tampering. For example, some or all of the service processor can be implemented on a SIM card module. As another example, some or all of the service processor can be encapsulated on a self contained hardware module that can be added to a device without the need to modify the networking communication stack software or hardware.

Figure 38:
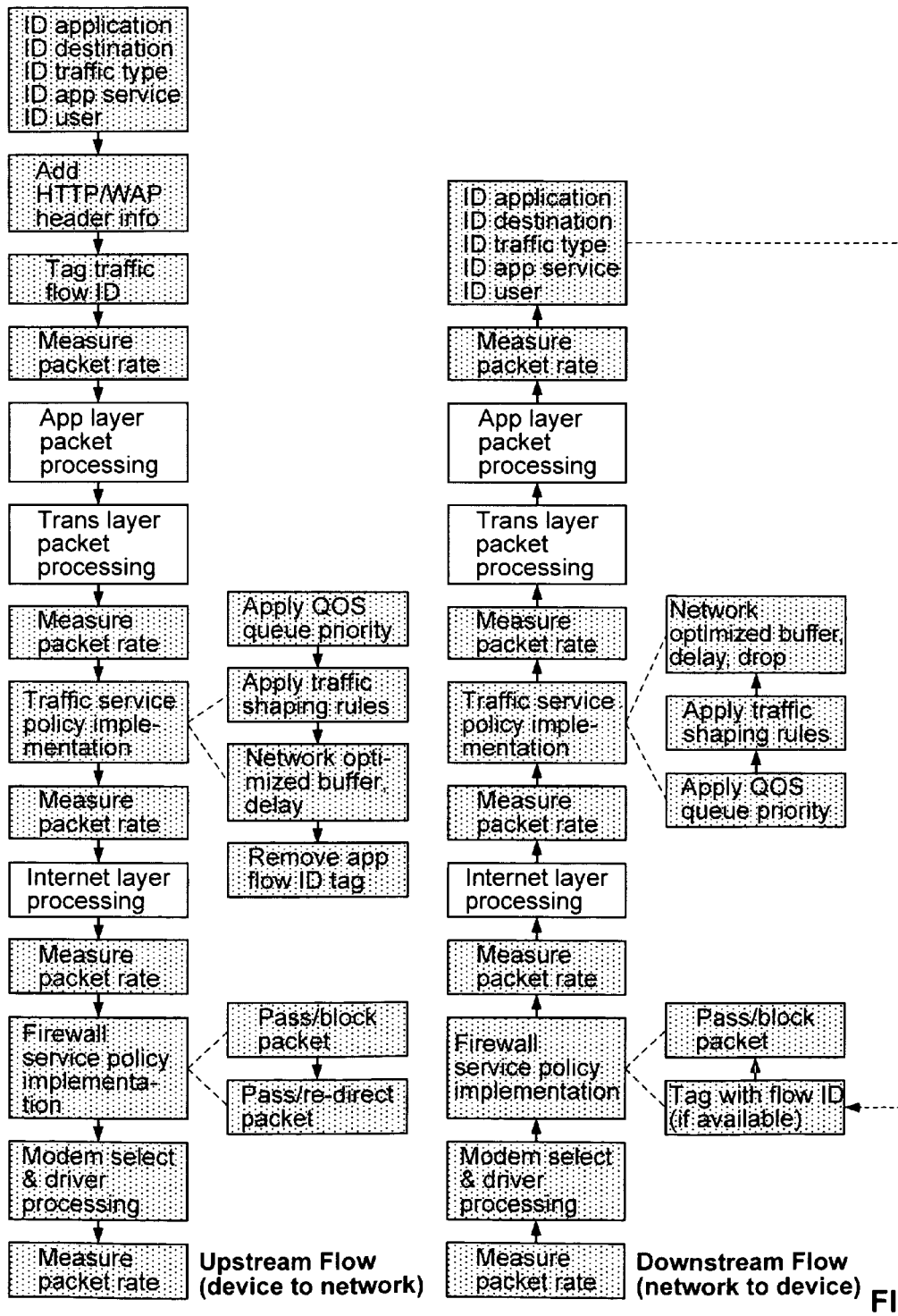
FIG. 38 is a functional diagram illustrating a device service processor packet processing flow in accordance with some embodiments.

FIG. 38 is a functional diagram illustrating a device service processor packet processing flow in accordance with some embodiments. In particular, both an example upstream service processor packet processing flow (device to the network) and an example downstream service processor packet processing flow (network to the device) are shown in FIG. 38. For example, the service processor packet processing flow can be performed by the device communications stack, such as described above with respect to FIG. 29. The various embodiments for packet processing flow depicted in FIGS. 38 through 40 are self explanatory to one of ordinary skill in the art and not all the processing steps and flow sequences are described herein.

In some embodiments, the burst size, buffer delay, acknowledgement delay and drop rate used in upstream and downstream traffic shaping are optimized with the goal of reducing access network traffic overhead, and excess capacity usage that can result from mismatches in traffic transmission parameters with the access network MAC and PHY or from excess network level packet delivery protocol re-transmissions. In some embodiments, an application interface agent 1693 is used to literally tag or virtually tag application layer traffic so that the policy implementation agent(s) 1690 has the necessary information to implement selected traffic shaping solutions. As shown in FIG. 16, the application interface agent 1693 is in communication with various applications, including a TCP application 1604, an IP application 1605, and a voice application 1602.

Figure 39:
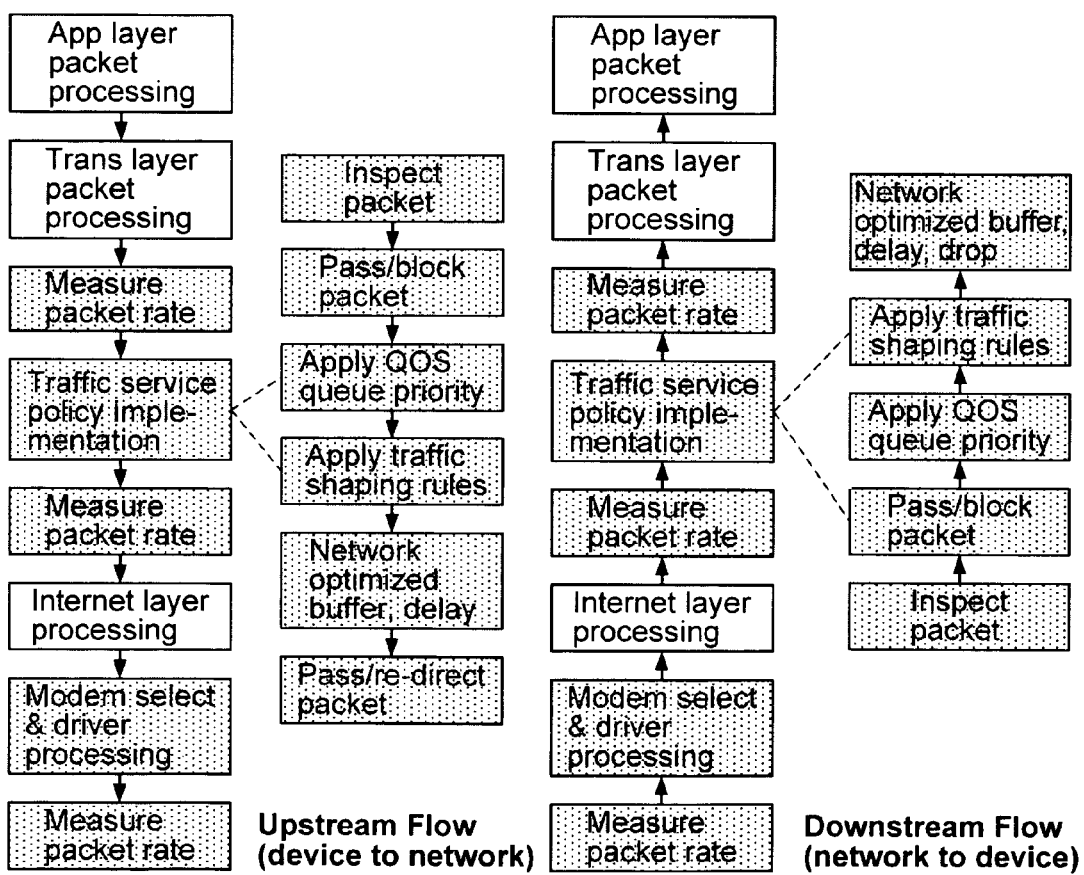
FIG. 39 is another functional diagram illustrating the device service processor packet processing flow in accordance with some embodiments.
Figure 40:
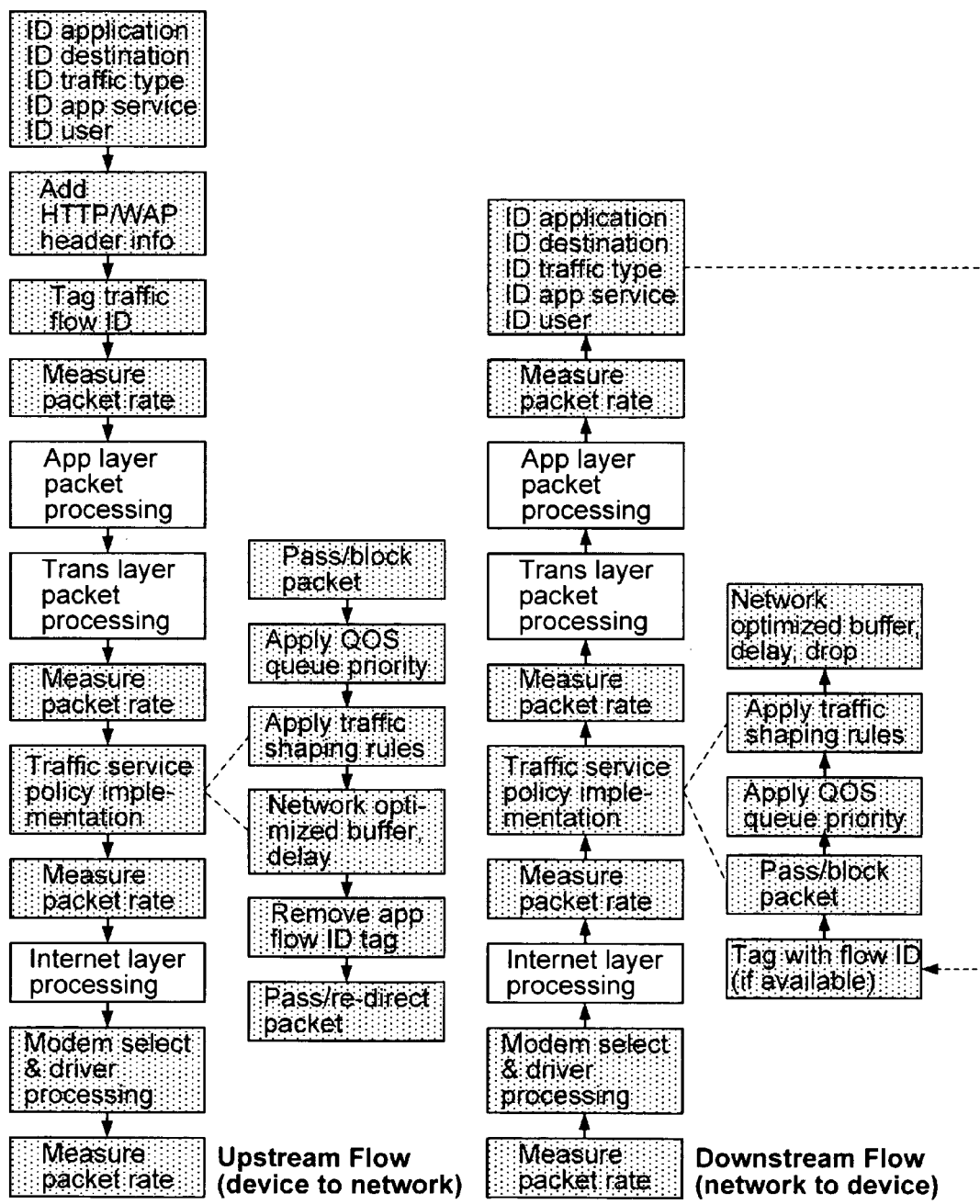
FIG. 40 is another functional diagram illustrating the device service processor packet processing flow in accordance with some embodiments.

Referring to FIGS. 38 through 40, in some embodiments, the upstream traffic service policy implementation step corresponds to the traffic shaping step described herein. Referring to FIG. 38, this step is depicted as shown as an alternate exploded view including four upstream sub-steps of apply QoS queue priority, apply traffic shaping rules, network optimized buffer/delay and remove application ID tag. An additional approach shown in FIG. 38 involves two exploded view sub-steps associated with the firewall service policy implementation step and these sub-steps are pass/block packet and pass/redirect packet. For example, the functions performed by these six sub-steps can be depicted in any number of sub-steps, the order of the steps can be appropriately performed in various different orders to provide for upstream traffic shaping within the network communication stack. For example, FIGS. 39 and 40 show the two steps of policy implementation and firewall as one step and the six exploded view sub-steps are included under the same policy implementation step and are performed in a different order than in FIG. 38. It should also be noted that a number of embodiments are possible in which the access control, traffic control or firewall functions are moved to the application service interface layer or another layer.

Referring now to the downstream portion of FIG. 38, there are two steps again termed traffic service policy implementation and firewall service policy implementation in this traffic shaping, access control and firewall example. These two packet flow processing steps are depicted as shown in the exploded view as the five sub-steps of tag with flow ID, pass/block packet, apply QoS, apply traffic shaping rules and network optimized buffer, delay, and drop. As with the upstream packet processing flow, the number of sub-steps, the order of sub-steps and the location of the sub-steps in the downstream networking stack processing can be depicted in any number of sub-steps, order and/or location, and various other embodiments will be apparent to one of ordinary skill in the art, including embodiments which locate some or all of the steps in the application service interface layer or other layers as depicted in FIGS. 39 and 40. The details of the packet flow processing design for the downstream can be somewhat more complex in certain embodiments as compared to the upstream processing in two ways. First, as described herein, in some embodiments, the packet tagging that requires application level information can require the initial portion of the packet flow burst to pass through the upstream networking communication stack until the application service interface layer can associate the packet flow with the appropriate information visible at the application level at which time the packet flow tag is communicated to the other service processor agent functions so that they can properly monitor or control the traffic associated with the flow.

Independently, another complication arises when upper layer reliable communication protocols, such as TCP, are employed in the networking stack in which the downstream transmitting end repeats the packet transmission if the receiving TCP protocol stack does not send a packet receipt acknowledge (ACK) within a certain period of time. If packets are arbitrarily delayed or dropped, then the TCP re-transmission traffic can reduce, completely eliminate or even reverse the network capacity advantage gained by reducing the average traffic speed or other transmission quality measure for one or more service activities. To solve this problem, in some embodiments, the packet traffic control parameters (e.g., downstream delay, drops, burst length, burst frequency and/or burst jitter) are optimized for TCP re-transmission efficiency so that changes in traffic control access bandwidth or speed for one or more service activities are implemented in such a manner that the TCP re-transmission delay at the network transmitting end adapts to be long enough so that wasted packet re-transmission bandwidth is reduced. In addition, and either in combination or in isolation, in some embodiments, the packet traffic control parameters (e.g., downstream delay, drops, burst length, burst frequency and/or burst jitter) can be adjusted so that the access network downstream MAC and/or PHY efficiencies are optimized.

Numerous other embodiments for the detailed implementation of packet flow processing in both downstream and upstream will be apparent to one of ordinary skill in the art in view of the various embodiments described herein. In some embodiments, as described herein, the following are provided: (A) traffic shaping is performed in a verifiable manner, (B) traffic shaping is performed in a manner that results in improved network capacity by taking into account to some degree the manner in which the access network PHY layer and/or MAC layer responds to packet parameters (e.g. burst delay, burst drops, burst length, burst frequency and/or burst jitter), (C) traffic shaping is performed in a manner that results in improved network capacity by taking into account how the packet parameters (e.g., burst delay, burst drops, burst length, burst frequency and/or burst jitter) impact layer 3 and higher ACK protocol or other network protocol network capacity efficiencies, (D) packet shaping is performed in a manner that is aware of and optimized for the particular type of communication protocol or packets being sent (e.g., TCP packets can be dropped to slow the application rate of transfer whereas UDP packets are never dropped, because there is no re-transmission), (E) a virtual or literal packet tagging system is used in a verifiable traffic shaping service control system to provide a deeper level of service monitoring and control or to simplify the processing of the packets, and/or (F) starting with these low level packet processing, traffic control or access control building blocks one or more additional layers of higher level policy control can be added on the device or in the network to create service profiles for the service provider network that define complete services, such as ambient services and many other variations of service profile settings that each define a device or user service experience and can be associated with a billing plan. For example, the use of higher layers of service profile control to form more complete service solutions starting with these relatively simple low-level traffic control, access control or firewall processing steps or functions is also described herein.

FIG. 39 is another functional diagram illustrating the device service processor packet processing flow in accordance with some embodiments. In particular, both an example upstream service processor packet processing flow (device to the network) and an example downstream service processor packet processing flow (network to the device) are shown in FIG. 39 (e.g., of a less feature rich device service processor embodiment, such as one similar to that depicted in FIG. 32).

FIG. 40 is another functional diagram illustrating the device service processor packet processing flow in accordance with some embodiments. In particular, both an example upstream service processor packet processing flow (device to the network) and an example downstream service processor packet processing flow (network to the device) are shown in FIG. 40 (e.g., of a mid=-featured embodiment of a device service processor, such as one similar to that depicted in FIG. 33).

FIG. 41 provides a table summarizing various privacy levels for service history reporting in accordance with some embodiments. Many of these privacy levels are similarly described above, and the table shown in FIG. 41 is not intended to be an exhaustive summary of these privacy levels, but rather is provided as an aid in understanding these privacy levels in accordance with user privacy related embodiments described herein. For example, there are many other parameters that can be associated with privacy filtering, and as will be apparent to one of ordinary skill in the art in view of the various embodiments described herein, the unique feature of user defined or user influenced privacy filtering for service usage, service activity or CRM reports can be implemented with a variety of embodiments that are variations of those described herein.

FIGS. 42A through 42J provide tables summarizing various service policy control commands in accordance with some embodiments. Many of these service policy control commands are similarly described above, and the tables shown in FIGS. 42A through 42J are not intended to be an exhaustive summary of these service policy control commands and do not include summaries of all the embodiments described herein, but rather are provided as a summary aid in understanding these service policy control commands in accordance with various embodiments described herein.

In some embodiments, QoS is employed for devices with a service processor 115. For example, QoS can be employed in a crowded hot spot where the service processor 115 profile has been changed from WWAN to WLAN, but the WLAN is backed up as too many users are trying to use it. The service processor 115 can have a hierarchical access to the hotspot at that point; or the service processor 115 that pays less can be throttled while those that pay more are opened up; or the service processor 115 can initiate a policy that slows down transmissions to improve trunking efficiency.

Figure 43A:
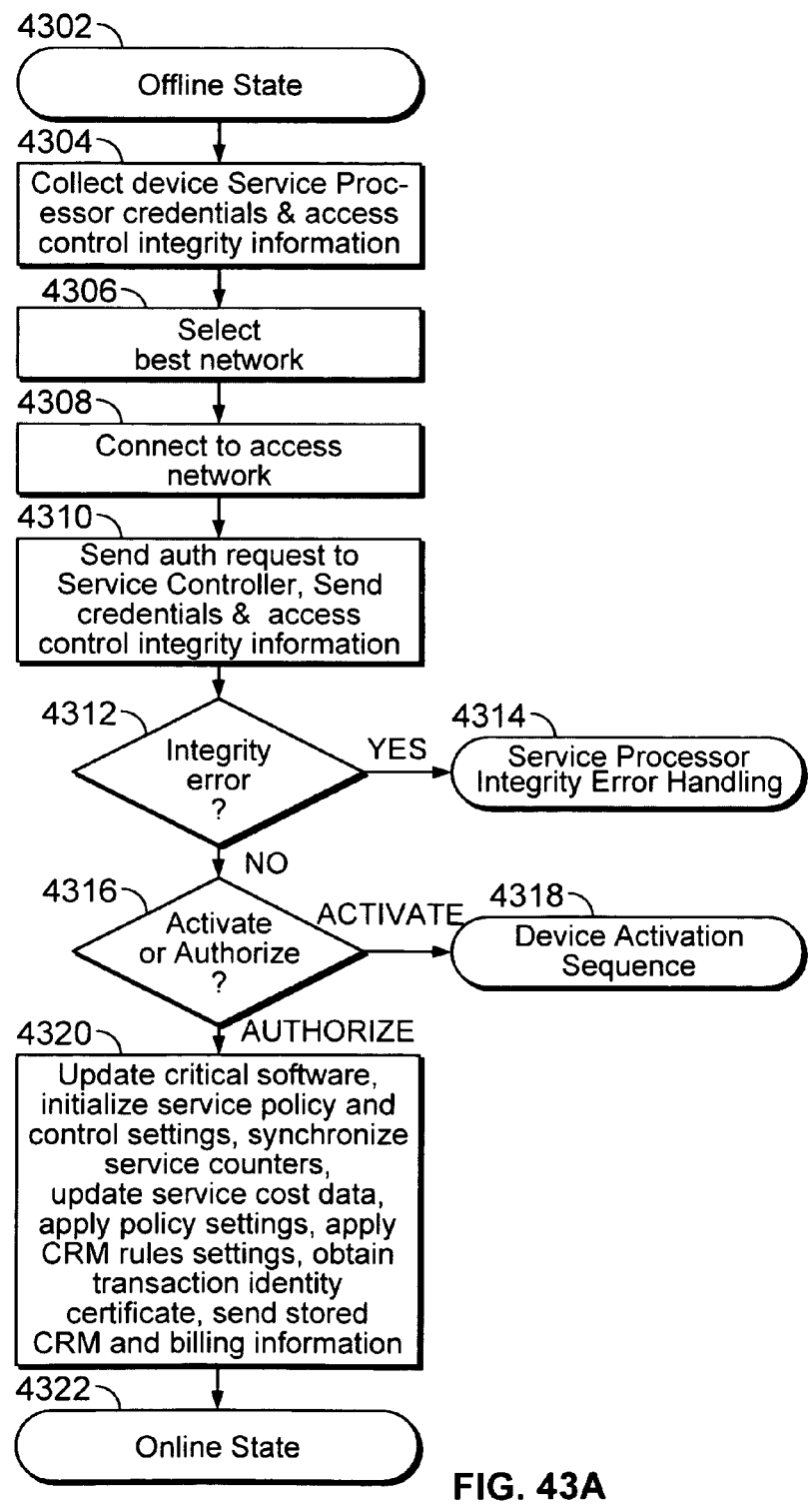
FIGS. 43A through 43B are flow diagrams illustrating a flow diagram for a service processor authorization sequence as shown in FIG. 43A and a flow diagram for a service controller authorization sequence as shown in FIG. 43B in accordance with some embodiments.
Figure 43B:
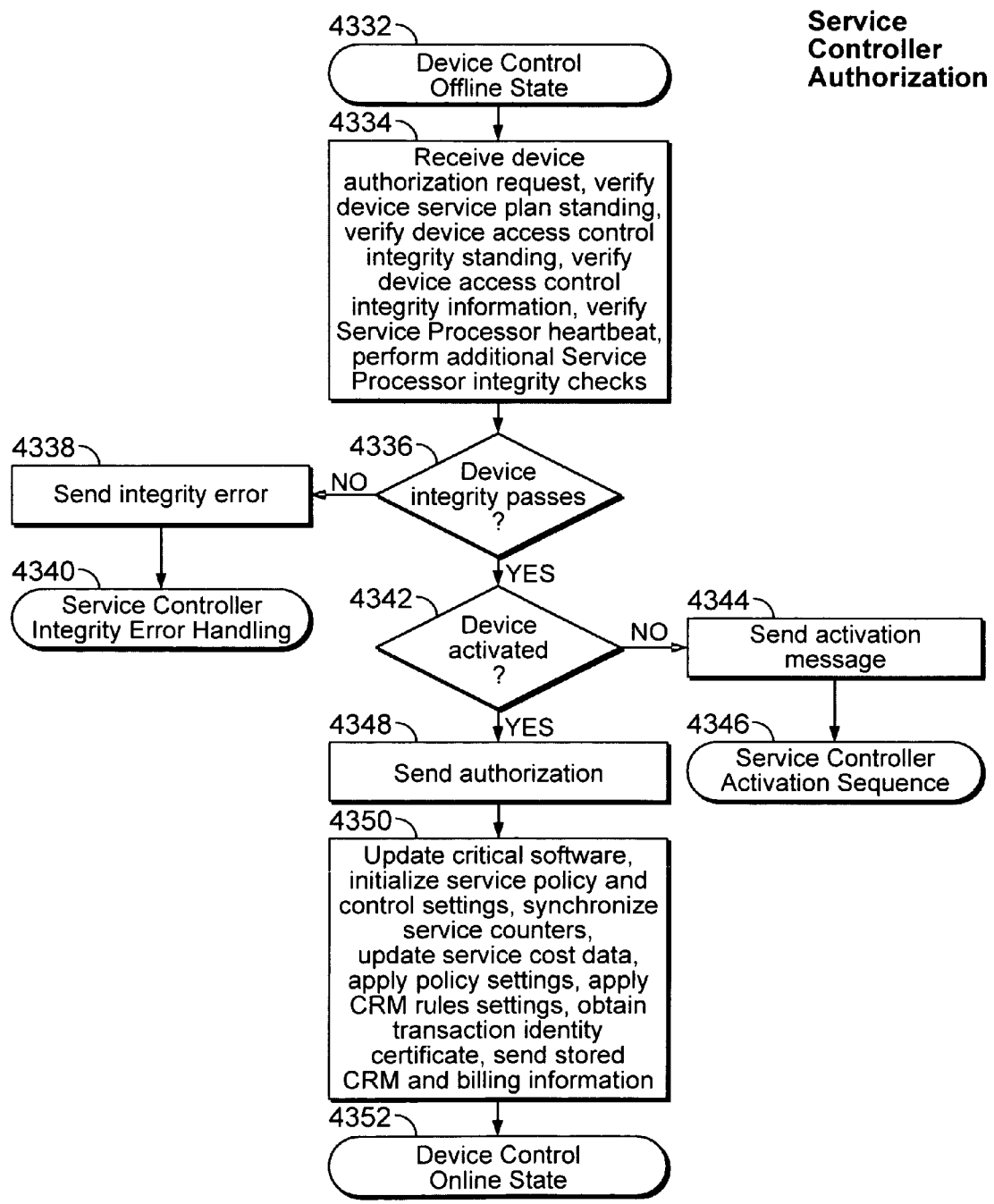

FIGS. 43A through 43B are flow diagrams illustrating a flow diagram for a service processor authorization sequence as shown in FIG. 43A and a flow diagram for a service controller authorization sequence as shown in FIG. 43B in accordance with some embodiments.

Referring to FIG. 43A, at 4302, the device is in an offline state. At 4304, the service processor (e.g., service processor 115) of the device collects device service processor credentials and access control integrity information. At 4306, the service processor of the device selects a best network. At 4308, the device connects to an access network. At 4310, the service processor of the device sends an authorization request to the service controller (e.g., service controller 122) and also sends the credentials and access control integrity information. At 4312, the service processor determines whether an integrity error has occurred. If so, then the service processor performs integrity error handling at 4314. Otherwise, the service processor determines whether the device is activated and/or authorized for network access at 4316. If not, then the service processor performs a device activation sequence at 4318. At 4320, the service processor performs the following: updates critical software, initializes service policy and control settings, synchronizes service counters, updates service cost data, applies policy settings, applies CRM rules settings, obtains transaction identity certificate, and sends stored CRM and billing information. At 4322, the device is in an online state.

Referring to FIG. 43B, at 4332, device control is in an offline state. At 4334, the service controller (e.g., service controller 122) receives a device authorization request, verifies device service plan standing, verifies device access control integrity standing, verifies device access control integrity information, verifies service processor heartbeat, and performs various additional service processor integrity checks (e.g., as similarly described herein). At 4336, the service controller determines whether the device integrity checks have all passed. If not, then the service controller sends an integrity error to the service processor (e.g., service processor 115) at 4338. At 4340, the service controller performs integrity error handling. Otherwise (the device integrity checks have all passed), the service controller determines whether the device is activated at 4342. If not, then the service controller sends an activation message to the service processor at 4344. At 4346, the service controller performs a service activation sequence. Otherwise (the device is activated), the service controller sends an authorization at 4348. At 4350, the service controller performs the following: updates critical software on the service processor, initializes service policy and control settings, synchronizes service counters, updates service cost data, applies policy settings, applies CRM rules settings, obtains transaction identity certificate, sends stored CRM and billing information. At 4352, the service controller is in a device online state.

Figure 44A:
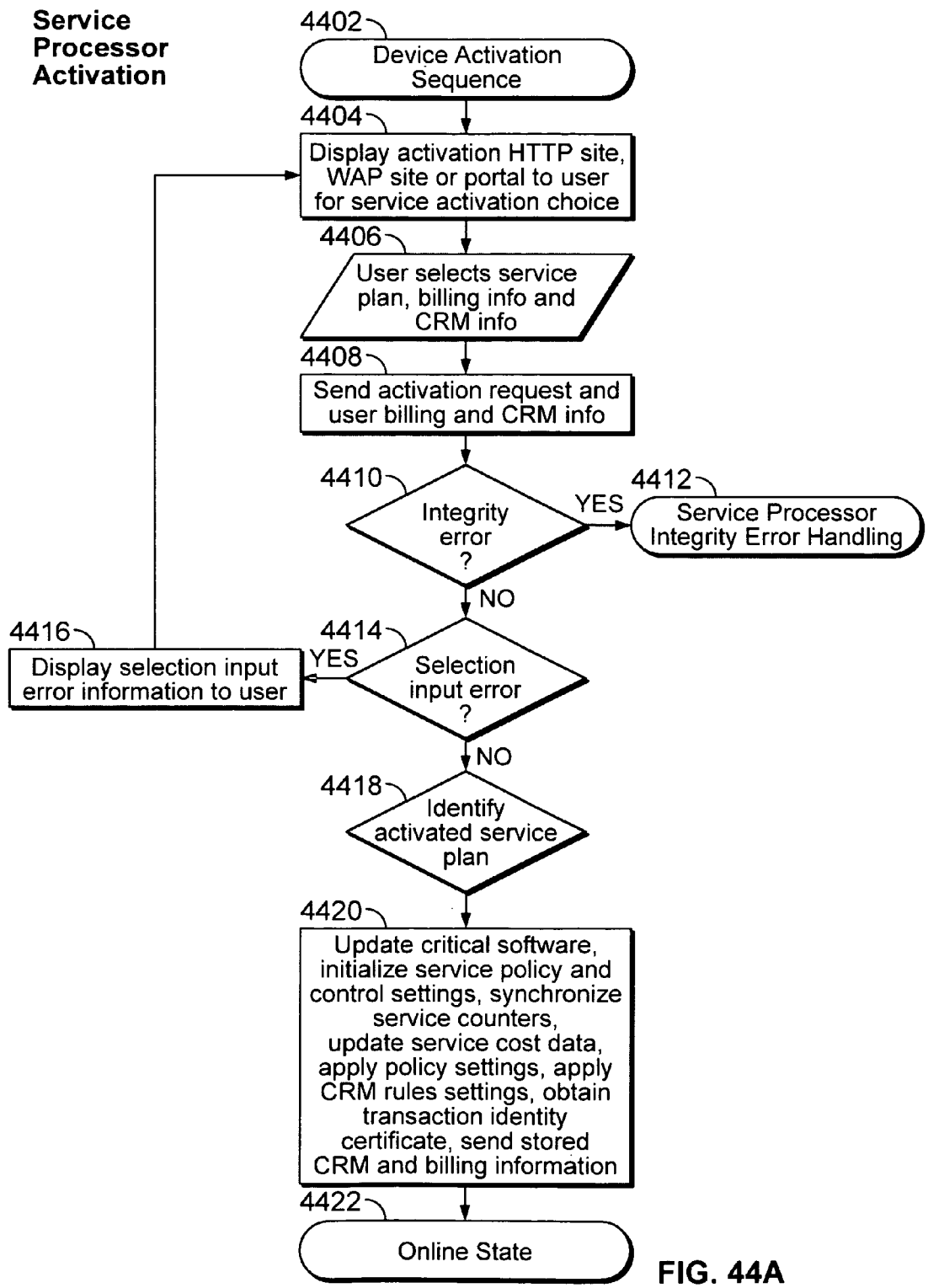
FIGS. 44A through 44B are flow diagrams illustrating a flow diagram for a service processor activation sequence as shown in FIG. 44A and a flow diagram for a service controller activation sequence as shown in FIG. 44B in accordance with some embodiments.
Figure 44B:
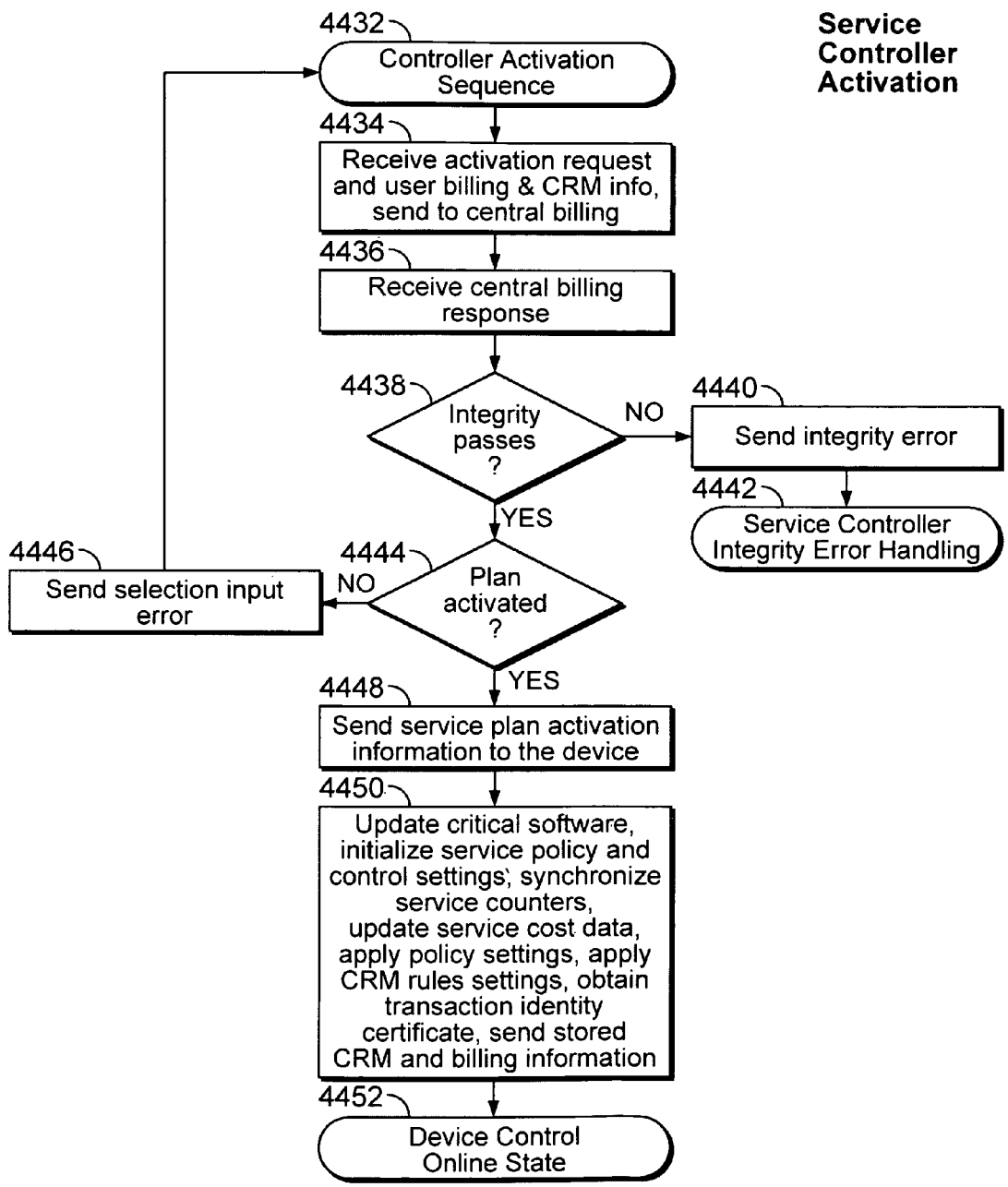

FIGS. 44A through 44B are flow diagrams illustrating a flow diagram for a service processor activation sequence as shown in FIG. 44A and a flow diagram for a service controller activation sequence as shown in FIG. 44B in accordance with some embodiments.

Referring to FIG. 44A, at 4402, a service processor activation sequence is initiated. At 4404, the service processor (e.g., service processor 115) of the device displays an activation site (e.g., HTTP site, WAP site or portal) to the user for the user's service activation choice. At 4406, the user selects service plan, billing information and CRM information. At 4408, the service processor sends an activation request and user billing and CRM information to, for example, the service controller. At 4410, the service processor determines whether there is an integrity error. If so, then the service processor performs integrity error handling at 4412. Otherwise, the service processor determines whether there has been a selection input error at 4414. If so, the service processor displays the selection input error to the user at 4416 and returns to the activation site/portal at 4404. Otherwise, the service processor identifies the activated service plan at 4418. At 4420, the service processor performs the following: updates critical software, initializes service policy and control settings, synchronizes service counters, updates service cost data, applies policy settings, applies CRM rules settings, obtains transaction identity certificate, and sends stored CRM and billing information. At 4422, the device is in an online and activated state.

Referring to FIG. 44B, at 4432, a service controller activation sequence is initiated. At 4434, the service controller (e.g., service controller 122) receives an activation request, including user billing and CRM information, and sends such to central billing. At 4436, the service controller receives a response from central billing. At 4438, the service controller verifies the integrity of the service processor. If an integrity error is detected, then an integrity error is sent at 4440. At 4442, the service controller performs integrity error handling. At 4444, the service controller determines whether the service plan has been activated. If not, then the service controller sends a selection input error to the device at 4446 and returns to 4432. Otherwise (device has been activated), the service controller sends the service plan activation information to the device at 4448. At 4450, the service controller performs the following: updates critical software, initializes service policy and control settings, synchronizes service counters, updates service cost data, applies policy settings, applies CRM rules settings, obtains transaction identity certificate, and sends stored CRM and billing information. At 4452, the service controller is in a device online and activated state.

Figure 45A:
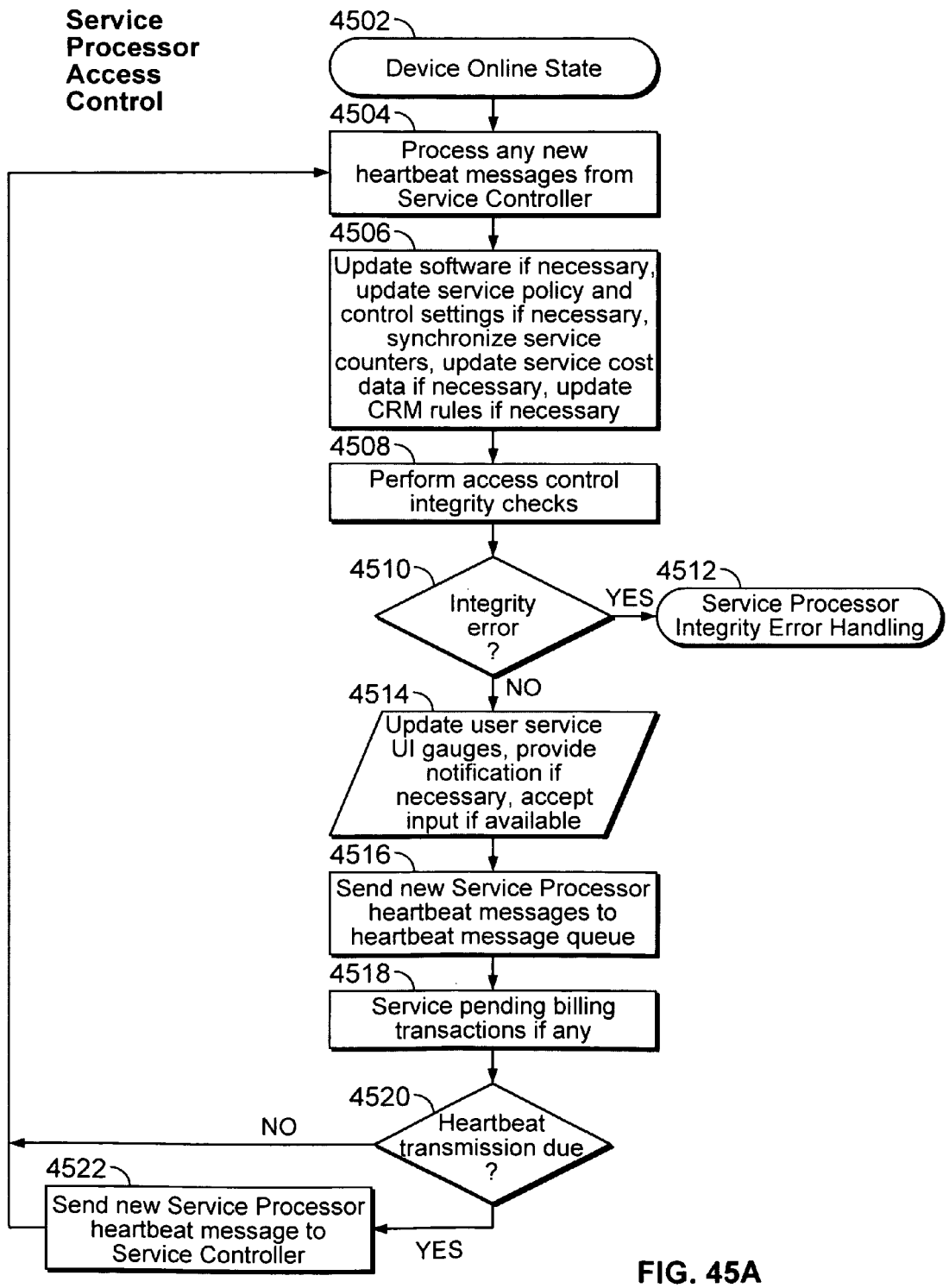
FIGS. 45A through 45B are flow diagrams illustrating a flow diagram for a service processor access control sequence as shown in FIG. 45A and a flow diagram for a service controller access control sequence as shown in FIG. 45B in accordance with some embodiments.
Figure 45B:
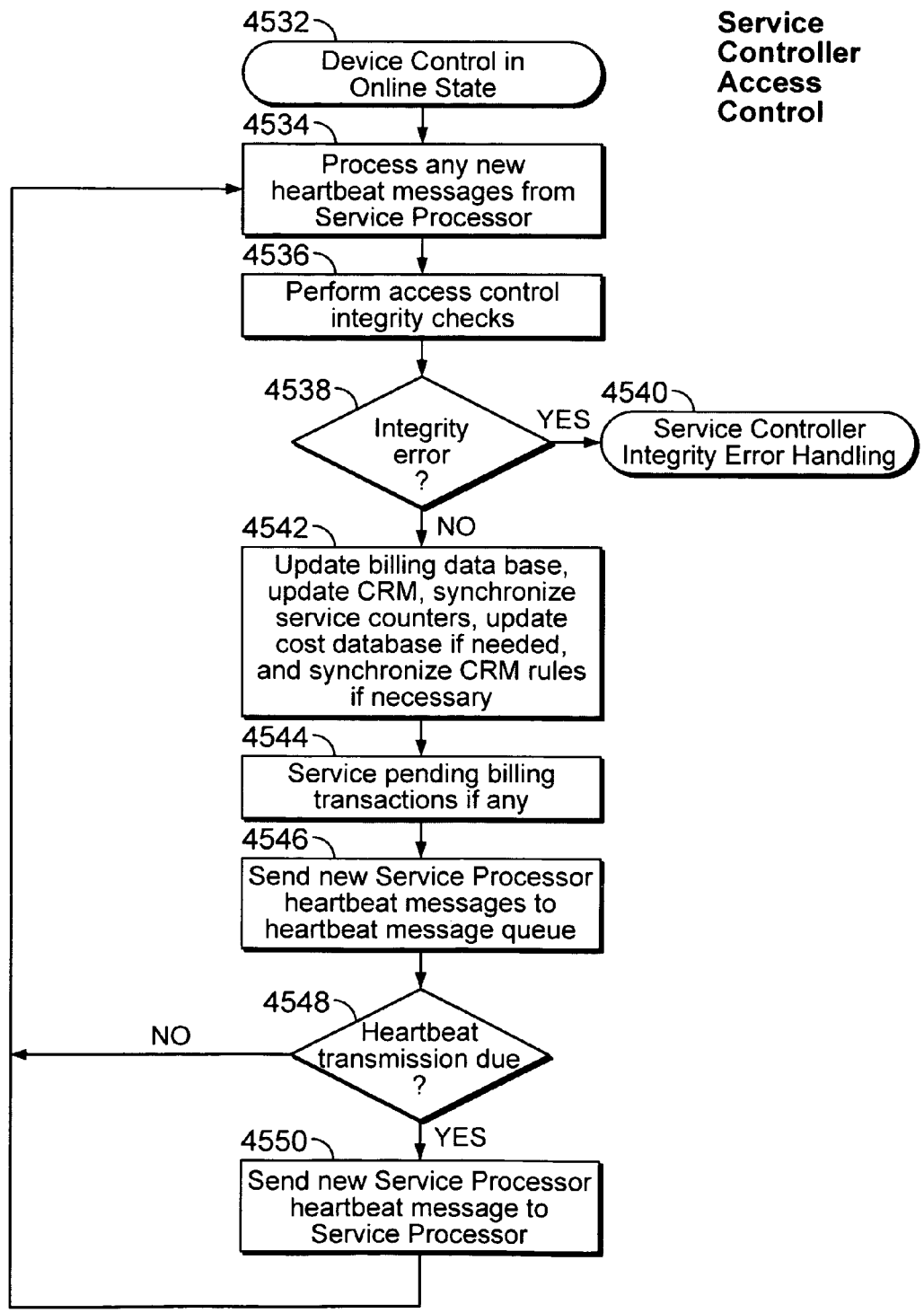

FIGS. 45A through 45B are flow diagrams illustrating a flow diagram for a service processor access control sequence as shown in FIG. 45A and a flow diagram for a service controller access control sequence as shown in FIG. 45B in accordance with some embodiments.

Referring to FIG. 45A, at 4502, the device is in an online state. At 4504, the service processor (e.g., service processor 115) of the device processes any new heartbeat messages received from the service controller (e.g., service controller 122). At 4506, the service processor updates software if necessary, updates service policy and control settings if necessary, synchronizes service counters, updates service cost data if necessary, and updates CRM rules if necessary. At 4508, the service processor performs access control integrity checks. At 4510, the service processor determines whether there are any access control integrity errors. If so, then the service processor performs integrity error handling at 4512. Otherwise, the service processor updates user service UI gauges, provides notification if necessary, and accepts input if available at 4514. At 4516, the service processor sends new service processor heartbeat messages to the heartbeat message queue. At 4518, the service processor processes any pending billing transactions. At 4520, the service processor determines if a heartbeat transmission is due, and if not, returns to 4504 for processing any received heartbeat messages. If so, at 4522, the service processor sends the new service processor heartbeat message to the service controller.

Referring to FIG. 45B, at 4532, the device is in an online state. At 4534, the service controller (e.g., service controller 122) processes any new heartbeat messages received from the service processor. At 4536, the service controller performs access control integrity checks. At 4538, the service controller determines whether there are any access control integrity errors. If so, then the service controller performs integrity error handling at 4540. At 4542, the service controller updates the billing database, updates the CRM information, synchronizes service counters, updates cost database if needed, and synchronizes CRM rules if necessary. At 4544, the service controller processes any pending billing transactions. At 4546, the service controller sends new service processor heartbeat messages to the heartbeat message queue. At 4548, the service controller determines if a heartbeat transmission is due, and if not, returns to 4534 for processing any received heartbeat messages. If so, at 4550, the service controller sends new service processor heartbeat message to the service processor.

Open Content Distribution and Transaction System

Figure 46:
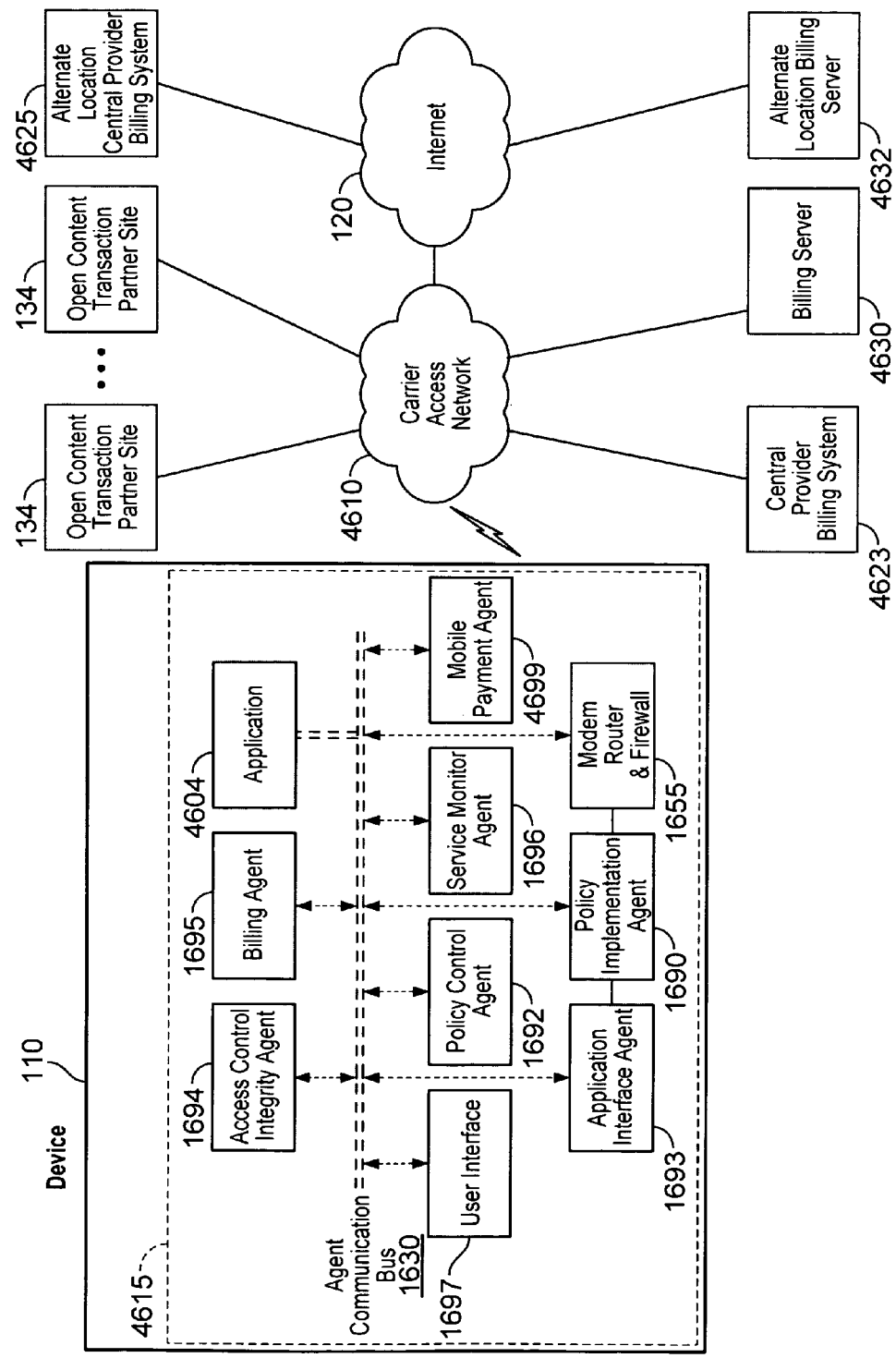
FIG. 46 is a functional diagram illustrating open, decentralized, device based mobile commerce transactions in accordance with some embodiments.
Figure 47A:
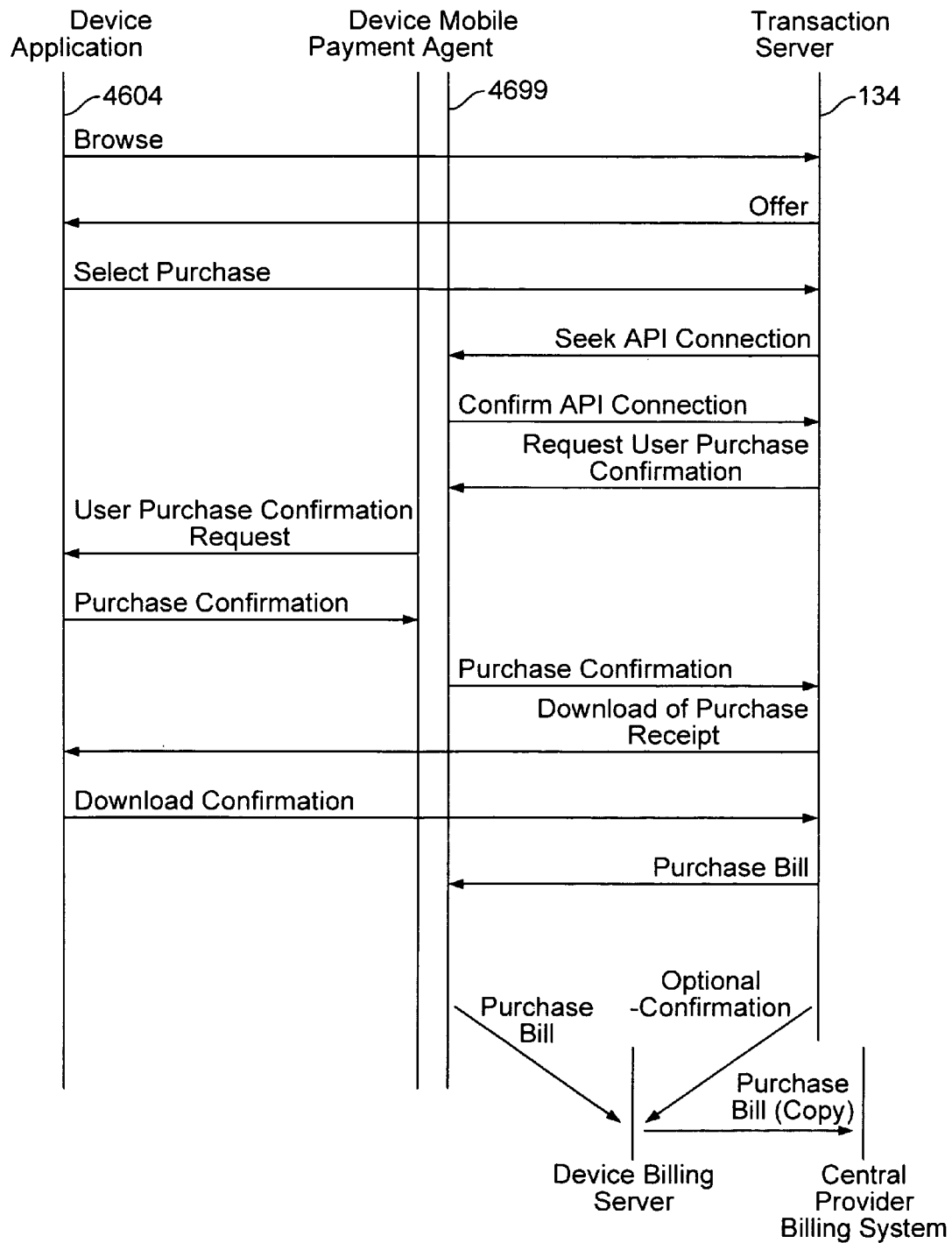
FIGS. 47A through 47B are transactional diagrams illustrating open, decentralized, device based mobile commerce transactions in accordance with some embodiments.
Figure 47B:
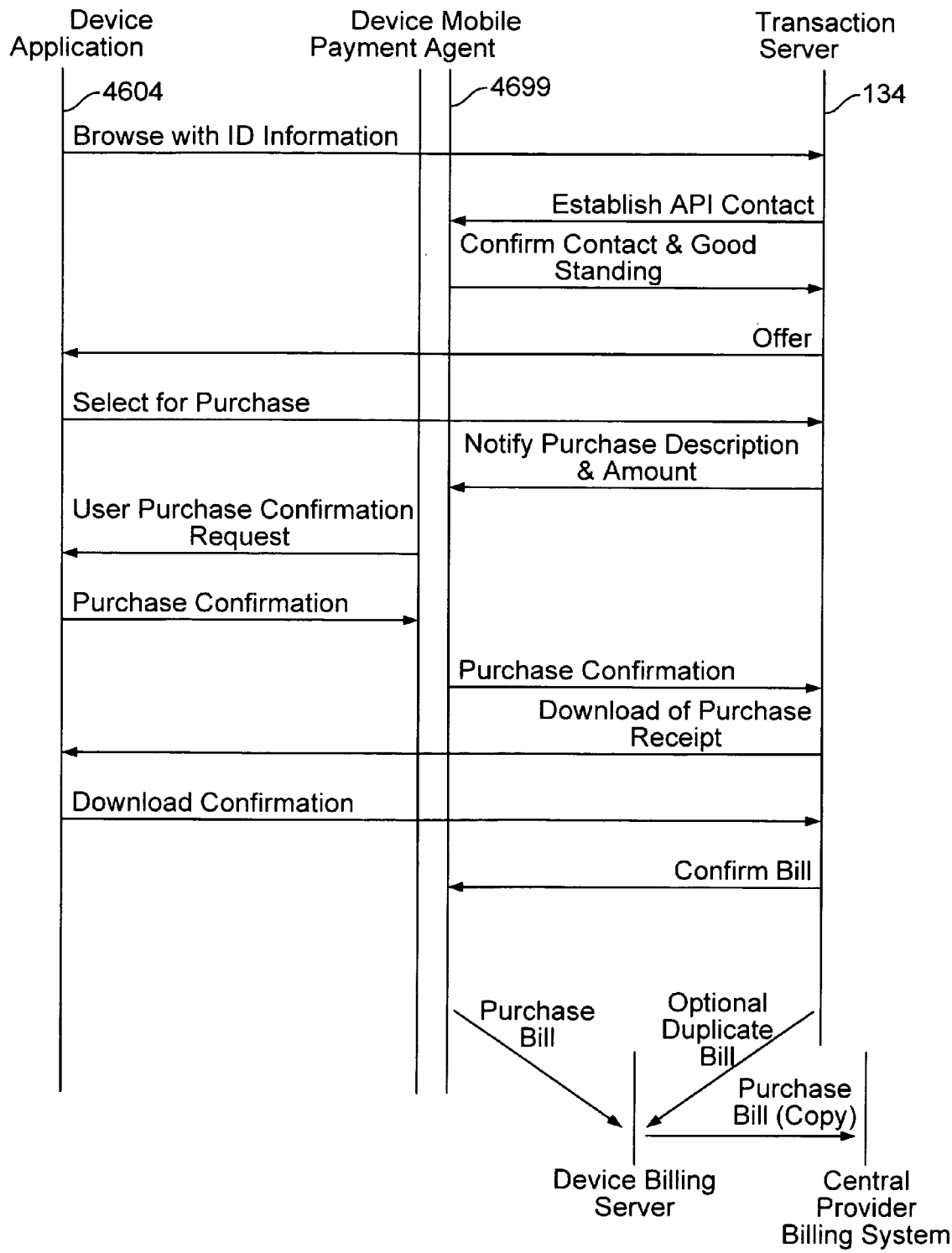

Referring now to FIGS. 46 and 47A-B, in another set of embodiments an open, decentralized, device based system for enabling central billing for third party electronic commerce transactions for mobile commerce is provided as shown. For example, in these embodiments, device information can be embedded in HTTP, WAP or other portal browser/network header request information that indicates a central billing option is available to a compatible third party transaction server, as further described below with respect to FIGS. 46 and 47A-B.

FIG. 46 is a functional diagram illustrating open, decentralized, device based mobile commerce transactions in accordance with some embodiments. As shown, a service processor 4615 of the device 100 (e.g., any mobile device capable of storing and executing the service processor 4615) includes access control integrity agent 1694, billing agent 1695, agent communication bus 1630, user interface 1697, policy control agent 1692, service monitor agent 1696, application interface agent 1693, policy implementation agent 1690, and modem router and firewall 1655, as similarly described herein with respect to various other service processor embodiments. In some embodiments, an application 4604 (e.g., an HTML/WAP web browser) and a mobile payment agent 4699 are also included in the device, such as part of the service processor 4615 as shown. In some embodiments, the application 4604 is not integrated as part of the service processor 4615, but is executing and/or stored on the device. In some embodiments, the mobile payment agent 4699 includes billing agent 1695, user interface 1697 and/or application interface agent 1693, and/or various other functional components/agents. As shown, the service processor 4615 is in communication with a carrier access network 4610, which is in network communication with the Internet 120.

In some embodiments, device information can be embedded in HTTP, WAP or other portal browser/network header request information that indicates a central billing option is available to a compatible third party transaction server, such as the open content transaction partner site(s) 134. For example, the compatible transaction server can then send a signed confirmation request over a pre-assigned control socket channel to the billing agent 1695 with the billing agent 1695 confirming the signed confirmation request by either performing the signature check locally based on a stored and synchronized list of approved transaction servers or by passing the signed request onto a billing server 4630 for confirmation. Optionally, in another example, a triangle confirmation can be set up in which the billing server 4630 can confirm the transaction set up with the transaction server 134 or the transaction server 134 can confirm the transaction set up with the billing server 4630. Once the device confirms the compatible and approved status of the transaction server 134, the device/transaction server pair can then optionally further exchange keys for the remainder of the transaction for enhanced security. In another example, the transaction server 134 can also redirect the user browsing experience to one tailored to one or more of device type, service provider, device manufacturer or user. When the user selects a transaction, the transaction server sends the billing agent 1695 a transaction bill that describes the transaction and the amount. The billing agent 1695 can optionally confirm that the user account has sufficient credit limit to make the purchase by either confirming the stored credit limit on the device or querying the billing server 4630. The billing agent 1695 then invokes the device UI 1697 to display the transaction description and amount and request user approval for the billing to be conducted through the central billing option. User approval can be acquired, for example, by a simple click operation or require a secure password, key and/or biometric response from the user. Upon user approval, the billing agent 1695 generates a billing approval and sends it to the transaction server 134, the transaction server 134 completes the transaction and then sends a bill to the billing agent 1695. The billing agent 1695 optionally sends a confirmation to the transaction server 134 and sends the bill to the billing server 4630. Again, optionally a triangle confirmation can be formed by the billing server sending a confirmation to the transaction server 134, or the transaction server 134 can send the bill to the billing server 4630. In some embodiments, the billing server 4630 can also communication such billed transactions to a central provider billing system 4623 via the carrier access network 4610. Also, in some embodiments, an alternate location billing server 4632 is in communication via the Internet 120, and an alternate location central provider billing system 4625 is also in communication via the Internet 120.

FIGS. 47A through 47B are transactional diagrams illustrating open, decentralized, device based mobile commerce transactions in accordance with some embodiments. Referring to FIG. 47A, the device application 4604 browses (e.g., based on the user submitting a browse request using a browser application) to transaction server 134 (e.g., a transaction web server, such as the open content transaction partner site 134). The transaction server 134 provides an offer to the device application 4604. The device application 4604 selects a purchase (e.g., based on the user's selection input). In response, the transaction server 134 seeks an API connection with the device mobile payment agent 4699, which then confirms the API connection. The transaction server 134 requests user purchase confirmation (mediated by the device mobile payment agent 4699 as shown), and the purchase is confirmed by the device application 4604 (e.g., based on the user's acknowledgement as similarly described above with respect to FIG. 46). The transaction server 134 then transmits a purchase receipt, and the device application 4604 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 46. The device billing server sends a copy of the purchase bill to the central provider billing system (e.g., central provider billing system 4623).

Referring now to FIG. 47B, the device application 4604 browses (e.g., based on the user submitting a browse request using a browser application) to transaction server 134 (e.g., a transaction web server, such as the open content transaction partner site 134), in which the browse request includes device ID information, such as similarly described above with respect to FIG. 46. The transaction server 134 establishes API contact with the device mobile agent 4699, which then confirms contact and good standing for transactional purchases from the device. The transaction server 134 provides an offer to the device application 4604. The device application 4604 selects a purchase (e.g., based on the user's selection input). The transaction server 134 notifies the device mobile payment agent 4699 of the purchase description and amount, and the device mobile payment agent 4699 then requests user purchase confirmation. The purchase is confirmed by the device application 4604 (e.g., based on the user's acknowledgement as similarly described above with respect to FIG. 46), and the device mobile payment agent 4699 then transmits a purchase confirmation to the transaction server 134. The transaction server 134 then transmits a purchase receipt, and the device application 4604 confirms the receipt. The transaction server 134 then transmits the purchase bill to the device mobile payment agent 4699, which then sends the purchase bill to the device billing server (e.g., billing server 4630). The transaction server also optionally sends a confirmation of the purchase bill to the device billing server for a triangle confirmation, as similarly described above with respect to FIG. 46. The device billing server sends the purchase bill to the central provider billing system (e.g., central provider billing system 4623). In some embodiments, the communications described above with respect to FIGS. 47A-B with the billing server and the central provider billing system are with the alternate location billing server 4632 and/or alternate location central provider billing system 4625 via the Internet 120. Similarly, in some embodiments, the transaction servers 134 are connected to the Internet 120.

Accordingly, these transaction billing embodiments do not require centralized content storage or content and transaction exchange infrastructure. For example, the transactions can be conducted over the Internet, and the user experience and content can be tailored versions of the transaction server/content provider's normal experience and content. This approach provides for a much wider array of content and transaction partners with minimal or no need to accommodate proprietary specialized systems. Moreover, the compatibility between the device billing agent transaction system and the transaction provider server is easily established, for example, by writing specifications for the header information transmitted by the device and for the secure handshake and signed message transactions that take place between the device billing agent, the transaction server and optionally the transaction server and the billing server. Once a transaction partner shows compatibility test results and concludes a business relationship with the service provider, the service provider can place the transaction partner on the compatible and approved list and exchange security keys and/or certificates.

If a common user experience is desired by the service provider across multiple transaction partners, then the experience specifications for the browser redirects can also be specified in the compatibility specification and tested before the transaction partner gains approval.

Design and Testing for Service Control

Figure 48:
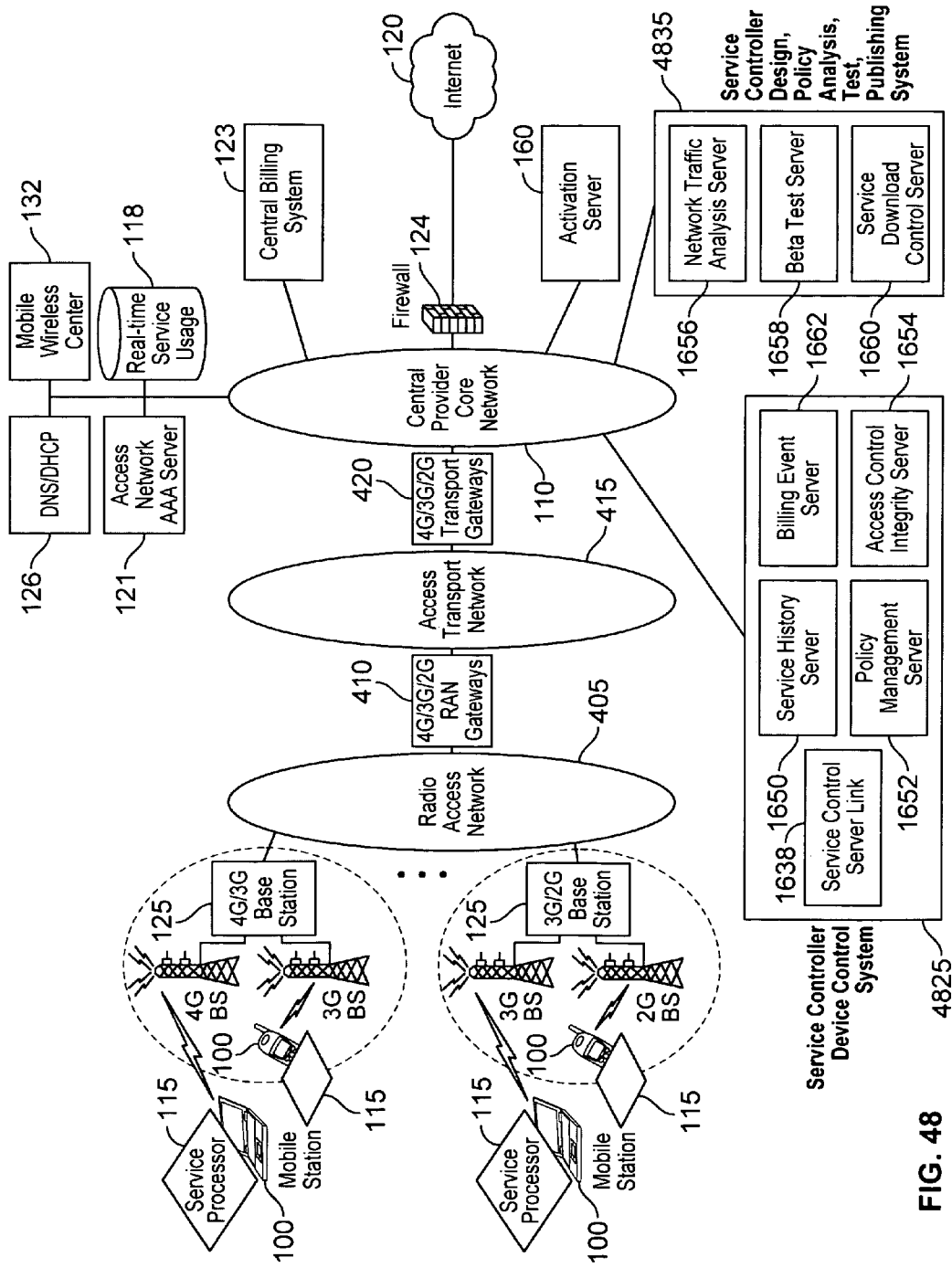
FIG. 48 illustrates a network architecture including a service controller device control system and a service controller analysis and management system in accordance with some embodiments.

FIG. 48 illustrates a network architecture including a service controller device control system and a service controller analysis and management system in accordance with some embodiments. As described herein, the RAN gateway 410 generally represents the functionality of the various specific RAN gateway functional elements shown and/or discussed herein. For example, these RAN gateway 410 functional elements represent the gateways used to aggregate the radio access network traffic, control, charging and roaming functions and/or other functions and are shown and/or discussed herein using other terminology specific to certain industry standards, including SGSN gateway 410 and gateways 508, 512, 608, 612, 708 and 712. Although the same reference numerals are used for SGSN gateway 410 and RAN gateway 410, it will be appreciated that the RAN gateway 410 represents any or all of the RAN gateway functional elements 410, 508, 512, 608, 612, 708, 712 or any other similar industry equipment or functions depending on the embodiment. Similarly, transport gateway 420 represents the next higher level of gateway aggregation for the transport layer that is used in many networks, and this term transport gateway 420 can be interchanged with any or all of the gateways 420, 520, 620, 720 or any other similar industry equipment or functions depending on the embodiment. Those of ordinary skill in the art will appreciate which gateway description applies to a respective embodiment in which the terms RAN gateway 410, gateway 410, transport gateway 420 or gateway 420 are referenced herein.

While the embodiments described below with respect to FIGS. 48 through 63 are depicted in the context of a conventional multi-tier access network, one of ordinary skill in the art will appreciate that such embodiments can also be generalized to other network topologies including the various flattened network topologies described herein. As shown, the service controller is divided into two main functions (e.g., as compared with the embodiments of service controller 122 depicted in FIG. 16): (1) a service controller device control system 4825 and (2) a service controller design, policy analysis, definition, test, publishing system 4835. The service controller device control system 4825 performs the device service control channel functions as previously described herein with respect to various embodiments.

The service controller design, policy analysis, definition, test, publishing system 4835 separates out the service analysis, control policy design and publishing from the device service control channel functions. The service controller design, policy analysis, definition, test, publishing system 4835 performs a variety of functions as described below. In some embodiments, the service controller design, policy analysis, definition, test, publishing system 4835 provides service usage statistical analysis, notification policy or procedure response analysis and/or billing policy or procedure response analysis for single devices, groups of devices, types of devices, groups of users, classes of users, or an entire set of devices and users that subscribe to a given service. In some embodiments, the service controller design, policy analysis, definition, test, publishing system 4835 detects, singles out and reports device service usage, notification responses or billing behavior that is outside of expected limits but may or may not be violating policy. In some embodiments, the service controller design, policy analysis, definition, test, publishing system 4835 provides service cost and profitability analysis for single devices, groups of devices, types of devices, groups of users, classes of users, or an entire set of devices and users that subscribe to a given service. In some embodiments, the service controller design, policy analysis, definition, test, publishing system 4835 provides user service control policy, notification policy or billing policy statistical satisfaction analysis for single devices, groups of devices, types of devices, groups of users, classes of users, or an entire set of devices and users that subscribe to a given service. In some embodiments, the service controller design, policy analysis, definition, test, publishing system 4835 provides statistical take rate analysis for transaction offers and billing offers for single devices, groups of devices, types of devices, groups of users, classes of users, or an entire set of devices and users that subscribe to a given service.

Figure 49:
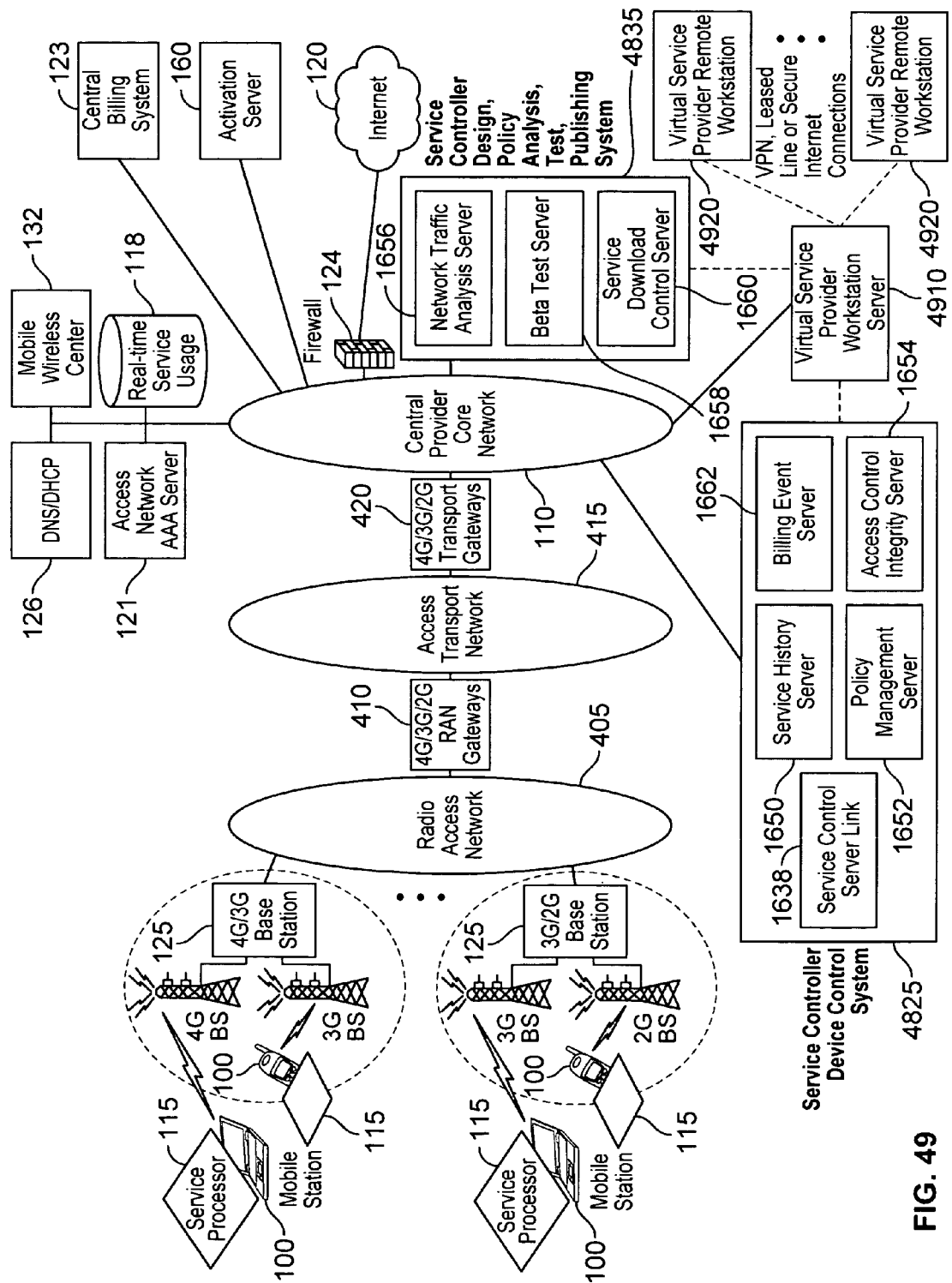
FIG. 49 illustrates a network architecture for an open developer platform for virtual service provider (VSP) partitioning in accordance with some embodiments.

In some embodiments, the service controller design, policy analysis, definition, test, publishing system 4835 provides service control policy definition work screens and "dry-lab" (pre-beta) testing against usage database for single devices, groups of devices, types of devices, groups of users, classes of users, or an entire set of devices and users that subscribe to a given service. In some embodiments, the service controller design, policy analysis, definition, test, publishing system 4835 provides service control policy, notification policy and/or billing policy beta testing (e.g., using beta test server 1658) in which the beta test profile is published to a subset of users or devices. In some embodiments, beta devices/users may or may not know that the service policy is being tested with them. In some embodiments, if they do know, then beta test apparatus includes offering system that provides user options to accept beta test and provide feedback in exchange for an offer (e.g., show them an offer page that comes up with their existing subscription service or ambient service—offer a free trial, a discount to something and/or reward zone points (or other incentives/rewards) if they accept the trial). In some embodiments, a beta test workstation (e.g., in communication with the beta test server 1658, such as VSP remote workstation 4920 as shown in FIG. 49) allows the beta test manager to define one or more beta test service policy, notification policy and/or billing policy control profiles. In some embodiments, the beta test workstation publishes each profile to specific individual (single) devices, groups of devices, types of devices, groups of users, classes of users, or an entire set of devices and users that subscribe to a given service. In some embodiments, the beta test workstation allows the beta test manager to analyze usage statistics, notification response statistics and/or billing/transaction offer response statistics for devices, users, groups of devices or groups of users and compare actual real-time usage versus beta test usage goals. In some embodiments, the beta test workstation allows the beta test manager to fine tune service, notification and/or billing/transaction policies and re-publish to observe changes to actual service usage until the service policy and/or notification control policies achieve the desired result. In some embodiments, the beta test workstation also allows the beta test manager to collect direct user feedback to a set of pre-designed user satisfaction or other questions regarding service usage. For example, questions can be presented through a pre-designed beta test portal or through a series of brief pop-ups that come up when the user initiates a particular action or at a particular time. In some embodiments, the beta test workstation also collects details of service and device usage (e.g., CRM data) that the beta test users have approved for collection. In some embodiments, the beta test workstation can decompose this data to determine if the users are using the service in the manner intended by the beta test goals.

In some embodiments, the beta test workstation also allows for publishing multiple variants of the service and/or notification policy control settings and compare the service usage for each group with convenient screens with information displays (e.g., statistical usage versus time of day, usage of particular activities, billing activity, device discovery activity, user response to notification message and options, user satisfaction with a particular notification policy or billing policy or traffic control policy). In some embodiments, the screens can be designed by the beta test manager.

In some embodiments, once a service is completely tested and approved for production publication, the service download control server 1660 has a workstation screen that allows the service manager to specify which group of devices are to receive the new service policy configuration. In some embodiments, the service download control server 1660 allows the service manager to define specific individual (single) devices, groups of devices, types of devices, groups of users, classes of users, or an entire set of devices and users that subscribe to a given service.

In some embodiments, a service (e.g., a newly created or new version of an existing service) is tested and/or enhanced using a new service testing model. For example, a new service (or a new version of an existing service) is loaded onto a server for testing, the new service is (optionally) tested against existing device usage statistics, a new service control definition (e.g., implemented as service processor 115 for publishing to devices 100 and a corresponding new service controller 122 for the service provider, such as a central provider or an MVNO partner, and, for example, the new service processor and service controller can be implemented using the below described SDK) for the new service is developed and possibly adjusted based on the testing against existing device usage statistics, the new service control definition is then published to beta devices (e.g., various devices 100 used for beta testing the new service), which then use the new service, service usage statistics and/or user feedback statistics are then collected (e.g., to ensure that the service is functioning properly and so that the service control definition can be tuned to ensure adequate service, user experience and for service pricing/profitability purposes), the service/service control definition is then fine tuned based on the service usage/user feedback statistics. Upon completion of the above testing and refinement of the service/service control definition, the service control definition can be published to specified groups of devices for using the new service. In some embodiments, this service control testing model for groups of devices and service partners is provided by a virtual MVNO or VSP. For example, this allows for new services to be more efficiently and more effectively developed, tested and proliferated.

In some embodiments, service history IPDRs come from within a networking component connected to the central provider core network 110 as depicted by (e.g., real-time) service usage 118 (which as discussed elsewhere is a general purpose descriptor for a function located in one or more of the networking equipment boxes). In some embodiments, service history IPDRs are collected/aggregated (in part) from the central billing system 123. In some embodiments, service history IPDRs are collected/aggregated (in part) from the transport gateways 420. In some embodiments, service history IPDRs are collected/aggregated (in part) from the RAN gateways 410. In some embodiments, service history IPDRs are collected/aggregated (in part) from the base station(s) 125 or a networking component co-located with the base station(s) 125, a networking component in the transport network 415, a networking component in the core network 110 or from another source.

Virtual Service Provider for Service Control

In some embodiments, virtual service provider (VSP) capabilities include making available to a third party service partner one or more of the following: (1) device group definition, control and security, (2) provisioning definition and execution, (3) ATS activation owner, (4) service profile definitions, (5) activation and ambient service definition, (6) billing rules definition, (7) billing process and branding controls, (8) bill by account settings, (9) service usage analysis capabilities by device, sub-group or group, (10) beta test publishing capabilities by device, sub-group or group, and (11) production publishing, fine tuning and re-publishing.

FIG. 49 illustrates a network architecture for an open developer platform for virtual service provider (VSP) partitioning in accordance with some embodiments. As shown, the service controller design, policy analysis, definition, test, publishing system 4835 is configured so that multiple "service group owners" (e.g., the service provider for certain smart phones) or "device group owners" (e.g., eReader devices for the eReader service provider(s)) or "user group owners" (e.g., IT for Company X for their employees' corporate mobile devices), collectively referred to as the "Virtual Service Provider" (VSP), are serviced with the same service controller infrastructure and the same (or substantially similar) service processor design from virtual service provider workstation server 4910 and/or virtual service provider remote workstation(s) 4920. As shown, the virtual service provider remote workstation(s) 4920 communicates with the virtual service provider workstation server 4910 via VPN, leased line or secure Internet connections. The dashed lines shown in FIG. 49 are depicted to represent that, in some embodiments, the virtual service provider workstation server 4910 is networked with the service controller device control system 4825 and/or, in some embodiments, the service controller design, policy analysis, definition, test, publishing system 4835. Based on the discussion herein, it will be apparent to one of ordinary skill in the art that the VSP workstation server 4910 can also be networked in various embodiments with billing system 123, AAA server 121, gateways 410 or 420, or other network components to perform, for example, various network provisioning and activation related functions discussed herein for the device group assigned to one or more VSPs, or for other reasons as will be apparent to a given VSP embodiment.

In some embodiments, the service controller functionality is partitioned for a VSP by setting up one or more secure workstations, secure portals, secure websites, secure remote software terminals and/or other similar techniques to allow the service managers who work for the VSP to analyze, fine tune, control or define the services they decide to publish to one or more groups of devices or groups of users that the VSP "owns." In some embodiments, the VSP "owns" such groups by virtue of a relationship with the central provider in which the VSP is responsible for the service design and profitability. In some embodiments, the central provider receives payment from the VSP for wholesale access services. In some embodiments, the VSP workstations 4910 and 4920 only have access to the service analysis, design, beta testing and publishing functions for the devices or users "owned" by the VSP. In some embodiments, the user or device base serviced by the central provider network is securely partitioned into those owned by the central provider, those owned by the VSP, and those owned by any other VSPs.

In some embodiments, the VSP manages their devices from the VSP workstations 4910 and 4920 using device based service control techniques as described herein. In some embodiments, the VSP manages their devices from the VSP workstations 4910 and 4920 using device assisted and network based service control techniques as described herein. In some embodiments, the VSP manages their devices from the VSP workstations 4910 and 4920 using network based service control techniques (e.g., DPI techniques) as described herein.

For example, this approach is particularly well suited for "open developer programs" offered by the central providers in which the central provider brings in VSPs who offer special value in the devices or service plans, and using this approach, neither the central provider nor the VSP needs to do as much work as would be required to set up a conventional MVNO or MVNE system, which often requires some degree of customization in the network solution, the billing solution or the device solution for each new device application and/or service application that is developed and deployed. In some embodiments, the service customization is simplified by implementing custom policy settings on the service processor and service controller, and the custom device is quickly brought onto the network using the SDK and test/certification process. In some embodiments, the VSP functionality is also offered by an entity other than the central provider. For example, an MVNE entity can develop a wholesale relationship with one or more carriers, use the service controller to create the VSP capabilities, and then offer VSP services for one network or for a group of networks. In some embodiments, the service customization is simplified by implementing custom policy settings through the VSP embodiments on the network equipment, including, in some embodiments, service aware or DPI based network equipment that has a relatively deep level of service activity control capability. For example, using the embodiments described herein, and possibly also including some of the activation and provisioning embodiments, it is possible to efficiently design and implement custom ambient service plans that are different for different types of devices, different OEMs, different VSPs, different distributors, or different user groups all using the same general infrastructure, whether the service control policy implementation is accomplished primarily (or exclusively) with networking equipment (network) based service control, primarily (or exclusively) with device based service control or with a combination of both (e.g., hybrid device and network based service control).

As discussed herein, various VSP embodiments for performing one or more of analyzing traffic usage and defining, managing service profiles or plans, dry lab testing service profiles or plans, beta testing service profiles or plans, fine tuning service profiles or plans, publishing service profiles or plans, or other policy related settings can involve programming settings in the network equipment and/or programming settings or software on the device. For example, as discussed herein, the service processor settings are controlled by the service controller, which can be partitioned to allow groups of devices to be controlled. As another example, equipment in the network involved with network based service control, such as DPI based gateways, routers or switches, can similarly be programmed to utilize various VSP embodiments to implement that portion of the service profile (or service activity usage control) that is controlled by network level functions, and it will be appreciated that substantially all or all of the service activity control for certain embodiments can be accomplished with the network functions instead of the device. Continuing this example, just as the device service processor settings control functions of the service processor can have a group of devices that are partitioned off and placed under the control of a VSP, various VSP control embodiments can partition off a group of devices that have service usage activity controlled by the networking equipment, including, in some embodiments, sophisticated service aware DPI based service control equipment, to achieve similar objectives. It will be appreciated that the discussion herein regarding service controller design, policy analysis, test, publishing 4835, and the discussion regarding device group, user group and other VSP related embodiments, should be understood as applicable to various embodiments described in view of device based services control, control assistance and/or monitoring, or network based services control, control assistance and/or monitoring, or a combination of device based services control, control assistance and/or monitoring and network based services control, control assistance and/or monitoring. The various embodiments described herein related to service activation and provisioning also make apparent how the programming of network equipment service control, service control assistance and/or monitoring can be implemented prior to and following activation of the device. It will also be appreciated that the VSP capabilities described herein can also be applied to those devices that have services controlled by, provided by and/or billed by the central provider, so these techniques can be applied to central provider service embodiments, MVNO embodiments and other embodiments.

Open Development System for Access Services—SDK

In some embodiments, an SDK is provided that allows developers, such as device manufacturers, service providers, MVNO, MVNE and/or VSPs, to develop various service processors (e.g., different versions of the service processor 115) for various devices (e.g., various types of devices 100) and corresponding service controllers (e.g., different versions of the service controller 122) for various types of services and network environments. For example, a device manufacturer can use the SDK to develop a new service processor for their new device (e.g., mobile phone, PDA, eBook reader, portable music device, computer, laptop, netbook, or any other network accessible device). The device manufacturer can also preload/preinstall their new service processor on their new devices. In this example, users of the new device would then be able to utilize the new device to access network based services using the new service processor, which communicates with the deployed new service controller, as similarly discussed herein in various embodiments. For example, the device can be preinstalled with the new service processor to provide ambient services, as similarly discussed herein in various embodiments. For example, the SDK can allow for substantially similar service processors to be installed on similar and/or different devices thereby minimizing any unnecessary differences between service processor elements for device assisted services. In some embodiments, for ambient services for a group of devices, or devices associated with a certain service provider, a set of numbers (e.g., dummy numbers) can be assigned for use for attempting access via the access network using a new device that is not yet otherwise subscribed for service. In some embodiments, the set of (dummy) numbers used for ambient access by the device can also be used for associate of the device with a service provider or a type of device (e.g., eReader or some other type of network accessible device), and upon activation, the service provider assigns a real number for the activated device (e.g., which can be provided at the time of manufacture of the device, point of sale of the device, or after the point of sale of the device, such as upon activation of the device). For example, ambient access of the device can use the device ID, SIM ID, assigned phone (real or dummy) number, and/or other information associated with the device for assigning appropriate service control and service policy/profile for the device.

In some embodiments, the service processor 115 is distributed as an SDK to any device that the central provider or the VSP desires to offer services with so that the service processor 115 can be efficiently designed or adapted by the device OEM, ODM or manufacturer for operation on the service network. In some embodiments, the SDK includes either a complete set of service processor 115 agent software designed for and/or tested for the OS (Operating System) and processor set being used on the device, or a mature reference design for the OS and processor set being used on the device, or a less mature reference design (potentially for the same OS and/or processor set or a different OS and/or processor set being used on the device) that the OEM (Original Equipment Manufacturer) ports to the desired OS or processor set, or a basic set of example software programs that the OEM or ODM (Original Design Manufacturer) can use to develop software compatible with the service, or a set of specifications and descriptions (possibly forming an interoperability standard) of how to design the software to be compatible with the service. In some embodiments, the SDK includes a set of OEM lab test procedures and/or test criteria to ensure that the implementation of the service SDK is compatible with the service and will operate properly. In some embodiments, the SDK includes a set of network certification test procedures and/or test criteria to ensure that the implementation of the service SDK is compatible with the service and will operate properly. In some embodiments, the certification procedures are approved for testing by the OEM, the central provider, the VSP and/or a trusted third party. For example, the central provider is typically in control of the SDK and the test procedures, but others can be in control. In some embodiments, the test procedures are at least in part common across multiple central provider networks. In some embodiments, the SDK concept is extended to include one or more modem modules where one or more of the SDK embodiments described above is combined with a standard reference design or a standard hardware sales package for one or more modems so that the entire package forms a turn-key product that allows a device manufacturer, central provider, VSP or other entity bring new devices or device applications onto the central provider network possibly in combination with other networks in a manner that requires less engineering time and resources and less network certification time and resources than would be required in some designs that do not use this standard SDK plus module approach. For example, the standard SDK plus module product embodiments can be pre-certified and tested with one or more central providers to further reduce development time and expense. The standard SDK plus module embodiments can also use a multi-mode modem (e.g., modems based on a multimode CDMA, EVDO, UMTS, HSPA chipset as in the Gobi global multimode chipset product or modems based on other recently announced LTE plus HSPA chipsets, WiMax plus Wi-Fi chipsets or LTE plus EVDO chipsets) and a multi-mode connection manager agent so that the same SDK plus modem embodiment may satisfy a wide range of applications for many service providers around the world.

In some embodiments, at the time of manufacture, the device is associated with an MVNO. For example, the MVNO can provide an ambient service that provides a service provider clearing house, in which the device can access a network in ambient access mode (e.g., a wholesale MVNO connection through the access network) for purposes of selecting a service provider (e.g., a VSP, MVNO or carrier). Based on the service provider selection, the device credentials and/or service processor are reprogrammed and/or new software is downloaded/installed to activate the device with the selected service provider, as described herein for provisioning the device and the account on that service provider network (e.g., the ATS can track such activation, for example, for revenue sharing purposes, as an activation incentive fee).

In some embodiments ATS is implemented entirely in the network as described below. At the time of manufacture or at sometime during device distribution, the device master agent programs a unique credential in the device that cannot be re-programmed or removed (or is difficult to re-program or remove) and that can be recognized and recorded by the network at the time of activation or at some other time. In this manner, even if other, possibly primary, device credentials are reprogrammed or removed, there will still be a credential that is associated with the device master agent. The ATS process can then be implemented by using a database search function to scan through the database of activated devices to form a list of devices that have been activated for the purpose of master agent reconciliation. Example credentials that can suffice are MEID, hardware MAC address, and/or serial number, that are picked up and recorded by the service provider or other service entity at time of activation or before or after activation.

Interface Server Overlay for Billing/IPDR Feed Mediation

Figure 50:
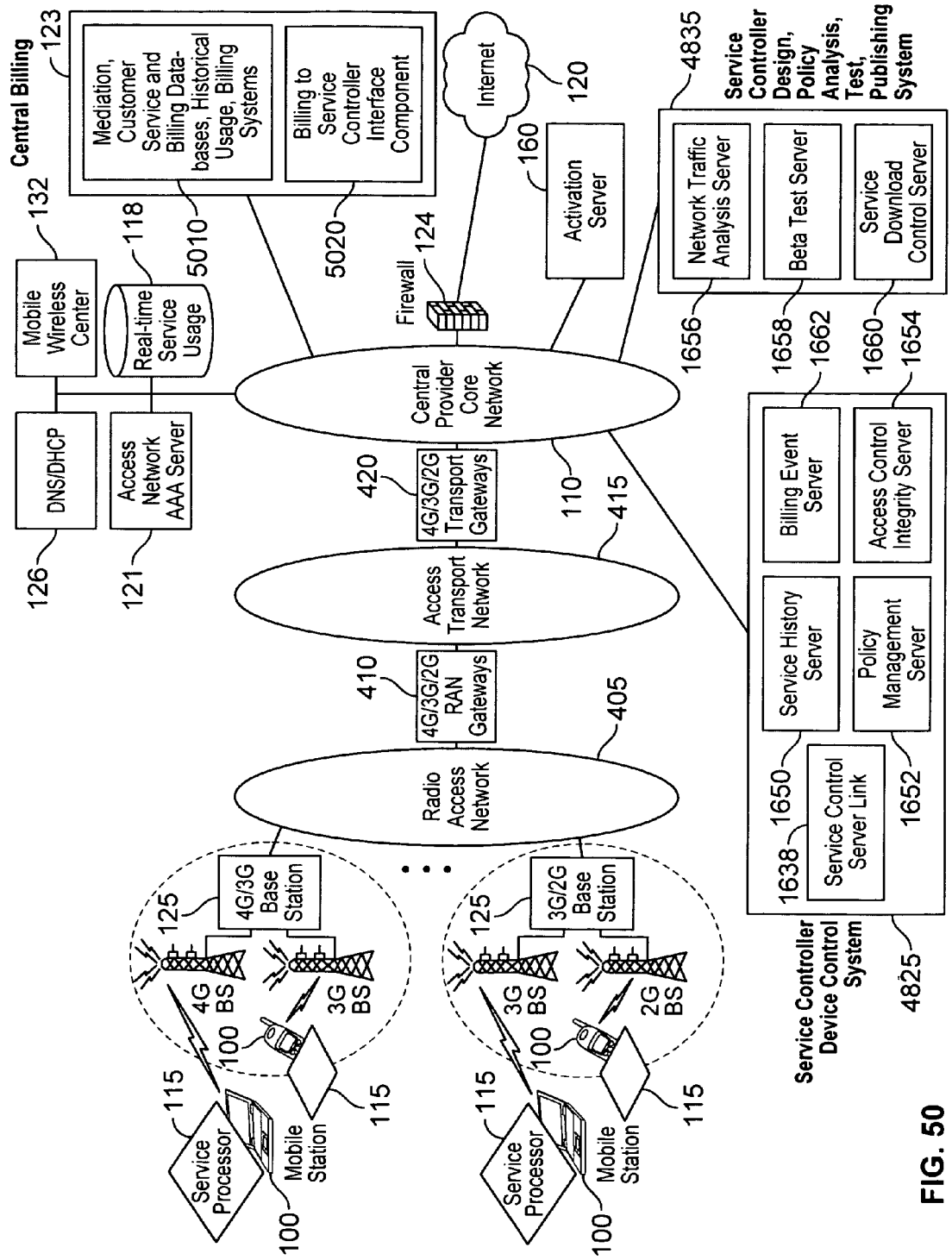
FIG. 50 illustrates a network architecture including a billing to service controller interface for accommodating minimum changes in existing central billing, AAA and/or other network components in accordance with some embodiments.

FIG. 50 illustrates a network architecture including a billing to service controller interface for accommodating minimum changes in existing central billing, AAA and/or other network components in accordance with some embodiments. As shown, the central billing system 123 includes a mediation, customer service and billing databases, historical usage, billing systems component 5010 and a billing to service controller interface component 5020. For example, the billing to service controller interface component 5020 allows for the central billing system 123 to efficiently communicate with the service controller (e.g., service controller device control system 4825).

In some embodiments, an interface server (e.g., the billing databases, historical usage, billing systems component 5010 and/or the billing to service controller interface component 5020) is provided that reads the IPDRs, service profile and/or service plan information stored in the billing and/or service record database(s). In some embodiments, the interface server performs these functions in a manner that is compatible with communication formats of the billing and/or service record database(s) so that little or no changes are required in the configuration, communication formats or software of the existing central billing, AAA and/or other network components. In some embodiments, the interface server (e.g., including the billing databases, historical usage, billing systems component 5010 and the billing to service controller interface component 5020) is co-located with the central billing system components as shown, or in other embodiments, the interface server is located elsewhere. For example, the interface server can be located close to or within the components that comprise the service controller or anywhere else in the network.

In some embodiments, the interface server performs certain communication protocol translation or data format translation required to interface the information stored in the billing and/or service record database(s) to the service controller functions so that the central billing system 123 and other existing components in the network do not need to change much (if at all) to enable the service controller and service processor to implement device based/assisted service control.

In some embodiments, the central billing system 123 or other network components are not required to be aware of the service control functions being implemented by the service controller or service processor, because the interface server acquires the network based information needed by the service controller and/or service processor while requiring little or no specialized awareness, communication, data formatting, user interfacing, service profile processing or service plan processing on the part of existing billing, database or networking components. In this type of overlay approach, various embodiments described herein can be used to quickly upgrade the capabilities of existing networks for new devices while minimizing the required changes to the existing network that supports legacy devices.

For example, a new ambient service plan can be implemented within the central billing system 123 that is associated with a zero or low cost billing plan and a usage limit (e.g., ambient service) that may be difficult or impossible to support in a manner that would result in high user satisfaction and a high level of control for service cost and service policy definition. Even if the central billing system 123 is not highly involved in the process, the zero or low cost plan can be implemented in a manner that results in high user satisfaction and a cost controlled service by using the service controller and/or service processor and the interface server to implement the ambient services access control, service usage control, user interface, service usage notification, transaction billing or bill by account functionality. For example, this approach can be implemented by reading the service plan and/or service policy settings for a device in the central billing database using the interface server, looking up the corresponding service policy, user notification policy, transaction billing policy and bill by account policy associated with the particular service profile or service plan, and then implementing the policies with the assistance of the service controller and/or service processor. Similarly, in another definition, multiple tiers of service control and user notification policies can be added to any number of new service profiles or service plans that would not otherwise be supported with the central billing system 123 and other network components, all with minimal or no modifications to the pre-existing network and billing system.

Another embodiment calls for receiving a standard IPDR feed from central billing 123 or another network component just like an MVNO would. For example, the interface server function can be located in the central billing system, service processor or elsewhere in the network. This provides the IPDR records for service usage policy verification and service usage notification synchronization with little or no need to modify existing billing or network apparatus.

In some embodiments, duplicate the IPDRs are sent from the network equipment to the billing system and/or network management system that are currently used for generating service billing or are used for device management or network management. In some embodiments, duplicate records are filtered to send only those records for devices controlled by the service controller and/or service processor. For example, this approach can provide for the same level of reporting, lower level of reporting, and/or higher level of reporting as compared to the reporting required by the central billing system.

In some embodiments, a bill-by-account billing offset is provided using the interface server. For example, bill-by-account billing offset information is informed to the billing system through an existing data feed and by updating the billing database using the interface server. In some embodiments, transaction billing is provided using the interface server. For example, transaction billing log information is provided to the billing system through an existing data feed and by updating the billing database using the interface server.

In some embodiments, existing/new service plan choice screens are displayed to the user, a user choice or decision/input is confirmed for a selected service plan, and then the service is implemented upon confirmation of the billing system update for the new service plan. In some embodiments, the service is implemented upon the user selection of a new service plan and then retracted if not confirmed as updated by the billing system within a certain period of time. In some embodiments, the new service plan information is updated in the billing system through an existing data feed or by updating the database using the interface server.

Integrated Service Control

Figure 51:
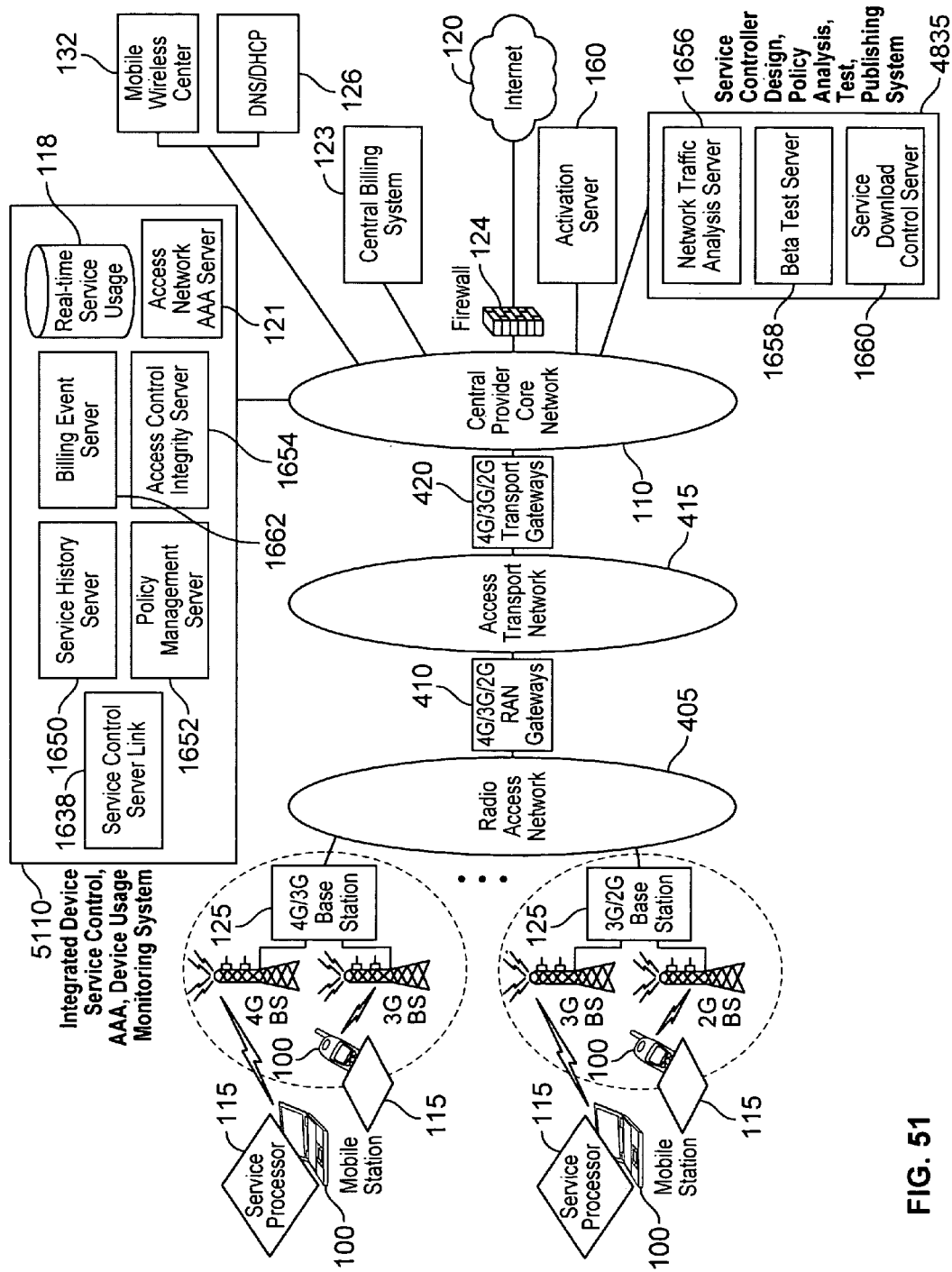
FIG. 51 illustrates a network architecture for locating service controller device control functions with AAA and network service usage functions in accordance with some embodiments.

FIG. 51 illustrates a network architecture for locating service controller device control functions with AAA and network service usage functions in accordance with some embodiments. As shown, an integrated device service control, AAA, device usage monitoring system 5110 is provided that integrates service controller functions (e.g., service controller device control system functions 4825 of FIG. 48) with access network AAA server 121 functions and network (e.g., real-time) service usage 118 functions.

Figure 52:
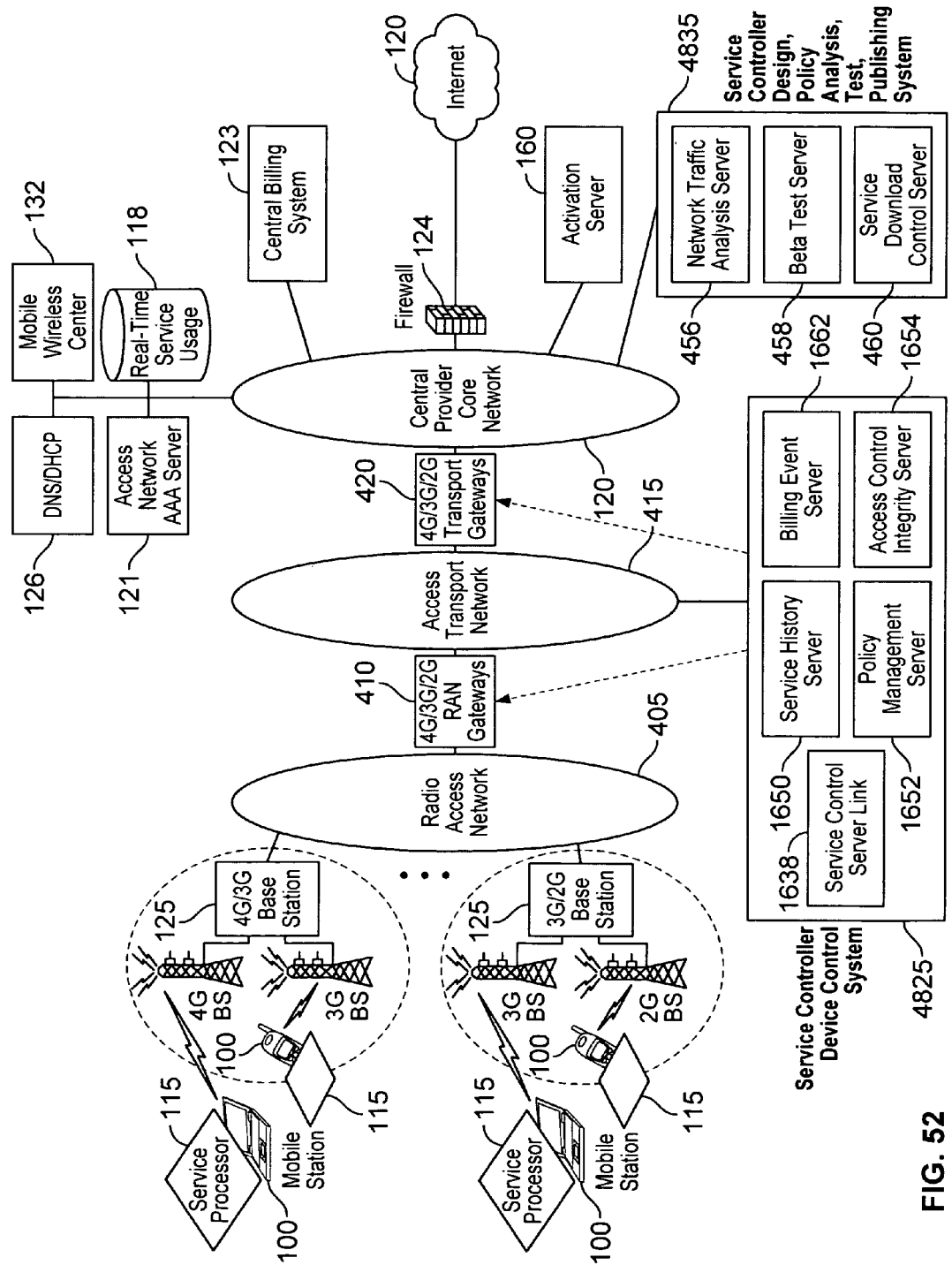
FIG. 52 illustrates a network architecture for locating service controller device control functions in the access transport network in accordance with some embodiments.

FIG. 52 illustrates a network architecture for locating service controller device control functions in the access transport network in accordance with some embodiments. As shown, the service controller device control system 4825 is located in the access transport network 415, or in some embodiments, in the 4G/3G/2G RAN gateways 410 (as indicated by the dashed line with the arrow), or alternatively, in the 4G/3G/2G transport gateways 420 (as indicated by the dashed line with the arrow).

Figure 53:
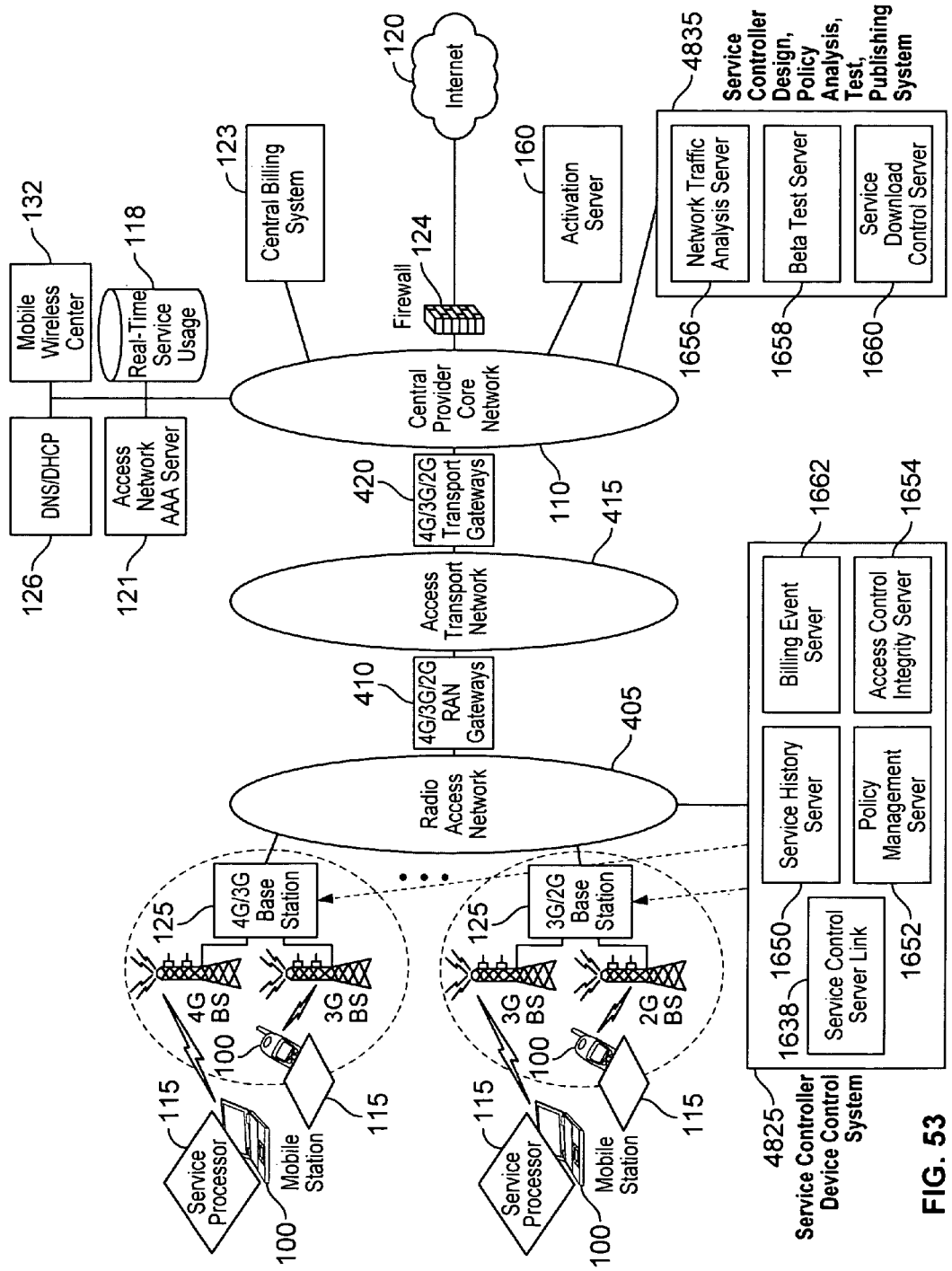
FIG. 53 illustrates a network architecture for locating service controller device control functions in the radio access network in accordance with some embodiments.

FIG. 53 illustrates a network architecture for locating service controller device control functions in the radio access network in accordance with some embodiments. As shown, the service controller device control system 4825 is located in the radio access network 405, or in some embodiments, in the 4G/3G base station(s) 125 (as indicated by the dashed line with the arrow), or alternatively, in the 3G/2G base stations 125 (as indicated by the dashed line with the arrow).

Ambient Services

In some embodiments, improved and simplified processes for provisioning a device or user for service on a central provider network, an MVNO network or a virtual service provider (VSP) on the central provider network are provided. In some embodiments, provisioning includes one or more of the following: a process or result of assigning, programming, storing or embedding into the device and/or network a set of credentials, or otherwise providing the credentials to the user; the credentials being at least in part carried on the device or with the user; and/or at least a portion of or a counterpart to the credentials being stored or recognized by the network so that the various network elements responsible for admitting the device access to the appropriate service activities do so once the device or user service is active. As an example, the credentials can include one or more of the following: phone number, device identification number, device security signature or other security credentials, device identification and/or security hardware such as a SIM, device type identifier, one or more IP addresses, one or more connection MAC addresses, any other address identifier, device service owner or VSP identifier, device OEM, device distributor or master agent, and/or any other information the network can use for admission control, authorization control, identifying the device with a service profile, identifying the device with an initial activation or ambient experience, identifying the device with a service plan or authorized set of service activity capabilities, identifying the device with a service provider or service owner, identifying the device with an OEM or master agent, identifying the device with a distributor or master agent, or identifying the device with a user group or user. In some embodiments, provisioning includes assigning, programming or embedding into the device and/or network the information to define the level of service activity, referred to as a service profile, that the device is authorized to receive. In some embodiments, provisioning also includes establishing the device settings and/or network settings to define an ambient activation experience in which the device user receives a set of services after (e.g., within a short period of time after) purchasing or otherwise obtaining or installing the device whether the device has or has not been registered and activated with the device user or device owner.

In some embodiments, the ambient experience is the user experience that is available at the time the device is sold in the event the user has not yet signed up for a service plan. For example, the ambient experience is defined by an ambient service profile, an ambient service plan and/or the other service usage activity control policies in effect in the network, on the device, or a combination of both. For example, if the device service processor is used in large part to define the ambient service profile, then the initial provisioning and activation settings in the service processor, and possibly the service controller, can define the user service upgrade offering choices, network destination access control possibilities, traffic control policies, mobile commerce transaction capabilities (e.g., which transaction websites, WAP sites or portals the user can access to purchase information, content, music, games and/or eBooks), possibly free news or weather or other modest bandwidth Internet services that are provided free of charge to entice the user into using/upgrading the service or using the transactions or viewing advertisements, what advertisements are displayed to the user or what advertisement based websites the user is exposed to, certain applications may have access while others are blocked (e.g., Internet based text services have access but email downloads do not), or other example service capabilities. It will be apparent to one of ordinary skill in the art that allowing all of these services, and blocking other ambient user service attempts (e.g., unpaid large file size Internet downloads or uploads or movie viewing or other access that would consume bandwidth and cause the ambient service to be a potential source of losses for the service provider) is made possible by the service profile control capabilities of the service processor and/or the service controller. The bill by account embodiments, as discussed herein, in which each service activity can, for example, be separately tracked with the service monitor and other agents and server functions to produce a billing offset that allows categorization and mediation of different billing entities (accounts) provides the capability for the service provider to individually account for the costs of each ambient service element. This allows business models wherein the free access to the end user is paid for or partially paid for by one or more service provider partners who are billed for service access using the bill by account capabilities (e.g., the transaction partners pay for user access to their transaction experience and perhaps pay a revenue share for transaction billing, the advertising sponsored website partners pay for their access service share).

While the service control capabilities of the service processor and the bill by account service cost sharing and transaction revenue sharing in some cases can create a profitable ambient business model, in other cases, the ambient services can be a potential source of losses for the service provider. Accordingly, in some embodiments, the ambient service capabilities can be modified over time to reduce service cost to the service provider or VSP based on a variety of decision factors. For example, the user can have one level of traffic control for a period of time, and if the user has not signed up for service by the end of the period, the ambient service access is reduced by changing the service control policy settings in the service processor, and the service level can be further reduced over time if the user continues to not sign up for service or the user does not create much transaction revenue. As another example, the recursive throttling algorithms discussed herein can be utilized to one or more of the service activities offered in ambient service mode so that the user experiences what full speed service is like, and if the user continues consuming appreciable bandwidth with the service activity, then the activity is throttled back to reduce costs. In these examples, the service processor or service controller can issue the user a notification explaining that their service is currently free so their usage is being throttled, and if they desire to receive better service, service plan upgrade offers can be delivered to the UI. It will now be apparent to one of ordinary skill in the art that the various ambient service parameters, including the provisioning and activation processes used to create the ambient service activation, can also be managed by the VSP apparatus and processes described herein. For example, this allows the same service controllers and service processor solutions to be used to define a wide range of ambient experiences for various device groups or user groups that are controlled by different VSPs.

Similarly, rather than controlling the ambient service profile settings using the VSP functions to control the service controller, service processor, provisioning and activation settings, other embodiments call for the ambient service profile settings to be controlled by the network based service activity control equipment as similarly discussed herein. Depending on the level of service control and service monitoring sophistication (e.g., highly advanced DPI or service aware techniques), some, much, most or all of the above described ambient services functionality can be implemented using network based service controls and the VSP management and control embodiments described herein.

In some embodiments, a device is suspended based on inactivity, or the device is placed in a suspended service state or suspended account state, so that the network does not get bogged down with a significant number of devices and credentials that are inactive. For example, this can also result in a portion of the device credentials being assigned back to an available pool rather than reserved for that particular device (e.g., phone numbers if phone numbers are scarce). The device account and/or activation state can be re-activated when the device comes back online. For example, the suspend state can be a simple suspension of services without changing the account status, in which case the re-activation process can be automatically completed as a subset or entire set of the activation sequence that occurs when the device is initially used as described herein. The suspend state can also involve changing the account status to inactive, in which case the re-activation process can automatically reconfigure the account status back to an active state when the device re-accesses the network. For example, the suspend state can involve de-assigning or possibly re-claiming a portion of the device credentials. If a portion of the credentials are de-assigned, then when the device re-accesses the network credentials can be automatically re-assigned as described in various embodiments described herein.

Network Based Service Monitoring Notification and Control

In some embodiments, as described herein, it is desirable to implement some or all of the deep service usage monitoring, service control or control assistance, or service notification or notification assistance associated with a service profile in network apparatus rather than in the device, or to implement some of the deep service monitoring, control, control assistance, notification or notification assistance in the device and others in the network. This is the case, for example, in a mixed network in which some devices have some, or at least one, or all of the service processor capabilities discussed herein, but other devices do not have as much or any of the service processor capabilities. Another example is for networks or devices that do not have any service processor capabilities or where it is desirable to do all of the service monitoring, control and notification in the network rather than the device. As described below, FIGS. 54 through 63 depict various embodiments for combinations of device based service monitoring, control or control assistance, usage notification or usage notification assistance and/or network based service monitoring, control or control assistance, usage notification or usage notification assistance.

FIG. 54 illustrates a network architecture for locating service controller device control functions with AAA and network service usage including deep packet inspection functions in accordance with some embodiments. As shown, an integrated device service control, device usage monitoring system 5410 is provided that integrates service controller functions including a deep packet control (DPC) policy implementation function 5402 with access network AAA server 121 functions and network real-time service usage 118 functions. In the following discussion, it is understood that the AAA server 121 function can be re-located to another point in the network or network equipment partitioning with no loss in generality. It is also understood that many of the functional partitions described for the various embodiments within integrated device service control, device usage monitoring system 5410 can be re-drawn with no loss in applicability, function or generality. Finally, it is understood that one or more of the functional elements described within the integrated device service control, device usage monitoring system 5410 can be removed for simplified embodiments and that not all the functionality described herein is necessary in some embodiments.

In some embodiments, the integrated device service control, device usage monitoring system 5410 provides for network based service monitoring or control that satisfies various network neutrality and/or privacy requirements based on indication(s) received from the device or user (e.g., user input provided using the device UI using the service processor 115; user input provided through another website, WAP site or portal; or user input provided through the service contract where the user agrees to the monitoring and/or service control levels) and network based service control using a DPI service monitor 5412 and/or the DPC policy implementation 5402.

In some embodiments, the integrated device service control, device usage monitoring system 5410 provides for network based service monitoring or service control that satisfies various privacy requirements using indication(s) received from the device or user (e.g., user input provided using the device UI using the service processor 115; user input provided through another website, WAP site or portal; or user input provided through the service contract where the user agrees to the monitoring and/or service control levels) and network based DPI service usage monitoring or DPC policy implementation using the DPI service monitor 5412 or DPC policy implementation 5402 as described below. In some embodiments, the DPI service monitor 5412 and/or DPC policy implementation 5402 include a secure database for storing service monitoring and CRM information for each device/device user. In some embodiments, the DPI service monitor 5412 and/or DPC policy implementation 5402 can be integrated with the integrated device service control, device usage monitoring system 5410 (as shown) or provided within a separate router, server, and/or software/hardware implemented function that is in secure communication with the integrated device service control, device usage monitoring system 5410 and/or other network elements based on the network architecture. In some embodiments, a secure data store, such as a secure database, is not integrated with the DPI service monitor 5412 or DPC policy implementation 5402 but is in secure communication with the DPI service monitor 5412 or DPC policy implementation 5402, the integrated device service control, device usage monitoring system 5410 and/or other network elements depending on the architecture (e.g., a billing server or any other network element). In some embodiments, the user selects limits and/or restrictions on who can access remotely stored service usage history and/or other CRM/privacy related data (e.g., CRM/privacy gatekeeper settings), and, for example, other network elements and/or network administrators access to such data can be limited and/or restricted accordingly. For example, access to such stored service monitoring and CRM information can require certain security credentials and/or using various other well known secure data storage techniques, such as the various secure storage techniques described herein.

In some embodiments, the secure database possessing user service usage information that is considered sensitive and has not been approved for distribution by the user can be made unavailable to the credentials possessed by network managers or network functions except, for example, for emergency service situations of government mandated monitoring needs where special credentials are brought out of secure storage that are not normally available. In some embodiments, rather than the user selecting limits, a certain set of restrictions are assumed unless the user selects information filtering settings that allow more information to be shared with the network functions, network administrators or service provider partners. In some embodiments, the information is filtered to remove information thought to be sensitive but still transmits service usage information needed for monitoring network services or other important parameters. For example, the website destinations a user is visiting can be classified with generic identifiers that are not decodable or the individual website information can be completely removed. Many other examples will be apparent to one of ordinary skill in the art.

For example, the stored service monitoring and CRM information can also be organized into groups to define group CRM profiles to store service monitoring information for every user indexed by the user credentials (e.g., such groups can also be used for various VSP related functions, as described herein). The DPI service monitor 5412 or DPC policy implementation 5402 also uses the secure storage to store service monitoring information for each user indexed by the user credentials or another aspect of the device identifier or address assignment (e.g., IP address or MAC address). In some embodiments, a CRM information manager (e.g., a supervisor program executing on the integrated device service control, device usage monitoring system 5410) communicates with the other network functions and provides filtered service usage and CRM information according to CRM filtering rules for each user or for groups of users. In some embodiments, the filtered CRM data can be made available using secure communications with other networking equipment by the integrated device service control, usage monitoring system 5410. In some embodiments, the filter settings for some users allow more information to be shared from the secure service usage information than others due to the differences in user preference settings and/or service plan agreements.

In some embodiments, user privacy preference information is used to determine the privacy filter settings, which are securely implemented by the integrated device service control, device usage monitoring system 5410. For example, service CRM filter settings can be received at the time of service contract sign up (e.g., service plan selection) and/or allow the user to log into service preferences web page to change settings (e.g., without involving any interaction with local software on the device). As another example, software on the device (e.g., including the service processor 115) can be used for selecting user CRM/privacy preferences, which are securely communicated to the integrated device service control, device usage monitoring system 5410 (e.g., the device can include credentials that can be verified to allow for selection/modification of CRM/privacy preferences or other user based preferences securely maintained in a network server, such as the integrated device service control, device usage monitoring system 5410 or another network element, such as shown in various other embodiments described herein). In these examples, the filtered CRM data is available from the integrated device service control, device usage monitoring system 5410 for other network components over a secure or open communication link. In another example, user CRM/privacy preferences are input using a web server hosted by the integrated device service control, device usage monitoring system 5410 or the central billing system 123. In another example, software on the device (e.g., including the service processor 115) can be used for securely communicating user preference decisions to an intermediate server that acts as a device manager and intermediate server for devices or device groups and the integrated device service control, device usage monitoring system 5410.

In some embodiments, the integrated device service control, device usage monitoring system 5410 provides for network based service control as described below. In some embodiments and similar to the above described network based CRM filtering embodiments, the DPI service monitor 5412 or DPC policy implementation 5402 includes secure storage (e.g., a secure database) for storing service monitoring information (e.g., based on user selections/preferences), and the DPC policy implementation 5402 performs traffic shaping/throttling algorithms for each user based on the stored service monitoring information from DPI service monitor 5412. For example, network based DPI traffic inspection by the DPI service monitor 5412 can use the secure storage to save service monitoring information for each user indexed by the user credentials or other parameters, such as IP address or other network tag. As another example, the DPC policy implementation 5402, for example, which can be supervised by policy management server 1652 as described herein with respect to various other embodiments, can implement service usage history statistical analysis inside the secure storage and maintain a service usage history analysis for each device/user and/or perform various traffic shaping and/or throttling algorithms based on various device, user selected and/or service plan related settings (e.g., for network neutrality purposes) allowing for various higher level service usage goals for one or more users, as similarly described herein with respect to various device based service usage monitoring embodiments (e.g., except for certain encrypted network traffic flows or application related flows for which traffic control generally needs information from the application level and/or content specific traffic control).

In some embodiments, input is collected on how to implement service control (e.g., from the user of the device). For example, such input can be determined based on one or more of the following: a service plan choice for the device; input provided by a user via a website (e.g., web based portal) for indicating changes to service control policies, as similarly described above; input provided by a user via the device (e.g., including the service processor 115), which securely communicates the input to the DPC policy implementation 5402, for example, which can be supervised by the policy management server 1652; and input provided by a user via the device (e.g., including the service processor 115), which securely communicates the input to an intermediate server for the DPC policy implementation 5402, as similarly described above. In some embodiments, such service control is based on various algorithms as described herein that identify the heaviest usage service activities and recursively control the speed for those activities while leaving certain others unaffected, and in a manner that is specified or selected by the user to ensure network neutrality. In some embodiments, the user is offered a choice for controlling service usage and/or selects an algorithm that controls all activities equally/neutrally (e.g., based on selected user preferences). For example, by implementing service control algorithms that are network neutral (e.g., throttling all activities equally or throttling the highest usage algorithms without singling out certain activities for throttling unless they satisfy certain network neutral usage history or usage statistics criteria), or that are approved, selected or otherwise specified by the user, network neutral traffic control or service usage control can be maintained.

In some embodiments, the DPI service monitor 5412, possibly in conjunction with the service usage notification 5420 and/or service history server 1650, provides service usage/service cost (e.g., a real-time service usage counter) related notifications to the device based on user preferences, as similarly described above with respect to various device based service usage/service related notification embodiments. For example, the DPI service monitor 5412, for example, in conjunction with the service usage notification 5420 and/or service history server 1650, can perform service usage/service related notification algorithms based on one or more of the following: service plans, device settings, and/or user selected preferences (e.g., such notification messages can be securely communicated to the device and/or to the device via an intermediate server). For example, the policies that govern how the user is notified of service usage or service cost can be determined by the policy management server 1652 and/or the service usage notification 5420. As another example, user acknowledgements of important notification messages and/or user choices related to important service usage decisions can be requested, as similarly discussed above with respect to device based service usage/control embodiments, which can then be communicated to the central billing system 123 as confirmation for any such important notification messages (e.g., related to service usage overage charges and/or confirmation of service upgrades). In some embodiments, various other service usage algorithms related to service usage and/or service cost forward projections described herein with respect device based service usage forward projection embodiments are performed in the network, such as by the integrated device service control, device usage monitoring system 5410, and such forward projections can then be communicated to each respective device as service usage notification messages (e.g., using a push based approach (initiated in the network) and/or pull based approach (initiated by a request from the device)). For example, these embodiments for projected service usage methods, as described herein, can be helpful for determining when the user is using services in a manner that will cause the user to run over a service limit so that the user can be notified, or the service can be controlled or throttled if the user has selected a control or throttling option.

In some embodiments, one or more intermediate servers are provided for workload balancing and/or off-loading the integrated device service control, device usage monitoring system 5410 and perform one or more of the functions described above with respect to various embodiments of the integrated device service control, device usage monitoring system 5410. In some embodiments, service plans, device settings, and/or user selected preferences are used to associate each device/user with a preprogrammed profile to more efficiently associate such devices/users with their selected service plans, device settings, and/or user preferences. For example, the process of setting a service profile for a given device can be determined by assigning the device to a service flow that has the pre-defined service profile and is shared with other devices within the integrated device service control, device usage monitoring system 5410 rather than individually processing the service flow manipulations for each device. In some embodiments, the act of provisioning and activating a service profile for a given devices involves setting up the service flow definition and identifier within the integrated device service control, device usage monitoring system 5410 (if it is not already set up) and then assigning the routing of the device credentials to that service flow identifier. User preferences can, for example, be accounted for by assigning the device service flow to one of several pre-defined profiles based on user preferences that are all supported under the same service plan. For example, one service flow profile can call for service usage notification but no control under the same service plan as another service flow profile that calls for less notification but active service usage control to maintain user costs to a monthly post-pay limit.

In some embodiments, the bill by account function is implemented in the context of the integrated device service control, device usage monitoring system 5410 or other network based system embodiments described herein. For example, the DPI service monitor 5412, in some cases in conjunction with service history server 1650, can operate in conjunction with bill by account policy settings stored in the billing event server 1662 so that service activities are divided into the account classifications defined by the service profile settings. The bill by account feeds can then be sent to the billing system or to an intermediate billing event aggregation server that collects this type of deep packet inspection generated information from one or more integrated device service control, device usage monitoring system 5410 units to aggregate and format the information in a manner that may be used by the central billing system 123. In some embodiments, the bill by account information collected in a network box like the integrated device service control, device usage monitoring system 5410 is augmented by bill by account information collected on the device as described herein, and any intermediate server that can be used to aggregate and format these bill by account feeds for the central billing system deals with both types of data, from the network and from the devices.

As shown in FIG. 54, in some embodiments, integrated device service control, device usage monitoring system 5410 includes the service control server link 1638, which, for example, can be used as described above (e.g., with respect to FIG. 16 and other embodiments described herein) to communicate with device service processors 115. In some embodiments, billing server 1662 within integrated device service control, device usage monitoring system 5410 detects device usage events reported by DPI service monitor 5412, in some cases in conjunction with service history server 1650, generates a billing event that can be recorded or transmitted to the central billing system 123. In some embodiments, billing server 1662 receives information from device billing agent 1695 and/or device service monitor agent 1696 and transmits the device service usage billing events to the central billing system 123. In some embodiments, certain billing events that are advantageously collected in the network (e.g., DPI service monitor 5412 and/or billing event server 1662) are combined with certain billing events that are advantageously collected on the device (e.g., service monitor agent 1696 and/or billing agent 1695), and both sources of billing information are transmitted to the billing system 123. Similarly, in some embodiments, certain service usage information is collected with service usage monitor agent 1696, and that information is combined with service usage information collected from DPI service monitor 5412 and/or service history server 1650 and/or service usage 118. In some embodiments, certain service aspects are controlled using network based DPC policy implementation 5402, in some cases in conjunction with or supervised by network based policy management server 1652, and other service aspects are controlled using device based policy implementation agent 1690, in some cases in conjunction with or supervised by policy control agent 1692. As will now be apparent to one of ordinary skill in the art in view of the numerous embodiments described herein, many hybrid approaches to service usage monitoring, service control, service notification or service billing can be accomplished with some aspects of the policy, notification, control, monitoring or billing being implemented/performed on the device apparatus described herein and others implemented/performed on the network apparatus described herein. The presence of access control integrity server 1662 and many other service control verification embodiments described herein make it apparent that the integrated device service control, device usage monitoring system 5410 embodiments also provide for affirmative verification of whatever functions are implemented on the device. It will also be apparent that all of the above combinations of device and network functions, and many others, can be accomplished in ways that are network neutral and/or protect user privacy preferences by implementing the service control algorithms in a network neutral manner and/or receiving user preference input on how to implement service control, and by maintaining service usage and CRM information security and filtering on both the device 100 and the network based integrated device service control, device usage monitoring system 5410.

In some embodiments, the integrated device service control, device usage monitoring system 5410 facilitates or plays a part in automated provisioning and activation of the devices as similarly described above with respect to various device based automated provisioning and activation embodiments. In some embodiments, the activation server 160 is integrated into or partially integrated into device service control, device usage monitoring system 5410.

In some embodiments, the integrated device service control, device usage monitoring system 5410 facilitates ambient services as similarly described above with respect to various device based ambient services embodiments.

In some embodiments, the integrated device service control, device usage monitoring system 5410 facilitates VSP and ODI solutions as similarly described above with respect to various device based VSP and ODI embodiments.

Various other network architectures for network based service control including deep packet inspection functions can similarly be used as will be apparent to one of ordinary skill in the art in view of the various embodiments described herein.

Figure 55:
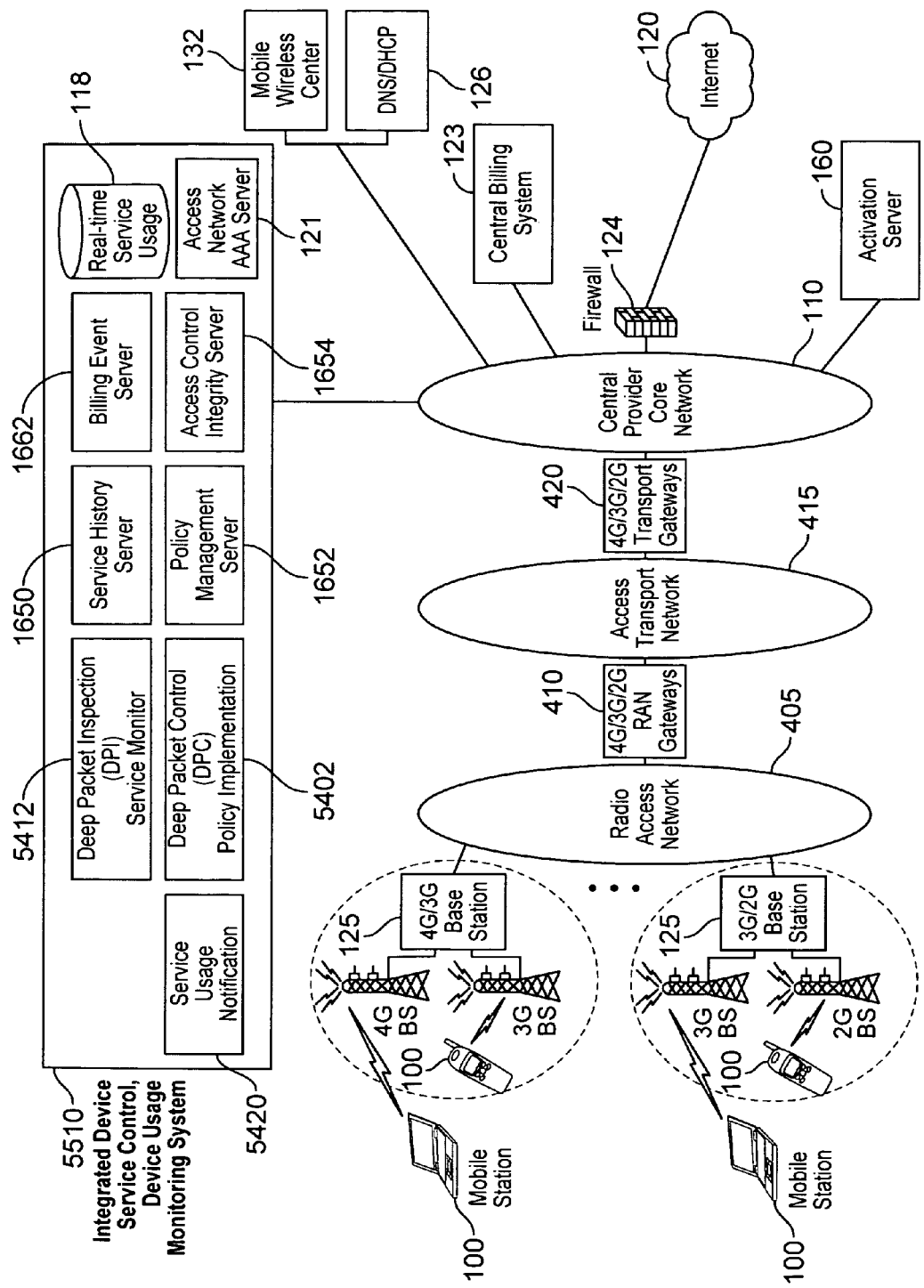
FIG. 55 illustrates another network architecture for locating service controller device control functions with AAA and network service usage including deep packet inspection functions in accordance with some embodiments.

FIG. 55 illustrates another network architecture for locating service controller device control functions with AAA and network service usage including deep packet inspection functions in accordance with some embodiments. As shown, the service processor 115 is not present on the devices 100, and the integrated device service control, device usage monitoring system 5510 performs all service monitoring, service control, billing, and notification functions.

Figure 56:
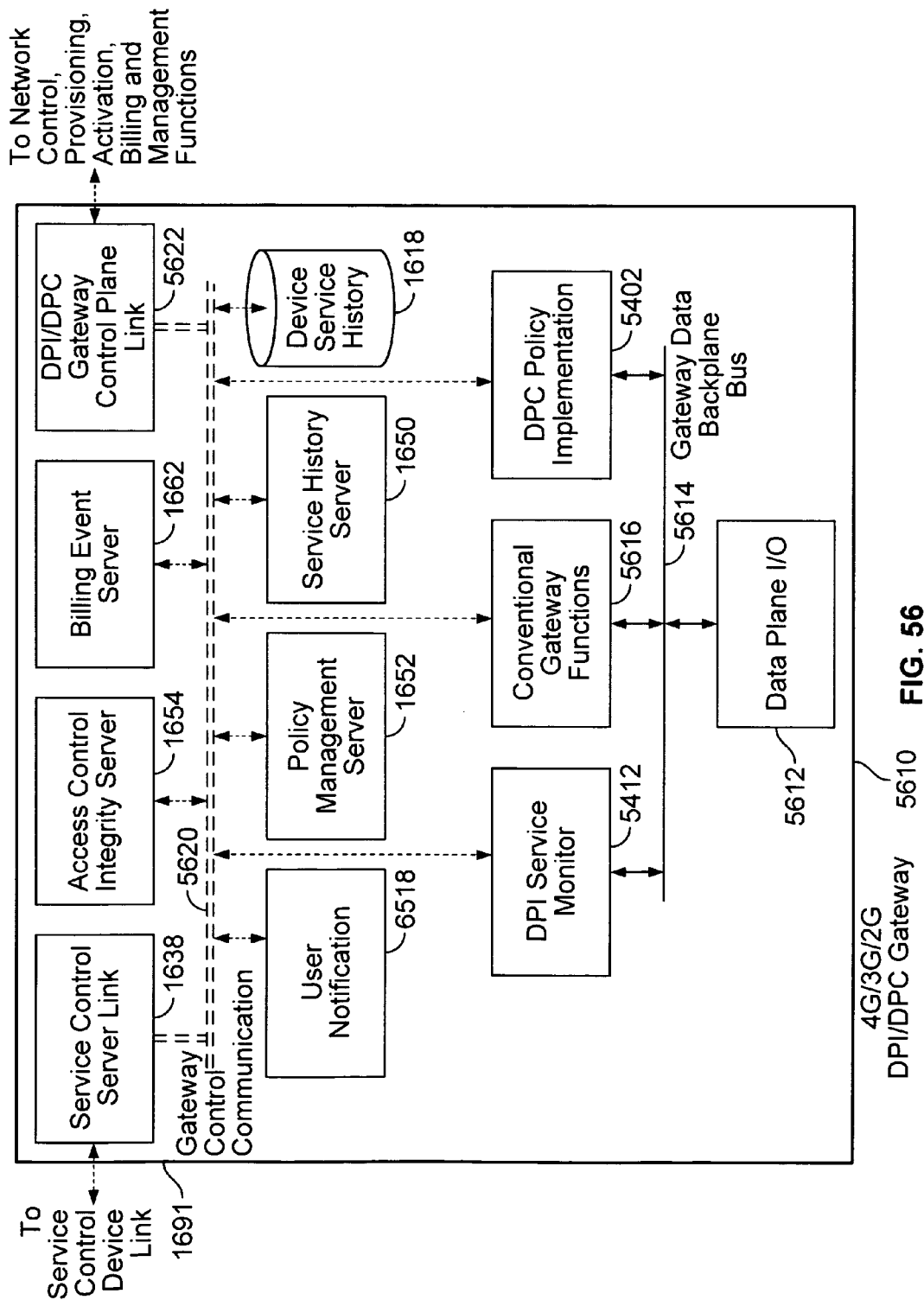
FIG. 56 illustrates a 4G/3G/2G DPI/DPC enabled gateway in accordance with some embodiments.

FIG. 56 illustrates a 4G/3G/2G DPI/DPC enabled gateway in accordance with some embodiments. As shown, a 4G/3G/2G DPI/DPC enabled gateway 5610 (e.g., implemented in either gateway 420 or gateway 410 or a combination of both) where the conventional service gateway functions 5616 (e.g., routing, switching, protocol translation/tunneling, charging data function (CDF), charging gateway function (GCF), mobility management, and/or suspend/resume) are combined with one or more of the following embodiments and integrated into one or a combination of the service gateways (e.g., RAN and/or transport gateways): DPI service monitor 5412, service history server 1650, device usage 118, DPC policy implementation 5402, policy management server 1652, user notification 5618, billing event server 1662, access control integrity server 1654, service control service link 1638, data plane I/O 5612 (e.g., used to represent the I/O port(s) for the gateway), and/or DPI/DPC gateway control plane link 5622 (e.g., used to represent the control plane network channel connecting the above elements to other network equipment and in communication with gateway control communication 5620). The packet processing architecture shown in this figure calls for a multi-point to multi-point backplane bus scheme, but it will apparent that other data path configurations are possible including serial. As will also be apparent, the above described configuration can also be applied to either the transport gateway 420 and/or the RAN gateway 410. As mentioned above, it is possible to maintain a secure storage on the 4G/3G/2G DPI/DPC gateway 420 or 410 that requires secure credentials to get into so that user privacy is protected and service usage information or CRM information is filtered according to user preferences prior to sending to another network function or network manager, and the same allowances can also be applied for emergency or government monitoring purposes. Network neutrality can also be maintained in this configuration by maintaining network neutrality in the service control algorithm and/or soliciting user input on how to control service usage just as discussed above for other network service control implementations or as discussed in the device based service control descriptions.

In some embodiments, the bill by account function is implemented in the context of the 4G/3G/2G DPI/DPC gateway 5610 embodiment or other network based system embodiments described herein. For example, the bill by account information can be completely derived from the network box (e.g., 4G/3G/2G DPI/DPC gateway 5610) without assistance from device based service monitoring or billing capabilities, or none may exist on the device. In this example, the DPI service monitor 5412, in some cases in conjunction with service history server 1650, can operate in conjunction with bill by account policy settings stored in the billing event server 1662 so that service activities are divided into the account classifications defined by the service profile settings. The bill by account feeds can then be sent to the billing system or to an intermediate billing event aggregation server that collects this type of deep packet inspection generated information from one or 4G/3G/2G DPI/DPC gateway 5610 units to aggregate and format the information in a manner that can be used by the central billing system 123. In some embodiments, the bill by account information collected in a network box, such as the 4G/3G/2G DPI/DPC gateway 5610, is augmented, refined or otherwise added to by bill by account information collected on the device as described herein and any intermediate server that can be used to aggregate and format these bill by account feeds for the central billing system deals with both types of data, from the network and from the devices.

Figure 57:
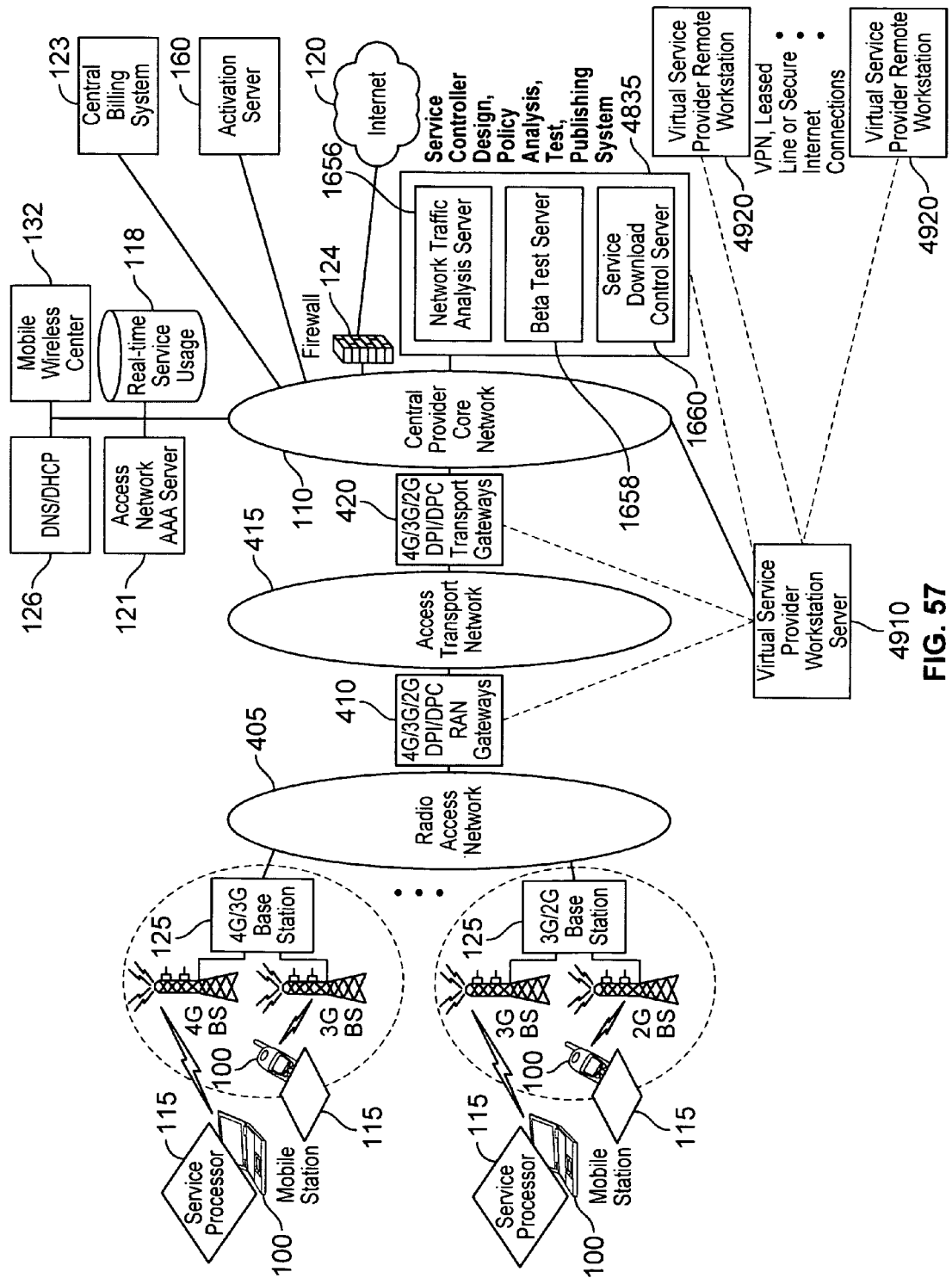
FIG. 57 illustrates a network architecture including the VSP workstation server in communication with the 4G/3G/2G DPI/DPC gateways in accordance with some embodiments.

FIG. 57 illustrates a network architecture including the VSP workstation server 4910 in communication with the 4G/3G/2G DPI/DPC gateways 410 and 420 in accordance with some embodiments. As shown, the VSP workstation server 4910 is in communication with the 4G/3G/2G DPI/DPC gateways 410 and/or 420, the Service Controller Design, Policy Analysis, Test, Publishing System 4835, and/or other networking elements including possibly the central billing system 123, the mobile wireless center 132 (HLR) and/or the AAA server 121 for the purpose of provisioning and/or controlling settings in the 4G/3G/2G DPI/DPC gateways 410 and/or 420, the mobile wireless center 132 and possibly other equipment for the purpose of implementing a portion of the VSP open partner functionality discussed herein. In FIG. 57, the 4G/3G/2G DPI/DPC gateway 5610 functionality as shown in FIG. 56 is implemented in the 4G/3G/2G DPI/DPC RAN gateway 410 and/or the 4G/3G/2G DPI/DPC transport gateway 420 as similarly described above. For example, the VSP functionality can also be used to set higher level policies associated with the 4G/3G/2G DPI/DPC gateway 420 or 410, such as provisioning or activation profiles or policies, ambient service profiles or policies, and/or bill by account service profiles or the other higher level service profile or service plan embodiments discussed herein. In some embodiments, the provisioning and/or activation steps described herein involve setting service policies in the 4G/3G/2G DPI/DPC gateway 420 or 410. In some embodiments, ambient services or ambient activation involve setting up service profiles within the 4G/3G/2G DPI/DPC gateway 420 or 410 that allow the desired activities and block the undesired activities. For example, these settings can be included as part of the open service provider partner programming capabilities of the VSP workstation server 4910 embodiments.

Figure 58:
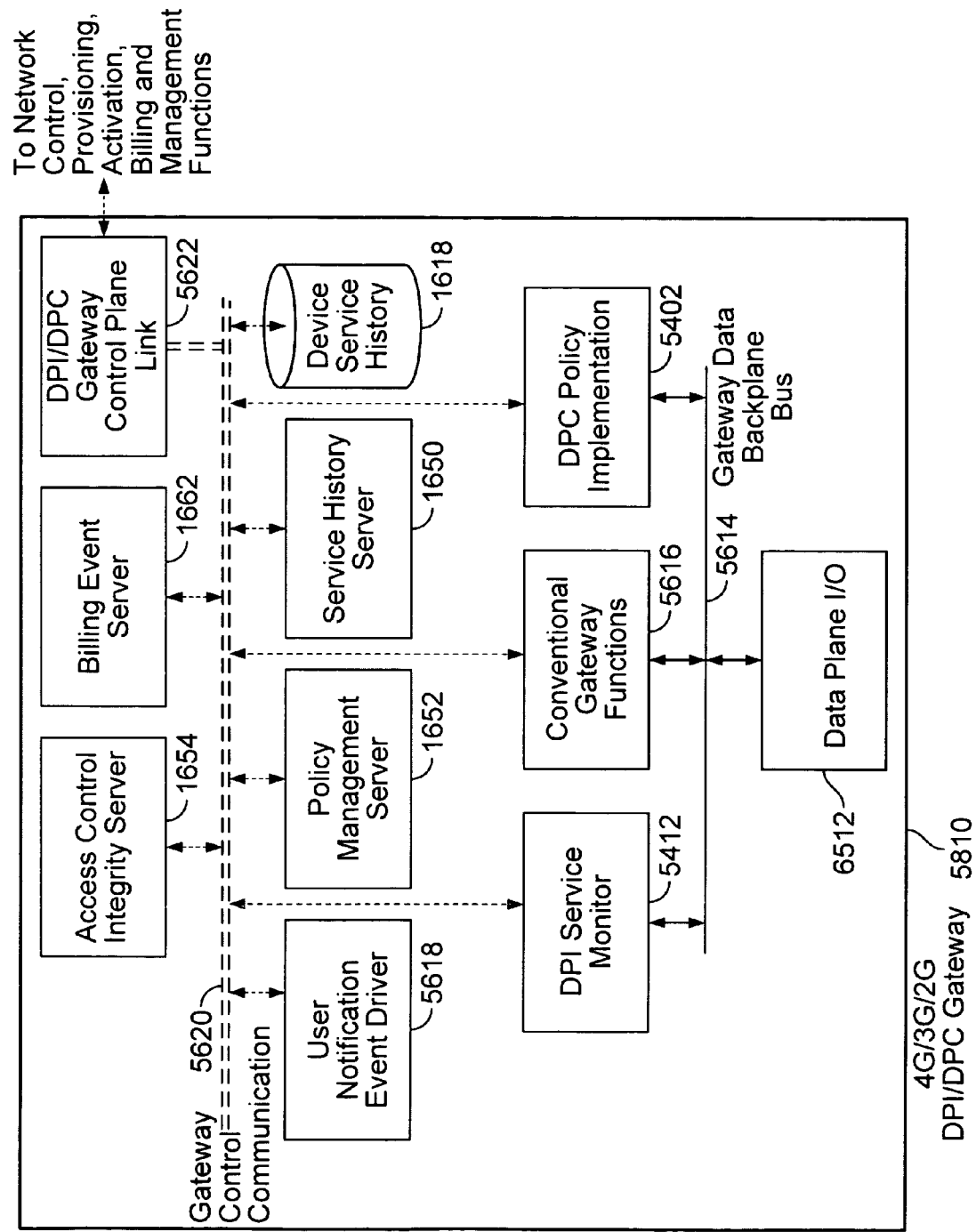
FIG. 58 illustrates another 4G/3G/2G DPI/DPC enabled gateway in accordance with some embodiments.

FIG. 58 illustrates another 4G/3G/2G DPI/DPC enabled gateway in accordance with some embodiments. As shown, a 4G/3G/2G DPI/DPC gateway 5810 (e.g., implemented in either gateway 420 and/or gateway 410) is provided in which the service processor connection (e.g., via service control server link 1638 as shown in FIG. 56) is not present so that all service monitoring, control, billing event collection and transmission, and notification are performed by the 4G/3G/2G DPI/DPC gateway 5610 (e.g., gateways 410 and/or 420).

Figure 59:
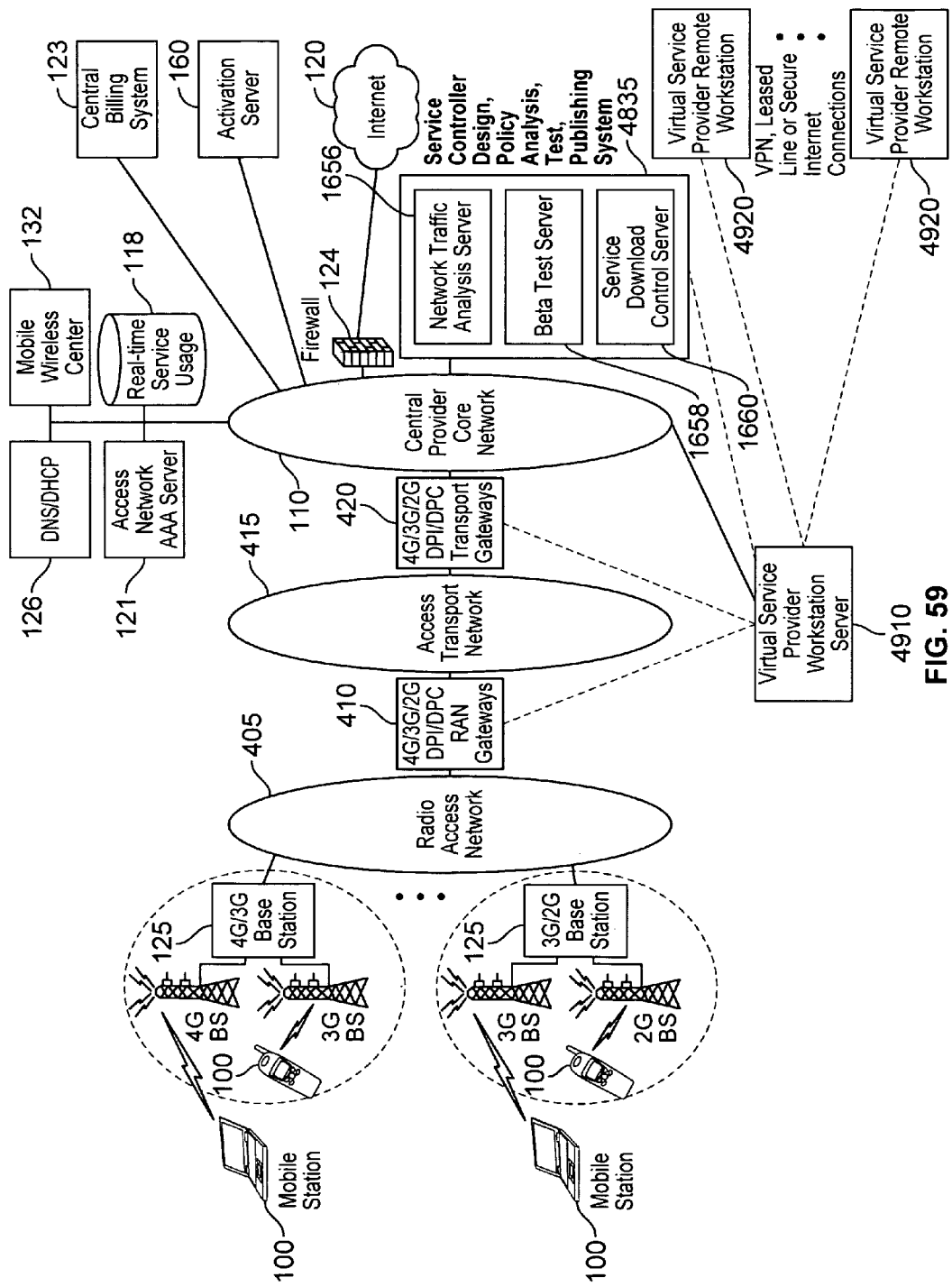
FIG. 59 illustrates another network architecture including the VSP workstation server in communication with the 4G/3G/2G DPI/DPC gateways in accordance with some embodiments.

FIG. 59 illustrates another network architecture including the VSP workstation server 4910 in communication with the 4G/3G/2G DPI/DPC gateways 410 and 420, the AAA 121 and the mobile wireless center 132 in accordance with some embodiments. As shown, FIG. 59 provides a network diagram corresponding to FIG. 58, with similar functionality to the embodiment shown in FIG. 57, in which the service processors 115 are not present on the devices 100. In FIG. 59, the 4G/3G/2G DPI/DPC gateway 5810 functionality as shown in FIG. 58 is implemented in the 4G/3G/2G DPI/DPC RAN gateway 410 and/or the 4G/3G/2G DPI/DPC transport gateway 420 as similarly described above.

Figure 60:
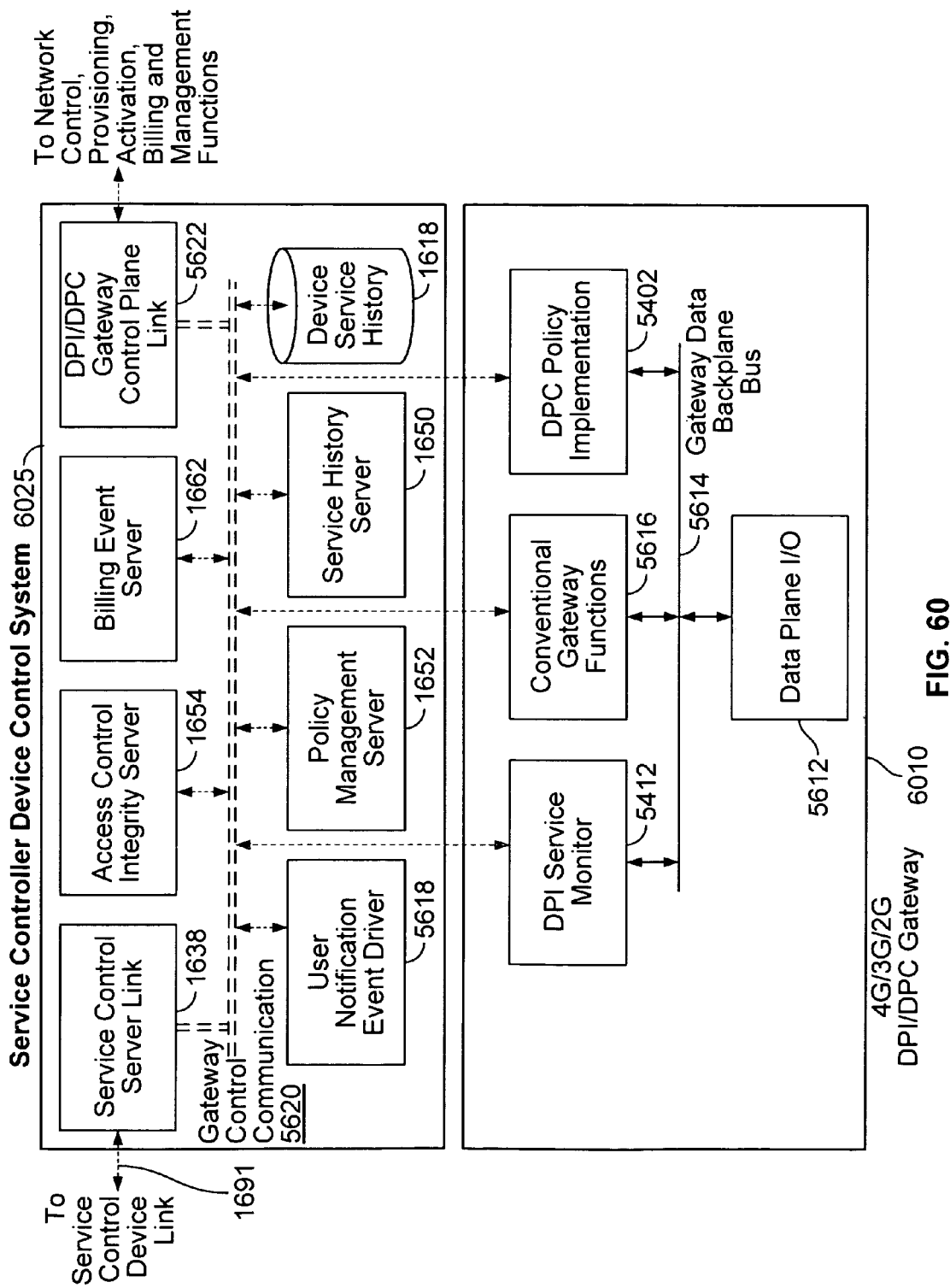
FIG. 60 illustrates a 4G/3G/2G DPI/DPC enabled gateway and service controller device control system in accordance with some embodiments.

FIG. 60 illustrates a 4G/3G/2G DPI/DPC enabled gateway and service controller device control system in accordance with some embodiments. In some embodiments, enhanced network based service monitoring, control, billing and notification as discussed above is implemented using a 4G/3G/2G DPI/DPC enabled gateway 6010 and service controller device control system 6025 as shown. In some embodiments, the functions shown in the figure to be inside of the service controller device control system 6025 have been moved from the 4G/3G/2G DPI/DPC gateway 5610 of FIG. 56 (e.g., or from gateways 410 and/or 420) so that they reside in a separate server embodiment or other network equipment function separate from the 4G/3G/2G DPI/DPC gateway 6010. For example, this architecture can be used when the network equipment manufacturer desires to separate these functions or has an existing product that it is desirable to upgrade by adding a separate box. As another example, this architecture can be used when the 4G/3G/2G DPI/DPC gateway 6010 is not capable of keeping up with large numbers of individual user profiles so it is desirable to go to a scalable server configuration in which load balancing can be applied with a potentially more flexible programming environment for implementing service policy management functions, statistical service history analysis algorithms, service usage projection, and/or service control (or throttling) algorithms. In some embodiments, a secure storage is provided on the 4G/3G/2G DPI/DPC gateway 6010 and/or the service controller device control system 6025 that requires secure credentials to get into so that, for example, user privacy can be protected and service usage information or CRM information can be filtered according to user preferences prior to sending to another network function or network manager, and the same allowances can also be applied, for example, for emergency or government monitoring purposes. For example, network neutrality can also be maintained in this configuration by maintaining network neutrality in the service control algorithm construction and/or soliciting user input on how to control service usage just as discussed above for other network service control implementations or as discussed in the device based service control descriptions.

Figure 61:
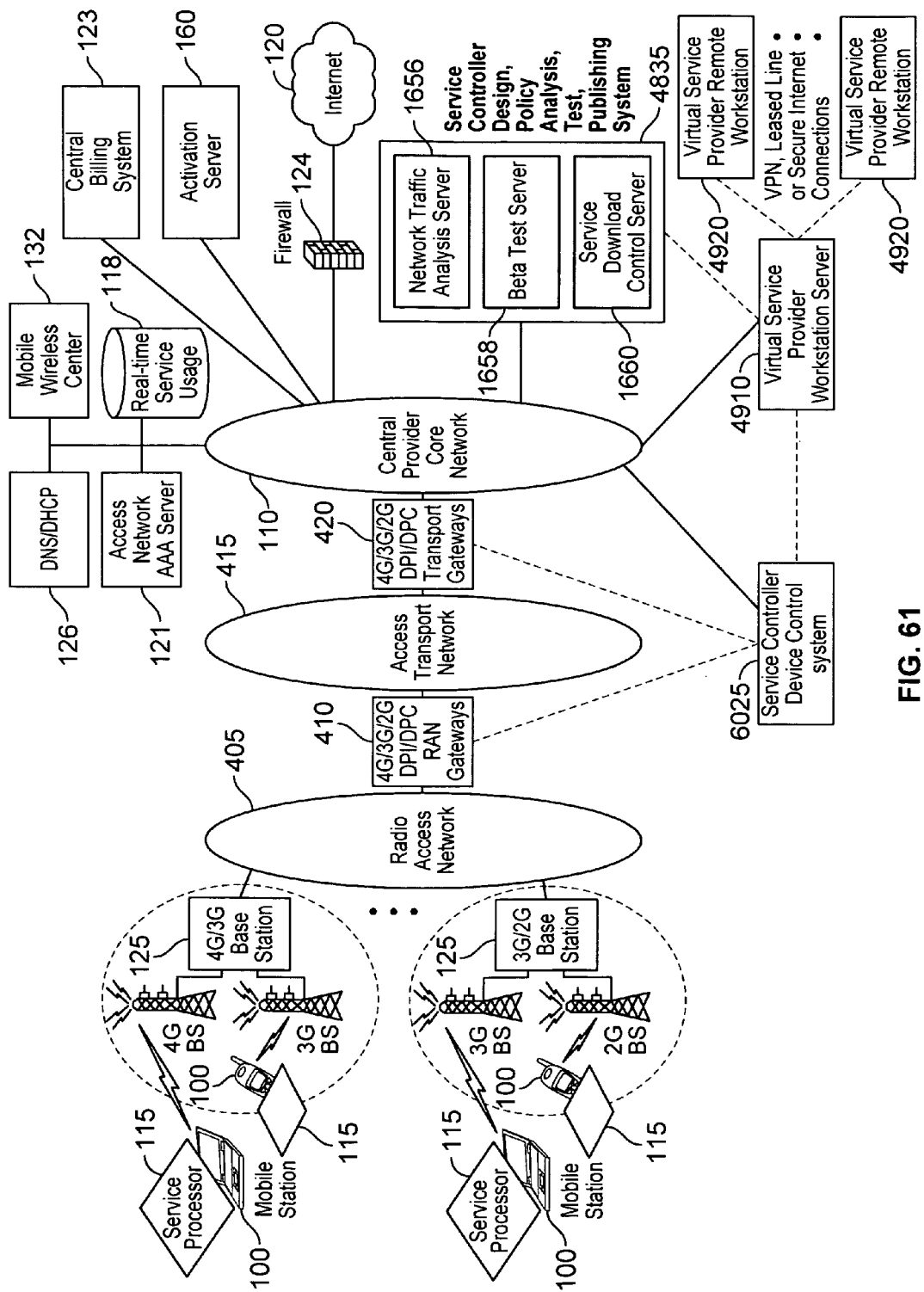
FIG. 61 illustrates another network architecture including the VSP workstation server in communication with the 4G/3G/2G DPI/DPC gateways in accordance with some embodiments.

FIG. 61 illustrates another network architecture including the VSP workstation server 4910 in communication with the 4G/3G/2G DPI/DPC gateways 410 and 420, AAA 121 and mobile wireless center 132 in accordance with some embodiments. In FIG. 61, the 4G/3G/2G DPI/DPC gateway 6010 functionality as shown in FIG. 60 is implemented in the 4G/3G/2G DPI/DPC RAN gateway 410 and/or the 4G/3G/2G DPI/DPC transport gateway 420, as similarly described above, and which are in communication with the service controller device control system 6025 as shown.

Figure 62:
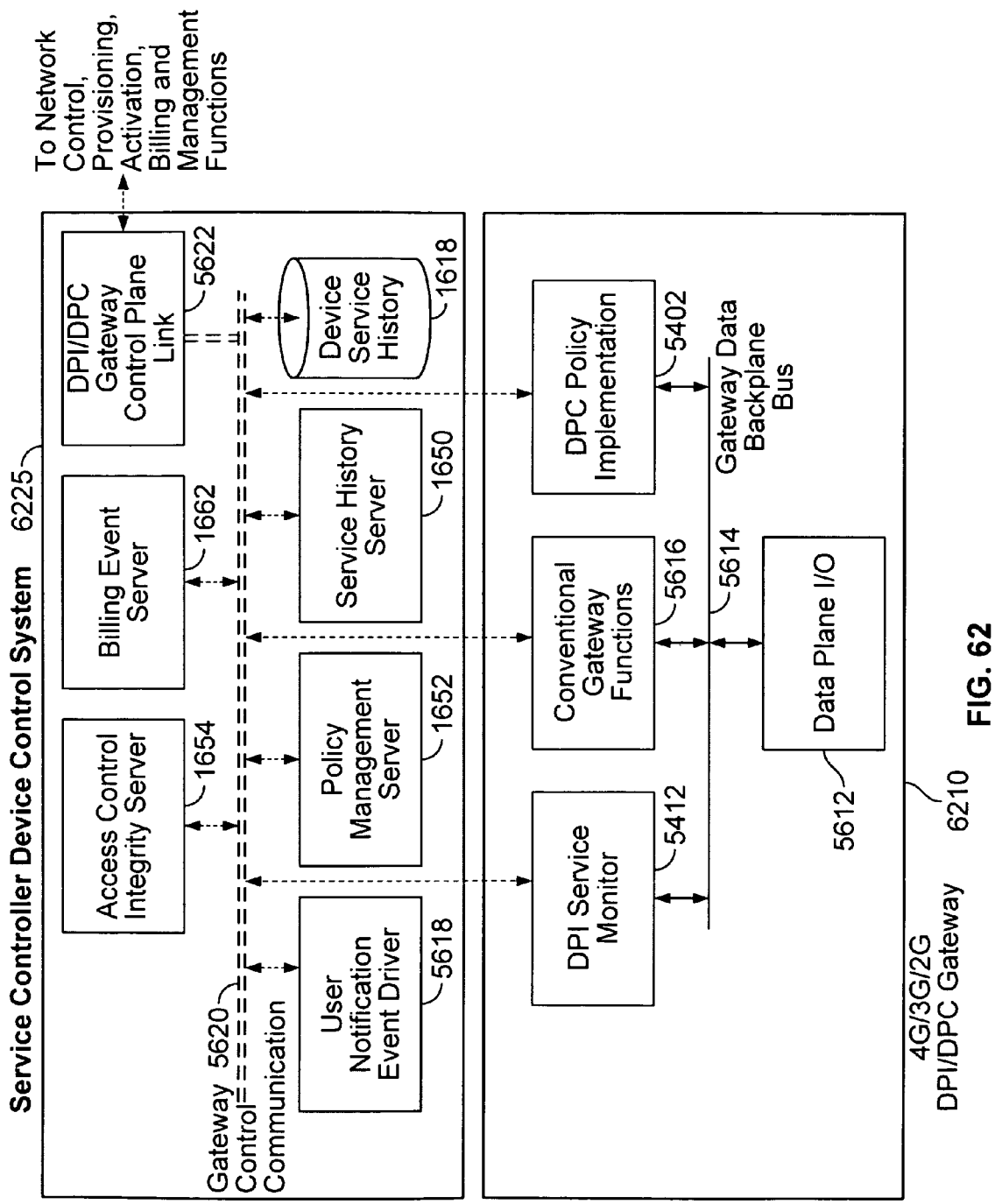
FIG. 62 illustrates another 4G/3G/2G DPI/DPC enabled gateway and service controller device control system in accordance with some embodiments.

FIG. 62 illustrates another 4G/3G/2G DPI/DPC enabled gateway and service controller device control system in accordance with some embodiments. As shown, the capability to communicate with the service processor 115 has been removed so that all service monitoring, control, billing event collection and transmission, and notification are performed by the 4G/3G/2G DPI/DPC gateways 6210 (e.g., implemented in gateways 410 and/or 420) in conjunction with the service controller device control system 6225 without assistance from the service processors 115.

Figure 63:
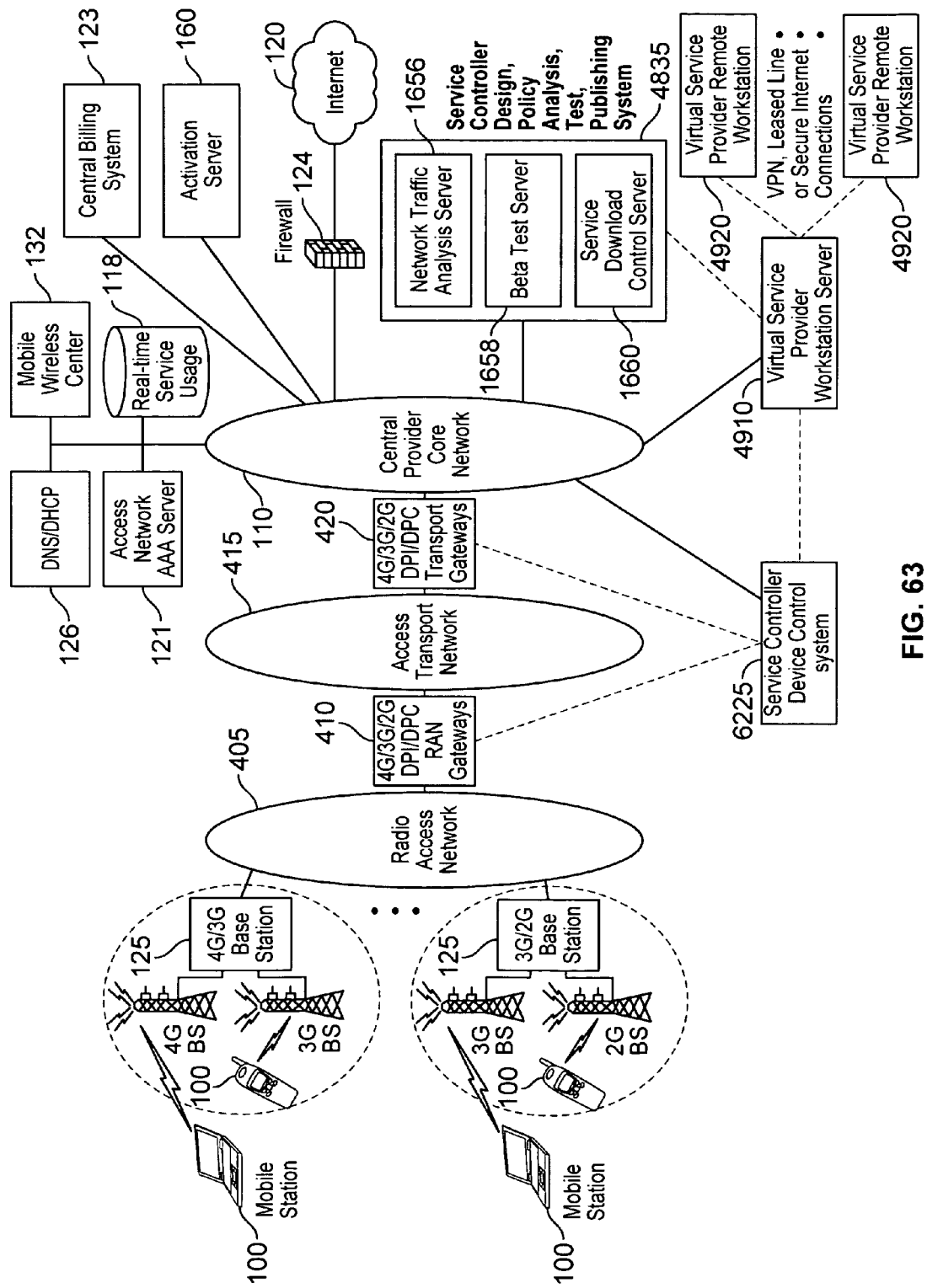
FIG. 63 illustrates another network architecture including the VSP workstation server in communication with the 4G/3G/2G DPI/DPC gateways in accordance with some embodiments.

FIG. 63 illustrates another network architecture including the VSP workstation server 4910 in communication with the 4G/3G/2G DPI/DPC gateways 410 and 420, AAA 121 and mobile wireless center 132 in accordance with some embodiments. In FIG. 61, the 4G/3G/2G DPI/DPC gateway 6210 functionality as shown in FIG. 62 is implemented in the 4G/3G/2G DPI/DPC RAN gateway 410 and/or the 4G/3G/2G DPI/DPC transport gateway 420, as similarly described above, and which are in communication with the service controller device control system 6225 as shown.

As will be apparent to one of ordinary skill in the art, the above described embodiments can be extended to include some or all of the functions depicted in the 4G/3G/2G DPI/DPC service gateways of FIG. 56 in the base station or base station controller 125.

Provisioning and Activation

In some embodiments, automated provisioning and activation includes automation of one or more of the following functions: (1) programming device credentials or partial credentials and recording them in a database (or providing same when they are programmed into the device), (2) associating these credentials with the proper provisioning and/or activation actions to be taken on the device and in the network, (3) directing the device to the proper activation function (e.g., activation server) sequence when it attempts to connect to the network, (4) completing provisioning of the device, (5) programming the AAA, billing system, gateways, mobile wireless center and other network equipment to the proper initial device service control settings, and (6) establishing a service account for the device.

In some embodiments, improved processes for activating service for a device or user with a network service provided by a central provider network, an MVNO network or a VSP on the central provider network are provided. In some embodiments, activation includes one or more of the following: a process or result of associating a service account with device or user credentials; with the service account potentially further being associated with a service profile defining the service activities that the device is authorized to access; creating or updating a service usage or billing record and associating it with the service account to create a service plan; and/or initiating service to the device or user in which the network equipment allows access to the appropriate level of service activities. In some embodiments, VSP embodiments include the provisioning and activation apparatus embodiments of any or all forms.

In conventional mobile device provisioning systems, the provisioning and activation process required to create a user service account and enable the device to access the desired level of service activities can limit mass market, low cost or user friendly applications of the device or service, because the process can often be cumbersome, time consuming and/or expensive for the service provider, service owner, master agent (service distributor), MVNO, VSP and/or user. Accordingly, the various embodiments for provisioning and activation described herein simplify the provisioning and activation process for mobile devices. In some embodiments, provisioning and activation for the device and/or the network accommodates a wide variety of device types and service profile types, with the capability to perform the provisioning and activation at a number of points in the manufacturing, distribution, sales and usage progression for the device, and the ability to either pre-activate before first device use or very quickly activate during first device use (or during some later use of the device).

In some embodiments, as described herein, the term provisioning generally refers to those actions/processes associated with programming the device with credentials or other device settings or software installations used to later activate the device, as well as, in some embodiments, creating database entries and other credential associations in the network so that the network and/or device have the information used to recognize the device or credentials and implement the service policies in the service profile and/or service plan once the service profile and/or service plan are activated. In some embodiments, as described herein, the term activation generally refers to the process of creating or selecting the service plan and/or service profile, programming the settings that are used in each (e.g., required) network function and/or each (e.g., required) device function so that the system can properly associate the device credentials with the appropriate service activity policies, and then admitting the device onto the network. The term activation can also refer in some embodiments to the creation of a user or device service account, in some cases, with user or device owner information or billing information. In some embodiments, the process of provisioning amounts to assigning credentials to the device and programming a portion or all of the credentials on the device, entering a portion or all of the credentials in the various necessary network equipment databases so that the network components are capable of identifying the device and associating it with the network based portion of the admission, traffic processing, service monitoring, billing, service limits and other policies that are eventually defined by the service profile and service plan.

Further examples of the network based service profile policies include network access level, traffic routing, service monitoring, service limits and actions taken upon reaching service limits. Once the service profile is created and activated during the activation process, the device credentials and the associated service profile are communicated throughout the necessary network elements so that each element can implement its part of the network portion of the service profile policies. This process of propagating the service profile settings to all the required network equipment components is a portion of what is referred to herein as activation in accordance with some embodiments. In some embodiments, the activation process includes associating the credentials with the proper service plan and/or service profile, and possibly completing the process of programming the device functions and/or network functions so that the device can be admitted to the appropriate level of network services. In some embodiments, activation also includes the service processor software settings, configurations or installs for each function or agent in the service processor to implement its part of the service profile, service plan, service billing or transaction billing policies. In some embodiments, activation also includes the creation of entries in the various service account databases and/or billing databases to create a user account or device owner account for the purpose of managing the user choices for service plan and other account information storage and management aspects, such as maintaining status information, maintaining the central service profile configuration, conducting reconciliation and billing exchanges, service usage history, and/or account history.

In some embodiments, the term credentials generally refers to the set of information parameters that the network and/or device uses (e.g., requires) to admit the device onto the network and associate it with the appropriate service profile and/or service plan. For example, the credentials can include one or more of the following: phone number, device ID, hardware security device ID, security signatures, IP or MAC address, signature algorithms, passwords, or other secure authorization processes, service provider, OEM, master agent (service distributor), device distributor, VSP, service processor settings or version, or other information used/required by the network to authorize network admission or activate service. In some embodiments, at least some of the credentials are unique to the device, and, in some embodiments, groups of devices share one or more aspects of the credentials. In some embodiments, the term permanent credentials generally refers to the set of credentials that include at least a subset that are intended to be assigned to a device or user on a permanent basis. In some embodiments, the term temporary credentials generally refers to the set of credentials that include at least a subset that are intended to be assigned to a device or user on a temporary basis. In some embodiments, temporary credentials are eventually replaced by permanent credentials. In some embodiments, at least some elements in the temporary credentials (e.g., phone number and/or access or authorization security credential) are used for more than one device. In some embodiments, the temporary credentials are recycled from one or more devices and used for one or more other devices, for example, when they remain unused for a period of time or when they are replaced with permanent credentials on one or more devices. It should not be inferred from the term permanent credentials that permanent credentials are never recycled, for example, when the user discontinues service or use of the credentials. Also, the term temporary credentials does not imply that temporary credentials are always temporary. In some embodiments, partial credentials or pre-activation credentials generally refer to a subset of credentials that are to gain access to limited network services for the purpose of provisioning of credentials and/or activation of a service plan or service profile. For example, prior to a phone number being assigned, a device can gain access to a limited set of network server destinations in which embedded information contained in the device (e.g., the partial credentials) is provided to the server, the server associates that information with the proper additional credentials (including the phone number) to assign to the device and/or associates the information with the proper service profile to activate service. In this example, partial credentials can include device type, OEM, service provider, VSP, device identification number, SIM, service processor configuration or some other information used by the server to determine what the credentials should be and the proper service profile.

In some embodiments, a permanent service account generally refers to the service account that is permanently associated with the user and/or device. For example, this account includes an association with the device or user credentials, user information or billing information, service profile, billing profile, network authorization status and other aspects that define the device or user service policies and billing policies. In some embodiments, the term temporary service account generally refers to a service account that is temporarily set up and associated with the device before some or all of the required permanent account information is available or entered for a device or user. For example, this account can be set up with an association with an actual user, or can be set up with a mock user or unassigned user association so that the network and billing system can recognize the credentials, authenticate the device, admit the device, provide the proper level of service activity control according to the service profile associated with the temporary service account, or collect the service activity usage information for various network and billing system accounting needs before actual user information or billing information has been entered into the network systems. For example, a temporary service account can make it possible or easier to use existing billing systems or other network systems to provide simplified provisioning, simplified activation or ambient services. A temporary service account can also become a permanent service account by replacing mock user or unassigned user information with actual user information, or a temporary service account may need to be replaced by a permanent service account when actual user information needs to be entered into the network systems, possibly including the billing or service profile databases.

In some embodiments, temporary or permanent device credentials and other information used/required for provisioning the device are generated with apparatus located at the manufacturer or in the distribution channel as discussed below. In some embodiments, the apparatus includes a local onsite server that typically shares some aspects of the provisioning information (e.g., phone number, phone number range, MEID or MEID range, SIM number or SIM number range, IP address or IP address range, MAC address or MAC address range, other secure device credential elements) with a network provisioning database. In some embodiments, the apparatus includes a server terminal, and the aforementioned portion of the credentials is generated by the network and shared with the local provisioning apparatus. In some embodiments, as will be discussed below, the provisioning credentials are in part generated in the network and shared with the device while it is connected online to an activation server (e.g., activation server 160) that is connected to the access network. Similarly, there can be activation servers connected to apparatus in the manufacturing or distribution channel that service device activation, or over the air or over the network apparatus connected to an activation server, which in turn connects to the device, can be used to accomplish activation programming of the network and device as further discussed below.

In some embodiments, when a device is provisioned and entered into the network provisioning database, it is associated with the automatic provisioning and/or activation sequence the device is intended to go through once it connects to the network or to the apparatus that will complete the process. In some embodiments, one or more device parameters (e.g., service owner, device type, OEM, plan type, IP address, security credential and/or software version) are used to determine what the appropriate network provisioning steps and/or settings are for completing the provisioning and/or activation process, and this association information is stored in the network provisioning database for propagation of the provisioning profiles or activation profiles to the various network equipment elements. In some embodiments, the network provisioning database is provided (e.g., in the network) that associates the pre-activation provisioning information (e.g., generated, as described herein, at time of manufacture, sometime during distribution, by the user on a website by a sales associate or other activation assistant, or by the network when a new device enters the automatic activation process). For example, the pre-activation provisioning information informs the network whether or not to let the device onto an activation sequence when the device attempts access, and in some cases, also instructs the network to direct the device to a specific activation sequence including, for example, an activation server (or other activation sequencing apparatus) sequence as described herein. In some embodiments, a central database is queried by other network equipment or the central database is included in one or more of the network elements (e.g., the AAA server and/or billing system, mobile wireless center 132), or the database is copied in part or in whole in various network elements (e.g., the central database, AAA server, mobile wireless center, billing system and/or gateways).

In some embodiments, propagating the network equipment provisioning information for a given device or group of devices is accomplished with a network provisioning system that has access to the network provisioning database and is capable of programming the appropriate network equipment. In some embodiments, this network equipment is referred to as "network management" equipment or "network provisioning" equipment. In some embodiments, there are several functions that take part individually or in concert, including, for example, the AAA server 121, service controller 122 (either with device based/assisted services through the service processor related embodiments or with network only embodiments as described herein), the mobile wireless center 132 (e.g., including the home location register (HLR) or other similar function referred to by other industry terms), the activation server(s) 160, other network provisioning or management equipment attached to or associated with the billing database system, and/or some other equipment apparatus. In some embodiments, the local database on the device, database in the AAA server and/or database elsewhere in network is provisioned to inform the gateway of the process for handling the pre-provisioned device according to, for example, the credentials. For example, if the device is not recognized or not authenticated onto the access network as an activated device with associated active service profile and/or service plan, the device connection or communication can be directed (or routed) to a generic activation server that provides an activation sequence that is not necessarily determined by one or more of the specific device credential elements, partial credential elements, device profile or partial device profile that define something specific about the activation sequence for the device. In another example, in which the device is not recognized or authenticated as an activated device with associated service profile and/or service plan, the device can be directed (or routed) to an activation service (or other activation sequencing apparatus) that uses some part of the credentials or range of partial credentials or a portion of a partial or complete device profile to determine a desired pre-determined device specific or device group specific activation sequence that is implemented by a specific activation service sequence or other activation sequence apparatus. In another example, in which the device is not recognized or authenticated as an activated device with associated active service profile and/or service plan, a portion of the device credentials or partial credentials can be used as a look-up index into a database that determines what the specific device activation sequence should be, and the device can be directed (or routed) to a specific activation server sequence or other activation sequencing apparatus.

In some embodiments, a database in the AAA server or database elsewhere in network is provisioned to inform the gateway what to do with a pre-provisioned device according to the credentials. For example, devices can be authenticated (for activated devices), routed to activation servers (or other activation sequencing apparatus) or denied access. In some embodiments, the AAA server (and/or other network elements) provide the above discussed look-up function for the above gateway description in which a lookup database, locally stored or stored in a central database, is queried to provide secondary routing information to the specific or generic activation servers.

In some embodiments, the pre-provisioned database is located in the billing system. In some embodiments, the billing system accesses the pre-provisioned database (e.g., stored on the billing system or another network element) for the purpose of setting up temporary accounts or permanent accounts and associating those accounts with pre-activation status, activated free ambient or activated paying customer.

In some embodiments, for zero activation, all the required pre-provisioning or programming of the above network elements, or others, is coordinated by the network provisioning system at some point after the partial or full device credentials have been associated with the device or reserved for a particular device type or service type. In some embodiments, the network provisioning system also coordinates the information to or from the device provisioning apparatus that is described elsewhere.

In view of the various embodiments described herein, it will be appreciated that many of the automated or background provisioning, activation and ambient embodiments described herein can be accomplished with network based approaches, device based approaches, or network/device combination/hybrid based approaches. For example, when the access control for the provisioning process is accomplished in the device (e.g., a device based approach), the activation server can be located anywhere on the Internet, and the device will ensure that the activation process is conducted with the activation server while blocking other traffic from occurring. As another example, some or all of the ambient provisioning programming steps become steps to program the access control, traffic control, application control, bill by account rules, and/or other aspects in the service processor or service controller as described herein.

In some embodiments, the provisioning apparatus described herein can be a computer located in the user's home or business, and the user or an IT manager has access to a website that provides the provisioning information, in which the computer serves as the provisioning or software programming apparatus. In some embodiments, the network itself, possibly through an activation server 160, website or other interface to the device, becomes the provisioning apparatus, in some cases, with the assistance of software on the device to affect the programming of provisioning information from the network or the communication of device credentials or other information to the network. For example, this software can be a background process that runs without user interaction, a portal/widget program, a web browser based program, a WAP browser based program, and/or any other program that provides a counterpart function to the network functions effecting the provisioning (e.g., activation server). In some embodiments, the activation server either initiates a specific provisioning sequence if device software is present to assist or routes to a website for manual entry if there is no software present.

Figure 64:
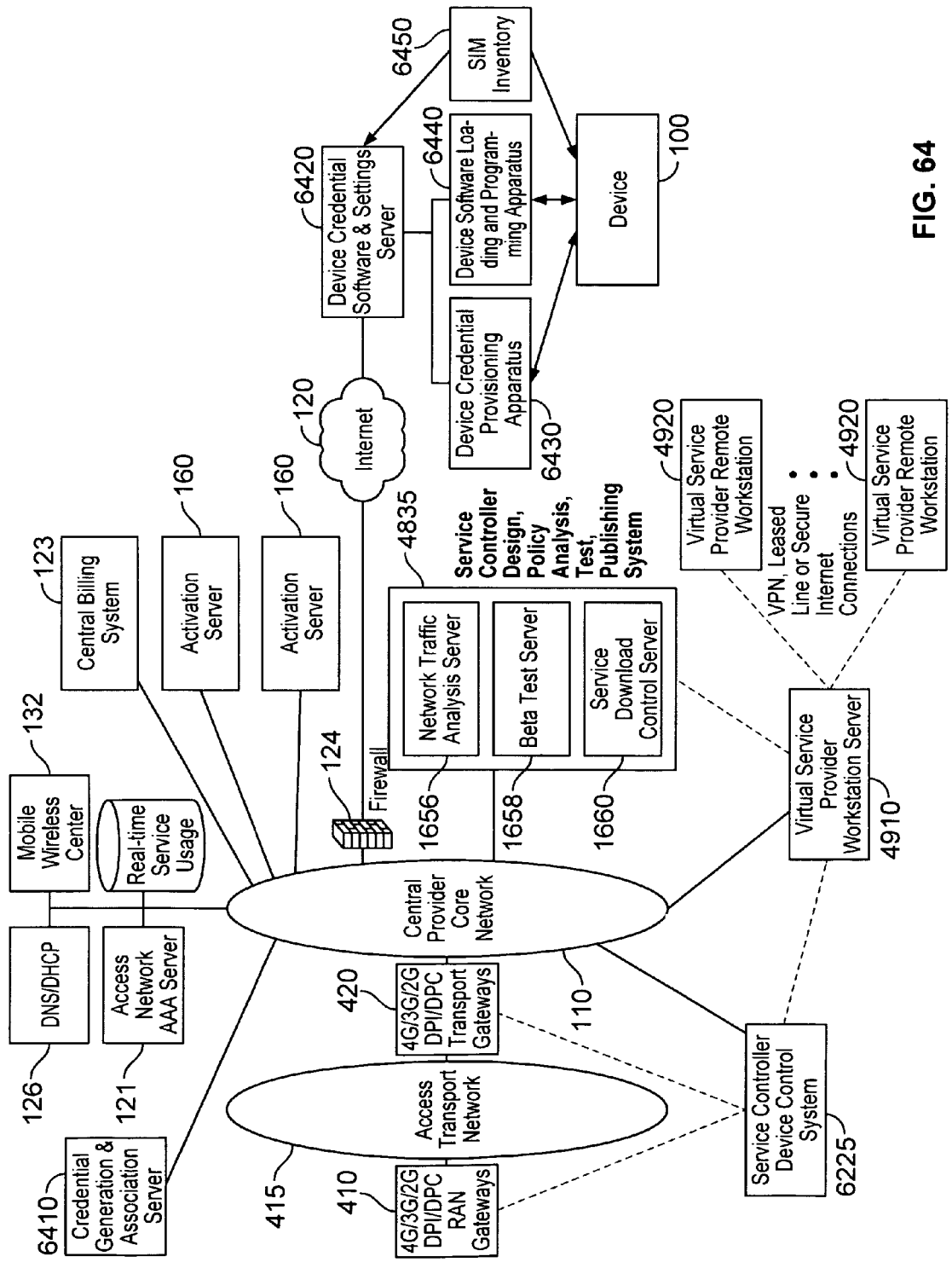
FIG. 64 illustrates another network architecture including a system located in the manufacturing or distribution chain for the device that provides the device provisioning or partial provisioning, and any pre-activation required for the device to later activate on the network in accordance with some embodiments.

FIG. 64 illustrates another network architecture including a system located in the manufacturing or distribution chain for the device that provides the device provisioning or partial provisioning, and any pre-activation required for the device to later activate on the network in accordance with some embodiments. Device credential, software and settings server 6420 provides a link to the network functions that generate or provide device credentials, and/or associate device credentials with activation profiles or pre-activation profiles in the network equipment (e.g., the billing system 123, service controller device control system 6225, gateways 410, 420, base station 125, credential generation and association server 6410, activation server 160, service download control server 1660 and/or other network apparatus). For example, the link between the device credential, software and settings server 6420 to the central provider core network equipment can be over the Internet 120 (e.g., a secure link over the Internet) as shown or over another connection such as a leased line. The device credential, software and settings server 6420 obtains credentials or partial credentials from the network apparatus that generates them, illustrated by the credential generation & association server 6410. Credential generation & association server 6410 need not be directly connected to the central provider core network 110 as shown, but can be located elsewhere (e.g., in another location connected by a secure Internet link). Credential generation & association server 6410 assigns credentials, or partial credentials, for use by device credential, software and settings server 6420. When these credentials are assigned to a device, they are programmed, loaded or otherwise associated with the device by device credential provisioning apparatus 6430, which is connected to the device wirelessly or via a wire line connection.

In some embodiments, a device software loading and programming apparatus 6440 provides software loading or device settings functions that form a portion or all of the provisioning or pre-provisioning device configuration, or form a portion or all of the device activation profile configuration, or form the device service owner, master agent or VSP device assignment or signature, and in some embodiments, using an activation tracking service (ATS) system. As discussed herein, the ATS monitors network connections and aspects of traffic that provide insight into which networks the device 100 is gaining access to, in some embodiments, for the purpose of ensuring that an OEM, master agent, device service owner or VSP is being compensated for devices that activate on a service provider network. In some embodiments, the ATS agent connects to a server counterpart that records and, in some embodiments, also analyzes the service or network connection information to make a determination of the type of access service the device is receiving and, in some cases, determine which networks the device is activated on. In some embodiments, the ATS is installed on the device in a manner that makes it difficult to tamper with or remove so that the entity that is intended to get credit for device service activation does get credit (e.g., the ATS agent can be loaded into secure memory, it can be installed with software that makes it difficult to de-install, it can be installed on the modem possibly in secure memory, it can be installed in the BIOS, it can be installed deep in the OS kernel, it can be installed with one or more additional device agents that monitor the ATS agent and alert a network function or re-install it if tampered with). The SIM inventory 6450 is provided to illustrate that, in some embodiments, hardware elements (e.g., a SIM security module as shown) or hardware configurations are also installed or manipulated in device 100 and these operations and the recording of the resulting associations form a portion of the provisioning or pre-provisioning process.

In some embodiments, at the time the credentials or partial credentials are loaded, programmed, set, installed, read from the device or otherwise recorded, they are, in some cases, all associated together in a database that allows for later identification of the device and its appropriate provisioning and/or activation process through such associations. For example, this can involve reading device parameters such as MEID, MAC address, device type, or other information that is associated with the information being loaded or configured on the device. As discussed herein, this credential configuration and association information is stored in the network equipment responsible using it to configure the network to activate the device in one of the various embodiments disclosed herein.

Some embodiments include tying some or all of the activation provisioning steps and information settings together into a database that defines a higher level activation profile for a group of users(/devices), and a server is used to perform device and equipment programming for the devices in the group, including, for example, associating the following device information into the group definition: credentials, service owner or master agent, provisioning information and/or activation profile. Some embodiments further provide for this device group information being distributed to the various network equipment components required to activate the devices as discussed elsewhere. In some embodiments, this programming and device group association is accomplished using the VSP workstation server 4910. For example, a device can be manufactured and distributed in a manner that provides flexible assignment of the device to a group that is assigned to an activation profile or a service owner.

In some embodiments, multiple activation servers 160 are provided (as shown), which illustrates that there can be multiple device activation servers 160 each with a different device activation experience and potentially controlled by a different VSP, service owner, service provider, OEM or master agent. As discussed herein, there are several ways that a device 100 can be routed to the proper activation server 160 so that the device provisioning and activation process can be completed. In some embodiments, all devices that are not activated are re-directed (or routed) to an activation server that reads one or more parameters in the device credentials. The device credential information can be determined either through the device identification information associated with the access network connection itself (e.g., MEID, IP address, phone number, security credentials, or other credentials identified for a device that gains access with the network), or with the aid of the device in a pre-arranged query-response sequence. The device can then be re-directed (or routed) to the appropriate activation server for that device, device group, device service owner or VSP. In some embodiments, the same process described above can be accomplished with a single re-direction from a service gateway 420 or 410, or another router enable network element. In some embodiments, the gateway or network element itself decodes the device credential information as described herein and performs the correct re-direct (or route) to the appropriate activation server 160 for that device. In some embodiments, the activation server 160 can be incorporated directly into the gateway 420 or 410, the base station 125 or other network component. In some embodiments, the activation server 160 can be incorporated into the service controller 122 or the service controller device control system 6225.

In some embodiments, apparatus other than the activation server are used to facilitate provisioning of credentials or partial credentials, or activation, during manufacturing or device distribution, and, for example, these apparatus can augment, supplement, compliment or replace the activation server function. Such apparatus include, for example, device programming equipment (e.g., device credential provisioning apparatus 6430, device software loading and programming apparatus 6440 or SIM inventory 6450), equipment that is networked into a central provider, MVNO or VSP database (e.g., device credential, software and settings server 6420) to gain access to provisioning information or activation information that is programmed into a device or group of devices, or to place device credential or partial credential information in a network database for later recognition, or to receive or communicate security information such as certificates for devices or SIM modules that will later be used to complete provisioning or complete activation or gain access to a network. For example, these apparatus, or any other apparatus including the activation server, can be networked into a service provider network or device database, an MVNO network or device database or a VSP network or device database. In some embodiments, programming of the device credentials or other information associated with the service processor or device is provided, so that, for example, the device can be recognized by an activation server or similar network function at a later point in time so that provisioning or activation can be completed in an automated manner, potentially with reduced or no user involvement, that provides a provisioning or activation configuration that is in some way unique for the service provider or service provider partner, device type, user group, VSP, MVNO, master agent or other entity. In some embodiments, this programming is provided in a manner that is difficult to change without the proper authorization so that the device is properly associated with the proper "service owner" or master agent (e.g., for the purpose of activation incentive payments). For example, as discussed herein, various approaches can be applied to the device credential or other settings or software provisioning so that the settings or software are secure or protected, or so that if the software is removed, replaced or modified it is reported or replace or restored. In some embodiments, VSP control of the provisioning, partial provisioning or activation of devices is provided during manufacture or at different points in the distribution channel. As discussed herein, some of these embodiments allow the central provider to offer to service partners (e.g., VSPs, MVNOs, master agents, and/or OEMs) similar types of control for device activation experience design or device service assignment control (e.g., sometimes referred to as service provider device locking so that other service providers cannot provide primary access to the device) during the manufacturing or distribution process that are possible with devices manufactured and distributed for the central service provider.

In some embodiments, the device is provisioned before the user obtains the device with permanent credentials, temporary credentials or partial credentials. In this case, the necessary credential programming of the device occurs during manufacture, at some point in the device distribution, such as at a distribution depot or in a store, or at the point of sale or point of shipment. In some embodiments, provisioning of network information as discussed above is used, and the network information is provisioned at the same time, before or after the device information is provisioned. In some embodiments, the device provisioning information is programmed with dedicated apparatus that connects to the device either with wires or wirelessly. For example, the dedicated apparatus can be local to the location where the device is being provisioned, or it can be partially or entirely networked into a database or provisioning solution located elsewhere and operated by the central provider, a VSP, OEM or other entity. For example, the apparatus to program the network portions of the provisioning information can also be networked and the operators who set up the required network programming for a device or group of devices may be in the vicinity of the servers that host the provisioning and management tools or they may network into the servers. In some embodiments, provisioning system operators have full or partial control of any device provisioning equipment associated with the entity they work for (e.g., OEM, VSP or master agent) but only have remote access via secure terminal, secure website or other techniques to network into a central provider or VSP server farm in which they control or partially control the network portion of provisioning capabilities for that subset of devices that are assigned to the entity they work for with (e.g. OEM, VSP or master agent).

In some embodiments, provisioning is accomplished over the air on the mobile access network for mobile devices, or over the wired access network or WLAN connection for wired access networks, either before the user receives the device or after the user receives the device. In some cases, the device can be connected to general purpose equipment, such as a computer to perform the programming required to complete provisioning. In the cases in which the device is provisioned at point of sale or after point of sale, the device provisioning can be triggered by a user initiated sequence, or can be initiated by an automated background sequence at any time after the device is powered on. In such cases, in some embodiments, partial credentials that include information such as device type, OEM or service provider are used to assist in determining how to complete the provisioning, and the information can also include secure information, certificate or signature programmed into the partial credentials that is required for the network to perform the provisioning of the remaining credential information in the device and possibly the network. In some embodiments, any network information used/required to provision the device or service is generated at the time the partial credentials are determined rather than beforehand.

In some embodiments, the device is activated for service before the user obtains the device with permanent credentials, temporary credentials or partial credentials, or with a permanent service account or a temporary service account. For example, in this case, the necessary steps of provisioning and activating service for the device can occur during manufacture, at some point in the device distribution, such as at a distribution depot or in a store, or at the point of sale or point of shipment. In some embodiments, the steps for activating service include one or more of the following: provision the device (e.g., with permanent, temporary or partial credentials), provision the necessary network databases and equipment to prepare them to recognize the device and associate it with the service profile and/or service plan, create or select the service account (e.g., permanent or temporary service account), select or create the service profile and/or service plan, program any elements in the device required to activate service (e.g., account ID, device aspects of the service profile and/or service plan), and program the necessary network databases and equipment with the required associations of device credentials and service profile and/or service plan policy settings. In some embodiments, the device oriented programming portions of the service activation steps occur at the same time, before or after the network oriented programming portions of the service activation steps.

In some embodiments, the device activation information is programmed with dedicated apparatus that connects to the device via a wireless or wire line connection. For example, the dedicated apparatus can be local to the location where the device is being provisioned, or the dedicated apparatus can be partially or entirely networked into a database or service activation solution located elsewhere and operated by the central provider, a VSP, OEM or other entity. For example, the apparatus to program the network portions of the activation information can also be networked and the operators who set up the required network programming for a device or group of devices can be in the vicinity of the servers that host the service activation and management tools or they can network into the servers. In some embodiments, activation server tools operators have full or partial control of any device activation apparatus associated with the entity they work for (e.g., OEM, VSP or master agent) but only have remote and partial access via secure terminal, secure website or other techniques to network into the network portion of the activation tools that are controlled by the central provider or VSP. The server tools operators can be restricted in some embodiments to providing network activation information or settings only for those devices or device groups that are assigned to the entity they work for with (e.g., OEM, VSP or master agent). For example, the device control group restriction can be accomplished with a secure database that has secure sub-partitions for one or more entities so that they cannot impact the control of one another's network activation settings but can control their own devices. In this way, a centralized set of activation tools resources controlled by a central provider, VSP or other entity can be partitioned so that different entities can have partial or full control of the activation service definition for devices or groups of devices without impact or risk to others who share the network and activation tools resources.

In some embodiments, activation is accomplished with an over the air interface to a mobile device, or over the wired access network or WLAN connection for wired access networks, either before the user receives the device or after the user receives the device. In some cases, the device can be connected to general purpose equipment such as a computer to perform the programming required to complete activation. In the cases in which the device is activated at point of sale or after point of sale, the final device activation process can be triggered by a user initiated sequence, or can be initiated by an automated background sequence at any time after the device is powered on. In such cases, some embodiments call for a temporary service account that is used to bring the device onto the network before the user has input the information necessary to create a permanent service account. In some embodiments, a temporary or permanent service account can be applied to the device at the time the device reaches the network, and the type of account, service profile and/or service plan can be influenced (e.g., partially determined or informed) or determined by information embedded in the device credentials or partial credentials, such as device type, device ID, SIM, OEM or service provider. For example, the device credentials can also include secure information, certificate or signature that can be required by the network to perform the activation steps for temporary or permanent service account status. In some embodiments, in which the device is activated in this manner before the user information is available, or before the user has selected a pay for service plan, the service profile and service plan are set up for ambient services as described herein.

In some embodiments, the device is activated during the manufacturing or distribution process, and then the activated device status is suspended. Once the temporary or permanent service account is set up, with appropriate service profile and/or service plan and temporary or permanent credentials, in some networks and billing systems the service can often be more easily resumed once suspended as compared to provisioning and activating the device from scratch. The device is then later resumed (or re-activated) when some event triggers the resume process, such as when it ships to the end user or when the end user attempts to use it. This process prevents the network from needing to manage credentials and accounts for devices that have been activated but are not yet on the network.

In some embodiments, provisioning is accomplished at least in part with temporary credentials in a manner which is automated and convenient for the user or device owner. In some embodiments, at least some subset of the temporary credential elements replaced at a later point in time by permanent credential elements in a manner that is also automated and convenient for the user or device owner. In some embodiments, the temporary credential set is pre-programmed into the device along with a temporary or permanent service account including service profile during the manufacturing or distribution process so that the device is activated with temporary credentials when it ships. In some embodiments, the aforementioned pre-programming is performed for the network via a secure set of server access equipment that networks into the network databases used to define the service profile and/or the service plan. In some embodiments, a subset of the temporary credentials is recycled once it is replaced, if a temporary service account is not activated or used after some period of time, if a permanent account is not activated or used after some period of time, or if the credentials subset is revoked from the device for some other reason.

In some embodiments, more than one device is assigned one or more elements of the temporary credentials, such as the phone number, which may be limited in supply. In some embodiments, a network will accept more than one set of temporary credentials, one or more redundant elements, for two or more different devices. In some embodiments, a device that has two or more temporary credential sets, in which at least a subset of the credential elements are different for the sets, so that if one set of credentials has elements that are already being used to access the network, then one or more reserve sets can be drawn upon to gain access to the network.

In some embodiments, the temporary credentials are used to log onto the network to conduct an over the air or over the network activation process in which an activation server reads at least a portion the device credentials to determine some aspect of how the device service profile. In some embodiments, the aforementioned over the air activation process is accomplished in the background without user intervention. In some embodiments, the over the air activation process is initiated when the user first attempts to use the device or when the user first attempts to access the network or upon user request or approval. In some embodiments, the over the air activation process is initiated using a temporary service account for the device and/or network to gain access to the network. In some embodiments, the over the air activation process is initiated after the user has entered the information required to create a permanent user account into the device or into the network. In some embodiments, the user is required to enter the aforementioned user information before using the device or using some aspect of the device. In some embodiments, the temporary service account is replaced by a permanent service account some time after the user has entered the necessary information to create a permanent account into the device or network. In some embodiments, the over the air activation process is initiated using a permanent service account assignment for the device and/or network to gain access to the network.

In some embodiments, the service profile is assigned to the device and/or network during the aforementioned over the air activation to be a pay for service profile with a free trial period. In some embodiments, the service profile assigned to the device and/or network during the aforementioned over the air activation includes pre-pay, post-pay, session based pay or pay as you go options for service. As will be apparent to one of ordinary skill in the art, various embodiments disclosed herein are particularly well suited for control or pre-pay services. In some embodiments, the service profile that is assigned to the device and/or network during the aforementioned over the air activation is an ambient service profile providing service access before all the user information is available to assign a permanent account. In some embodiments, the service profile that is assigned to the device and/or network during the aforementioned activation is an ambient service profile providing a service upgrade selection option interface to the user. In some embodiments, the service profile that is assigned to the device and/or network during the aforementioned activation is an ambient service profile providing transaction services to the user. In some embodiments, the service profile that is assigned to the device and/or network during the aforementioned activation is an ambient service profile providing bill by account functionality for the network. In some embodiments, the service profile that is assigned to the device and/or network during the aforementioned activation is an ambient service profile providing some amount of free networking or information service to entice the user to use the other ambient services. In some embodiments, the aforementioned ambient service is at least partially implemented with device based service activity control or control assistance. In some embodiments, the aforementioned ambient service is at least partially implemented by gateways, routers or switches in the network that are programmed according to the ambient access profile for the device to implement the ambient policies for network access control, routing control, traffic control or service monitoring and reporting for bill by account.

In some embodiments, activation is accomplished at least in part with a temporary service account in a manner that is automated and convenient for the user or device owner. In some embodiments, at least some subset of the temporary service account is replaced at a later point in time by permanent service account subset in a manner that is also automated and convenient for the user or device owner. In some embodiments, the temporary service account settings (e.g., including the service profile settings and/or the service plan settings) are pre-programmed into the device along with a temporary or permanent credentials set during the manufacturing or distribution process so that the device is activated with temporary credentials when it ships. In some embodiments, the aforementioned pre-programming for the network is performed via a secure set of server access equipment that networks into the network databases used to define the service profile and/or the service plan. In some embodiments, the device is suspended once it is activated but before the user is using it, and then resumed before or commensurate with the point in time that the user begins to use it. In some embodiments, some subset of the temporary service account is recycled once it is replaced, if the temporary service account is not used after some period of time, if the temporary service account is not upgraded to a permanent service account after some period of time, or if the activation is revoked from the device for some other reason. In some embodiments, more than one device is assigned to the same temporary service account. In some embodiments, a network accepts more than one device on the same temporary service account. In some embodiments, a device includes or is associated with two or more temporary service accounts, in which at least a subset of the temporary service account elements are different, so that if one account is already being used to access the network then one or more reserve accounts can be drawn upon to gain access to the network. In some embodiments, the temporary service account is associated with a temporary credentials set. In some embodiments, the temporary service account is associated with a permanent credentials set.

In some embodiments, un-activated devices are detected by the network routing equipment (e.g., service gateways or routers in hierarchical networks or base stations with embedded gateways in flat networks) and the device routing is programmed to re-direct un-activated devices to an activation server network destination. For example, the activation server can first inspect the information associated with the device to determine if the device belongs to the list of devices, device types or device groups that the network is programmed to provide access to. For example, the information used to determine this can include device type, service provider, phone number, device ID, SIM ID or configuration, secure information used to qualify the device, IP address, MAC address, user, user group, VSP, OEM, device distributor, service distributor (master agent), service processor presence or configuration, presence or configuration of other software or hardware. There can also be some activation definition information embedded in the credentials, or associated with some portion of the credentials, or programmed additionally on the device that informs the activation server as to the service profile and/or service plan and/or service account that should be established for the device. If activation information (the service profile, service plan and/or service account information) is found through association with the device credentials (e.g., device ID, phone number, IP address, MAC address, SIM or other security credentials) rather than being read directly from information embedded in the device or device credentials, then the pertinent aspects of the credentials can be used as a cross reference to look up the service plan and/or service profile information stored in a database networked to or within the activation server. The activation information can include information to define a wide variety of service plans and service profiles that when properly implemented on the network functions, and perhaps device if necessary, can provide for a wide range of service activity policies, service billing policies, transaction billing policies and service account types that can be associated with the device over the air or over the network.

In some embodiments, once the activation server has determined the activation information from the device or from a look up based on some aspect of the device credentials, then the activation server initiates the necessary network settings and billing database entries to be programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. The provisioning can be with permanent credentials or temporary credentials, and the service account that is set up may be permanent or temporary. In some embodiments, the activation process described above is completed perhaps before the user has entered some or all of the user information necessary to set up a permanent service account, and, in these cases, a temporary service account can be set up. In some cases, the activation process can be completed in the background before the user has completed an attempt to access the network and the service profile can be set up to provide ambient services to a temporary service account. In some embodiments, the user is required to enter the information required to establish a permanent service account prior to gaining full use of the device, either on the device, on a computer or in the store, so that by the time the user begins using the device the above activation embodiments can provide for ambient services activation with permanent account status so that the user can purchase a service upgrade or any transaction without entering any more account information.

In some embodiments, a device status is changed from a temporary service account to a permanent service account. If the device is activated with a temporary service account, and the user information is available to set up a permanent account, then if the billing system rules and interfaces allow for such, the user information can be changed from the mock information to the actual user information while maintaining the same account identifiers in the billing system. If the billing system will not allow for such, then the user information can be used to establish a new account, the device credentials can be re-associated with the new account, in some cases, after modifying one or more of the device credential parameters, and the network functions can be re-programmed as required, and, in some cases, the device can be re-programmed as required to accommodate the new permanent account.

In some embodiments, code on the device pulls a temporary or permanent set of credentials. When the credentials are pulled, the network associates the device with an ambient service profile according to one or more of the following: embedded device information identifying device type, service owner (e.g., VSP), user group, or user, or device ID is cross referenced to a database that is populated some time from manufacturing time to post sale where the database provides information identifying device type, service owner (e.g., VSP), user group, or user. The device is then re-directed accordingly (e.g., for device based this is a matter of setting the policies or loading the software for the service processor, for the network based approach this is a matter of populating the routing tables and service profile). For example, credentials can be re-cycled after a period of time, and/or some portion of the credentials can be redundant with other devices. For example, this is essentially a dynamic service for (temporarily) assigning device credentials, and the duration of the temporary credential validity for that device ID can be time limited to give the user time to activate a real account or a free trial, session limited, or a longer duration of time that is perhaps refreshed each time the device logs on. For example, the device could also already have permanent or temporary credentials but not have a service account. The above process can be used to assign a temporary or permanent service account as well. Once the service account is assigned and the appropriate service profile is propagated to the network elements, the device can then be directed to or use the appropriate activation profile service activities or the appropriate ambient service activities.

In some embodiments, the device is activated in the background in a manner that is virtually transparent to the user. For example, at some point in the distribution channel, the device is programmed to seek the activation server system described above as soon as it is turned on, or as soon as some other event occurs like the user using the device or the user attempting to gain access. When the pre-programmed event is triggered, the device connects to the network and the gateways or routers re-direct the device to an activation server, as discussed above. As also described herein, the activation server either derives information from the device that informs the server what service the device should be activated with, or the server derives that information from a database look up with a portion of the device credentials as the cross reference parameter. Once the activation server has determined the activation information from the device or from a look up based on some aspect of the device credentials, then the activation server causes all the necessary network settings and billing database entries to be configured/programmed by sending the service profile instructions to the network provisioning and activation apparatus and the service plan instructions to the billing system. In some embodiments, the activation server can then also send the any necessary service profile and/or service plan settings required for the device to a provisioning and activation support software function on the device, such as various embodiments of the service processor, so that the device provisioning and activation can be completed. For example, the provisioning can be with permanent credentials or temporary credentials, and the service account that is set up can be permanent or temporary.

In some embodiments, background activation is performed using the aforementioned activate/suspend process. At some point in the distribution channel, the device is programmed to seek to resume service as soon as it is turned on, or as soon as some other event occurs like the user using the device or the user attempting to gain access. When the pre-programmed event is triggered, the device attempts to connect to the network and the gateways or routers re-direct the device to an activation server as described herein. As also described herein, the activation server either derives information from the device that informs the server that the device is ready to resume service, or the server derives that information from a database look up with a portion of the device credentials as the cross reference parameter. Once the server is aware of this information, it sends a message to resume service to the billing system, or other network function that controls the suspend/resume function, and the service is resumed.

In some embodiments, background activation is performed as described below. The service processor and the credentials are pre-programmed during the manufacturing or distribution process to provide the desired service profile support and/or billing profile support for the desired initial ambient service. As described herein, this programming can be accomplished with dedicated apparatus at the manufacturer or distribution depot. Furthermore, the party responsible for defining the service (e.g., typically the central provider, OEM, VSP, distributor or master agent) can network into the service processor programming apparatus to control service processor and/or credential programming for all or a subset or group of the devices or device types locally available. The service processor enabled device is programmed to seek the activation server system described above as soon as it is turned on, or as soon as some other event occurs like the user using the device or the user attempting to gain access. In some embodiments, the activation server is the access control server previously discussed or the access control server can act in concert with another server that performs the activation function. When the pre-programmed event is triggered, the device connects to the network and the gateways or routers re-direct the device to the activation server. As also described herein, the activation server can communicate with the service processor to verify the service processor security credentials, agents and configuration.

In some embodiments, if the activation server determines that the pre-programmed settings stored in the service processor need to be modified to provide the latest version of the desired service, or if the service processor agent software needs to be updated, then this can be accomplished prior to completing the activation process. Once the service processor configuration and settings are confirmed, the activation server causes the necessary network settings and billing database entries to be programmed by sending the service profile instructions to the network provisioning and activation apparatus and the service plan instructions to the billing system. Given that the service processor can perform some or much of the service activity control or control assistance, the service control options are generally larger than without the service processor, and there can be less configuration to perform for other networking equipment to complete the provisioning and activation process. The provisioning can be with permanent credentials or temporary credentials, and the service account that is set up can be permanent or temporary.

In some embodiments, pre-programming and pre-activation of devices with temporary credentials and a temporary service account are used to ship devices that are pre-activated. Given that the credentials are temporary and can be recycled when the permanent credentials are assigned, concerns about using up too many pre-assigned credentials are reduced. In embodiments in which a portion of credentials elements can be used for multiple devices, this concern is further reduced.

If there is a concern about too many activated devices being assigned that are not actually active and generating service revenue, then the suspend/resume process discussed herein can be employed. In some embodiments, the temporary credentials and/or temporary account can be replaced with permanent credentials and/or account assignments at any time as follows. When a pre-programmed event in the device is triggered, then the device initiates a program that seeks the aforementioned activation server or another server that has the capability of fulfilling the device request to exchange the temporary credentials for permanent credentials and/or exchange the temporary account for a permanent account. The event that triggers the credential exchange can be the same or different than the event that triggers the service account exchange. The service account exchange can typically be triggered by the point in time that the user enters account information.

In some embodiments, the aforementioned ambient service is partly implemented with a combination of the techniques for pre-provisioning during manufacturing or distribution and at least partially implementing the service activity control (e.g., access control, routing policy, traffic control, usage limits, and/or policy for useage limit overage) required for implementing ambient using the service policy provisioning capabilities in the data path gateways, routers or switches in the network. The gateways, router or switches are pre-programmed as discussed herein according to the ambient access profile for the device to implement the ambient policies for network access control, routing control, traffic control or service monitoring and reporting for bill by account. In some embodiments, the provisioning credential elements are not all pre-programmed before the device ships, but a subset of the credential elements are programmed using the activation server technique discussed herein. This over the air automated provisioning is combined with the activation server reading the device credentials to derive the service activity control settings for the gateways, routers or switches that will result in the desired ambient services activity controls.

In some embodiments, the aforementioned ambient service is implemented with a combination of the techniques for pre-activation during manufacturing or distribution and at least partially implementing the service activity control (e.g., access control, routing policy, traffic control, usage limits, and/or policy for usage limit overage) required for implementing ambient using the service policy control capabilities in the data path gateways, routers or switches in the network. The gateways, router or switches are programmed to recognize the pre-activated device credentials as discussed herein according to the ambient access profile for the device to implement the ambient policies for network access control, routing control, traffic control or service monitoring and reporting for bill by account. In some embodiments, the device activation profile and/or service account are not pre-programmed in the network and/or the device before the device ships but the activation profile and/or service account are programmed using the activation server technique discussed herein. This over the air automated provisioning is combined with the activation server reading the device credentials to derive the service profile activity control settings for the gateways, routers or switches that results in the desired ambient services activity controls.

In some embodiment, a VSP capability is enabled by providing a secure network connection to the service policy settings tools that define the device pre-provisioning settings, the device pre-activation service profile settings, the network equipment service activity control policy settings (e.g., access control, routing policy, traffic control, usage limits, and/or policy for usage limit overage), and the network billing system database. By providing server tools that enable all these settings to be controlled (or perhaps only observed in the case of the billing system) by a secure workstation or secure website interface that networks into the equipment that programs the settings, and providing for a secure partitioning of the devices that can be controlled by a given secure workstation or secure website interface, a central provider can provide VSP services to multiple entities who all have different device and service plan combinations that they desire different flavors of ambient services for. These techniques can also be extended beyond ambient to any device/service profile/service plan combo the VSP desires to create. In some embodiments, the networking equipment is implemented to secure device service group domains in which the service policies for a group of devices can be controlled. In some embodiments, the pre-provisioning and pre-activation techniques are substituted with the over the air activation server techniques discussed herein, and a secure device group partition capability is provided in the activation server as well so that the activation server device group partition control capabilities can be added to the secure device group partition control capabilities of the network gateways, routers and/or switches, the device programming tools and the billing system to form a VSP partition solution for over the air activation of various device/service plan combinations. In some embodiments, the device groups are relatively small so that beta trials of arbitrarily large or small size can be designed and implemented by defining a service control group as described above, and after fine tuning and perfecting the beta trial settings the device group can be expanded to publish the automated provisioning and activation service settings to a larger user or device group for production services.

In some embodiments, device based service activity control assistance (e.g., based on the various service processor embodiments described herein) is combined with simplified provisioning techniques described herein so that service processor enabled devices can be shipped with pre-provisioned credentials (temporary or permanent or can obtain credentials in an automated manner that is convenient and efficient for the user or device owner. In some embodiments, the service processor embodiments in combination with the manufacturing and supply chain credentials and provisioning apparatus described elsewhere provide various approaches for provisioning pre-provisioned service processor enabled devices. In some embodiments, the service processor embodiments in combination with the activation server variants discussed above provide various approaches for over the air or over the network simplified post-sale provisioning for service processor enabled devices. For example, these embodiments can also be used for ambient services given that as discussed herein the service processor has capability to implement service profile policies for deep control of ambient service activity control.

In some embodiments, provisioning includes provisioning partial device credentials that include, for example, a secure certificate that is used to authorize full credential provisioning and/or activation by performing a process for a later look-up/validation of the full device credentials. For example, the look-up/validation of the full device credentials can be performed by a gateway, router or similar network device that re-directs to a provisioning server and/or activation server or other network components that either: (1) recognizes the partial credentials that serve as a reference to direct the device communication to a specific provisioning/activation server determined from the partial credentials; or (2) does not recognize the partial credentials, and directs the device communication to a less specific provisioning/activation server that is not necessarily associated with a reference to the partial credentials.

In some embodiments, if the partial device credentials (e.g., temporary or permanent credentials) are being used for provisioning, then the partial credentials are read (e.g., and/or other credentials can be looked up based on the partial credentials as described above). The device is authorized if the proper credentials and/or secure certificate is present. The device credential provisioning is then completed (e.g., using activation server commands or settings to a device based software and/or hardware element), and the credentials are, in some cases, also communicated to the various network equipment elements.

In some embodiments, if the partial device credentials are being used for activation, then partial or full device credential provisioning is performed, such as described above. A service account (e.g., temporary or permanent service account) is created or looked up based on the partial device credentials (e.g., a user account associated with the device through embedded partial or full credentials or a look up process, or based on a dynamically created/assigned temporary account associated with the device through embedded partial or full credentials). An initial service profile and, in some cases, an initial service plan (e.g., service control policy settings including a billing profile) are determined from embedded information and/or using a look up process (e.g., based on the device type and/or partial or full device credentials). The device is then programmed to enable access with the service profile and plan, and, in some cases, the various network components/elements are programmed to enable the service profile and plan, and, in some cases, proper entries in the billing system are made or confirmed, and the device credentials are, thus, activated for service.

In some embodiments, the above described provisioning and/or activation processes are performed with the provisioning server(s) and/or activation server(s) in the background with reduced, minimal or no user input required, for example, after the device is sold to the user and the user turns on the device so that by the time the user attempts to access the service using the device, the provisioning and/or activation process is already completed.

In some embodiments, device based service activity control assistance (e.g., based on the service processor embodiments) is combined with simplified activation techniques described herein so that service processor enabled devices can be shipped with pre-activated accounts (temporary or permanent), or can obtain activated account status in an automated manner that is convenient and efficient for the user or device owner. In some embodiments, the service processor embodiments in combination with the manufacturing and supply chain activation and provisioning apparatus described elsewhere provide various approaches for pre-activated service processor enabled devices. In some embodiments, the service processor embodiments in combination with the activation server variants discussed above provide various approaches for over the air or over the network simplified post-sale account activation for service processor enabled devices. These embodiments can also be used for ambient services given that as discussed herein the service processor has capability to implement service profile policies for deep control of ambient service activity control.

In some embodiments, the service processor can be combined with the pre-provisioning and pre-activation techniques described above to create an ambient service solution that will work on roaming networks in which the central provider or VSP has no control or minimal control over the network elements. For example, the device includes a service processor pre-programmed for ambient service activity control as discussed herein, and the device credentials and other settings are pre-provisioned and pre-activated for the central provider network, all of which is described in numerous embodiments disclosed herein. Provided that the service provider has a roaming agreement with other service providers, or provided that the device may gain access to the roaming network, when the device is roaming it will be capable of ambient connectivity with bill by account functionality and all the other features of ambient. Furthermore, as also discussed herein, the ambient service activity control policies can be different for different roaming networks to accommodate the varying network costs and performance. Also, for example, it would be permissible to sign up for initial services or additional upgrade services with the central provider while roaming on the roaming partner network. One of ordinary skill in the art will appreciate that this also allows for creating a VSP or MVNO for the purpose of creating a clearing house for central provider service activations according to geography or user choice. By using a global multi-mode modem module, and maintaining service agreements with a multitude of carriers, the MVNO or VSP can provide consistent ambient services across multiple carriers and multiple geographies while still maintaining a good degree of cost control. Using bill by account capabilities, it is also possible to have an activation agreement where a roaming service provider agrees to refined the cost of ambient roaming. From the ambient service platform, the VSP or MVNO can then provide service purchase options to the user based on the carrier networks available to the device, or the VSP or MVNO can broker the user off to any of the carriers by activating the device onto the carriers main central provider service.

Accordingly, these embodiments provide flexible capabilities for activating a device or group of devices with a broad range of service profiles and service plans by simply programming the device with the proper credentials at some time during manufacturing or distribution, or simply programming a database associated with the network so that a portion of the device credentials can be used to look up the desired service profile and service plan. For example, various activation embodiments described herein are highly convenient for the end user and need not, in many cases, involve any human intervention.

The service processor 115, service controller 122, policy implementation and/or profile implementation and various embodiments disclosed herein are applicable to conventional communication products as well as machine to machine applications. For example, if the machine to machine device includes a service processor 115 with an activated account, then the service profile settings can be optimized for machine communications to provide only the limited access required to support the particular machine to machine application. This allows for cost optimized access services and prevents the machine to machine device or access modem from being misappropriated and used for some other service access than that intended. For example, by programming the machine to machine communications device at time of manufacture or during distribution with credentials or partial credentials that provide for automated provisioning and activation as described herein, the device can be automatically provisioned and activated on the service network with a service account when deployed, thus eliminating the need for costly or time consuming human intervention. The various embodiments that make it simpler to design, manufacture, test and deploy devices may also be equally applied to machine to machine devices. These embodiments include the service processor 115 developers kit and the automated provisioning and activation management tools among others. Also, the service analysis and test tools and the virtual service provider embodiments can also be applied to machine to machine applications.

Verifiable Device Assisted Services for Intermediate Networking Devices

It should be appreciated that the various service monitoring, notification, control and billing embodiments disclosed herein can also be applied to intermediate networking device applications.

In some embodiments, an intermediate networking device is a communications device in which the service processor 115 is configured at least in part to allow the intermediate networking device to act as a service intermediary or intermediate connection between the network and one or more end point devices (e.g., communications devices). In addition, a service controller 122 or other suitable network functions can be employed to assist with the verifiable service usage monitoring, control and verification as disclosed in numerous embodiments described herein. In some embodiments, an intermediate networking device does this by implementing the service policies required for assisting service usage control of the intermediate networking device and connecting the network to provide services to one or more end point devices that are connected to the intermediate networking device. In some embodiments, the intermediate networking device also monitors the service use activities of the intermediate networking device and/or the end point devices connected to the intermediate networking device. In some embodiments, the intermediate networking device and/or end point device service usage is verified to ensure that the service usage is within the expected ranges for the policies that are implemented. In some embodiments, the intermediate networking device connects with the network using one modem technology and connects with the end point devices using one or more additional technologies. In some embodiments, an intermediate networking device connects the end point devices to the network by passing, bridging, forwarding, routing, traffic shaping or otherwise allowing the end point devices to communicate with the network. Example intermediate networking device embodiments include a Wi-Fi to WWAN (e.g., 2G, 3G, 4G or other wireless wide area networking access technology) bridge or router device, a Wi-Fi to DSL, cable or fiber gateway device, a WWAN to DSL or Cable femto cell device, a WWAN and Wi-Fi to DSL, Cable or fiber back-hauled femto cell device, a WWAN to WWAN router device, a WWAN to WLAN, WPAN or LAN bridge, router or gateway device, or a WWAN back up connection device for an enterprise router.

An intermediate networking device can also be provided in some embodiments by including a bridging, forwarding or routing function between two modems in a communications enabled device that connects to the network. For example, an intermediate networking device configuration can be a cell phone, smart phone, mobile internet device or any other mobile device that includes a WWAN modem and a Wi-Fi, WLAN, WPAN or LAN connection that can be used to connect to other end point devices. For example, the mobile device WWAN modem can connect to the network, a service processor 115 can be included on the device processor to assist monitoring, controlling and billing for services between the WWAN network and end point devices connected to a Wi-Fi modem. In addition, a service controller 122 or other suitable network functions can be employed to assist with verifiable service usage monitoring, control and verification as disclosed in numerous embodiments disclosed throughout herein. In some embodiments, the Wi-Fi modem can be configured in access point mode or in ad hoc mode to communicate with other end point devices in the area covered by the mobile device WLAN modem. In this manner, a service processor 115 and a service controller 122 or other suitable network functions can be employed to enable the verifiable service usage monitoring, control and verification as disclosed in numerous embodiments described herein.

Another example embodiment is a notebook or sub-notebook computer with a WWAN modem and a Wi-Fi, Ethernet, Firewire, Bluetooth, near field or Zigbee modem in which the notebook processor has a service processor 115 running on the notebook processor and the service processor 115 is used to assist monitoring, control and billing for services communicated between the WWAN network and end point devices connected to the notebook or sub-notebook WLAN, LAN or WPAN. Another example embodiment is a Wi-Fi hot spot with a service processor 115 capability. Another example embodiment is a WWAN back up modem in an access network router where the back up modem connection to the WWAN network is used when the main wired network connection goes down, and a router processor or a WWAN back up modem processor runs a service processor 115 to assist monitoring, controlling and billing for services between the WWAN network and the access router (e.g., the service provider may only wish to enable a connection when the main wired network is down to ensure that the WWAN modem is not used for everyday access). In this manner, a service processor 115 and a service controller 122 or other suitable network functions can be employed to enable the verifiable service usage monitoring, control and verification as disclosed in numerous embodiments described herein.

Another example embodiment is a two-way home gateway configured to perform various functions such as reading power consumption of the home and/or components in the home, providing WLAN, WPAN or LAN connectivity for such components or to the power meters/controllers attached to such components, providing a WWAN or WAN connection to a network that reads, records, monitors and/or controls the home and/or component power consumption, and possibly to provide other wide area network services for other devices in the home such as computers or entertainment electronics in a similar manner to the WWAN, DSL, cable and fiber gateway embodiments. The WLAN, WPAN connections can be made with one or more of Wi-Fi, Zigbee, Bluetooth, NFC or any other suitable wireless modem technology, and any desired wired LAN connections may be made with one or more of Ethernet, USB, Firewire, data over cable, data over power line or any other suitable wired modem technology. The WWAN connections can be made with one or more of 2G (e.g. CDMA 1xRT, GPRS), 3G (e.g. WCDMA UMTS/HSPA/non-MIMO HSPA+, CDMA EVDOrA/B, 802.16d/e WiMax), 4G (e.g. LTE, MIMO HSPA+, MIMO 802.16m WiMax) or any other suitable modem technologies and the wired WAN connections may be made with one or more of DSL, Cable, fiber or any other wired modem technology. A service processor 115 and a service controller 122 or other suitable network functions can be employed to enable the verifiable service usage monitoring, control and verification as disclosed in numerous embodiments disclosed throughout herein.

In some embodiments, an intermediate networking device can be used to connect one end point device to a network and assist in implementing service policies, or an intermediate networking device can connect multiple end point devices to one or more networks and assist in implementing service policies. In some embodiments, an intermediate networking device can be associated with one service profile, one service plan or one service account, or an intermediate networking device can be associated with multiple service profiles, multiple service plans or multiple service accounts. In some embodiments, end point devices connected to an intermediate networking device can have service usage policies implemented in aggregate for all end point devices, or service policies can be implemented differentially for different end point devices.

In some embodiments, an intermediate networking device can have a network connection associated with a single account and manage QOS between end point devices under one umbrella service profile or collection of profiles. In some embodiments, an intermediate networking device can treat all connected end point devices equally from a service sharing or QOS perspective so that, for example, service usage is based on end point device demand and/or contention. In some embodiments, an intermediate networking device differentiates service QOS between different end point devices based on end point device service demand or service usage patterns, EDP device type or device group, end point device user or user group, end point device service account status or service plan status, or end point device application type, and/or traffic type or service type.

As discussed herein, the service processor 115 function assisting intermediate networking device implementation can be included on the intermediate networking device, can be included in part on the intermediate networking device and one or more end point devices, or can be implemented mainly or entirely on one or more end point devices.

In some embodiments, an intermediate networking device can be constructed in which end point devices connect to the intermediate networking device and gain access services to a WWAN network through a WWAN/Wi-Fi enabled intermediate networking device that is supplied with services associated with a single account and service profile. The intermediate networking device service processor 115 can assist in monitoring, control and billing for WWAN service usage for all end point devices in the area covered by the intermediate networking device Wi-Fi link. In some embodiments, end point devices receive service on first come first serve basis with no differentiation. In some embodiments, end point devices receive fair distribution of services so that if one end point device is using more significantly more service than the other end point devices, or is demanding more service than the intermediate networking device service profile settings provide for a single end point device (e.g., "bandwidth hogging"), then the high demand end point device is throttled and the other end point devices are not. In some embodiments, end point devices receive hierarchical distribution of services based on one or more of service type, device type, user type, and/or account status. In some embodiments, an intermediate networking device can provide for a large or unlimited number of end point devices to connect to the network and simply control aggregate service usage parameters for the intermediate networking device WWAN connection. In some embodiments, the intermediate networking device limits the number of end point devices that are allowed to connect to the WWAN network according the end point device count limits programmed in the service processor 115 service profile settings in the intermediate networking device. In some embodiments, end point device traffic can be identified by various end point device credential aspects including, for example, by Wi-Fi ID, MAC ID, IP address, user ID, LAN tag, end point device agent credentials, and/or browser token or cookie. In some embodiments, the intermediate networking device service account can be billed for overall service usage and/or by number of end point device connections allowed or experienced. In some embodiments, as the intermediate networking device user or owner signs up for a higher end point device connection count, one ore more aspects of the service usage policy implementation and/or profile implementations in the service processor 115 profile settings can be increased.

The various verification techniques described herein can also be applied to the intermediate networking device and extended to multiple end point devices. For example, network based service usage measures for verification can be applied to the intermediate networking device just as if the intermediate networking device were an end point device. For example, network based service usage measures (e.g., IPDR information) can be used to perform network verification checks to ensure that intermediate networking device service usage is within acceptable ranges based on intermediate networking device policy settings as similarly described with respect to various device embodiments. In some embodiments, in the event intermediate networking device service usage is outside the policy limits set for the intermediate networking device service processor 115, a notification can be sent to the intermediate networking device main account owner. The main intermediate networking device account owner can also be required to acknowledge the notification. The notification can also be sent to one or more other users of the intermediate networking device connection, including possibly all users. Other actions that can be taken if the network based intermediate networking device service usage measure does not match the policy limits set on the service processor 115 include notify the user, notify the user and require acknowledgement, bill the user for service overage, suspend the end point device, quarantine the end point device, SPAN the end point device, and/or alert network manager or alert an automated network troubleshooting function. In some embodiments, a device based usage measure can be verified against a network based service usage measure. It will now be apparent that the various service processor 115 verification embodiments, service controller 122 verification embodiments, network verification embodiments, authentication embodiments, and tamper prevention or detection embodiments, such as those shown in and described with respect to FIGS. 22, 23, 26, 27 and 28, can be applied to intermediate networking device applications and embodiments.

In some embodiments, it is desirable to match up individual end point device or user intermediate networking device service usage with other service usage measures. For example, the individual end point device service usage measures logged or reported from the end point devices and/or the intermediate networking device can be aggregated to form a total intermediate networking device usage measure that is compared to an aggregate intermediate networking device usage measure logged or reported in the network. In some embodiments, if these measures do not match, then an error condition results and an action is taken. In some embodiments, the aggregate intermediate networking device service usage measure is compared to the aggregate network based service usage measure and as long as these two measures are within an acceptable tolerance, then the intermediate networking device service usage measures are trusted and can be used for deeper intermediate networking device and end point device usage measures for service control and/or billing than may be possible in the network. In such embodiments, the individual end point device service usage measures gained from the intermediate networking device or end point device can be used to verify end point device service usage versus service policy allowances. In some embodiments, end point device service usage measures are compared with intermediate networking device measures for the same end point devices.

In some embodiments, the IPDR records for one or more networks can include individual end point device service usage information. This is the case for example when the IPDRs include information broken down by end point device credential, such as IP address or other end point device credential. In such cases, intermediate networking device embodiments can be employed in which the individual end point device service usage information measured in the network can be compared with the service usage policy allowances or limits for the end point device. Also, in some embodiments, the individual end point device service usage measures from an end point device service usage monitor and/or an intermediate networking device service usage monitor can be compared with the network based service usage information to verify an end point device and/or an intermediate networking device service usage monitor is operating properly.

As similarly described with respect to end point device embodiments with no intermediate networking device between the end point device and the network, in some intermediate networking device embodiments, service usage and service usage monitor reports can be periodically verified by performing a SPAN function on the traffic for an intermediate networking device. The SPAN traffic can be analyzed in a real-time manner or in a non-real-time manner in the network and the results can be compared with the intermediate networking device or end point device service policies or service usage measures.

The synchronized device notification and acknowledgement embodiments can also be employed in the case in which one service account is applied to the intermediate networking device. The service usage counters in the intermediate networking device can be synchronized or updated with the network based measures and the differences between the two may be minimized. The service usage notification can be sent to one or more of the end point devices connected to the intermediate networking device. For example, the notification can be sent to the intermediate networking device manager or service owner, all end point devices or the most active end point devices.

Similarly, user preference feedback can be collected from one or more of the service users connected to the intermediate networking device. In some embodiments, user preferences or user service selections or service settings are collected from one user or a subset of end point devices used by the service subscriber. In some embodiments, more than one service user can provide preference information or service settings even if there is only one user account. In some embodiments, there are multiple service subscribers each providing preferences. In some embodiments, as similarly described with respect to various device embodiments, user preferences can be used set service control policies that provide the user with their selected balance of cost and service capability in a manner that meets network neutrality requirements. Similarly, in some embodiments, the service monitoring and customer resource management information collected on the intermediate networking device or end point devices can be filtered according to user privacy preferences to maintain the level of user privacy selected by the user.

Adaptive intermediate networking device policy implementation can also be performed in the intermediate networking device service processor 115 embodiments, as similarly described with respect to various device embodiments. In some embodiments, the service policy implementation for the intermediate networking device can be adapted by the service processor 115 agents (e.g., policy control agent 1692 working to control the settings in policy implementation agent 1690, and/or another service processor agent or function) to achieve a higher level service usage goal. In some embodiments, the usage goals or adaptation can be based on aggregate end point device usage for the intermediate networking device network services, and in some embodiments, the higher level usage goals or adaptation can apply to one or more individual end point devices.

In some embodiments, even though there is one intermediate networking device account, there can be multiple options for multi-end point device or multi-user operation in which the number of end point devices, number of users or service capabilities for some of the end point devices or users are selectable. These parameters are accommodated by an intermediate networking device service profile that includes the service capabilities that are to be delivered to a multitude of end point devices or users. In some cases, some end point devices or users have a different profile within the intermediate networking device service processor 115 with differentiated capabilities as compared to the intermediate networking device service processor 115 profile for other end point devices or users. This is the case for some of the examples provided herein. These multi-end point device or multi-user service profiles in the intermediate networking device service processor 115 can share services equally or can allow more capable access services to some end point devices or users than others. In some embodiments, a service profile implemented by the intermediate networking device service processor 115 for one end point device or user is different than that in the service profile implemented by the service processor 115 for another end point device or user (e.g., providing differentiated service profile implementations by end point devices and/or users). End point devices can be uniquely identified for purposes involving implementation of different service profiles in the intermediate networking device service processor 115 agents (e.g., depending on the embodiment, service monitor agent 1696, policy implementation agent 1690, policy control agent 1692, application interface agent 1693 and/or other service processor agents or functions) based on a number of parameters, such as IP address, local area network address (e.g., Wi-Fi address), MAC address end point device ID, user ID, and/or end point device application layer tag. This allows for independent service usage monitoring and control for different end point devices or users.

In some embodiments, an intermediate networking device also bridges services to end point devices or users that have individually managed service profiles, service plans or service accounts. As discussed herein, individual end point device service policy implementation and/or service profile implementation can be accomplished by classifying end point device service usage according to an end point device identifier so that service monitoring, control assistance and reporting may be differentiated between one or more end point devices. These end point device identifiers can then be associated with a different service plan or account in the service processor 115 and/or billing system 123. The end point device or user specific service usage monitoring, reporting, notification and control assistance can be accomplished by running one or more profiles for each end point device or each user.

It will now be apparent that billing can also be implemented with a single account encompassing service usage for all users or end point devices connected to an intermediate networking device, or for individual users, end point devices, user groups or end point device groups connected to an intermediate networking device. As similarly described with respect to the service profile, this is accomplished by associating service usage events and associated billing events with an end point device identifier, user identifier, end point device group identifier, and/or user group identifier.

In some embodiments, end point devices or users connect to more than one intermediate networking device with the same service account, service plan or service profile. In some embodiments, the intermediate networking device requires an authentication sequence for the end point device or user before allowing connection to the network through the intermediate networking device. This authentication sequence can involve the end point device communicating an active account or admission credential with the intermediate networking device. The intermediate networking device can compare the credential with a local database or may query a database in the network to admit the end point device to the intermediate networking device network connection. In either case, provided the user credential or network authorization process is passed, the service processor 115 service profile settings for the end point device are applied and service is then established as discussed herein. In these cases, the verification can be accomplished as described herein. In some embodiments, even if the end point device does not have a service processor 115, provided that the intermediate networking device service policy implementations and/or service profile implementations are verified as described herein, then the intermediate networking device will accurately assist in control and reporting of service usage for the different end point devices or users, and the appropriate service policy controls and/or billing can be maintained.

In some embodiments, when the end point device attempts connection to the intermediate networking device, if the user or end point device does not already have an active account or logon credential that the intermediate networking device recognizes, then the intermediate networking device can offer the end point device or user a service sign up experience. This experience can be implemented in a number of ways, including a website, WAP site, portal, download of agent software, and other methods. For example, an automated recognition of new devices can redirect unauthorized end point devices to browse into a website, WAP site, or portal site located on the intermediate networking device or in the network. If the site is located on the intermediate networking device, it can be cached and refreshed at a time of day when the network is not overly busy. Once on the site, the user or end point device selects the plan choice they desire, inputs account information and, in some embodiments, downloads device agent software to aid in network service policy implementation and/or profile implementation with the intermediate networking device. Once the user signs up, the information is logged into the network data base, the service account is established and the intermediate networking device service profile for that user or end point device is activated and the user can begin using the service.

In some embodiments, a website, WAP site, or portal site located in the intermediate networking device can be used to provide the end point device user with a service usage monitor interface and a service purchase interface for cases in which the end point device does not posses any special software to allow it to display a more specialized service usage monitor function for information received from the intermediate networking device or network service usage counters. The service usage monitor for the intermediate networking device can be synchronized, as similarly described with respect to various device embodiments. In some embodiments, the service usage notification system can also display cost data from a usage to cost look-up function. In some embodiments, the service usage notification system can display projected service usage or projected cost, as similarly described with respect to various device embodiments. The service usage monitor to drive these service notification embodiments can be located on one or more of the end point device, the intermediate networking device or the network.

In some embodiments, if multiple accounts are serviced by one or more intermediate networking devices, verification can be performed on the service controls for the end point device or user service usage. As will now be apparent, just as with the intermediate networking device, the end point device or user service usage comparison with usage policy settings can be verified in the ways described herein. If the usage is found to be out of policy, then any of the out of policy actions described herein can be performed, including, for example, notify the end user, notify and require acknowledgement, bill for overage, suspend, quarantine, SPAN, and/or flag to network manager or network error handling function. For example, the verification methods shown in and described with respect to FIGS. 22, 23, 26, 27 and 28 can be applied for the embodiments where intermediate networking devices have multiple account, multiple service plan, multiple service profile, multiple end point device, and/or multiple user capabilities.

It will be apparent that the various embodiments described herein for automated provisioning and activation also can similarly be applied to the intermediate networking device embodiments. It will also be apparent that the various virtual service provider embodiments can similarly be applied to the intermediate networking device embodiments.

Ambient services can be employed on the intermediate networking device and the ambient services can thus be provided to the end point devices. It will be apparent that the ambient service profile embodiments disclosed herein can similarly be applied to the intermediate networking device, and then the intermediate networking device can supply those ambient services to end point devices connected to the intermediate networking device. It will also be apparent that the intermediate networking device can provide an ambient service profile as described herein to end point devices or users that have not yet signed up for service, while providing other paid for service profiles to end point devices or users that have signed up for service.

Bill by account embodiments can similarly be applied to the intermediate networking device embodiments; For example, bill by account can be used in embodiments in which all end point devices or users are connected to the intermediate networking device under one account, or to embodiments in which some end point devices or users are accounted for separately with different service accounts, service plans or service profiles. In either case, it will be apparent that using one or more of the end point device or user identification credential aspects discussed herein can be used in a bill by account profile to account for any end point device or service activity. In such embodiments, billing event reports for those activities that include the end point device or user identifiers can also be provided for billing mediation and reconciliation down to the individual end point device or user level. For example, this allows for very deep service monitoring and billing capabilities with intermediate networking devices.

The intermediate networking device embodiments described above also have uses in machine to machine applications. It will be apparent that if the end point device includes the correct credentials to gain access to an existing account, or to allow an automated provisioning and activation account to be established, then the end point device can be connected to the network through the intermediate networking device without human intervention. Furthermore, the service profile that is established with the end point device for machine to machine communications can be set up to provide the access required to support the machine to machine application allowing for low cost access services and preventing the end point device from being misused for some service other than that intended. For example, the verification techniques and embodiments disclosed herein can similarly be applied to such machine to machine applications.

It will be apparent that the identifiers discussed above for bill by account mediation with accounting down to the individual end point device or user level can be combined with a billing mediation server in the network that accepts intermediate networking device billing events with end point device identification or user identification indexed billing, performs the necessary bill by account mediation functions, formats the billing events into the format used by the billing system, and transmits the mediated billing information to the billing system 123.

In some embodiments, the intermediate networking device service processor 115 functionality can be split. The division ranges from some or all of the service processor 115 on the device to some or all of the service processor 115 on the intermediate networking device.

In some embodiments, all of the service processor 115 is on the intermediate networking device. The end point device does not participate in service processor 115 functions and has no service processor 115 interface software. In some embodiments, the end point device has small subset of service processor 115 capabilities, including, for example, a service notification UI or a logon client with credentials. In some embodiments, service monitoring is implemented on the end point device or on both the end point device and in the intermediate networking device. In some embodiments, the end point device has additional service processor 115 capabilities including, for example, application layer tagging that associates application layer activity with service processor 115 service monitoring or service policy implementation and/or service profile implementation information. This can be accomplished by a range of techniques, for example, transmitting the application tagging information disclosed elsewhere to the intermediate networking device service processor 115 so that the policy implementation may be accomplished with knowledge of the application layer information. Another example involves assigning IP addresses in the intermediate networking device networking stack to the end point devices so that different types of end point device traffic can be routed into service processor 115 traffic shaping queues, each queue having a policy profile implementation engine, and application layer tagging information or similar traffic indentifying information is used to determine which policy implementation engine the traffic should be routed to in order to accomplish the desired traffic shaping for the traffic type, application type, service type, and/or content type. In some embodiments, the traffic control policy is implemented on the end point device either with an application layer traffic controller, or by implementing more of the service processor 115 functionality, as similarly described with respect to various device embodiments. In the end point device service functionality example, most or all of the service processor 115 functionality is implemented on the end point device and the intermediate networking device functionality can be reduced to a bridging, forwarding or routing function between the end point devices and the network that performs little or no service control, monitoring and/or billing functions. For example, the service usage monitoring agents can also be provided on the end point device to aid in verification.

In embodiments in which the end point device requires agent software, the software can be loaded at time of manufacture or during distribution, loaded later, and/or made available for download through the intermediate networking device. In the case in which the end point device agent SW is downloaded through the end point device, there can be locally cached copies of the SW for one or more OS variants stored in a cache on the intermediate networking device, with the cache being updated over the network at convenient or conducive times, or the software can be downloaded live over the network when it is needed by the end point device. Logging the service usage to download this software is another example in which bill by account functionality can be used to track network traffic that may not be desirable to bill to an end point device owner or user, and bill by account functionality can be used to log and mediate such usage out of the user or end point device owner's bill.

Any end point device agent software required to connect to the intermediate networking device can also be implemented as a service processor 115 developer's kit as described herein and distributed to aid manufacturers, service provider and virtual service providers in bringing new devices onto networks with intermediate networking device capability.

In the case of a femto cell intermediate networking device, in some embodiments, it is desirable to facilitate handover from the WWAN network to the femto cell. In some embodiments, this provided in the intermediate networking device service processor 115 in a variety of ways. In some embodiments, the voice and data traffic is routed through a VPN tunnel controlled by the service processor 115 and connected to a network element, such as the transport gateway or another specified traffic concentration destination for the femto cell. In some embodiments, the voice traffic, the data traffic or both can be routed in secure or open Internet channels to different destinations, or the data can be routed directly to the Internet destination specified by the packets. In some embodiments, the femto cell intermediate networking device controls the femto cell frequencies or local frequency channel strength surveys over the intermediate networking device control channel. In some embodiments, the service processor 115 has a VPN connection to a network base station hand off controller to assist in handoff to and from the WWAN network and/or has the capability to instruct the end point device and the base station handoff controller. In some embodiment, whenever an end point device authenticated for femto cell access is within range of the femto cell, the service provider desires to set up a service processor 115 profile to get the end point device to connect to the femto cell even if it has a strong signal with one or more WWAN base stations so that the WWAN traffic may be offloaded. In some embodiments, the service processor 115 can form a secure control plane link with network AAA functions to manage authorization and admission of end point devices the femto cell has not yet admitted, or the network policies can require re-authorization every time an end point device attempts access. Once an end point device is connected to the femto cell intermediate networking device, the verifiable traffic monitoring, control and billing functions described herein can be applied to various application embodiments. For example, the intermediate networking device service policy verification techniques disclosed herein, as similarly described with respect to various device embodiments, can similarly be applied to the femto cell intermediate networking device embodiments.

In some embodiments, the service provider desires to keep the number of end point devices or users that access an intermediate networking device below a certain count specified in the service processor 115 profile. In some embodiments, this is accomplished by controlling the number of IP addresses allowed onto the intermediate networking device local area side connection. In some embodiments, this is facilitated by observing the end point device identification parameters available in the end point device traffic. In some embodiments, this is facilitated by observing the traffic patterns to determine the likely number of devices connecting to the network. For example, traffic demand patterns can be examined to determine how many users are likely to be demanding access at one time. Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method comprising:
receiving a message about a request of a communications device for a service over a particular roaming access network of a plurality of roaming access networks, the communications device being subscribed to a service plan associated with a home access network that is different than the plurality of roaming access networks;
retrieving one or more first charging rates for use of the service over the particular roaming access network, the one or more first charging rates being different than one or more second charging rates for use of the service over another access network;
obtaining an estimate of the communications device's usage of the service over the particular roaming access network;
calculating, by a service controller, an estimated service usage cost of the communications device's usage of the service over the particular roaming access network based on the one or more first charging rates and the estimated usage;
comparing a value based on the estimated service usage cost to a first limit;
sending an indication to a user of the communications device when the comparison satisfies a predetermined condition;
receiving from the particular roaming access network a measurement of the communications device's usage of the service; and
synchronizing the estimated usage with the usage measurement from the particular roaming access network, wherein the synchronizing the estimated usage with the usage measurement from the particular roaming access network includes applying an algorithm to reconcile the difference between the estimated usage and the usage measurement from the particular roaming access network.

2. The method of claim 1, wherein the measurement of the communications device's usage comprises a measure from the communications device, a measure from a roaming network element, or a measure from a billing record.

3. The method of claim 1, wherein the algorithm to reconcile the difference between the estimated usage and the usage measurement from the particular roaming access network comprises using the usage measurement from the particular roaming access network to determine a cost of or billable usage amount associated with the communication device's usage of the service.

4. The method of claim 1, wherein the algorithm to reconcile the difference between the estimated usage and the usage measurement from the particular roaming access network comprises using the usage measurement from the particular roaming access network to correct, modify, or update the estimated usage.

5. The method of claim 1, wherein the algorithm to reconcile the difference between the estimated usage and the usage measurement from the particular roaming access network comprises using the estimated usage to determine a cost of or billable usage amount associated with the communication device's usage of the service.

6. The method of claim 1, wherein the algorithm to reconcile the difference between the estimated usage and the usage measurement from the particular roaming access network comprises using the lower of the estimated usage and the usage measurement from the particular roaming access network to determine a cost of or billable usage amount associated with the communication device's usage of the service.

7. The method of claim 1, wherein the algorithm to reconcile the difference between the estimated usage and the usage measurement from the particular roaming access network comprises using the higher of the estimated usage and the usage measurement from the particular roaming access network to determine a cost of or billable usage amount associated with the communication device's usage of the service.

8. The method of claim 1, wherein the algorithm to reconcile the difference between the estimated usage and the usage measurement from the particular roaming access network comprises using the estimated usage and the usage measurement from the particular roaming access network to determine a cost of or billable usage amount associated with the communication device's usage of the service.

9. The method of claim 1, further comprising using a result of reconciling the difference between the estimated usage and the usage measurement from the particular roaming access network in determining a cost of or billable usage amount associated with the communication device's usage of the service.

10. The method of claim 1, wherein the message is transmitted by the communications device.

11. The method of claim 1, wherein the message is communicated by a function in the particular roaming access network.

12. The method of claim 1, further comprising sending to the communications device one or more service usage charging rates corresponding to one or more available roaming access networks.

13. The method of claim 1, further comprising:
identifying the particular roaming access network; and
using the identification in retrieving the one or more first charging rates.

14. The method of claim 1, wherein the service controller is associated with the home access network.

15. The method of claim 1, wherein the one or more first charging rates are based at least in part on a roaming service billing agreement between a home access network service provider and a roaming access network service provider associated with the particular roaming access network.

16. The method of claim 1, wherein the estimated usage is measured by a network element of the home access network that monitors data traffic backhauled from the particular roaming access network.

17. The method of claim 1, wherein the communications device measures the estimated usage at least in part by monitoring data communicated with the particular roaming access network.

18. The method of claim 17, further comprising synchronizing the estimated usage with a usage measured by a network element.

19. The method of claim 18, wherein the network element is associated with a home network.

20. The method of claim 18, wherein the network element is associated with a roaming network.

21. The method of claim 18, wherein the usage measured by the network element is an amount of usage from a billing record.

22. The method of claim 1, further comprising quarantining the communications device based at least in part on the comparison of the value based on the estimated service usage cost to the first limit.

23. The method of claim 22, wherein, in a quarantine state, the communications device is permitted to communicate over the particular roaming access network with one or more first network destinations, and is blocked from communicating with one or more other network destinations.

24. The method of claim 22, wherein the quarantining includes instructing a network gateway to restrict backhauling at least a portion of data traffic for the communications device.

25. The method of claim 24, wherein the network gateway is a home access network gateway.

26. The method of claim 24, wherein the network gateway is a roaming access network gateway.

27. The method of claim 24, further comprising:
receiving a user input from the communications device;
determining whether the user input meets a condition; and
when the user input meets the condition, instructing the network gateway to remove the restriction on backhauling the at least a portion of data traffic for the communications device.

28. The method of claim 27, wherein the condition is that the user input comprises an acknowledgment associated with the communications device's usage of the service over the particular roaming access network.

29. The method of claim 27, wherein the condition is that the user input comprises an indication of a measure of service usage over the particular roaming access network, an amount of data, an amount of time, or a cost.

30. The method of claim 27, wherein the condition is that the user input comprises an acknowledgment of an incurred cost associated with the communications device's usage of the service over the particular roaming access network.

31. The method of claim 27, wherein the condition is that the user input comprises an indication that the communications device is permitted to continue to use the service over the particular roaming access network.

32. The method of claim 27, wherein the condition is that the user input comprises a credential configured to identify a user.

33. The method of claim 22, wherein the quarantining includes instructing a service processor on the communications device to prevent the communications device from accessing one or more destinations over the particular roaming access network.

34. The method of claim 33, further comprising:
receiving a user input from the communications device;
determining whether the user input meets a condition; and
when the user input meets the condition, instructing the service processor to allow the communications device to access the one or more destinations over the particular roaming access network.

35. The method of claim 34, wherein the condition is that the user input comprises an acknowledgment associated with the communications device's usage of the service over the particular roaming access network.

36. The method of claim 34, wherein the condition is that the user input comprises an indication of a measure of service usage over the particular roaming access network, an amount of data, an amount of time, or a cost.

37. The method of claim 34, wherein the condition is that the user input comprises an acknowledgment of an incurred cost associated with the communications device's usage of the service over the particular roaming access network.

38. The method of claim 34, wherein the condition is that the user input comprises an indication that the communications device is permitted to continue to use the service over the particular roaming access network.

39. The method of claim 34, wherein the condition is that the user input comprises a credential configured to identify a user.

40. The method of claim 1, wherein the first limit is specified by a roaming access notification policy.

41. The method of claim 1, wherein the first limit is specified by the user of the communications device.

42. The method of claim 1, wherein the indication is configured to inform the user that the user must acknowledge or deny continued use of the service.

43. The method of claim 42, wherein the indication is configured to require a user response to the indication.

44. The method of claim 43, wherein the indication is further configured to require the user to enter a user credential, password, secure code, or identifier if the user response comprises an acknowledgment of continued use of the service.

45. The method of claim 43, further comprising:
receiving the user response; and
quarantining the communications device's use of the service until the user response is received.

46. The method of claim 43, further comprising:
receiving the user response; and
sending a user-response message to a network element, the user-response message indicating whether the user acknowledged or denied continued use of the service.

47. The method of claim 43, further comprising:
receiving the user response; and
if the user response indicates that the user denied continued use of the service, quarantining, blocking, or restricting the communications device from accessing the particular roaming access network.

48. The method of claim 1, wherein the indication includes a particular first charging rate, and a user response is required to acknowledge the particular first charging rate.

49. The method of claim 1, further comprising:
comparing the estimated service usage cost to a second limit, the second limit less than the first limit; and
sending to the user of the communications device a warning indicating the estimated service usage cost, the warning based on the comparison of the estimated service usage cost to the second limit.

50. The method of claim 1, wherein the indication is configured to trigger a service processor to provide a notification to the user through a user interface, the notification including one or more service plan options for the user to select to receive additional service.

51. The method of claim 1, further comprising:
determining an estimated rate of usage of the service by the communications device;
analyzing the estimated rate of usage to determine a projected usage estimate; and
sending to the user of the communications device a rate of service usage notification or service usage warning based on the projected usage estimate.

52. A method comprising:
receiving a message about a request of a communications device for a service over a particular roaming access network of a plurality of roaming access networks, the communications device being subscribed to a service plan associated with a home access network that is different than the plurality of roaming access networks;
retrieving one or more first charging rates for use of the service over the particular roaming access network, the one or more first charging rates being different than one or more second charging rates for use of the service over another access network;
obtaining an estimate of the communications device's usage of the service over the particular roaming access network, wherein the estimated usage is measured by the communications device, which monitors data communicated with the particular roaming access network;
calculating, by a service controller, an estimated service usage cost of the communications device's usage of the service over the particular roaming access network based on the one or more first charging rates and the estimated usage;
comparing a value based on the estimated service usage cost to a first limit;
sending an indication to a user of the communications device when the comparison satisfies predetermined condition; and
synchronizing the estimated usage received from the communications device with a usage measured by and received from a network element.

53. The method of claim 52, wherein the message is transmitted by the communications device.

54. The method of claim 52, wherein the message is communicated by a function in the particular roaming access network.

55. The method of claim 52, further comprising sending to the communications device one or more service usage charging rates corresponding to one or more available roaming access networks.

56. The method of claim 52, further comprising:
identifying the particular roaming access network; and
using the identification in retrieving the one or more first charging rates.

57. The method of claim 52, wherein the service controller is associated with the home access network.

58. The method of claim 52, wherein the one or more first charging rates are based at least in part on a roaming service billing agreement between a home access network service provider and a roaming access network service provider associated with the particular roaming access network.

59. The method of claim 52, further comprising quarantining the communications device based at least in part on the comparison of the value based on the estimated service usage cost to the first limit.

60. The method of claim 59, wherein, in a quarantine state, the communications device is permitted to communicate over the particular roaming access network with one or more first network destinations, and is blocked from communicating with one or more other network destinations.

61. The method of claim 59, wherein the quarantining includes instructing a network gateway to restrict backhauling at least a portion of data traffic for the communications device.

62. The method of claim 61, wherein the network gateway is a home access network gateway.

63. The method of claim 61, wherein the network gateway is a roaming access network gateway.

64. The method of claim 61, further comprising:
receiving a user input from the communications device;
determining whether the user input meets a condition; and
when the user input meets the condition, instructing the network gateway to remove the restriction on backhauling the at least a portion of data traffic for the communications device.

65. The method of claim 64, wherein the condition is that the user input comprises an acknowledgment associated with the communications device's usage of the service over the particular roaming access network.

66. The method of claim 64, wherein the condition is that the user input comprises an indication of a measure of service usage over the particular roaming access network, an amount of data, an amount of time, or a cost.

67. The method of claim 64, wherein the condition is that the user input comprises an acknowledgment of an incurred cost associated with the communications device's usage of the service over the particular roaming access network.

68. The method of claim 64, wherein the condition is that the user input comprises an indication that the communications device is permitted to continue to use the service over the particular roaming access network.

69. The method of claim 64, wherein the condition is that the user input comprises a credential configured to identify a user.

70. The method of claim 59, wherein the quarantining includes instructing a service processor on the communications device to prevent the communications device from accessing one or more destinations over the particular roaming access network.

71. The method of claim 70, further comprising:
receiving a user input from the communications device;
determining whether the user input meets a condition; and
when the user input meets the condition, instructing the service processor to allow the communications device to access the one or more destinations over the particular roaming access network.

72. The method of claim 71, wherein the condition is that the user input comprises an acknowledgment associated with the communications device's usage of the service over the particular roaming access network.

73. The method of claim 71, wherein the condition is that the user input comprises an indication of a measure of service usage over the particular roaming access network, an amount of data, an amount of time, or a cost.

74. The method of claim 73, wherein the condition is that the user input comprises an acknowledgment of an incurred cost associated with the communications device's usage of the service over the particular roaming access network.

75. The method of claim 73, wherein the condition is that the user input comprises an indication that the communications device is permitted to continue to use the service over the particular roaming access network.

76. The method of claim 73, wherein the condition is that the user input comprises a credential configured to identify a user.

77. The method of claim 52, wherein the first limit is specified by a roaming access notification policy.

78. The method of claim 52, wherein the first limit is specified by the user of the communications device.

79. The method of claim 52, wherein the indication is configured to trigger a service processor on the communications device to provide a notification to the user.

80. The method of claim 79, wherein the notification is configured to inform the user that the user must acknowledge or deny continued use of the service.

81. The method of claim 79, wherein the notification includes content stored locally on the communications device.

82. The method of claim 79, wherein the notification includes content from a network element.

83. The method of claim 82, wherein the notification is configured to require a user response to the notification.

84. The method of claim 83, wherein the notification is further configured to require the user to enter a user credential, password, secure code, or identifier if the user response comprises an acknowledgment of continued use of the service.

85. The method of claim 83, further comprising:
receiving the user response; and
quarantining the communications device's use of the service until the user response is received.

86. The method of claim 83, further comprising:
receiving the user response; and
sending a user-response message to a network element, the user-response message indicating whether the user acknowledged or denied continued use of the service.

87. The method of claim 83, further comprising:
receiving the user response; and
if the user response indicates that the user denied continued use of the service, quarantining, blocking, or restricting the communications device from accessing the particular roaming access network.

88. The method of claim 52, wherein the indication includes a particular first charging rate, and a user response is required to acknowledge the particular first charging rate.

89. The method of claim 52, further comprising:
comparing the estimated service usage cost to a second limit, the second limit less than the first limit; and
sending to the user of the communications device a warning indicating the estimated service usage cost, the warning based on the comparison of the estimated service usage cost to the second limit.

90. The method of claim 52, wherein the indication is configured to trigger a service processor to provide a notification to the user through a user interface, the notification including one or more service plan options for the user to select to receive additional service.

91. The method of claim 52, further comprising:
determining an estimated rate of usage of the service by the communications device;
analyzing the estimated rate of usage to determine a projected usage estimate; and
sending to the user of the communications device a rate of service usage notification or service usage warning based on the projected usage estimate.

92. A method comprising:
receiving a message about a request of a communications device for a service over a particular roaming access network of a plurality of roaming access networks, the communications device being subscribed to a service plan associated with a home access network that is different than the plurality of roaming access networks;
retrieving one or more first charging rates for use of the service over the particular roaming access network, the one or more first charging rates being different than one or more second charging rates for use of the service over another access network;

obtaining an estimate of the communications device's usage of the service over the particular roaming access network;

calculating, by a service controller, an estimated service usage cost of the communications device's usage of the service over the particular roaming access network based on the one or more first charging rates and the estimated usage;

comparing a value based on the estimated service usage cost to a first limit;

sending an indication to a user of the communications device when the comparison satisfies a predetermined condition, wherein the indication is configured to trigger a service processor on the communications device to provide a notification to the user;

obtaining a portion of the communications device's usage of the service for facilitating at least a portion of the communication between the service controller and the communications device; and excluding the portion from a calculated cost of the communication device's usage of the service.

93. The method of claim 92, wherein the notification includes a first charging rate for the service, and the user response is required to acknowledge the first charging rate.

94. The method of claim 92, wherein the message is transmitted by the communications device.

95. The method of claim 92, wherein the message is communicated by a function in the particular roaming access network.

96. The method of claim 92, further comprising sending to the communications device one or more service usage charging rates corresponding to one or more available roaming access networks.

97. The method of claim 92, further comprising:
identifying the particular roaming access network; and
using the identification in retrieving the one or more first charging rates.

98. The method of claim 92, wherein the service controller is associated with the home access network.

99. The method of claim 92, wherein the one or more first charging rates are based at least in part on a roaming service billing agreement between a home access network service provider and a roaming access network service provider associated with the particular roaming access network.

100. The method of claim 92, wherein the estimated usage is measured by a network element of the home access network that monitors data traffic backhauled from the particular roaming access network.

101. The method of claim 92, wherein the communications device measures estimated usage at least in part by monitoring data communicated with the particular roaming access network.

102. The method of claim 101, further comprising synchronizing the estimated usage with a usage measured by a network element.

103. The method of claim 102, wherein the network element is associated with a home network.

104. The method of claim 102, wherein the network element is associated with a roaming network.

105. The method of claim 102, wherein the usage measured by the network element is an amount of usage from a billing record.

106. The method of claim 92, further comprising quarantining the communications device based at least in part on the comparison of the value based on the estimated service usage cost to the first limit.

107. The method of claim 106, wherein, in a quarantine state, the communications device is permitted to communicate over the particular roaming access network with one or more first network destinations, and is blocked from communicating with one or more other network destinations.

108. The method of claim 106, wherein the quarantining includes instructing a network gateway to restrict backhauling at least a portion of data traffic for the communications device.

109. The method of claim 108, wherein the network access gateway is a home access network gateway.

110. The method of claim 108, wherein the network access gateway is a roaming access network gateway.

111. The method of claim 108, further comprising:
receiving a user input from the communications device;
determining whether the user input meets a condition; and
when the user input meets the condition, instructing the network gateway to remove the restriction on backhauling the at least a portion of data traffic for the communications device.

112. The method of claim 111, wherein the condition is that the user input comprises an acknowledgment associated with the communications device's usage of the service over the particular roaming access network.

113. The method of claim 111, wherein the condition is that the user input comprises an indication of a measure of service usage over the particular roaming access network, an amount of data, an amount of time, or a cost.

114. The method of claim 111, wherein the condition is that the user input comprises an acknowledgment of an incurred cost associated with the communications device's usage of the service over the particular roaming access network.

115. The method of claim 111, wherein the condition is that the user input comprises an indication that the communications device is permitted to continue to use the service over the particular roaming access network.

116. The method of claim 111, wherein the condition is that the user input comprises a credential configured to identify a user.

117. The method of claim 106, wherein the quarantining includes instructing a service processor on the communications device to prevent the communications device from accessing one or more destinations over of the particular roaming access network.

118. The method of claim 117, further comprising:
receiving a user input from the communications device;
determining whether the user input meets a condition; and
when the user input meets the condition, instructing the service processor to allow the communications device to access the one or more destinations over the particular roaming access network.

119. The method of claim 118, wherein the condition is that the user input comprises an acknowledgment associated with the communications device's usage of the service over the particular roaming access network.

120. The method of claim 118, wherein the condition is that the user input comprises an indication of a measure of service usage over the particular roaming access network, an amount of data, an amount of time, or a cost.

121. The method of claim 120, wherein the condition is that the user input comprises an acknowledgment of an incurred cost associated with the communications device's usage of the service over the particular roaming access network.

122. The method of claim 120, wherein the condition is that the user input comprises an indication that the communications device is permitted to continue to use the service over the particular roaming access network.

123. The method of claim 120, wherein the condition is that the user input comprises a credential configured to identify a user.

124. The method of claim 92, wherein the first limit is specified by a roaming access notification policy.

125. The method of claim 92, wherein the first limit is specified by the user of the communications device.

126. The method of claim 92, wherein the indication is configured to trigger a service processor on the communications device to provide a notification to the user.

127. The method of claim 126, wherein the notification is configured to inform the user that the user must acknowledge or deny continued use of the service.

128. The method of claim 127, wherein the notification is configured to require a user response to the notification.

129. The method of claim 128, wherein the notification is further configured to require the user to enter a user credential, password, secure code, or identifier if the user response comprises an acknowledgment of continued use of the service.

130. The method of claim 128, further comprising:
receiving the user response; and
quarantining the communications device's use of the service until the user response is received.

131. The method of claim 128, further comprising:
receiving the user response; and
sending a user-response message to a network element, the user-response message indicating whether the user acknowledged or denied continued use of the service.

132. The method of claim 128, further comprising:
receiving the user response; and
if the user response indicates that the user denied continued use of the service, quarantining, blocking, or restricting the communications device from accessing the particular roaming access network.

133. The method of claim 126, wherein the notification includes content stored locally on the communications device.

134. The method of claim 126, wherein the notification includes content from a network element.

135. The method of claim 92, further comprising:
comparing the estimated service usage cost to a second limit, the second limit less than the first limit; and
sending to the user of the communications device a warning indicating the estimated service usage cost, the warning based on the comparison of the estimated service usage cost to the second limit.

136. The method of claim 92, wherein the indication is configured to trigger a service processor to provide a notification to the user through a user interface, the notification including one or more service plan options for the user to select to receive additional service.

137. The method of claim 92, further comprising:
determining an estimated rate of usage of the service by the communications device;
analyzing the estimated rate of usage to determine a projected usage estimate; and
sending to the user of the communications device a rate of service usage notification or service usage warning based on the projected usage estimate.

* * * * *